(12) United States Patent
Monkman et al.

(10) Patent No.: US 11,958,212 B2
(45) Date of Patent: Apr. 16, 2024

(54) METHODS AND COMPOSITIONS FOR TREATMENT OF CONCRETE WASH WATER

(71) Applicant: CARBONCURE TECHNOLOGIES, INC., Dartmouth (CA)

(72) Inventors: George Sean Monkman, Halifax (CA); Paul J. Sandberg, Venice, FL (US); Kevin Cail, Sarasota, FL (US); Dean Paul Forgeron, White's Lake (CA); Mark MacDonald, Sackville (CA)

(73) Assignee: CARBONCURE TECHNOLOGIES INC., Dartmouth (CA)

( * ) Notice: Subject to any disclaimer, the term of this patent is extended or adjusted under 35 U.S.C. 154(b) by 564 days.

(21) Appl. No.: 16/624,776

(22) PCT Filed: Jun. 20, 2018

(86) PCT No.: PCT/CA2018/050750
§ 371 (c)(1),
(2) Date: Dec. 19, 2019

(87) PCT Pub. No.: WO2018/232507
PCT Pub. Date: Dec. 27, 2018

(65) Prior Publication Data
US 2020/0282595 A1 Sep. 10, 2020

Related U.S. Application Data

(60) Provisional application No. 62/675,615, filed on May 23, 2018, provisional application No. 62/652,385, filed on Apr. 4, 2018, provisional application No. 62/573,109, filed on Oct. 16, 2017, provisional application No. 62/570,452, filed on Oct. 10, 2017, provisional application No. 62/560,311, filed on Sep. 19, 2017, provisional application No. 62/559,771, filed on Sep. 18, 2017, provisional application No. 62/558,173, filed on Sep. 13, 2017, provisional application No. 62/554,830, filed on Sep. 6, 2017, provisional application No. 62/522,510, filed on Jun. 20, 2017.

(51) Int. Cl.
| | |
|---|---|
| B28C 5/00 | (2006.01) |
| B28C 7/04 | (2006.01) |
| B28C 7/12 | (2006.01) |
| C02F 1/66 | (2006.01) |
| C04B 22/00 | (2006.01) |
| C04B 28/04 | (2006.01) |
| C04B 40/00 | (2006.01) |

(52) U.S. Cl.
CPC ............ B28C 5/003 (2013.01); B28C 7/12 (2013.01); C02F 1/66 (2013.01); C04B 22/0046 (2013.01); C04B 28/04 (2013.01); *B28C 7/0418* (2013.01); *B28C 7/0454* (2013.01); *C02F 2209/005* (2013.01); *C02F 2209/02* (2013.01); *C02F 2209/05* (2013.01); *C02F 2209/06* (2013.01); *C02F 2209/245* (2013.01); *C02F 2209/42* (2013.01); *C02F 2209/44* (2013.01); *C04B 40/0032* (2013.01)

(58) Field of Classification Search
CPC .......... B29B 7/60; B29B 7/603; C04B 12/00; C04B 40/0032; C04B 28/02; C04B 40/0231; C04B 22/06; C04B 22/0046; C04B 28/04; B28C 5/00; B28C 5/422; B28C 5/4237; B28C 5/003; B28C 7/12; B28C 7/0418; B28C 7/0454; B01F 15/00136; B01F 15/00162; B01F 3/04099; B01F 13/0037; B01F 3/04439; B01F 9/00; B01F 15/00175; B01F 2215/0047; B01F 7/12; B01F 15/00142; G01F 1/00; G01F 1/86; C02F 1/66; C02F 2209/005; C02F 2209/04; C02F 2209/05; C02F 2209/06; C02F 2209/245; C02F 2209/42; C02F 2209/44; C02F 2103/12; C02F 2209/24; C02F 2209/02; Y02P 40/18; Y02W 30/91
See application file for complete search history.

(56) References Cited

U.S. PATENT DOCUMENTS

| | | |
|---|---|---|
| 128,980 A | 7/1872 | Rowland |
| 170,594 A | 11/1875 | Richardson |
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |

(Continued)

FOREIGN PATENT DOCUMENTS

| | | |
|---|---|---|
| AU | 2397377 A | 10/1978 |
| AU | 504446 B2 | 10/1979 |

(Continued)

OTHER PUBLICATIONS

EP17781677.4 Extended European Search Report dated Nov. 12, 2019.

(Continued)

*Primary Examiner* — Charles Cooley

(74) *Attorney, Agent, or Firm* — Storella & Witt, LLP

(57) ABSTRACT

The invention provides methods and compositions for treating wash water from concrete production with carbon dioxide. The treated wash water can be reused as mix water in fresh batches of concrete.

17 Claims, 88 Drawing Sheets

(56) References Cited

U.S. PATENT DOCUMENTS

| | | |
|---|---|---|
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Kilburn |
| 3,752,314 A | 8/1973 | Brown et al. |
| 3,757,631 A | 9/1973 | McManus et al. |
| 3,917,236 A | 11/1975 | Hanson |
| 3,957,203 A | 5/1976 | Bullard |
| 3,976,445 A | 8/1976 | Douglas et al. |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,117,060 A | 9/1978 | Murray |
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,375,755 A | 3/1983 | Barbini et al. |
| 4,420,868 A | 12/1983 | McEwen et al. |
| 4,427,610 A | 1/1984 | Murray |
| 4,436,498 A | 3/1984 | Murray |
| 4,526,534 A | 7/1985 | Wollmann |
| 4,588,299 A | 5/1986 | Brown et al. |
| 4,613,472 A | 9/1986 | Svanholm |
| 4,746,481 A | 5/1988 | Schmidt |
| 4,772,439 A | 9/1988 | Trevino-Gonzalez |
| 4,789,244 A | 12/1988 | Dunton et al. |
| 4,846,580 A | 7/1989 | Oury |
| 4,881,347 A | 11/1989 | Mario et al. |
| 4,917,587 A | 4/1990 | Alpar et al. |
| 4,944,595 A | 7/1990 | Hodson |
| 5,051,217 A | 9/1991 | Alpar et al. |
| 5,158,996 A | 10/1992 | Valenti |
| 5,162,402 A | 11/1992 | Ogawa et al. |
| 5,203,919 A | 4/1993 | Bobrowski et al. |
| 5,220,732 A | 6/1993 | Lee |
| 5,232,496 A | 8/1993 | Jennings et al. |
| 5,244,498 A | 9/1993 | Steinke |
| 5,257,464 A | 11/1993 | Trevino-Gonzales |
| 5,298,475 A | 3/1994 | Shibata et al. |
| 5,352,035 A | 10/1994 | Macaulay et al. |
| 5,356,579 A | 10/1994 | Jennings et al. |
| 5,358,566 A | 10/1994 | Tanaka et al. |
| 5,360,660 A | 11/1994 | Nohlgren |
| 5,393,343 A | 2/1995 | Darwin et al. |
| 5,427,617 A | 6/1995 | Bobrowski et al. |
| 5,453,123 A | 9/1995 | Burge et al. |
| 5,458,470 A | 10/1995 | Mannhart et al. |
| 5,494,516 A | 2/1996 | Drs et al. |
| 5,505,987 A | 4/1996 | Jennings et al. |
| 5,518,540 A | 5/1996 | Jones, Jr. |
| 5,583,183 A | 12/1996 | Darwin et al. |
| 5,609,681 A | 3/1997 | Drs et al. |
| 5,612,396 A | 3/1997 | Valenti et al. |
| 5,624,493 A | 4/1997 | Wagh et al. |
| 5,633,298 A | 5/1997 | Arfaei et al. |
| 5,643,978 A | 7/1997 | Darwin et al. |
| 5,650,562 A | 7/1997 | Jones, Jr. |
| 5,660,626 A | 8/1997 | Ohta et al. |
| 5,661,206 A | 8/1997 | Tanaka et al. |
| 5,665,158 A | 9/1997 | Darwin et al. |
| 5,667,298 A | 9/1997 | Musil et al. |
| 5,668,195 A | 9/1997 | Leikauf |
| 5,669,968 A | 9/1997 | Kobori et al. |
| 5,674,929 A | 10/1997 | Melbye |
| 5,676,905 A | 10/1997 | Andersen et al. |
| 5,690,729 A | 11/1997 | Jones, Jr. |
| 5,703,174 A | 12/1997 | Arfaei et al. |
| 5,725,657 A | 3/1998 | Darwin et al. |
| 5,728,207 A | 3/1998 | Arfaei et al. |
| 5,744,078 A | 4/1998 | Soroushian et al. |
| 5,752,768 A | 5/1998 | Assh |
| 5,753,744 A | 5/1998 | Darwin et al. |
| 5,798,425 A | 8/1998 | Albrecht et al. |
| 5,800,752 A | 9/1998 | Charlebois |
| 5,804,175 A | 9/1998 | Ronin et al. |
| 5,840,114 A | 11/1998 | Jeknavorian et al. |
| 5,873,653 A | 2/1999 | Paetzold |
| 5,882,190 A | 3/1999 | Doumet |
| 5,885,478 A * | 3/1999 | Montgomery .......... C04B 18/16 |
| 5,912,284 A | 6/1999 | Hirata et al. |
| 5,935,317 A | 8/1999 | Soroushian et al. |
| 5,947,600 A | 9/1999 | Maeda et al. |
| 5,965,201 A | 10/1999 | Jones, Jr. |
| 6,008,275 A | 12/1999 | Moreau et al. |
| 6,042,258 A | 3/2000 | Hines et al. |
| 6,042,259 A | 3/2000 | Hines et al. |
| 6,063,184 A | 5/2000 | Leikauf et al. |
| 6,066,262 A | 5/2000 | Montgomery et al. |
| 6,113,684 A | 9/2000 | Kunbargi |
| 6,136,950 A | 10/2000 | Vickers, Jr. et al. |
| 6,187,841 B1 | 2/2001 | Tanaka et al. |
| 6,264,736 B1 | 7/2001 | Knopf et al. |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,318,193 B1 | 11/2001 | Brock et al. |
| 6,334,895 B1 | 1/2002 | Bland |
| 6,372,157 B1 | 4/2002 | Krill, Jr. et al. |
| 6,387,174 B2 | 5/2002 | Knopf et al. |
| 6,451,105 B1 | 9/2002 | Turpin, Jr. |
| 6,463,958 B1 | 10/2002 | Schwing |
| 6,517,631 B2 | 2/2003 | Bland |
| 6,648,551 B1 | 11/2003 | Taylor |
| 6,682,655 B2 | 1/2004 | Beckham et al. |
| 6,871,667 B2 | 3/2005 | Schwing et al. |
| 6,890,497 B2 | 5/2005 | Rau et al. |
| 6,936,098 B2 | 8/2005 | Ronin |
| 6,960,311 B1 | 11/2005 | Mirsky et al. |
| 6,997,045 B2 | 2/2006 | Wallevik et al. |
| 7,003,965 B2 | 2/2006 | Auer et al. |
| 7,201,018 B2 | 4/2007 | Gershtein et al. |
| 7,390,444 B2 | 6/2008 | Ramme et al. |
| 7,399,378 B2 | 7/2008 | Edwards et al. |
| 7,419,051 B2 | 9/2008 | Damkjaer et al. |
| 7,549,493 B1 | 6/2009 | Jones |
| 7,588,661 B2 | 9/2009 | Edwards et al. |
| 7,635,434 B2 | 12/2009 | Mickelson et al. |
| 7,704,349 B2 | 4/2010 | Edwards et al. |
| 7,735,274 B2 | 6/2010 | Constantz et al. |
| 7,736,430 B2 | 6/2010 | Barron et al. |
| 7,771,684 B2 | 8/2010 | Constantz et al. |
| 7,815,880 B2 | 10/2010 | Constantz et al. |
| 7,879,146 B2 | 2/2011 | Raki et al. |
| 7,906,086 B2 | 3/2011 | Comrie |
| 7,914,685 B2 | 3/2011 | Constantz et al. |
| 7,922,809 B1 | 4/2011 | Constantz et al. |
| 7,950,841 B2 | 5/2011 | Klein et al. |
| 7,966,250 B2 | 6/2011 | Constantz et al. |
| 8,006,446 B2 | 8/2011 | Constantz et al. |
| 8,043,426 B2 | 10/2011 | Mohamed et al. |
| 8,105,558 B2 | 1/2012 | Comrie |
| 8,114,214 B2 | 2/2012 | Constantz et al. |
| 8,114,367 B2 | 2/2012 | Riman et al. |
| 8,118,473 B2 | 2/2012 | Cooley et al. |
| 8,137,455 B1 | 3/2012 | Constantz et al. |
| 8,157,009 B2 | 4/2012 | Patil et al. |
| 8,177,909 B2 | 5/2012 | Constantz et al. |
| 8,192,542 B2 | 6/2012 | Virtanen |
| 8,235,576 B2 | 8/2012 | Klein et al. |
| 8,272,205 B2 | 9/2012 | Estes et al. |
| 8,287,173 B2 | 10/2012 | Khouri |
| 8,311,678 B2 | 11/2012 | Koehler et al. |
| 8,313,802 B2 | 11/2012 | Riman et al. |
| 8,333,944 B2 | 12/2012 | Constantz et al. |

(56) References Cited

U.S. PATENT DOCUMENTS

| | | |
|---|---|---|
| 8,470,275 B2 | 6/2013 | Constantz et al. |
| 8,491,858 B2 | 7/2013 | Seeker et al. |
| 8,518,176 B2 | 8/2013 | Silva et al. |
| 8,584,864 B2 | 11/2013 | Lee et al. |
| 8,708,547 B2 | 4/2014 | Bilger |
| 8,709,960 B2 | 4/2014 | Riman et al. |
| 8,721,784 B2 | 5/2014 | Riman et al. |
| 8,746,954 B2 | 6/2014 | Cooley et al. |
| 8,845,940 B2 | 9/2014 | Niven et al. |
| 8,989,905 B2 | 3/2015 | Sostaric et al. |
| 9,061,940 B2 | 6/2015 | Chen et al. |
| 9,108,803 B2 | 8/2015 | Till |
| 9,108,883 B2 | 8/2015 | Forgeron et al. |
| 9,376,345 B2 | 6/2016 | Forgeron et al. |
| 9,388,072 B1 | 7/2016 | Niven et al. |
| 9,429,558 B2 | 8/2016 | Boncan et al. |
| 9,448,094 B2 | 9/2016 | Downie et al. |
| 9,463,580 B2 | 10/2016 | Forgeron et al. |
| 9,492,945 B2 | 11/2016 | Niven et al. |
| 9,738,562 B2 * | 8/2017 | Monkman ............. B28C 5/1856 |
| 9,758,437 B2 | 9/2017 | Forgeron et al. |
| 9,790,131 B2 | 10/2017 | Lee et al. |
| 10,246,379 B2 | 4/2019 | Niven et al. |
| 10,350,787 B2 | 7/2019 | Forgeron et al. |
| 10,392,305 B2 | 8/2019 | Wang et al. |
| 10,570,064 B2 | 2/2020 | Monkman et al. |
| 10,654,191 B2 | 5/2020 | Niven et al. |
| 10,683,237 B2 | 6/2020 | Lee et al. |
| 10,927,042 B2 | 2/2021 | Monkman et al. |
| 11,090,700 B1 | 8/2021 | Camell |
| 2002/0019459 A1 | 2/2002 | Albrecht et al. |
| 2002/0047225 A1 | 4/2002 | Bruning et al. |
| 2002/0179119 A1 | 12/2002 | Harmon |
| 2003/0122273 A1 | 7/2003 | Fifield |
| 2005/0131600 A1 | 6/2005 | Quigley et al. |
| 2005/0219938 A1 | 10/2005 | Rigaudon et al. |
| 2005/0219939 A1 | 10/2005 | Christenson et al. |
| 2007/0114178 A1 | 5/2007 | Coppola et al. |
| 2007/0170119 A1 | 7/2007 | Mickelson et al. |
| 2007/0171764 A1 | 7/2007 | Klein et al. |
| 2007/0185636 A1 | 8/2007 | Cooley et al. |
| 2007/0215353 A1 | 9/2007 | Barron et al. |
| 2008/0092957 A1 | 4/2008 | Rosaen |
| 2008/0174041 A1 | 7/2008 | Firedman et al. |
| 2008/0183523 A1 | 7/2008 | Dikeman |
| 2008/0202389 A1 | 8/2008 | Hojaji et al. |
| 2008/0245274 A1 | 10/2008 | Ramme |
| 2008/0264872 A1 | 10/2008 | Konishi et al. |
| 2008/0275149 A1 | 11/2008 | Ladely et al. |
| 2008/0308133 A1 | 12/2008 | Grubb et al. |
| 2008/0316856 A1 | 12/2008 | Cooley et al. |
| 2009/0044832 A1 | 2/2009 | Leonardich et al. |
| 2009/0093328 A1 | 4/2009 | Dickinger et al. |
| 2009/0103392 A1 | 4/2009 | Bilger |
| 2009/0143211 A1 | 6/2009 | Riman et al. |
| 2009/0292572 A1 | 11/2009 | Alden et al. |
| 2009/0294079 A1 | 12/2009 | Edwards et al. |
| 2010/0086983 A1 | 4/2010 | Gellett et al. |
| 2010/0132556 A1 | 6/2010 | Constantz et al. |
| 2010/0239487 A1 | 9/2010 | Constantz et al. |
| 2010/0246312 A1 | 9/2010 | Welker et al. |
| 2011/0067600 A1 | 3/2011 | Constantz et al. |
| 2011/0165400 A1 | 7/2011 | Quaghebeur et al. |
| 2011/0198369 A1 | 8/2011 | Klein et al. |
| 2011/0249527 A1 | 10/2011 | Seiler et al. |
| 2011/0281333 A1 | 11/2011 | Brown et al. |
| 2011/0289901 A1 | 12/2011 | Estes et al. |
| 2011/0303551 A1 | 12/2011 | Gilliam et al. |
| 2011/0320040 A1 | 12/2011 | Koehler et al. |
| 2012/0031303 A1 | 2/2012 | Constantz et al. |
| 2012/0153153 A1 | 6/2012 | Chang et al. |
| 2012/0238006 A1 | 9/2012 | Gartner et al. |
| 2012/0290208 A1 | 11/2012 | Jiang et al. |
| 2012/0312194 A1 | 12/2012 | Riman et al. |
| 2013/0036945 A1 | 2/2013 | Constantz et al. |
| 2013/0122267 A1 | 5/2013 | Riman et al. |
| 2013/0125791 A1 | 5/2013 | Fried et al. |
| 2013/0139727 A1 | 6/2013 | Constantz et al. |
| 2013/0167756 A1 | 7/2013 | Chen et al. |
| 2013/0284073 A1 | 10/2013 | Gartner |
| 2013/0305963 A1 | 11/2013 | Fridman |
| 2014/0034452 A1 | 2/2014 | Lee et al. |
| 2014/0050611 A1 | 2/2014 | Warren et al. |
| 2014/0069302 A1 | 3/2014 | Saastamoinen et al. |
| 2014/0083514 A1 | 3/2014 | Ding |
| 2014/0096704 A1 | 4/2014 | Rademan et al. |
| 2014/0104972 A1 | 4/2014 | Roberts et al. |
| 2014/0107844 A1 | 4/2014 | Koehler et al. |
| 2014/0116295 A1 | 5/2014 | Niven et al. |
| 2014/0127450 A1 | 5/2014 | Riman et al. |
| 2014/0197563 A1 | 7/2014 | Niven et al. |
| 2014/0212941 A1 | 7/2014 | Lee |
| 2014/0216303 A1 | 8/2014 | Lee et al. |
| 2014/0327168 A1 | 11/2014 | Niven et al. |
| 2014/0373755 A1 | 12/2014 | Forgeron et al. |
| 2015/0023127 A1 | 1/2015 | Chon et al. |
| 2015/0069656 A1 | 3/2015 | Bowers et al. |
| 2015/0197447 A1 | 7/2015 | Forgeron et al. |
| 2015/0202579 A1 | 7/2015 | Richardson et al. |
| 2015/0232381 A1 | 8/2015 | Niven et al. |
| 2015/0247212 A1 | 9/2015 | Sakaguchi et al. |
| 2015/0298351 A1 | 10/2015 | Beaupré |
| 2015/0345034 A1 | 12/2015 | Sundara et al. |
| 2015/0355049 A1 | 12/2015 | Ait et al. |
| 2016/0001462 A1 | 1/2016 | Forgeron et al. |
| 2016/0107939 A1 * | 4/2016 | Monkman ............... C04B 28/04 366/12 |
| 2016/0185662 A9 | 6/2016 | Niven et al. |
| 2016/0272542 A1 * | 9/2016 | Monkman ................ B28C 7/04 |
| 2016/0280610 A1 | 9/2016 | Forgeron et al. |
| 2016/0340253 A1 | 11/2016 | Forgeron et al. |
| 2016/0355441 A1 | 12/2016 | Tregger et al. |
| 2016/0355442 A1 | 12/2016 | Niven et al. |
| 2017/0015598 A1 | 1/2017 | Monkman et al. |
| 2017/0028586 A1 | 2/2017 | Jordan et al. |
| 2017/0036372 A1 | 2/2017 | Sandberg et al. |
| 2017/0043499 A1 | 2/2017 | Forgeron et al. |
| 2017/0158549 A1 | 6/2017 | Yamada et al. |
| 2017/0158569 A1 | 6/2017 | Lee et al. |
| 2017/0165870 A1 | 6/2017 | Niven et al. |
| 2017/0217047 A1 | 8/2017 | Leon et al. |
| 2017/0252714 A1 | 9/2017 | Bennett et al. |
| 2017/0283293 A1 | 10/2017 | Shin et al. |
| 2018/0022654 A1 | 1/2018 | Forgeron et al. |
| 2018/0029934 A1 * | 2/2018 | Monkman ............... C04B 22/10 |
| 2018/0118622 A1 | 5/2018 | Monkman et al. |
| 2018/0252444 A1 | 9/2018 | Nelson et al. |
| 2018/0258000 A1 | 9/2018 | Lee et al. |
| 2019/0168416 A1 * | 6/2019 | Monkman ............. C02F 1/5236 |
| 2020/0165170 A1 | 5/2020 | Niven et al. |
| 2020/0223760 A1 | 7/2020 | Monkman et al. |
| 2020/0282595 A1 * | 9/2020 | Monkman ................ C02F 1/66 |
| 2022/0001578 A1 | 1/2022 | Forgeron et al. |
| 2022/0013196 A1 * | 1/2022 | Monkman ............ G01N 33/004 |
| 2022/0065527 A1 | 3/2022 | Forgeron et al. |
| 2022/0194852 A1 | 6/2022 | Thomas et al. |

FOREIGN PATENT DOCUMENTS

| | | |
|---|---|---|
| AU | 2017249444 A1 | 11/2018 |
| CA | 970935 A1 | 7/1975 |
| CA | 1045073 A | 12/1978 |
| CA | 1072440 A | 2/1980 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |

(56) References Cited

FOREIGN PATENT DOCUMENTS

| | | |
|---|---|---|
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CA | 2943791 A1 | 10/2015 |
| CA | 3019860 A1 | 10/2017 |
| CA | 3068082 A1 | 12/2018 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| CN | 101844826 A | 9/2010 |
| CN | 105102370 A | 11/2015 |
| CN | 107814530 A | 3/2018 |
| CN | 110590260 A | 12/2019 |
| DE | 1817001 A1 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0639650 A1 | 2/1995 |
| EP | 0573524 B1 | 5/1996 |
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 1749629 B1 | 5/2013 |
| EP | 2123441 B1 | 7/2013 |
| EP | 2107000-81 | 9/2013 |
| EP | 2031010 B1 | 4/2014 |
| EP | 2123808 B1 | 5/2014 |
| EP | 2036952 B1 | 4/2016 |
| EP | 3013544 A1 | 5/2016 |
| EP | 2387551 B1 | 7/2016 |
| EP | 1985754 B1 | 8/2016 |
| EP | 3081842 A1 | 10/2016 |
| EP | 3129126 A1 | 2/2017 |
| EP | 3442761 A1 | 2/2019 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A | 10/1982 |
| FR | 2513932 A1 | 4/1983 |
| FR | 2735804 A1 | 12/1996 |
| FR | 2805532 A1 | 8/2001 |
| FR | 2969997 B1 | 3/2015 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2300631 A | 11/1996 |
| GB | 2302090 A | 1/1997 |
| GB | 2392502 A | 3/2004 |
| GB | 2467005 A | 7/2010 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05116135 A | 5/1993 |
| JP | H05117012 A | 5/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |
| JP | H09124099 A | 5/1997 |
| JP | H10194798 A | 7/1998 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2001026418 A | 1/2001 |
| JP | 2001170659 A | 6/2001 |
| JP | 2002012480 A | 1/2002 |
| JP | 2002127122 A | 5/2002 |
| JP | 3311436 B2 | 8/2002 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 3147769 U | 1/2009 |
| JP | 2009115209 A | 5/2009 |
| JP | 2009136770 A | 6/2009 |
| JP | 4313352 B2 | 8/2009 |
| JP | 2010125386 A | 6/2010 |
| JP | 2011073891 A | 4/2011 |
| JP | 2014213479 A | 11/2014 |
| JP | 2017074552 A | 4/2017 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060064557 A | 6/2006 |
| KR | 100766364 B1 | 10/2007 |
| KR | 100950009 B1 | 3/2010 |
| KR | 20110048266 A | 5/2011 |
| MX | 2018012464 A | 8/2019 |
| NZ | 183790 A | 9/1980 |

(56) References Cited

FOREIGN PATENT DOCUMENTS

| RU | 2168412 C2 | 6/2001 | | |
|---|---|---|---|---|
| RU | 2212125 C2 | 9/2003 | | |
| RU | 2351469 C2 | 4/2009 | | |
| SE | 8002613 L | 3/1982 | | |
| SE | 451067 B | 8/1987 | | |
| SU | 1031728 A2 | 7/1983 | | |
| TW | I257330 B | 7/2006 | | |
| WO | WO-7900473 A1 | 7/1979 | | |
| WO | WO-8500587 A1 | 2/1985 | | |
| WO | WO-9105644 A1 | 5/1991 | | |
| WO | WO-9215753 A1 | 9/1992 | | |
| WO | WO-9319347 A1 | 9/1993 | | |
| WO | WO-9427797 A1 | 12/1994 | | |
| WO | WO-2001064348 A1 | 9/2001 | | |
| WO | WO-0190020 A2 | 11/2001 | | |
| WO | WO-2004033793 A2 | 4/2004 | | |
| WO | WO-2004074733 A1 | 9/2004 | | |
| WO | WO-2005025768 A1 | 3/2005 | | |
| WO | WO-2006040503 A1 | 4/2006 | | |
| WO | WO-2006100550 A1 | 9/2006 | | |
| WO | WO-2006100693 A1 | 9/2006 | | |
| WO | 2008057275 A2 | 5/2008 | | |
| WO | WO-2008149389 A1 | 12/2008 | | |
| WO | WO-2008149390 A1 | 12/2008 | | |
| WO | WO-2009078430 A1 | 6/2009 | | |
| WO | WO-2009089906 A1 | 7/2009 | | |
| WO | WO-2009132692 A1 | 11/2009 | | |
| WO | 2010048457 A1 | 4/2010 | | |
| WO | WO-2010074811 A1 | 7/2010 | | |
| WO | WO-2012079173 A1 | 6/2012 | | |
| WO | WO-2012081486 A1 | 6/2012 | | |
| WO | WO-2013011092 A1 | 1/2013 | | |
| WO | WO-2014021884 A1 | 2/2014 | | |
| WO | WO-2014026794 A1 | 2/2014 | | |
| WO | WO-2014063242 A1 | 5/2014 | | |
| WO | WO-2014121198 A1 | 8/2014 | | |
| WO | 2014154741 A1 | 10/2014 | | |
| WO | WO-2014205577 A1 | 12/2014 | | |
| WO | WO-2015123769 A1 | 8/2015 | | |
| WO | WO-2015/154174 | 10/2015 | | |
| WO | WO-2015154162 A1 | 10/2015 | | |
| WO | WO-2016041054 A1 | 3/2016 | | |
| WO | WO-2016082030 | 6/2016 | | |
| WO | WO-2016082030 A1 | 6/2016 | | |
| WO | WO-2017000075 A1 | 1/2017 | | |
| WO | WO-2017041176 | 3/2017 | | |
| WO | 2017177324 A1 | 10/2017 | | |
| WO | WO-2017177324 A1 * | 10/2017 | ............... | B28C 5/00 |
| WO | 2018232507 A1 | 12/2018 | | |
| WO | WO-2018232507 A1 | 12/2018 | | |

OTHER PUBLICATIONS

U.S. Appl. No. 15/304,208 Office Action dated Oct. 25, 2019.
U.S. Appl. No. 15/650,524 Office Action dated Sep. 17, 2019.
Cheung et al. Impact of admixtures on the hydration kinetics of Portland cement. Cement and Concrete Research 41:1289-1309 (2011).
Co-pending U.S. Appl. No. 16/249,012, filed Jan. 16, 2019.
Cornerstone Custom Concrete, LLC. "How Much Does Concrete Weigh?" Retrieved Jul. 15, 2019. <web.archive.org/web/20130124160823/http://www.minneapolis-concrete.com/how-much-does-concrete-weigh.html>. One page. (Year: 2013).
Lobo et al. Recycled Water in Ready Mixed Concrete Operations. Concrete in Focus, Spring 2003 (2003). 10 pages.
"MB-AETM 90: Air-Entraining Admixture" BASF, Product Data (Apr. 2011), 2 pages, found at http://www.basf-admixtures.com/en/products/airentraining/mbae_90/Pages/default.aspx.
EP14746909.2 Summons to Attend Oral Proceedings dated Jun. 19, 2019.
U.S. Appl. No. 15/304,208 Office Action dated Jan. 24, 2019.
U.S. Appl. No. 15/170,018 Notice of Allowance dated Dec. 19, 2018.
U.S. Appl. No. 15/240,954 Ex Parte Quayle Office action dated Feb. 5, 2019.
U.S. Appl. No. 15/240,954 Notice of Allowance dated Mar. 5, 2019.
U.S. Appl. No. 15/284,186 Office Action dated Jun. 14, 2019.
U.S. Appl. No. 15/828,240 Office Action dated Jul. 22, 2019.
Google Patents Translation of EP1785245. pp. 1-2. Retrieved Jul. 17, 2019. (Year: 2007).
Tri-Cast literature, Dry cast machine. Besser Company. Sioux, Iowa, USA. (Jun. 2009).
Co-pending U.S. Appl. No. 15/911,573, filed Mar. 5, 2018.
Co-pending U.S. Appl. No. 15/649,339, filed Jul. 13, 2017.
Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.
Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed Feb. 4, 2013.
Co-pending U.S. Appl. No. 61/976,360, filed Apr. 7, 2014.
Co-pending U.S. Appl. No. 61/980,505, filed Apr. 16, 2014.
EP15862209.2 Partial Supplementary European Search Report dated Jun. 20, 2018.
European search report dated Nov. 7, 2017 for EP Application No. 15776706.
European search report with written opinion dated Nov. 14, 2017 for EP Application No. 15777459.
European search report with written opinion dated Nov. 29, 2017 for EP15780122.
Le et al. Hardened properties of high-performance printing concrete. Cement and Concrete Research, vol. 42, No. 3, Mar. 31, 2012, pp. 558-566.
MASS. Premixed Cement Paste. Concrete International 11(11):82-85 (Nov. 1, 1989).
Office action dated Oct. 19, 2017 for U.S. Appl. No. 15/228,964.
PCT Application No. PCT/CA2014/050611 as filed Jun. 25, 2014.
Younsi, et al. Performance-based design and carbonation of concrete with high fly ash content. Cement and Concrete Composites, Elsevier Applied Science, Barking, GB, vol. 33, No. 1, Jul. 14, 2011. pp. 993-1000.
Co-pending U.S. Appl. No. 15/650,524, filed Jul. 14, 2017.
Co-pending U.S. Appl. No. 15/659,334, filed Jul. 25, 2017.
European search report with written opinion dated Feb. 2, 2017 for EP2951122.
European search report with written opinion dated Jan. 20, 2017 for EP14818442.
International search report with written opinion dated Jun. 15, 2017 for PCT/CA2017/050445.
International search report with written opinion dated Jul. 3, 2016 for PCT/CA2015/050195.
Notice of allowance dated Apr. 14, 2017 for U.S. Appl. No. 15/157,205.
Notice of allowance dated Apr. 24, 2017 for U.S. Appl. No. 15/161,927.
Notice of allowance dated Jun. 15, 2017 for U.S. Appl. No. 15/157,205.
Notice of allowance dated Jun. 22, 2017 for U.S. Appl. No. 15/161,927.
Notice of allowance dated Jun. 30, 2017 for U.S. Appl. No. 15/434,429.
Notice of allowance dated Jul. 28, 2017 for U.S. Appl. No. 15/434,429.
Notice of allowance dated Aug. 2, 2017 for U.S. Appl. No. 15/161,927.

(56) References Cited

OTHER PUBLICATIONS

Office action dated Feb. 27, 2017 for U.S. Appl. No. 14/171,350.
Office action dated Mar. 7, 2017 for U.S. Appl. No. 15/434,429.
Office action dated Mar. 14, 2017 for U. S. Appl. No. 15/228,964.
Office action dated May 10, 2017 for U.S. Appl. No. 13/994,681.
Office action dated Jul. 3, 2017 for U.S. Appl. No. 14/171,350.
Yelton, R. Treating Process Water. The Concrete Producer. pp. 441-443. Jun. 1, 1997.
Co-pending U.S. Appl. No. 15/284,186, filed Oct. 3, 2016.
International Search Report and Written Opinion dated Aug. 30, 2016 for International application No. PCT/CA2016/050773.
International Search Report and Written Opinion dated Oct. 19, 2016 for International Application No. PCT/CA2016/051062.
Kim, et al. Properties of cement-based mortars substituted by carbonated fly ash and carbonated under supercritical conditions. IJAER. 9(24), 25525-25534 (2014).
Notice of Allowance dated Dec. 21, 2016 for U.S. Appl. No. 15/161,927.
Office Action dated Nov. 3, 2016 for U.S. Appl. No. 15/161,927.
Office Action dated Dec. 29, 2016 for U.S. Appl. No. 15/157,205.
Office Action dated Dec. 30, 2016 for U.S. Appl. No. 13/994,681.
Abanades, et al. Conversion limits in the reaction of CO2 with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the CO2-lime reaction. AIChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
"Clear Edge Filtration—Screen and Filter, Process Belts, and Screen Print," Mining-Techology.com, no date, [retrieved on May 25, 2010]. Retrieved from: http/www.mining-technology.com/contractors/filtering/clear-edge/, 2 pages.
Co-pending U.S. Appl. No, 15/170,018, filed Jun. 1, 2016.
Co-pending U.S. Appl. No. 15/184,219, filed Jun. 16, 2016.
Co-pending U.S. Appl. No. 15/228,964, filed Aug. 4, 2016.
Co-pending U.S. Appl. No. 15/240,954, filed Aug. 18, 2016.
Co-pending U.S. Appl. No. 62/096,018, filed Dec. 23, 2014.
Co-pending U.S. Appl. No. 61/839,312, filed Jun. 25, 2013.
Co-pending U.S. Appl. No. 61/847,254, filed Jul. 17, 2013.
Co-pending U.S. Appl. No. 61/879,049, filed Sep. 17, 2013.
Co-pending U.S. Appl. No. 61/925,100, filed Jan. 8, 2014.
Co-pending U.S. Appl. No. 61/938,063, filed Feb. 10, 2014.
Co-pending U.S. Appl. No. 61/941,222, filed Feb. 18, 2014.
Co-pending U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CArbonCure garners $3.5 min in Series B funds," Reuters PE HUB, Dec. 11, 2013, 6 pages, found at http://www.pehub.com/2013/12/nova-scotia-based-carboncure-garners-3-5-mln-in-series-b-funds/.
Estes-Haselbach. The greenest concrete mixer—carbon sequestration in freshly mixed concrete. Sep. 25, 2012.
Eurpoean search report and search opinion dated Jan. 14, 2015 for EP 11849437.6.
Fernandez-Bertos, et al. A review of accelerated carbonation technology in the treatment of cement-based materials and sequestration of CO2. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Gager, "Trumbull Corp.: CHARLEROI Lock & Dam," Construction Today, 2010, [retrieved on May 25, 2010]. Retrieved from http://www.construction-today.com/cms1/content/view/1909/104/, 2 pages.
"Glenium® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudal.ac.jp/dspace/bitstream/2115/35923/1/10(4)_571-640.pdf.
Hesson, et al. Flow of two-phase carbon dioxide through orifices. AIChE Journal 4.2 (1958):207-210.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.
Hurst. Canadian cement plant becomes first to capture CO2 in algae. Earth and Industry. Pond Biofuels press release. Mar. 19, 2010.
Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.
International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 18, 2013 for PCT Application No. CA2013/050190.
International search report and written opinion dated Sep. 18, 2014 for PCT/CA2014/050611.
International search report dated May 16, 2014 for PCT Application No. PCT/US14/14447.
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.
Lomboy, et al. Atom Probe Tomography for Nanomodified Portland Cement. Nanotechnology in Construction. Springer International Publishing, 2015. 79-86.
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.

(56) References Cited

OTHER PUBLICATIONS

Monkman, et al. Carbonated Ladle Slag Fines for Carbon Uptake and Sand Substitute. Journal of Materials in Civil Engineering. Nov. 2009;657-665.

Monkman, et al. Carbonation Curing of Slag-Cement Concrete for Binding CO2 and Improving Performance. Journal of Materials in Civil Engineering. Apr. 2010; 296-304.

Monkman, et al. Integration of carbon sequestration into curing process of precast concrete. Can. J. Civ. Eng. 2010; 37:302-310.

Monkman, G. S. Investigating Carbon Dioxide Sequestration in Fresh Ready Mixed Concrete. International Symposium on Environmentally Friendly Concrete—ECO-Crete Aug. 13-15, 2014, Reykjavik, Iceland.

Monkman, S. Maximizing carbon uptake and performance gain in slag-containing concretes through early carbonation. Thesis. Department of Civil Engineering and Applied Mechanics, McGill University. Montreal, QC, Canada. 2008.

Niven, et al. Carbon Dioxide Uptake Rate and Extent during Accelerated Curing of Concrete. International Congress on the Chemistry of Cement 2007. ICCC 2007.

Niven. Industrial pilot study examining the application of precast concrete carbonation curing. Cardon Sense Solutions Inc. Halifax, Canada. ACEME 2008.

Niven. Physiochemical investigation of CO2 accelerated concrete curing as a greenhosue gas mitigation technology. Theses from the Department of Civil Engineering and Applied Mechanics. McGill University, Montreal, Canada. Oct. 2006.

Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 25, 2016 for U.S. Appl. No. 14/642,536.
Notice of allowance dated May 6, 2016 for U.S. Appl. No. 14/796,751.
Notice of allowance dated May 11, 2016 for U.S. Appl. No. 14/701,456.
Notice of allowance dated Jun. 24, 2015 for U.S. Appl. No. 14/249,308.
Notice of allowance dated Jul. 5, 2016 for U.S. Appl. No. 14/282,965.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 10, 2015 for U.S. Appl. No. 14/249,308.
Office action dated Mar. 28, 2013 for U.S. Appl. No. 13/660,447.
Office action dated Apr. 26, 2016 for U.S. Appl. No. 14/950,288.
Office Action dated Jun. 16, 2016 for U.S. Appl. No. 13/994,681.
Office action dated Jul. 15, 2013 for U.S. Appl. No. 13/660,447.
Office action dated Jul. 30, 2015 for U.S. Appl. No. 14/282,965.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Sep. 28, 2016 for U.S. Appl. No. 15/157,205.
Office action dated Oct. 5, 2015 for U.S. Appl. No. 14/701,456.
Office action dated Dec. 2, 2015 for U.S. Appl. No. 14/282,965.
Office action dated Dec. 7, 2015 for U.S. Appl. No. 14/796,751.
Papadakis, et al. A reaction engineering approach to the problem of concrete carbonation. AIChE Journal. 1989; 35(10):1639-1650.

Papadakis, et al. Fundamental Modeling and Experimental Investigation of Concrete Carbonation. ACI Materials Journal. 1991; 88(4):363-373.

Phipps and MacDonald. Sustainability Leads to Durability in the New I-35W Bridge. Concrete International. Feb. 2009; vol. 31 Issue 2, p. 27-32.

"Pozzolith® 200N: Water-Reducing Admixture," BASF, Product Data, Sep. 2010, 2 pages, found at http://www.basf-admixtures.com/en/products/waterreducingretarding/pozzolith200n/Pages/default.aspx.

"Pozzolith® 322 N: Water-Reducing Admixture," BASF, Product Data, Mar. 2007, 2 pages.

Preliminary Amendment dated Nov. 1, 2013 for U.S. Appl. No. 13/994,681.

Reardon, et al. High pressure carbonation of cementitious grout. Cement and Concrete Research. 1989; 19(3):385-399.

Sato, et al. Effect of Nano-CaCO3 on Hydration of Cement Containing Supplementary Cementitious Materials. Institute for Research in Construction, National Research Council Canada. Oct. 2010.

Sato, et al. Seeding effect of nano-CaCO3 on the hidration of tricalcium silicate, Transportation Research Record. 2010; 2141:61-67.

Shao, et al. A new CO2 sequestration process via concrete products production. Department of civil engineering. McGill University, Montreal, Canada. 2007.

Shao, et al. CO2 sequestration using calcium-silicate concrete. Canadian Journal of Civil Engineering. 2006;(33)6:776-784.

Shao, et al. Market analysis of CO2 sequestration in concrete building products. Second International Conference on Sustainable Construction Materials and Technologies. Jun. 28-30, 2010.

Shao, et al. Recycling carbon dioxide into concrete: a feasibility study. Concrete Sustainability Conference. 2010.

Shi, et al. Studies on some factors affecting CO2 curing of lightweight concrete products. Resources, Conservation and Recycling. 2008; (52)8-9:1087-1092.

Shideler, J. Investigation of the moisture-volume stability of concrete masonry units. Portland Cement Association. 1955. (D3).

Shih, et al. Kinetics of the reaction of Ca(OH)2 with CO2 at low temperature. Industrial and Engineering Chemistry Research. 1999; 38(4):1316-1322.

Sorochkin, et al. Study of the possibility of using carbon dioxide for accelerating the hardening of products made from Portland Cement. J. Appl. Chem. USSR. 1975; 48:1271-1274.

Steinour, H. Some effects of carbon dioxide on mortars and concrete-discussion. Journal of the American Concrete Institute. 1959; 30:905-907.

Technology Roadmap: Cement. International Energy Agency. Dec. 2009 [Retrieved on Jul. 13, 2013]. Retrieved from http://www.iea.org/publications/freepublications/publication/name,3861,en.html.

Teir, et al. Carbonation of Finnish magnesium silicates for CO2 sequestration . Fifth Annual Conference on Carbon Capture and Sequestration. May 8-11, 2006. National Energy Technology Laboratory, Department of Energy, USA.

The Vince Hagan Co., "Stationary, Radial Stacking, and Wet Belt Converyors—Product Brochure," 4 pages.

Toennies, et al. Artificial carbonation of concrete masonry units. American Concrete Institute Journal. 1960; 31(8):737-755.

Tri-Cast literature, Besser Company. Sioux, Iowa, USA.

U.S. Appl. No. 13/660,447, filed Oct. 25, 2012.
U.S. Appl. No. 13/994,681, filed Jun. 14, 2013.
U.S. Appl. No. 14/249,308, filed Apr. 9, 2014.
U.S. Appl. No. 14/282,965, filed May 20, 2014.
U.S. Appl. No. 14/642,536, filed Mar. 9, 2015.
U.S. Appl. No. 14/701,456, filed Apr. 30, 2015.
U.S. Appl. No. 14/796,751, filed Jul. 10, 2015.
U.S. Appl. No. 14/950,288, filed Nov. 24, 2015.
U.S. Appl. No. 61/839,312, filed Jun. 25, 2013.
U.S. Appl. No. 61/847,254, filed Jul. 17, 2013.
U.S. Appl. No. 61/879,049, filed Sep. 17, 2013.
U.S. Appl. No. 61/925,100, filed Jan. 8, 2014.
U.S. Appl. No. 61/938,063, filed Feb. 10, 2014.
U.S. Appl. No. 61/941,222, filed Feb. 18, 2014.
U.S. Appl. No. 61/976,360, filed Apr. 7, 2014.

(56) References Cited

OTHER PUBLICATIONS

U.S. Appl. No. 61/980,505, filed Apr. 16, 2014.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society.. 1974; 57(9):394-397.
ASTM International, "Standard Test Method for Slump of Hydraulic-Cement Concrete," Designation: C143/ C143M—15a, Revised 5.1. 1., Dec. 15, 2015, 4 pages.
Canadian Intellectual Property Office, Canadian Office Action for Application No. 2,943,791 dated Apr. 22, 2021, 3 pages.
Canadian Intellectual Property Office, Canadian Office Action for Application No. 2,943,791 dated May 27, 2022, 3 pages.
Canadian Intellectual Property Office, Canadian Office Action for Application No. 2,943,791 dated Nov. 25, 2021, 4 pages.
Canadian Intellectual Property Office, Canadian Office Action for Application No. 2,945,060, dated Jan. 20, 2022, 4 pages.
Canadian Intellectual Property Office, Canadian Office Action for Application No. 3, 120,472 dated Apr. 22, 2022, 3 pages.
Canadian Intellectual Property Office, Canadian Office Action for Application No. 3, 120,472 dated Oct. 12, 2022, 4 pages.
Canadian Patent Office, Examination Search Report for CA 2,968,246, dated Aug. 18, 2022, 3 pages.
Chile Patent Office, First Office Action and Translation for Application No. 3376-2020, dated Nov. 18, 2021, 34 Pages.
Chile Patent Office, First Office Action for Application No. 3804-2019, dated Mar. 30, 2021, 24 Pages.
Chile Patent Office, Second Examination Report with English Transmittal for Application No. 3376-2020, dated May 16, 2022, 21 Pages.
Chinese International Search Report for Application No. 2019800306982, dated Mar. 25, 2022, 2 pages.
Corrected First Office Action for Chilean Application No. 3804-2019, mailed Aug. 31, 2021, 51 pages.
European Communication for European Application No. 17781677.4, dated May 9, 2022, 5 pages.
Examination Report and translation for Brazilian Application No. 112017010897-6 dated Nov. 23, 2021; 7 pages.
Examination Report for Australian Application No. 2017249444 mailed Jul. 28, 2021, 6 pages.
Examination Report for Australian Application No. 2018288555 mailed Feb. 20, 2021, 5 pages.
Examination Report for Australian Application No. 2018288555 mailed Aug. 9, 2021, 5 pages.
Examination Report for Canadian Application No. 2945060 mailed Apr. 19, 2021, 3 pages.
Examination Report for Canadian Application No. 2968246 mailed Oct. 22, 2021, 4 pages.
Examination Report for EP 15777459.7 mailed Apr. 17, 2020, 7 pages.
Examination Report for European Application No. 17781677.4 dated May 9, 2022; 5 pages.
Examination Report for Indian Application No. 201817042016 mailed Mar. 4, 2021, 5 pages.
Examination Report for Indian Application No. 201917054847 mailed Apr. 20, 2021, 7 pages.
Examination Report for Singapore Application No. 11201912759R mailed Dec. 18, 2021, 5 pages.
Extended European Search Report dated Oct. 8, 2018, for European patent application No. EP15862209.2, 10 pages.
Extended European Search Report for EP 19894565.1, Date Aug. 3, 2022.
Extended European Search Report for European Application No. 18820477.0 mailed Feb. 5, 2021, 11 pages.
Ghacham, "Valorization of waste concrete through CO2 mineral carbonation: optimizing parameter and improving reactivity using concrete separation". Journal of Cleaner Production, 2019, vol. 166, pp. 1-10.
Ho et al., "CO2 Utilization via Direct Aqueous Carbonation of Synthesized Concrete Fines under Atmospheric Pressure". ACS Omega, Jun. 22, 2020 (Jun. 22, 2020), vol. 5, p. 15877-15890.
India, Examination Report for Application No. 202127030664 dated Dec. 15, 2022, 7 pages.
Indonesia Application No. P00202105311 Substantive Examination Results Stage I dated Jan. 11, 2023, 8 pages.
International Search Report and Written Opinion dated Jan. 13, 2021 for PCT Application No. PCT/US20/54625, 6 pages.
International Search Report and Written Opinion dated Oct. 19, 2021 for PCT Application No. PCT/US21/40764, 11 pages.
International Search Report and Written Opinion dated Mar. 29, 2022 for PCT Application No. PCT/IB2021/000718.
International Search Report and Written Opinion dated Aug. 25, 2021 for PCT Application No. PCT/IB2021/055223.
International Search Report and Written Opinion dated Sep. 6, 2018 for PCT/CA2018/050750, 13 pages.
Japanese Patent Application No. 2019-571536, Notice of Reasons for Rejection, (Translation) dated Jun. 8, 2022, 5 pages.
Liang et al., "Utilization of CO2 curing to enhance the properties of recycled aggregate and prepared concrete: A review". Cement and Concrete Composites, Nov. 1, 2019 (Jan. 11, 2019), vol. 105, pp. 1-14 * Abstract ;* Section 1.0; * Section 2.2.4; * Fig. 4(d).
Liu, J. et al., "Development of a Co2 solidification method for recycling autoclaved lightweight concrete waste", Journal of Materials Science Letters 20, 2001, pp. 1791-1794.
Morocco Patent Application No. 53762 Search Report with Opinion on Patentability, dated Jul. 1, 2022, 4 pages.
Office Action for Chilean Application No. 03376-2020 dated Nov. 18, 2021, 34 pages.
Ozcan et al., "Process integration of a Ca-looping carbon capture process in a cement plant", International Journal of Greenhouse Gas Control, 2013, vol. 19, pp. 530-540. https://doi.org/10.1016/j.ijggc.2013.10.009).
Republic of Columbia [translation]; First Exam Report for No. NC2021/0009084, dated Aug. 5, 2022, 13 pages.
Singapore, Invitation to Respond to Written Opinion for Application No. 11221062015, dated Oct. 18, 2022, 2 pages.
Singapore, Written Opinion for Application No. 11221062015, dated Oct. 18, 2022, 8 pages.
Summons to Attend Oral Proceedings for EP 15777459.7 mailed Aug. 27, 2021, 7 pages.
Canadian Office Action for Application No. 3,019,860 dated Mar. 2, 2023, 3 pages.
U.S. Appl. No. 17/959,013, filed Oct. 3, 2022, Niven et al.
Australian Patent Office; Examination Report for European Application No. 2022201059 dated May 22, 2023; 4 pages.
Mexican Patent Office, Application No. MX/a/2017/006746 office action dated May 8, 2023, 8 pages.
Monkman, Sean G. Investigating carbon dioxide sequestration in fresh ready mixed concrete, ECO-CRETE, International symposium On Sustainability Aug. 13, 2014, 22 pages.
Mexican Patent Office, Office Action for Application No. MX/a/2018/012464, dated Jul. 20, 2023, 8 pages.
Singapore Patent Office, Examination Report for SG11202203433R, dated Jun. 7, 2023, 5 pages.
Singapore Patent Office, Search Report for SG11202203433R, dated May 15, 2023, 2 pages.

* cited by examiner

Figure 37

Analyte Concentration (mg/L)

| Sample | Ag | Al | As | Ba | Be | Bi | Ca | Cd | Ce | Co | Cr | Cu | Fe | Ga | Ge | In | K | La |
|---|---|---|---|---|---|---|---|---|---|---|---|---|---|---|---|---|---|---|
| 100% OPC - Aged 1 Days - Untreated | <0.02 | <0.05 | <0.2 | 1.03 | <0.01 | <0.1 | 915 | <0.01 | <0.05 | <0.05 | 0.39 | 0.01 | <0.01 | <0.2 | <0.5 | <0.5 | 640 | <0.05 |
| 100% OPC - Aged 7 Days - Untreated | <0.02 | <0.05 | <0.2 | 5.33 | <0.01 | <0.1 | 759 | <0.01 | <0.05 | <0.05 | 0.02 | <0.01 | <0.01 | <0.2 | <0.5 | <0.5 | 685 | <0.05 |
| 100% OPC - Aged 1 Days - CO2 Treated | <0.02 | 0.05 | <0.2 | 0.04 | <0.01 | <0.1 | 444 | <0.01 | <0.05 | <0.05 | 4.54 | <0.01 | <0.01 | <0.2 | <0.5 | <0.5 | 301 | <0.05 |
| 100% OPC - Aged 7 Days - CO2 Treated | <0.02 | <0.05 | <0.2 | 0.06 | <0.01 | <0.1 | 372 | <0.01 | <0.05 | <0.05 | 4.90 | 0.01 | <0.01 | <0.2 | <0.5 | <0.5 | 260 | <0.05 |
| 25% Slag + 75% OPC - Aged 1 Days - Untreated | <0.02 | <0.05 | <0.2 | 3.17 | <0.01 | <0.1 | 860 | <0.01 | <0.05 | <0.05 | 0.12 | 0.02 | <0.01 | <0.2 | <0.5 | <0.5 | 525 | <0.05 |
| 25% Slag + 75% OPC - Aged 7 Days - Untreated | <0.02 | 0.22 | <0.2 | 5.16 | <0.01 | <0.1 | 755 | <0.01 | <0.05 | <0.05 | 0.03 | 0.01 | <0.01 | <0.2 | <0.5 | <0.5 | 621 | <0.05 |
| 25% Slag + 75% OPC - Aged 1 Days - CO2 Treated | <0.02 | <0.05 | <0.2 | 0.07 | <0.01 | <0.1 | 333 | <0.01 | <0.05 | <0.05 | 0.29 | 0.03 | <0.01 | <0.2 | <0.5 | <0.5 | 202 | <0.05 |
| 25% Slag + 75% OPC - Aged 7 Days - CO2 Treated | <0.02 | <0.05 | <0.2 | 0.07 | <0.01 | <0.1 | 175 | <0.01 | <0.05 | <0.05 | 0.02 | 0.03 | <0.01 | <0.2 | <0.5 | <0.5 | 135 | <0.05 |

Figure 38

Analyte Concentration (mg/L)

| Sample | Li | Mg | Mn | Mo | Na | Nb | Ni | P | Pb | S | Sb | Se | Si | Sn | Sr | Ta | Te | Ti | Tl | V | Zn | Zr | pH |
|---|---|---|---|---|---|---|---|---|---|---|---|---|---|---|---|---|---|---|---|---|---|---|---|
| 100% OPC - Aged 1 Days - Untreated | 2.7 | 0.01 | <0.01 | 0.1 | 106 | <0.2 | <0.01 | <0.1 | <0.1 | 76 | <0.1 | <0.5 | 0.2 | <0.5 | 43.0 | <0.5 | <0.5 | 0.09 | <0.5 | <0.01 | 0.02 | <0.01 | 12.5 |
| 100% OPC - Aged 7 Days - Untreated | 4.0 | <0.01 | <0.01 | <0.1 | 126 | <0.2 | <0.01 | <0.1 | <0.1 | 13 | <0.1 | <0.5 | 0.3 | <0.5 | 66.1 | <0.5 | <0.5 | 0.08 | <0.5 | 0.01 | <0.01 | <0.01 | 12.4 |
| 100% OPC - Aged 1 Days - CO2 Treated | 1.0 | 64.1 | <0.01 | 0.6 | 63 | <0.2 | <0.01 | <0.1 | <0.1 | 473 | <0.1 | <0.5 | 64.9 | <0.5 | 3.90 | <0.5 | <0.5 | 0.05 | <0.5 | 0.11 | <0.01 | <0.01 | 7.4 |
| 100% OPC - Aged 7 Days - CO2 Treated | 1.5 | 136 | <0.01 | 0.5 | 64 | <0.2 | <0.01 | <0.1 | <0.1 | 371 | <0.1 | 0.6 | 49.8 | <0.5 | 4.27 | <0.5 | <0.5 | 0.04 | <0.5 | 0.13 | <0.01 | <0.01 | 7.8 |
| 25% Slag + 75% OPC - Aged 1 Days - Untreated | 2.3 | 0.01 | <0.01 | <0.1 | 91 | <0.2 | <0.01 | <0.1 | <0.1 | 21 | <0.1 | <0.5 | 0.2 | <0.5 | 41.0 | <0.5 | <0.5 | 0.08 | <0.5 | <0.01 | <0.01 | <0.01 | 13 |
| 25% Slag + 75% OPC - Aged 7 Days - Untreated | 4.0 | <0.01 | <0.01 | 0.7 | 123 | <0.2 | <0.01 | <0.1 | <0.1 | 7 | <0.1 | <0.5 | 0.3 | <0.5 | 61.2 | <0.5 | <0.5 | 0.07 | <0.5 | <0.01 | <0.01 | <0.01 | 12.3 |
| 25% Slag + 75% OPC - Aged 1 Days - CO2 Treated | 1.2 | 70.8 | <0.01 | 0.7 | 66 | <0.2 | <0.01 | <0.1 | <0.1 | 416 | <0.1 | 0.6 | 49.9 | <0.5 | 2.58 | <0.5 | <0.5 | 0.04 | <0.5 | 0.11 | 0.01 | 0.01 | 7.6 |
| 25% Slag + 75% OPC - Aged 7 Days - CO2 Treated | 1.6 | 213 | <0.01 | 0.6 | 64 | <0.2 | <0.01 | <0.1 | <0.1 | 370 | <0.1 | 0.6 | 45.2 | <0.5 | 1.90 | <0.5 | <0.5 | 0.02 | <0.5 | 0.11 | 0.01 | <0.01 | 8 |

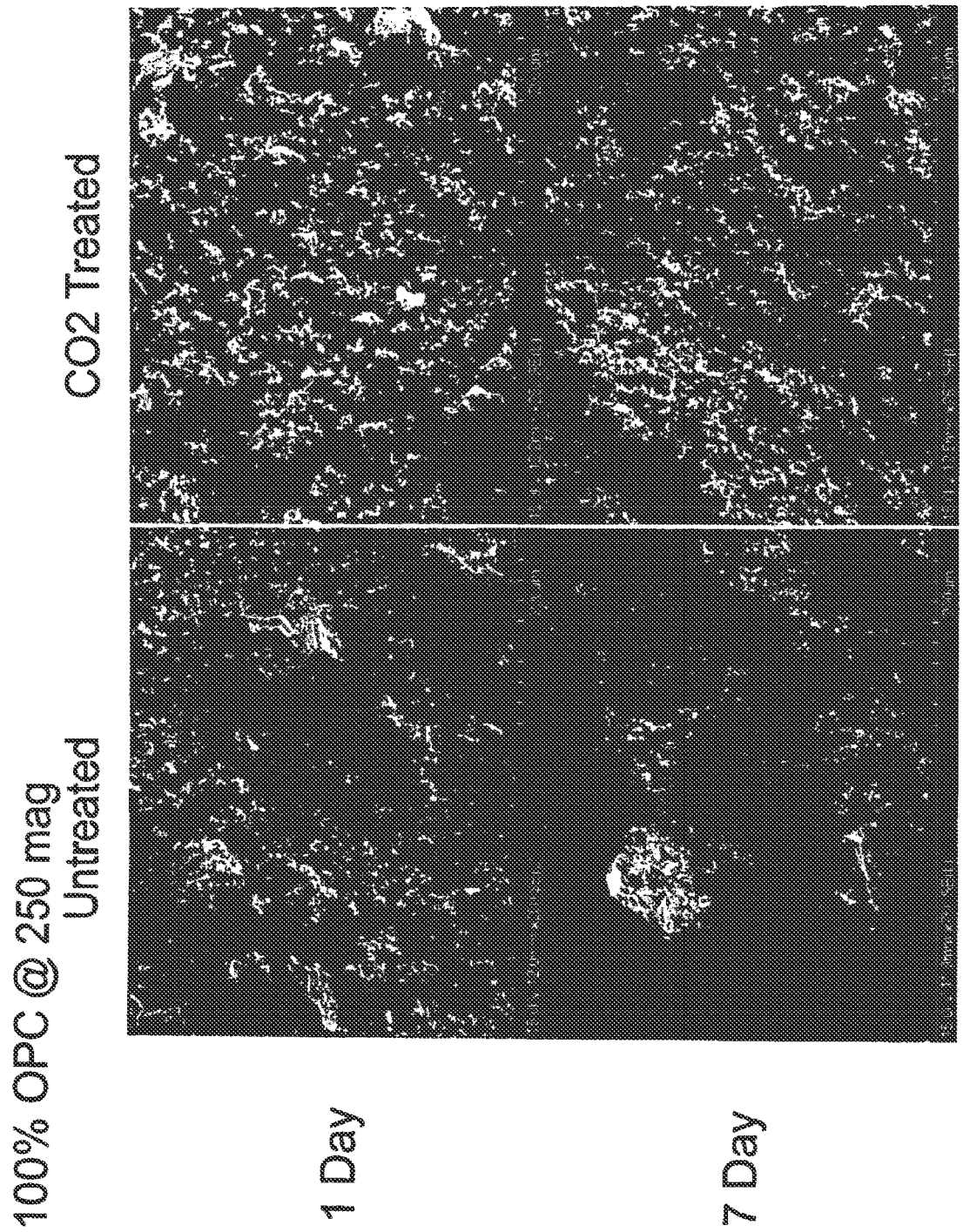

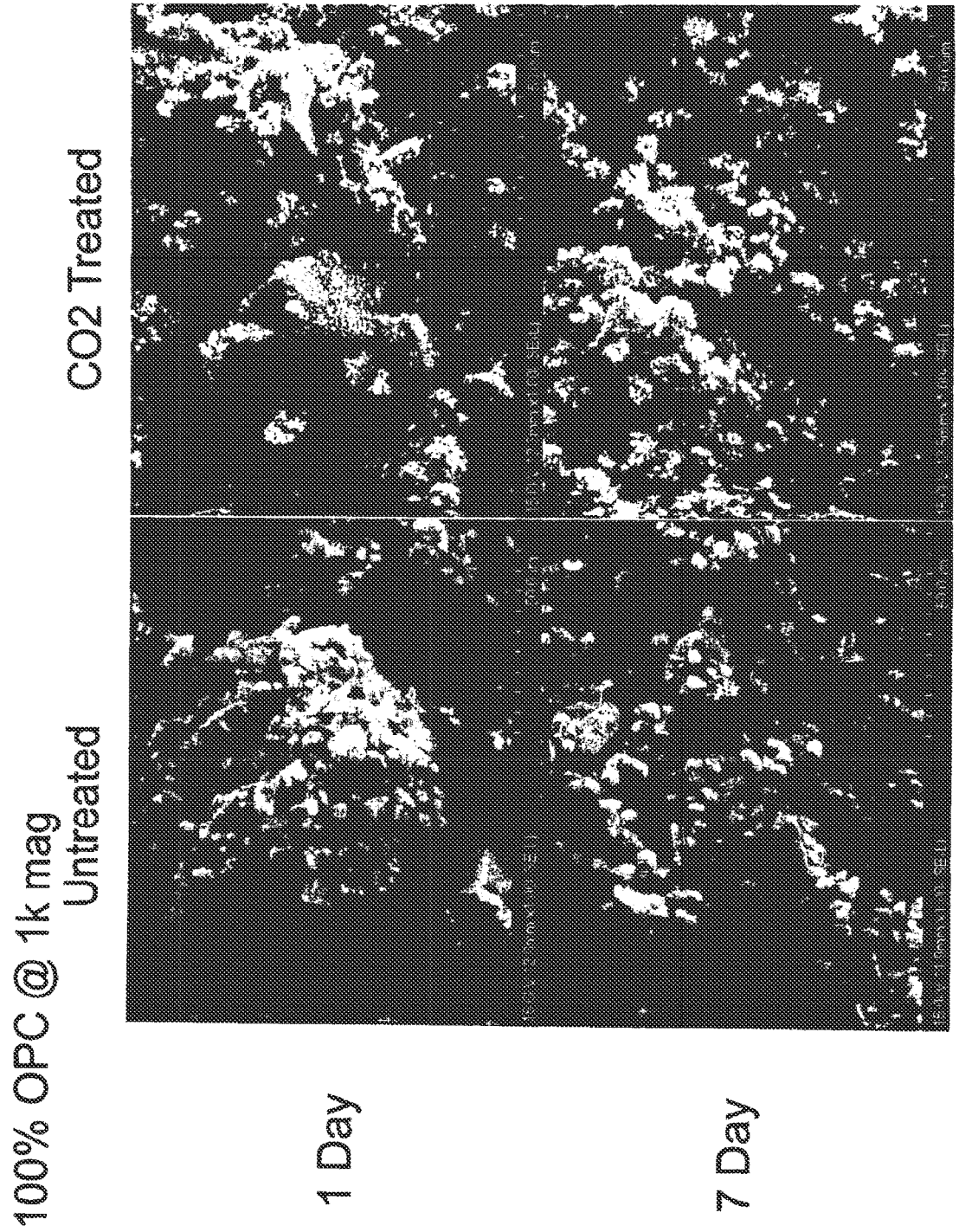

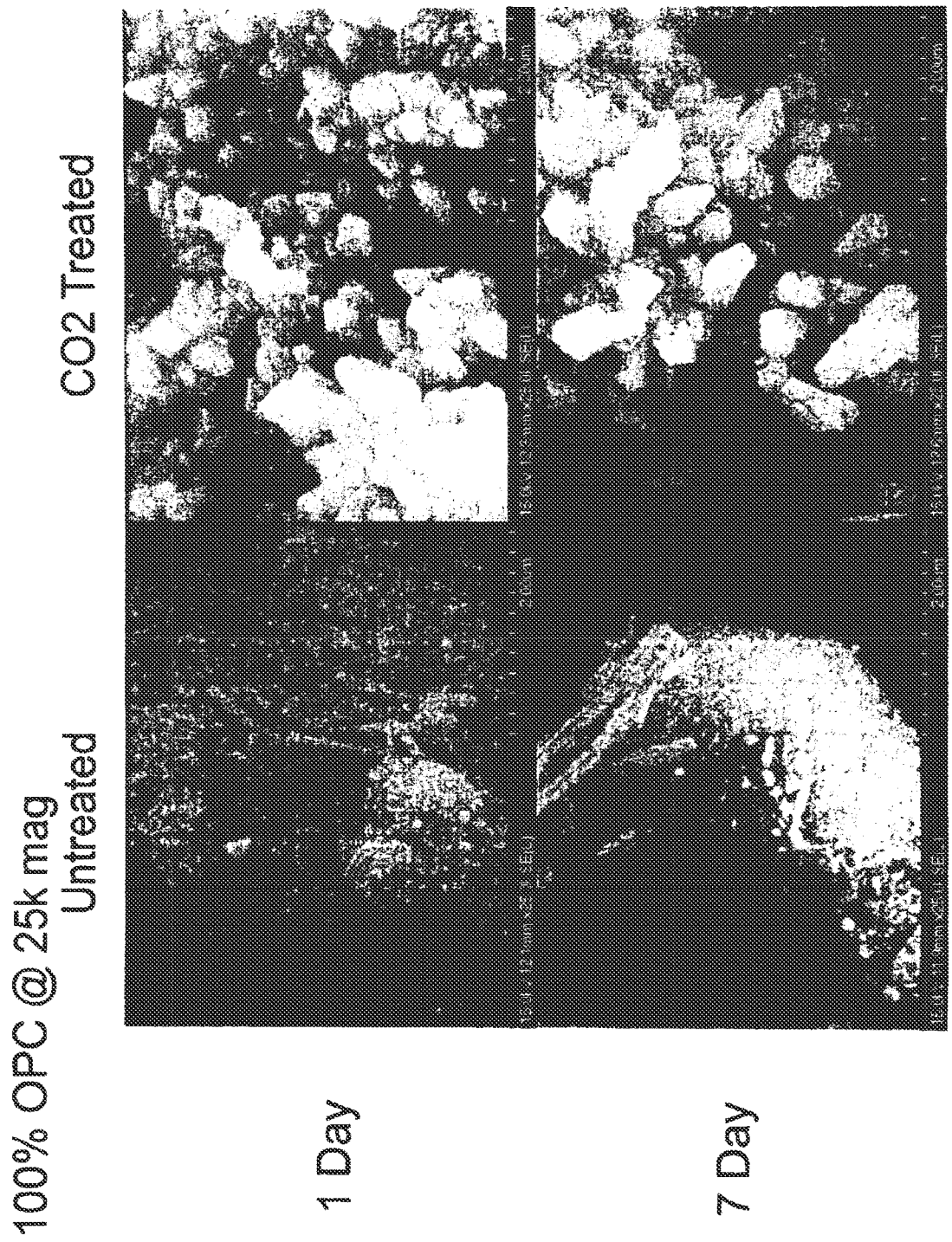

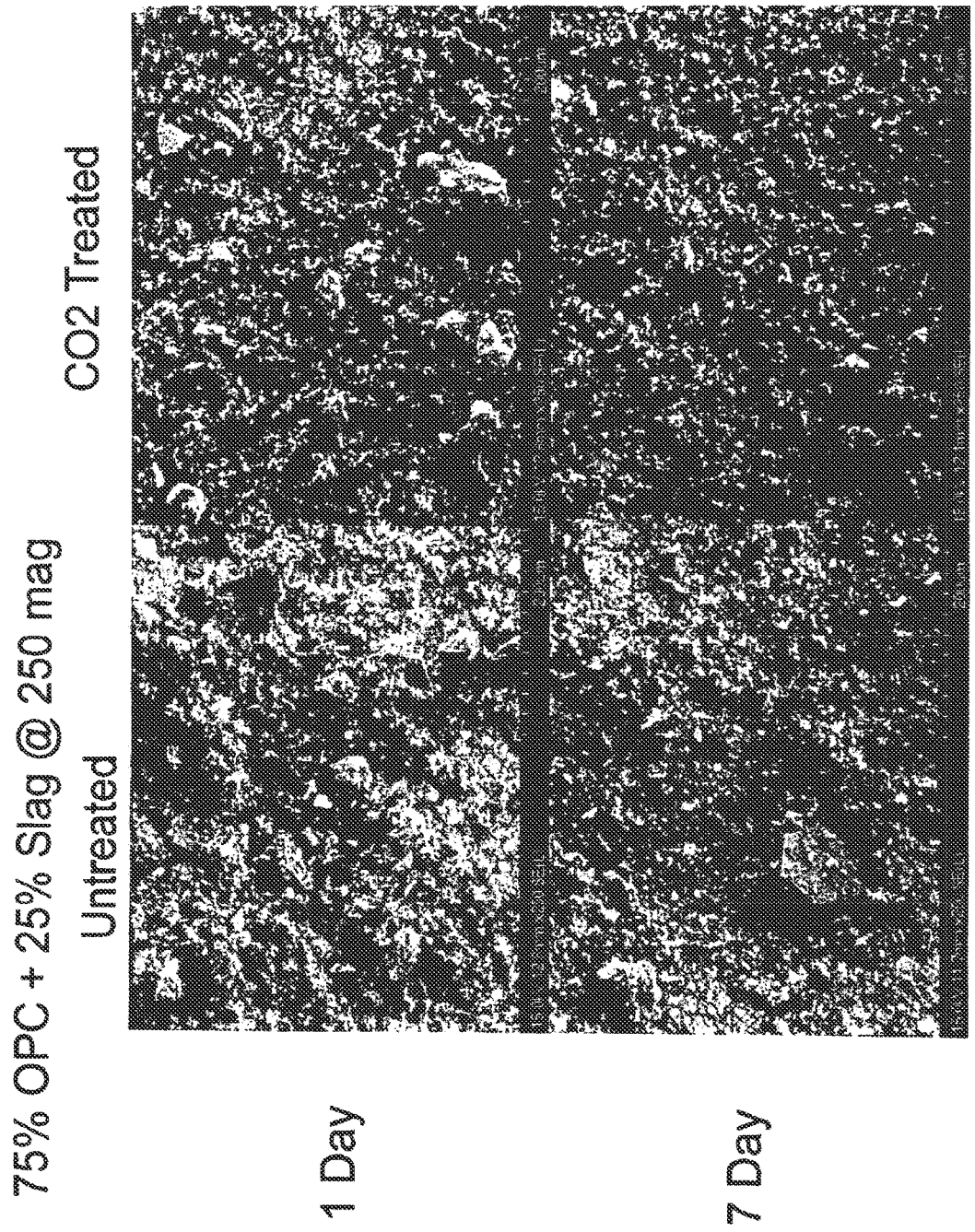

Fig. 6 $^{29}$Si NMR spectra of 75% OPC + 25% Slag based samples undergone various treatments (Si_Slag_samples.pdf)

Fig. 9 $^{27}$Al NMR spectra of 75% OPC + 25% Slag based samples undergone various treatments (Al_slag.pdf)

METHODS AND COMPOSITIONS FOR TREATMENT OF CONCRETE WASH WATER

CROSS-REFERENCE

This application is a continuation-in-part of PCT Application No. PCT/CA2017/050445, filed Apr. 11, 2017, which claims priority to U.S. Provisional Patent Application No. 62/321,013, filed Apr. 11, 2016. This application also claims priority to U.S. Provisional Patent Application No. 62/522,510 filed Jun. 20, 2017, to U.S. Provisional Patent Application No. 62/554,830 filed Sep. 6, 2017, to U.S. Provisional Patent Application No. 62/558,173 filed Sep. 13, 2017, to U.S. Provisional Patent Application No. 62/559,771 filed Sep. 18, 2017, to U.S. Provisional Patent Application No. 62/560,311 filed Sep. 19, 2017, to U.S. Provisional Patent Application No. 62/570,452 filed Oct. 10, 2017, to U.S. Provisional Patent Application No. 62/675,615 filed May 23, 2018, to U.S. Provisional Patent Application No. 62/652,385 filed Apr. 4, 2018, and to U.S. Provisional Patent Application No. 62/573,109 filed Oct. 16, 2017 all of which are incorporated herein by reference in their entirety.

BACKGROUND OF THE INVENTION

Wash water, produced in the making of concrete, poses a significant problem in terms of use and/or disposal. Methods and compositions to better manage concrete wash water are needed.

SUMMARY OF THE INVENTION

In one aspect the invention provides methods.

In certain embodiments, the invention provides a method of preparing a concrete mix comprising (i) adding concrete materials to a mixer; (ii) adding mix water to the mixer, wherein the mix water comprises carbonated concrete wash water; and (iii) mixing the water and the concrete materials to produce a concrete mix. In certain embodiments, the carbonated concrete wash water comprises at least 10% of the total mix water. In certain embodiments, the carbonated concrete mix water comprises at least 40% of the total mix water. In certain embodiments, the mix water comprises a first portion of water that is not carbonated mix water and a second portion of mix water that comprises carbonated mix water, wherein the first batch of mix water is added to the concrete materials before the second batch of mix water. The first portion of water can added at a first location and the second portion of water can added at a second location, e.g., the drum of a ready-mix truck, wherein the first and second locations are different. In certain embodiments, the second portion of mix water is added at least 2 minutes after the first portion. In certain embodiments, the carbonated concrete wash water has a density of at least 1.10 g/cm$^3$. In certain embodiments, the carbonated concrete wash water has been held for at least 1 day. In certain embodiments, the carbonated concrete wash water has been held for at least 3 days. In certain embodiments, the concrete mix is sufficiently workable for its intended use, and the carbonated wash water is of an age that the same mix made with the wash water of the same age in the same proportions would not be sufficiently workable for its intended use. In certain embodiments, the mix water comprises carbonated wash water in an amount that results in a concrete mix that is at least 1, 2, 3, 4, 5, 6, 7, 8, 9, 10, 12, 15, 20, 25, 30, 40, or 50%, for example 5%, stronger at a time after pouring—e.g., 1 day, 7 days, 28 days, or any combination thereof—than the same concrete mix made without carbonated wash water. In certain embodiments, the mix water comprises carbonated wash water in an amount that allows the concrete mix to contain at least 1, 2, 3, 4, 5, 6, 7, 8, 9, 10, 11, 12, 13, 14, 15, 16, 17, 18, 19, 20, 22, 25, 30, 40, or 50%, for example at least 5%, less cement than, and retain a compressive strength after pouring of within 1, 2, 3, 4, 5, 6, 7, 8, 9, 10, 12, 15, 20, 25, 30, 40, or 50%, for example at least 5%, of the same concrete mix made without carbonated wash water and with the extra (normal mix) percentage cement.

In certain embodiments, presented is a method comprising (i) exposing a concrete mix to one or more set retarders; (ii) after the concrete has been exposed to the set retarder, exposing the concrete mix to carbon dioxide. The concrete mix can include, e.g., a concrete wash water. In certain embodiments, the concrete mix is exposed to the set retarder in the drum of a ready-mix truck.

In certain embodiments, presented is a method comprising (i) exposing concrete wash water to carbon dioxide to produce carbonated wash water; (ii) exposing the carbonated wash water to an admixture, wherein the admixture is such that after exposure, the solids in the carbonated wash water remain suspended with little or no agitation.

In certain embodiments, provided is a method comprising (i) exposing concrete wash water to carbon dioxide to produce carbonated wash water; (ii) mixing said carbonated wash water with cement powder to produce a wet cement mix; and (iii) exposing the wet cement mix to carbon dioxide to produce a carbonated wet cement mix. The method can further comprise mixing aggregate with the cement powder and water to produce a wet concrete mix.

In another aspect, the invention provides apparatus.

In certain embodiments, the invention provides an apparatus for carbonating wash water produced in the production of concrete in a wash water operation wherein the wash water comprises cement and/or supplementary cementitious materials (SCM), comprising (i) a source of carbon dioxide; (ii) a first conduit operably connected to the source of carbon dioxide that runs to a wash water container, wherein (a) the wash water container contains wash water from a concrete production site; (b) the conduit has one or more openings positioned to deliver carbon dioxide at or under the surface of the wash water in the container to produce carbonated wash water; (iii) a system to transport the carbonated wash water to a concrete mix operation where the carbonated wash water is used as mix water in a concrete mix. The apparatus can further include (iv) a controller that determines whether or not, and/or how, to modify delivery of carbon dioxide to the wash water, or another characteristic of the wash water operation, or both, based on the one or more characteristics of the wash water or wash water operation. The characteristic can be, e.g., at least one, at least two, at least three, at least four, at least five, or at least six, of pH of the wash water, rate of delivery of carbon dioxide to the wash water, total amount of wash water in the wash water container, temperature of the wash water, specific gravity of the wash water, concentration of one or more ions in the wash water, age of the wash water, circulation rate of the wash water, timing of circulation of the wash water, appearance of bubbles at surface of wash water, carbon dioxide concentration of the air above the wash water, electrical conductivity of the wash water, optical characteristics of the wash water, or any combination thereof. In certain embodiments, the apparatus may further include (v) one or more sensors that monitor one or more characteristics of the wash water and/or the carbonation of the wash water in the container, wherein the one or more sensors is operably connected to the controller and delivers information regarding the characteristic of the wash water and/or wash water operation to the controller. In certain embodiments, the apparatus includes at least one, two, three, four, five, or six of sensors for (a) pH of the wash water, (b) rate of delivery of carbon dioxide to the wash water, (c) total amount of wash water in the wash water container, (d) temperature of the wash water, (e) specific gravity of the wash water, (f) concentration of one or more ions in the wash water, (g) age of the wash water, (h) circulation rate of the wash water, (i) timing of circulation of the wash water, (j) appearance of bubbles at surface of wash water, (k) carbon dioxide concentration of the air above the wash water, (l) electrical conductivity of the wash water, (m) optical characteristics of the wash water, or any combination thereof. The apparatus may further include (iii) one or more actuators operably connected to the controller to modify delivery of carbon dioxide to the wash water, or another characteristic of the wash water operation, or both.

In certain embodiments, the invention provides an apparatus for preparing a concrete mix comprising (i) a first mixer for mixing concrete materials and water; (ii) a second mixer for mixing concrete materials and water; (iii) a first water container holding water that comprises carbonated concrete wash water; (iv) a second water container, different from the first, holding water that is not carbonated concrete wash water; (iv) a first system fluidly connecting the first water container with the second mixer and a second system fluidly connecting the second water container with the first mixer. The first and second mixers can be the same mixer; in certain embodiments, they are different mixers. In certain embodiments, the first mixer is the drum of a ready-mix truck. In certain embodiments, the apparatus further includes a controller configured to add a first amount of the water in the second water container to the first mixer at a first time and to add a second amount of the water in the first water container to the second mixer at a second time, wherein the first and second times are different and wherein the first time is before the second time.

In certain embodiments, the invention provides an apparatus for preparing a concrete mix comprising (i) a mixer for mixing concrete materials and water; (ii) a first water container holding water that comprises carbonated concrete wash water; (iii) a second water container, different from the first, holding water that is not carbonated concrete wash water; (iv) a third container, fluid connected to the first and second water containers and to the mixer, for receiving a first portion of the water in the first container and a second portion of the water in the second container, mixing them to form mixed waters, and sending a third portion of the mixed waters to the mixer.

In certain embodiments, provided is apparatus comprising (i) a holding tank for holding concrete wash water; (ii) a first conduit operably connected to the holding tank, wherein the conduit (a) comprises an inlet from the holding tank to admit wash water to the conduit and an outlet to replace wash water back in the holding tank after it has circulated through the conduit, and (b) comprises one or more openings for introducing carbon dioxide into wash water pumped through the conduit. In certain embodiments the apparatus further comprises a second conduit operably connected to the holding tank, wherein the second conduit is configured to transport concrete wash water to the holding tank. The second conduit can, e.g., transport concrete wash water from a sedimentation pond to the holding tank.

In certain embodiments, provided is a composition comprising (i) a hydraulic cement; (ii) mix water for the hydraulic cement, wherein the mix water comprises carbonated concrete wash water.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 37 shows data of FIGS. 30-35 in Tabular form.

FIG. 38 shows data of FIGS. 30-35 in Tabular form.

FIG. 39 shows scanning electron micrographs (SEM) for particles in wash waters (100% OPC) treated or untreated with carbon dioxide, 250× magnification.

FIG. 40 shows scanning electron micrographs (SEM) for particles in wash waters (100% OPC) treated or untreated with carbon dioxide, 1000× magnification.

FIG. 41 shows scanning electron micrographs (SEM) for particles in wash waters (100% OPC) treated or untreated with carbon dioxide, 25,000× magnification.

FIG. 42 shows scanning electron micrographs (SEM) for particles in wash waters (75% OPC/25% slag) treated or untreated with carbon dioxide, 250× magnification.

DETAILED DESCRIPTION OF THE INVENTION

Figure 1:
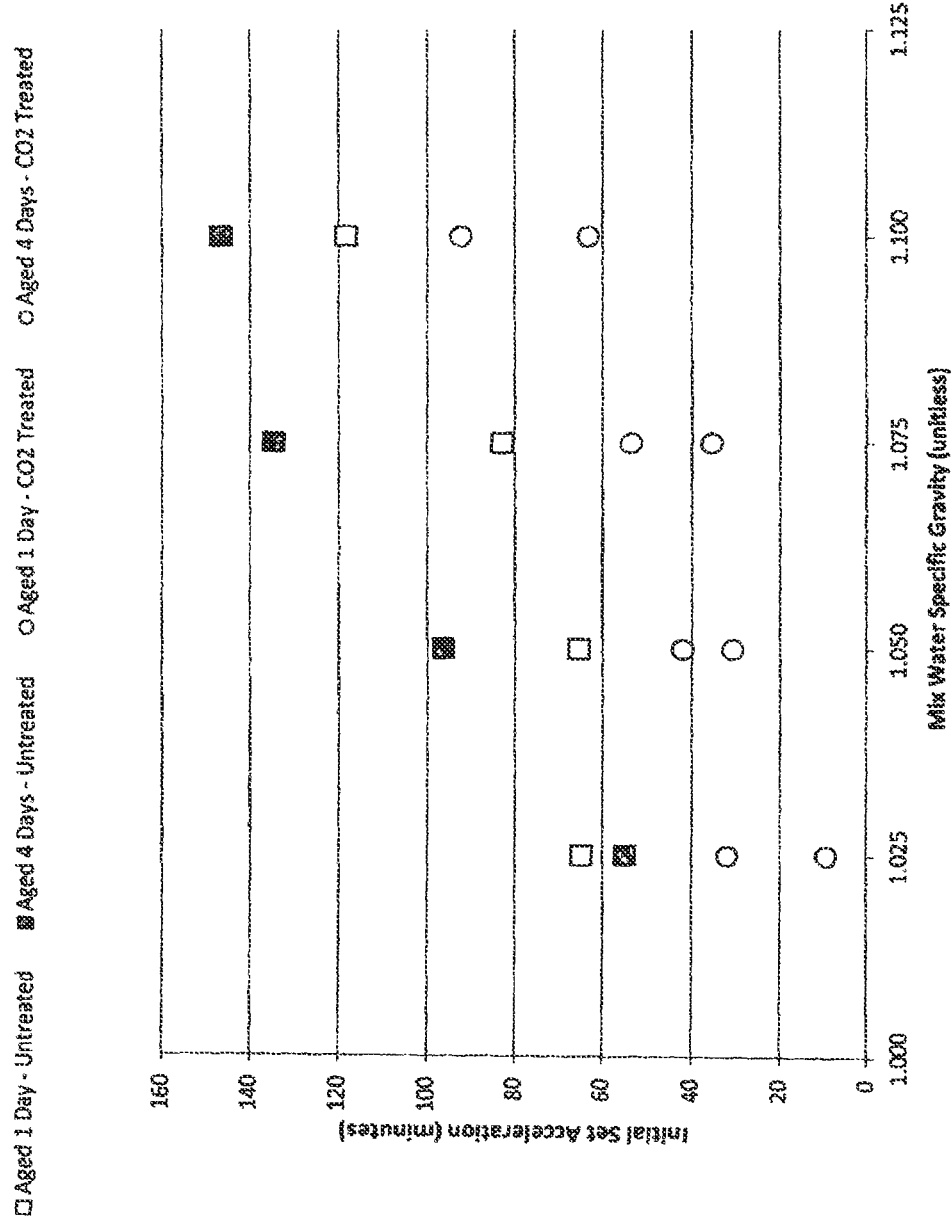
FIG. 1 shows set acceleration in concrete produced with wash (grey) water at various specific gravities and ages, where the water was with and without carbon dioxide treatment. See Example 1.

Wash water, also called grey water herein, is produced as a byproduct of the concrete industry. This water, which may contain suspended solids in the form of sand, aggregate and/or cementitious materials, is generated through various steps in the cycle of producing concrete structures. Generally a large volume of concrete wash water is produced by the washing-out of concrete mixer trucks following the delivery of concrete. This water is alkaline in nature and requires specialized treatment, handling and disposal. As used herein, "wash water" includes waters that are primarily composed of concrete drum wash water; such water may contain water from other parts of the concrete production process, rain runoff water, etc., as is known in the art. As will be clear from context, "wash water" includes water used to clean the drum of a ready-mix truck and/or other mixers, which contains cement and aggregate, as well as such water after aggregate has been removed, e.g., in a reclaimer, but still containing solids, such as cementitious solids. Typically at least a portion of such solids are retained in the wash water for re-use in subsequent concrete batches.

While this water can be suitable for reuse in the production of concrete, it has been documented that the wash water can result in negative impacts on the properties of concrete, for example, set acceleration and loss of workability. Wash water is mainly a mixture of cement and, in many cases, supplementary cementitious materials (SCMs) in water. It becomes problematic as a mix water because as the cement hydrates it changes the chemistry of the water. These changes in chemistry, along with the hydration products, cause a host of issues when the water is used as mix water, such as acceleration, increased water demand, reduced 7-day strength, and the like. These issues generally worsen as the amount of cement in the water increases, and/or the water ages.

The methods and compositions of the invention utilize the application of $CO_2$ to concrete wash water to improve its properties for reuse in the production of concrete. Thus, wash water that has a cement content (e.g., specific gravity) and/or that has aged to a degree that would normally not allow its use as mix water can, after application of carbon dioxide, be so used.

Without being bound by theory, it is thought that by carbonating wash water, several results may be achieved that are beneficial in terms of using the water as part or all of mix water for subsequent batches of concrete:

1) Maintain a pH of ~7: This effectively dissolves the cement due to the acidity of $CO_2$. This helps deliver a grey water of consistent chemistry and removes the "ageing effects". In certain embodiments, a pH of less than or greater than 7 may be maintained, as described elsewhere herein.

2) Precipitate any insoluble carbonates: $CO_2$ actively forms carbonate reaction products with many ions. This removes certain species from solution, such as calcium, aluminum, magnesium and others. This is another step that helps provide a grey water of consistent chemistry.

3) Change solubility of cement ions: The solubilities of many ions depend on pH. By maintaining the pH at ~7 with $CO_2$ the nature of the water chemistry is changed, potentially in a favorable direction. In certain embodiments, a pH of less than or greater than 7 may be maintained, as described elsewhere herein.

4) Shut down pozzolanic reactions: By maintaining the pH around 7 no $Ca(OH)_2$ is available to react with slag and/or fly ash in the grey water. This can mean that these SCMs are unaltered through the treatment and reuse of the grey water, thus reducing the impact of the grey water substantially. In certain embodiments, a pH of less than or greater than 7 may be maintained, as described elsewhere herein.

5) Reduce amount of anions left behind: The formation of carbonate precipitates using $CO_2$ is advantageous over other common acids, like HCl or $H_2SO_4$ whose anions, if left soluble in the treated water, can adversely impact the chemistry of the grey water for concrete batching.

6) Cause retardation: By saturating the grey water with $CO_2/HCO_3^-$ retardation can be achieved when used as batch water.

7) Nature of precipitates: The process may potentially be altered to form precipitates that have less effects on the water demand of concrete prepared with grey water. In particular, conditions of carbonation may be used that produce nanocrystalline carbonates, such as nanocrystalline calcium carbonate, that are known to be beneficial when used in concrete products.

In certain embodiments, the invention provides a method of providing a mix water for a batch of concrete, where the mix water comprises wash water from one or more previous batches of concrete that has be exposed to carbon dioxide in an amount above atmospheric concentrations of carbon dioxide, to carbonate the wash water ("carbonated wash water"). The mix water may contain at least 10, 20, 30, 40, 50, 60, 70, 80, 90, 95, 99, or 99.5% carbonated wash water. Alternatively or additionally, the mix water may contain no more than 20, 30, 40, 50, 60, 70, 80, 90, 95, 99, 99.5, or 100% carbonated wash water. In certain embodiments, the mix water is 100% carbonated wash water. In certain embodiments, the mix water is 1-100% carbonated wash water. In certain embodiments, the mix water is 1-80% carbonated wash water. In certain embodiments, the mix water is 1-50% carbonated wash water. In certain embodiments, the mix water is 1-30% carbonated wash water. In certain embodiments, the mix water is 10-100% carbonated wash water. In certain embodiments, the mix water is 20-100% carbonated wash water. In certain embodiments, the mix water is 50-100% carbonated wash water. In certain embodiments, the mix water is 70-100% carbonated wash water. In certain embodiments, the mix water is 90-100% carbonated wash water.

In certain embodiments, a first portion of mix water that is plain water, e.g., not wash or other water that has been carbonated, such as plain water as normally used in concrete mixes, is mixed with concrete materials, such as cement, aggregate, and the like, and then a second portion of mix water that comprises carbonated water, which can be carbonated plain water or, e.g., carbonated wash water is added. The first portion of water may be such that an acceptable level of mixing is achieved, e.g., mixing without clumps or without substantial amounts of clumps. For example, the first portion of mix water that is plain water may be more than 1, 2, 5, 10, 20, 30, 40, 50, 60, 70, 80, or 90%, and/or less than 2, 5, 10, 20, 30, 40, 50, 60, 70, 80, 90 or 95%, such as % 1-90%, or 1-80%, or 1-75%, or 1-70%, or 1-65%, or 1-60%, or 1-55%, or 1-50%, or 1-45%, or 1-40%, or 1-30%, or 1-20%, or 1-10% of the total mix water used in the concrete mix, while the remainder of the mix water used in the concrete mix is the second portion, i.e., carbonated mix water. The first portion of water may be added at one location and the second portion at a second location. For example, in a ready mix operation, the first portion may be added to concrete materials which are mixed, then the mixed materials are transferred to a drum of a ready-mix truck, where the second portion of water is added to the concrete in the drum of the ready-mix truck. However, it is also possible that both the first and the second locations are the same location, e.g., a mixer prior to deposit into a ready-mix truck, or the drum of the ready-mix truck. The second portion of water may be added at any suitable time after the addition of the first portion. In general, the second portion of water is added at least after the first portion and the concrete materials have mixed sufficiently to achieve mixing without clumps or without substantial amounts of clumps. In certain embodiments, the second portion of water is added at least 1, 2, 3, 4, 5, 6, 7, 8, 9, 10, 12, 15, 20, 25, 30, 40, 50, or 60 minutes after the first portion of water, and/or not more than, 2, 3, 4, 5, 6, 7, 8, 9, 10, 12, 15, 20, 25, 30, 40, 50, or 60 minutes, or 1, 2, 3, 4, 5, or 6 hours after the first portion of water.

The wash water may be carbonated at any suitable time, for example, right after its production, at some time after production, or just before use in the concrete, or any combination thereof. Without being bound by theory, it is probable that at time 0 (immediately after formation of the wash water), added carbon dioxide will react with unhydrated cement phases (C3S, C2S, C3A, etc.) while at later ages added carbon dioxide will react with hydrated cement phases (CSH, ettringite, etc.). Providing dosage later can result in different properties than when the dosage is applied earlier, potentially leading to different properties when the wash water is reused in concrete production. In addition, the phases reacting in wash water at later ages can be generally more thermodynamically stable and thus have lower heats of reaction when reacting with carbon dioxide; the inventors have observed that the exothermic heat rise (e.g., as measured by temperature) can be greater when treating fresh wash water with carbon dioxide than when treating aged wash water. It can be advantageous to have a lower heat rise because a treated water that becomes heated may have to be cooled before it can be used as a mix water. Hence, certain embodiments provide methods and apparatus that cause a cooling of the wash water due to production of gaseous carbon dioxide for treatment of the wash water from liquid carbon dioxide, e.g., piping or conduits that contact the wash water and absorb heat necessary to convert liquid to gaseous carbon dioxide and thus cooling the wash water. These are described in more detail elsewhere herein. In addition, when treating an aged wash water with carbon dioxide, it can be possible that less carbon dioxide is required to achieve a stable wash water than with wash water that is fresh. The amount of carbon dioxide to create a stable wash water (e.g., properties are relatively unchanged after further aging) can depend on the relative contributions of $Ca(OH)_2$, ettringite, CSH, and/or unreacted cement (e.g., unreacted Ordinary Portland Cement, OPC) to the undesirable properties of wash water. In addition, different phases can have different carbon dioxide reaction kinetics, which in turn can influence choices of carbon dioxide delivery settings, approaches (e.g., type of delivery system or adjustments to delivery system), and the like.

Thus, for example, in certain embodiments, carbonation of wash water can commence no later than 1, 2, 5, 10, 20, 30, 40, 60, 80, 100, 120, 150, 180, 240, 300, 360, 420, or 480 minutes, or 7, 8, 9, 10, 11, 12, 14, 16, 18, or 24 hours, or 1.5, 2, 3, 4, or 5 days after formation of the wash water, and/or no sooner than 0, 0.5, 1, 2, 5, 10, 20, 30, 40, 60, 80, 100, 120, 150, 180, 240, 300, 360, 420, 480, or 540 minutes or 8, 9, 10, 11, 12, 14, 16, 18, or 24 hours, or 1.5, 2, 3, 4, 5, or 6 days after formation of the wash water. The carbonation can continue for any suitable period of time, for example, in certain embodiments wash water is continuously exposed to carbon dioxide for a period of time after carbonation commences. Alternatively or additionally, wash water can be carbonated just before its use as mix water, for example, no more than 1, 2, 5, 10, 20, 30, 40, 60, 80, 100, 120, 150, 180, 240, 300, 360, 420, or 480 minutes before its use as mix water (e.g., before contacting the concrete mixture), and/or no sooner than 0, 0.5, 1, 2, 5, 10, 20, 30, 40, 60, 80, 100, 120, 150, 180, 240, 300, 360, 420, 480, or 540 minutes before its use as mix water. Additionally or alternatively, the wash water may be aged for some amount of time after addition of carbon dioxide before it is used as wash water, for example, carbonated wash water can be used as mix water no later than 1, 2, 5, 10, 20, 30, 40, 60, 80, 100, 120, 150, 180, 240, 300, 360, 420, or 480 minutes, or, 7, 8, 9, 10, 12, 18, or 24 hours, or 1.5, 2, 3, 4, 5, or six days after carbonation of the wash water, and/or no sooner than 0, 0.5, 1, 2, 5, 10, 20, 30, 40, 60, 80, 100, 120, 150, 180, 240, 300, 360, 420, 480, or 540 minutes or 8, 10, 12, 18, 24 hours, or 1.5, 2, 3, 4, 5, 6, 7, 8, 10, 12, or 14 days after carbonation of the wash water; for example, at least 3 hours, at least 6 hours, at least 12 hours, at least one day, at least 3 days, or at least 5 days after carbonation of the wash water.

The water used for washing may be clean water or recycled wash water. In certain embodiments, the water that is used to wash out trucks may be carbonated before and/or during the wash process, i.e., before the wash water enters a reclamation tank. Concrete trucks typically have 10-15 min of mixing when washing out. Carbon dioxide can be, e.g., injected into the water pump line on its way to the truck (fresh water input), or from the settlement pond/reclamation system pump (recycled water input).

Additionally or alternatively, after a truck is emptied and water is added to the truck for washing, carbon dioxide can be added to the truck. The carbon dioxide reacts with the slurry, and the carbon dioxide can "put the cement to sleep" (e.g., halt or retard most or all deleterious reactions, and react with most or all deleterious materials, as outlined herein). In certain embodiments, the slurry can be reused in a new batch. In certain embodiments, the slurry need not even leave the truck. Carbon dioxide can be added as a solid, liquid, or gas, or combination thereof. For example, carbon dioxide may be added as a solid. In certain embodiments, carbon dioxide is added as a mixture of solid and gas, produced when liquid carbon dioxide is released to atmospheric pressure. A conduit carries liquid carbon dioxide from a container to an injector, which is configured so as to cause a desired conversion to gas and solid. The mixture of gaseous and solid carbon dioxide is directed into the drum of a ready mix truck. The amount of carbon dioxide added may be a predetermined amount, based, e.g., on typical residual amounts of concrete left in the truck. The amount of carbon dioxide added may also be regulated according to the condition of the wash water, e.g., according to pH as the carbon dioxide mixes and reacts with components of the wash water. Using this method, it is possible to eliminate the need to discharge wash water from the mixer. This allows the wash water to be used as mix water in the next batch of concrete produced and prevents the residual plastic concrete from hardening. In certain embodiments, the treatment allows stabilization of the wash water, so that it can be used as mix water for the next batch, after at least 0.5, 1, 2, 3, 4, 5, 6, 12, 18, 24, 30, 36, 42, 48, 54, 60, 66, 72, 78, 86, or 92 hours and/or not more than 12, 18, 24, 30, 36, 42, 48, 54, 60, 66, 72, 78, 86, 92, or 104 hours. The carbon dioxide treatment may be used alone or used with other treatments that are designed to stabilize wash water and allow reuse, such as Recover, GCP Applied Technologies, Inc., Cambridge, Mass., or similar admixture.

In certain embodiments, the wash water is circulated before its use as a mix water. For example, part or all of the wash water that is carbonated may be circulated (e.g., run through one or more loops to, e.g., aid in mixing and/or reactions, or agitated, or stirred, or the like). This circulation may occur continuously or intermittently as the water is held prior to use. In certain embodiments the wash water is circulated for at least 5, 10, 20, 50, 70, 80, 90, 95, or 99% and/or not more than 10, 20, 50, 70, 80, 90, 95, 99 or 100% of the time it is held prior to use as mix water.

It will be appreciated that many different wash waters are typically combined and held, for example, in a holding tank, until use or disposal. Carbonation of wash water may occur before, during, or after its placement in a holding tank, or any combination thereof. Some or all of the wash water from a given operation may be carbonated. It is also possible that wash water from one batch of concrete may be carbonated then used directly in a subsequent batch, without storage. In general, the tank will be outfitted or retrofitted to allow circulation of the water in such a way that sedimentation does not occur, to allow reuse of materials in the wash water as it is carbonated.

Any suitable method or combination of methods may be used to carbonate the wash water. The wash water may be held in a container and exposed to a carbon dioxide atmosphere while mixing. Carbon dioxide may be bubbled through mix water by any suitable method; for example, by use of bubbling mats, or alternatively or additionally, by introduction of carbon dioxide via one or more conduits with one or a plurality of openings beneath the surface of the wash water. The conduit may be positioned to be above the sludge that settles in the tank and, in certain embodiments, regulated so as to not significantly impede settling. Catalysts may also be used to accelerate one or more reactions in the carbonating wash water. In certain embodiments, liquid carbon dioxide injection is used. A vaporizer can be set inside the tank and converts liquid carbon dioxide to gas, drawing heat from the water to do so, and thereby cooling the water. For example, a series of metal tubes may be submerged in the water that are configured to ensure gas rises to the top and is pushed out of a nozzle. Pipes run vertically, but with the heat capacity and transfer rate in water being so much higher than air, fins that are normally be present in a cryogenic carbon dioxide heat exchanger that operates in air may not be needed.

Impeller Blades

In certain embodiments, carbon dioxide is added to a slurry tank by injecting it through a specially designed agitator blade. As known in the water treatment industry, a flash mixing style blade can be used that is designed to create turbulence, vortices, vacuum pockets and high shear behind the mixer blades to promote rapid mixing action. See, e.g., blades supplied by Dynamix Inc., 14480 River Road, Unit 150, Richmond, British Columbia, Canada V6V 1L4, such as the P4 Pitch Impeller Blade. This is merely exemplary and those of skill in the art will recognize that various types, such as pitch-blade impellers or airfoil impellers may be used.

Injection of carbon dioxide at a particular location along the blade edge can increase mixing action and contact time. The blade action forces the carbon dioxide bubbles to undergo more mixing rather than being buoyantly forced towards the surface. Fine dispersed bubbles can be assured through selecting the proper hole size. It is important to ensure that the holes remain unplugged. Whereas a perforated hose in the bottom of a tank with have solids settle upon it when the slurry is unagitated, the agitator blade holes will not be at the bottom of a tank and get covered by the settling solids. Further the holes can be placed on the sides or bottom of the agitator element to avoid vertical settlement buildup.

Augur

In a pond where an auger is used for mixing, injection can be through the central axis of the auger shaft. In certain embodiments, to ensure serviceability and possibly to reduce the occurrence of buildup, a retractable injection pipe with a gas distribution nozzle at the end can be routed through the central axis of the mixing auger shaft. The carbon dioxide can be injected, e.g., when a control system calls for it and then the injector can retract out of the water when the system has determined that the amount of carbon dioxide is sufficient. Alternately, a retractable injector is not routed through the shaft, but the shaft is simply hollow. Carbon dioxide can be injected down the center of the mixing auger shaft. An orifice at the injection point can promote the formation of finely dispersed bubbles. Either way, the injector nozzle positioning, direction, and injection speed are such that they do not interfere with normal mixing, so that sedimentation does not occur.

Submersible Pump

A suitably efficient or powerful pump can both circulate the slurry and also, in some cases, send the slurry to the concrete batching process. Carbon dioxide can be integrated with the pump via, for example, injection into the impeller housing at a location chosen to maximize mixing, or, for example, just under the intake to allow the suction to bring the gas into the housing. The impeller blades mix up and pressurize the carbon dioxide/wastewater mix, providing better uptake of carbon dioxide, and pump the slurry through a long hose. The transport in the hose provides additional time to promote uptake. The slurry can be directed back into the tank or pumped directly into the batch process.

The $CO_2$ injection rate can be tied to the flow rate/density of the slurry. If one cycle through the loop is insufficient to provide the desired degree of carbon dioxide uptake, then it can be recirculated through the same loop or through another loop, e.g., via a secondary, smaller pump, until the desired amount of $CO_2$ has been absorbed.

Carbon dioxide injection can take place near an impeller. Carbon dioxide injection can also take place in a discharge pipe line, near the pump itself or at any point in the pipe line. Carbon dioxide injection can be achieved with single or multiple injection points and carbon dioxide can be injected at 90 degrees or any suitable angle relative to the direction of flow. Directing the carbon dioxide exit parallel to the rising liquid flow will increase liquid flow as the buoyancy of the carbon dioxide displaces the wash water upwards.

Eductor Nozzles

In certain embodiments, one or more eductor nozzles are used. Eductor nozzles are well-known in the art. An eductor nozzle mixes and agitates, and increases overall water flow, thus allowing a smaller pump to move sufficient water to ensure adequate mixing to prevent sedimentation. The nozzle allows high pressure into a first stage nozzle to increase velocity, then the eductor provides a venturi effect of high velocity flow which creates low pressure, pulling added liquid into the stream of flow, and allowing higher volume lower velocity output. Such nozzles are supplied by, e.g., Bete Ltd., P.O. Box 2748, Lewes, East Sussex, United Kingdom. Such a nozzle can incorporate carbon dioxide injection into its operation. If carbon dioxide is injected as nanobubbles in solution (supersaturated carbon dioxide water, see elsewhere in this application, e.g., systems supplied by Gaia USA Inc., Scottsdale, Ariz.) then the buoyancy that acts upon coarse bubbles may be avoided. Pumps can be used for mixing, provided they are placed strategically and provide sufficient flow.

In certain embodiments, a combination of mixing blades and sump pump with eductor may be used, so long as the pump or pumps is in a non-intrusive location and does not impede the mixing action required. The discharge of water and carbon dioxide (eductor) is in a location that does not disturb the blade mixing action. Most reclaimer blades push material downward so it is preferred to discharge the pump water/carbon dioxide near the axis of the blades to help promote mixing. In certain embodiments, an integrated mixing and injection process is used: Strategically placed eductor nozzles can be used to carbonate water and maintain sufficient fluid flow. The eductors are fed by a pump or pumps which can incorporate carbon dioxide in several ways, as described herein. For retrofitting of existing wash water settlement ponds, a series of eductors can be configured to mix the pond. It is important to ensure the eductor configuration keeps the water flow throughout the tank above the settlement velocity of suspended solids.

Head Space Integration

If the treatment vessel is a closed container then increased efficiency can be had by recycling gas from the headspace into the injection hardware. As bubbles rise through the liquid to join the headspace such an approach allows the carbon dioxide molecules another chance to dissolve and react. The process can monitor the headspace gas for carbon dioxide and pressure. For a given fixed mass of carbon dioxide injected the carbon dioxide content and pressure will initially increase. As reaction proceeds the carbon dioxide concentration and pressure will decrease. This can be a signal that causes another dose of carbon dioxide. The dosing efficiency of the dose is in direct response to the absorption.

Super-Saturated Carbon Dioxide

In certain cases, mix water, e.g., wash water may be treated with carbon dioxide in such a manner that the carbon dioxide content of the water increases beyond normal saturation, for example, at least 10, 20, 30, 40, 50, 70, 100, 150, 200, or 300%, or not more than 10, 20, 30, 40, 50, 70, 100, 150, 200, 300, 400, or 500% beyond normal saturation, compared to the same water under the same conditions that is normally saturated with carbon dioxide. Normal saturation is, e.g., the saturation achieved by, e.g., bubbling carbon dioxide through the water, e.g., wash water, until saturation is achieved, without using manipulation of the water beyond the contact with the carbon dioxide gas. For methods of treating water to increase carbon dioxide concentration beyond normal saturation levels, see, e.g., U.S. Patent Application Publication No. 2015/0202579.

In certain embodiments, the invention allows the use of wash water substantially "as is," that is, without settling to remove solids. Carbonation of the wash water permits its use as mix water, even at high specific gravities.

This technology can allow the use of grey (wash) water as mix water, where the grey (wash) water is at specific gravities of at least 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.22, 1.25, 1.30, 1.35, 1.40, or 1.50, and/or not more than 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.22, 1.25, 1.30, 1.35, 1.40, 1.50 or 1.60; e.g., 1.0-1.2, or 1.0 to 1.3, or 1.0 to 1.18, or 1.0 to 1.16, or 1.0 to 1.15, or 1.0 to 1.14, or 1.0 to 1.13, or 1.0 to 1.12, or 1.0 to 1.10, or 1.0 to 1.09, or 1.0 to 1.08, or 1.0 to 1.07, or 1.0 to 1.06, or 1.0 to 1.05, or 1.0 to 1.04, or 1.0 to 1.03, or 1.0 to 1.02, 1.01-1.2, or 1.01 to 1.3, or 1.01 to 1.18, or 1.01 to 1.16, or 1.01 to 1.15, or 1.01 to 1.14, or 1.01 to 1.13, or 1.01 to 1.12, or 1.01 to 1.10, or 1.01 to 1.09, or 1.01 to 1.08, or 1.01 to 1.07, or 1.01 to 1.06, or 1.01 to 1.05, or 1.01 to 1.04, or 1.01 to 1.03, or 1.01 to 1.02, or 1.02-1.2, or 1.02 to 1.3, or 1.02 to 1.18, or 1.02 to 1.16, or 1.02 to 1.15, or 1.02 to 1.14, or 1.02 to 1.13, or 1.02 to 1.12, or 1.02 to 1.10, or 1.02 to 1.09, or 1.02 to 1.08, or 1.02 to 1.07, or 1.02 to 1.06, or 1.02 to 1.05, or 1.02 to 1.04, or 1.02 to 1.03, or 1.03-1.2, or 1.03 to 1.3, or 1.03 to 1.18, or 1.03 to 1.16, or 1.03 to 1.15, or 1.03 to 1.14, or 1.03 to 1.13, or 1.03 to 1.12, or 1.03 to 1.10, or 1.03 to 1.09, or 1.03 to 1.08, or 1.03 to 1.07, or 1.03 to 1.06, or 1.03 to 1.05, or 1.03 to 1.04, or 1.05-1.2, or 1.05 to 1.3, or 1.05 to 1.18, or 1.05 to 1.16, or 1.05 to 1.15, or 1.05 to 1.14, or 1.05 to 1.13, or 1.05 to 1.12, or 1.05 to 1.10, or 1.05 to 1.09, or 1.05 to 1.08, or 1.05 to 1.07, or 1.05 to 1.06. In certain embodiments the methods and compositions of the invention allow the use of grey (wash) water as mix water, where the grey water has a specific gravity of at least 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20. The methods and compositions of the invention can reduce or even eliminate the need to further treat wash water, beyond carbonation, for the wash water to be suitable for use as mix water in a subsequent batch. In certain embodiments, after grey (wash) water is carbonated, it is used in subsequent batches of concrete with no more than 5, 10, 15, 20, 30, 40, 50, 60, 70, 80, 90, or 95% of remaining solids removed. In certain embodiments, none of the remain solids are removed. The carbonated wash water may be combined with non-wash water, e.g., normal mix water, before or during use in a subsequent concrete batch, to provide a total amount of water used in the batch; in certain embodiments, the carbonated wash water comprises at least 5, 10, 15, 20, 30, 40, 50, 60, 70, 80, 90, 95, or 99% of the total amount of water used in the batch; in certain embodiments, 100% of the total amount of water used in the batch is carbonated wash water, excluding water used to wash down equipment and, in some cases, excluding water added at the job before or during pouring of the concrete mix.

The use of wash water in a concrete mix, especially carbonated wash water, often results in enhanced strength of the resulting concrete composition at one or more times after pouring, for example, an increase in compressive strength, when compared to the same concrete mix without carbonated wash water, of at least 1, 2, 3, 4, 5, 6, 7, 8, 9, 10, 12, 14, 16, 18, 20, 22, or 25% at 1-day, 7-days, and/or 28-days. This increase in early strength, as well as additionally or alternatively the presence of cementitious materials in the carbonated wash water that can replace some of the cementitious materials in a subsequent mix, often allows the use of less cement in a mix that incorporates carbonated wash water than would be used in the same mix that did not incorporate carbonated wash water; for example, the use of at least 1, 2, 3, 4, 5, 6, 7, 8, 9, 10, 11, 12, 13, 14, 15, 16, 17, 18, 20, 22, 25, 30, 35, or 40% less cement in the mix where the mix retains a compressive strength at a time after pouring, e.g., at 1, 7, and/or 28-days, that is within 1, 2, 3, 4, 5, 6, 7, 8, 9, 10, 12, 15, 20, 30, 40, or 50% of the compressive strength of the mix that did not incorporate carbonated wash water, e.g., within 5%, or within 7%, or within 10%.

In addition, the carbonation of wash water can allow the use of wash water at certain ages that would otherwise not be feasible, e.g., wash water that has aged at least 1, 2, 3, 4, 5, 6, 7, 8, 9, 10, 12, or 15 days. Wash water that has been carbonated may be used in concrete at an age where it would otherwise produce a concrete mix without sufficient workability to be used.

The $CO_2$ treatment produces carbonate reaction products that likely contain some amount of nano-structured material. Of the carbonated products in the wash water, e.g., calcium carbonate, at least 1, 2, 5, 7, 10, 12, 15, 20, 25, 30, 25, 40, 45, 50, 60, 70, 80, or 90% may be present as nano-structured materials, and/or not more than 5, 7, 10, 12, 15, 20, 25, 30, 25, 40, 45, 50, 60, 70, 80, 90, 95, or 100% may be present as nano-structured material. A "nano-structured material," as that term used herein, includes a solid product of reaction of a wash water component with carbon dioxide whose longest dimension is no more than 500 nm, in certain embodiments no more than 400 nm, in certain embodiment no more than 300 nm, and in certain embodiments no more than 100 nm.

Carbon dioxide treatment of wash water can result in a solid material that is distinct from untreated wash water in terms of the coordination environment of aluminum and silicon crosslinking, e.g., as measured by NMR. Without being bound by theory, it is thought that carbon dioxide treatment of the wash water can create a carbonate shell around the particle, and that this shell can have an inhibiting effect on the phases contained therein, perhaps physically inhibiting dissolution.

The $CO_2$ treatment has the further benefit of sequestering carbon dioxide, as the carbon dioxide reacts with components of the wash water (typically cement or supplementary cementitious material), as well as being present as dissolved carbon dioxide/carbonic acid/bicarbonate which, when the wash water is added to a fresh concrete mix, further reacts with the cement in the mix to produce further carbon dioxide-sequestering products. In certain embodiments, the carbon dioxide added to the wash water results in products in the wash water that account for at least 1, 2, 5, 7, 10, 12, 15, 20, 25, 30, 25, 40, 45, 50, 60, 70, 80, or 90% carbon dioxide by weight cement (bwc) in the wash water, and/or not more than 2, 5, 7, 10, 12, 15, 20, 25, 30, 25, 40, 45, 50, 60, 70, 80, 90, 95, or 100% carbon dioxide by weigh cement (bwc) in the wash water.

Embodiments include applying $CO_2$ immediately after the wash water is generated, in a tank, and/or as the grey water is being loaded for batching.

Alternatively or additionally, carbonation of grey (wash) water can allow use of aged wash water as mix water, for example, wash water that has aged at least 1, 2, 3, 4, 5, 6, 7, 8, 9, or 10 days.

The source of the carbon dioxide can be any suitable source. In certain embodiments, some or all of the carbon dioxide is recovered from a cement kiln operation, for example, one or more cement kiln operations in proximity to the concrete production facility, e.g., one or more cement kiln operations that produce cement used in the concrete production facility. In certain embodiments, wash water is transported from a concrete wash station or similar facility where concrete wash water is produced, to a cement kiln, or a power plant and flue gas from the cement kiln or power plant is used to carbonate the wash water. Carbon dioxide concentrations in cement kiln flue gas or power plant flue gas may be sufficient that no additional carbon dioxide is needed to carbonate the wash water; it is also possible that the flue gas need not be completely treated before exposure to wash water; i.e., it will be appreciated that cement kiln and power plant flue gas, in addition to containing carbon dioxide, may also contain SOx, NOx, mercury, volatile organics, and other substances required to be removed, or brought to an acceptable level, before the flue gas is released to the atmosphere. In certain embodiments, the flue gas is treated to remove one or more of these substances, or bring them to acceptable levels, before it is exposed to the wash water. In certain embodiments, one or more of these substances is left in the flue gas as it contacts the wash water, and after contacting the wash water the amount of the substance in the flue gas is reduced, so that further treatment for that substance is decreased or eliminated. For example, in certain embodiments, the flue gas comprises SOx, and treatment of the wash water with the flue gas decreases the amount of SOx in the flue gas (e.g., by formation of insoluble sulfates) so that the flue gas after wash water treatment requires decreased treatment to remove SOx, or no treatment. Additionally or alternatively, one or more of NOx, volatile organics, acids, and/or mercury may be decreased in the flue gas by contact with wash water so that the need for treatment of the flue gas for the substance is reduced or eliminated. After treatment with the flue gas, the carbonated wash water may be transported to a concrete production facility, either the same one where it was produced and/or a different one, and used in producing concrete at the facility, e.g., used as an admixture, e.g., to reduce cement requirements in the concrete due to the cement in the wash water.

The wash water may be monitored, e.g., as it is being carbonated. Any suitable characteristic, as described herein, may be used to determine whether to modify carbon dioxide delivery to the wash water. One convenient measurement is pH. For example, in certain embodiments, a carbonated wash water of pH less than 8.0, 7.9, 7.8, 7.7, 7.6, 7.5, 7.4, 7.3, 7.2, 7.1, or 7.0 is desired, e.g., to be used as a mix water. The pH may be monitored and brought to a suitable pH or within a suitable range of pHs before, e.g., its use as a mix water. For example, the pH can be at least 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, or 8.5, and/or not more than 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.7, 9.0, 9.3, 9.5, 9.7, 10, 10.3, 10.5, 10.7, 11.0, 12.0, or 13.0.

In addition, it is desirable that gas flow in a wash water, e.g., in a holding tank, not be increased to a level high enough that the rate of supply exceeds the rate of absorption/reaction; if this occurs, typically, bubbles will be observed at the surface of the wash water. If the rate of supply is equal to or less than the rate of absorption/reaction, then no bubbles are observed at the surface of the wash water. The rate of absorption and reaction may change with time, for example, decreasing as more of particles react or become coated with reaction products. Thus, appearance of bubbles may be used as an indicator to adjust carbon dioxide flow rate, and an appropriate sensor or sensors may be used to determine whether or not bubbles are appearing. Alternatively, or additionally, carbon dioxide content of the air above the surface of the wash water may be monitored using appropriate sensor or sensors and be used as a signal to modulate delivery of carbon dioxide to the wash water, e.g., slow or stop delivery when a certain threshold concentration of carbon dioxide in the air above the surface is reached. Rate of change of concentration can also be used as an indicator to modulate flow rate of carbon dioxide.

Bubble formation, in particular, is to be minimized or avoided, because in a tank where water is agitated to prevent settling of solids, it is desired to use the minimum amount of energy to cause the water to move in a pattern with sufficient motion that solids remain suspended; bubbles, which automatically rise to the surface no matter where they are in the overall flow pattern of the tank, can disrupt the flow, and cause more energy to be required for sufficient agitation. In a holding tank in which, e.g., an augur is used for agitation, systems of the invention may pull water from the tank into a recirculation loop where carbon dioxide is introduced. The rate of introduction, length of the loop, and other relevant factors are manipulated so that carbon dioxide is absorbed into the water and/or reacts with constituents of the water before it's released back into the tank. The carbon dioxide can be input into the loop near or at the start of the loop, so that there is maximum distance for the carbon dioxide to be absorbed and/or react. It is also advantageous to inject the carbonated water at a downward location in the tank.

Additional characteristics that can be useful to monitor include temperature of the wash water (reaction of carbon dioxide with cement products is typically exothermic), ionic concentration of the wash water, electrical conductivity of the wash water, and/or optical properties of the wash water (e.g., it has been observed that carbon dioxide can change the color of the wash water). Appropriate sensors for one or more of these characteristics may be included in an apparatus of the invention. Other characteristics and sensors are also appropriate as described herein.

Compositions include an apparatus for carbonating concrete wash water in a wash water operation that includes a source of carbon dioxide operably connected to a conduit that runs to a wash water container containing wash water from a concrete production site, where one or more openings of the conduit are positioned to deliver carbon dioxide at or under the surface of wash water in the container, or both, and a system to transport the carbonated wash water to a concrete mix operation where the carbonated wash water is used as mix water in a concrete mix, e.g. a second conduit that can be positioned to remove carbonated wash water from the wash water container and transport it to a concrete mix operation, where the carbonated wash water is used as part or all of mix water for concrete batches. Generally, the carbon dioxide will be delivered directly to the wash water tank as described elsewhere herein, though in some embodiments carbonation may occur outside the tank and the carbonated water returned to the tank. The apparatus may further include a controller that determines whether or not to modify the delivery of carbon dioxide based at least in part on one or more characteristics of the wash water or wash water operation. The characteristics may include one or more of pH of the wash water, rate of delivery of carbon dioxide to the wash water, total amount of wash water in the wash water container, temperature of the wash water, specific gravity of the wash water, concentration of one or more ions in the wash water, age of the wash water, circulation rate of the wash water, timing of circulation of the wash water, bubbles on surface, carbon dioxide concentration of air above surface, optical properties, electrical properties, e.g., conductivity, or any combination thereof. One or more sensors may be used for monitoring one or more characteristics of the wash water; additionally, or alternatively, manual measurements may be made periodically, e.g., manual measurements of specific gravity, pH, or the like. The apparatus may further comprise one or more actuators operably connected to the controller to modify delivery of carbon dioxide to the wash water, or another characteristic of the wash water, or both. The apparatus may include a system for moving the wash water, such as by circulating or agitating the wash water, either continuously or intermittently. The composition may further include a delivery system for delivering carbon dioxide to the source of carbon dioxide, where some or all of the carbon dioxide is derived from a cement kiln operation in proximity to the concrete production site, for example, a cement kiln operation that produces some or all of cement used in the concrete production site.

In certain embodiments, solids are removed from the carbonated wash water, for example, by filtration. These solids, which mostly comprise carbonated cement particles, can be further treated, e.g., dried. The dried solids can then be, e.g., re-used in new concrete batches.

Carbonation of Wash Water in Ready-Mix Truck, Reclaimer, and/or Lines.

In certain embodiments, concrete wash water is carbonated directly in the drum of a ready-mix truck and/or before it reaches a holding tank, e.g., during cycling in a reclaimer, or in the line between a reclaimer and a holding tank.

In a typical operation, a ready-mix truck is loaded at a batching facility; the load may be a partial load or a full load. A full load may be several cubic meters, e.g., 8 $m^3$, depending on the size of the truck. However, regardless of the size of the load, a large portion, in some cases virtually all, of the drum and interior components of the drum (e.g., fins, etc.), come in contact with the wet cement. The load is then released at the job site and the truck returns to a wash facility, usually at the batching facility, where it is cleaned prior to further batching. After the load is released at the job site, a certain amount of water that is carried in containers on the truck (typically called saddlebags) can be released into the truck and mixed in the truck at the site and during the trip back to the wash station, to prevent the wet concrete from hardening during the time before the truck is cleaned at the wash station. Additional water is then introduced into the drum at the wash station, with spraying and mixing to thoroughly clean the interior of the drum, and the resultant wash water is then either dumped, or, more commonly, sent to one or more tanks to be treated prior to disposal and/or reuse.

Typically, around 100-160 (e.g., 120) L wash water/$m^3$ of concrete is used to wash the truck; however, as stated, since partial loads result in a coating of the empty truck that is a greater part of the truck than the proportion of the load to a full load, and in some cases result in a completely coated empty truck drum, in some cases in which there has been a partial load a more realistic estimate of the amount of water needed is larger than the 120 L/$m^3$ of concrete. For example, if the total capacity of the truck is 8 $m^3$ and a 4 $m^3$ load is delivered, it is possible that the amount of wash water will be greater than 4×120 L, perhaps as much as that used for a full load, e.g., 8×120 L or 960 L. For any particular operation, the amount of water needed for a particular size load and mix type is generally known and can be used in any calculations required.

In some facilities, a reclaimer is used to separate out aggregate (e.g., sand and gravel) from the wash water, generally for reuse in further concrete batches. The remainder of the wash water is generally sent to a settlement pond to settle out further solids, or, alternatively, it is pumped into a slurry tank where it is kept suspended with paddles and diluted to a specific gravity and otherwise treated so that at least some of the water may be used again in concrete production. In a conventional reclaimer process, not all of the treated wash water produced can be reused, e.g. in concrete, and the overflow is sent to a holding pond, where it is disposed of in the conventional manner.

Introduction of Carbon Dioxide to the Drum of the Truck.

In certain embodiments of the invention, carbon dioxide is introduced into the water in the drum of the ready mix truck, before the water leaves the drum. The carbon dioxide can be in any form, and introduced in any suitable manner.

1) Introduction of Carbon Dioxide after Concrete Load has been Poured and Before Truck Reaches Wash Station.

For example, carbonated water may be used as saddlebag water and/or as wash water at a wash station. Supersaturated carbonated water may be used, as described elsewhere (see, e.g., U.S. Patent Application Publication No. 2015/0202579). In addition, or alternatively, solid carbon dioxide may be introduced into the water. For example, a certain amount of dry ice may be added at the job site, before, during, or after the addition of saddlebag water, and mix with the saddlebag water and residual concrete in the drum of the ready-mix truck during the drive back to the wash station; the dry ice will sublimate in the water and provide a steady source of carbon dioxide as the cement in the residual concrete reacts to produce reaction products, e.g., carbonates. The dry ice may be added as one dose or as more than one dose, e.g., as 2, 3, 4, 5, 6, 7, 8, 9, 10, or more than 10 doses, or continuously or semi-continuously. In addition or alternatively, gaseous carbon dioxide may be introduced into the drum, either as a single addition, or multiple additions, or as a stream of carbon dioxide that is injected into the drum, e.g., for some or all of the transport time from the job site. For example, carbon dioxide gas may be added as one dose or as more than one dose, e.g., as 2, 3, 4, 5, 6, 7, 8, 9, 10, or more than 10 doses, or continuously or semi-continuously. Carbon dioxide can also be introduced as mix of gaseous and solid carbon dioxide, e.g., by use of a snow horn; this can also be as one or more additions or continuous addition. For example, carbon dioxide as a mix of gas and solid may be added as one dose or as more than one dose, e.g., as 2, 3, 4, 5, 6, 7, 8, 9, 10, or more than 10 doses, or continuously or semi-continuously. In embodiments in which dry ice is used, there can be a further effect of cooling the wash water as cementitious materials react. It will be appreciated that one or more of the above options may be used for any given load.

For example, it is possible to add carbon dioxide to the drum after saddlebag water has been added, and while the truck is moving from the job site to a wash station: In one option, a certain amount of dry ice may be carried with the truck and introduced into the drum at the time that the saddlebag water is introduced; this is an easy and convenient method to get a relatively large amount of carbon dioxide into the drum. The dry ice may be used as pieces of a certain size, or within a certain range of sizes, that may be determined by, e.g., one or more of the volume of saddlebag water, the amount of cement in the mix, the expected amount of concrete coating the interior of the truck, the expected transport time back to the wash station, the desired level of carbon dioxide uptake, the efficiency of uptake, the temperature that the truck is likely to encounter, and the like, so that the dry ice sublimates at a rate that will match the expected rate of reaction with concrete residue and, in particular, with cement. This will tend to keep more of the carbon dioxide in the drum of the truck, since it will be reacting at approximately the rate that it is sublimated into gaseous form. In a second option, the saddlebag water is carbonated, or super-saturated, with carbon dioxide, generally at the batching facility before being loaded into its containers. The containers may be modified as necessary to preserve the carbonation of the water for the necessary time before use. Supersaturated solutions have been found to retain a large percentage of introduced carbon dioxide over relatively long time periods; thus, little or no modification of the saddlebags may be necessary if a supersaturated solution is used. See, e.g., U.S. Patent Application Publication No. 2015/0202579. In a third option, gaseous carbon dioxide is added to the drum of the ready-mix truck, before, after, or during the addition of the saddlebag water. As described above, the addition may be in one dose, more than one dose, continuous, or a combination. The total amount of carbon dioxide added may be metered and regulated based on the same criteria as for dry ice. In a fourth option, a mixture of solid and gaseous carbon dioxide is added to the drum, for example by use of liquid carbon dioxide passed through a snow horn. Dosing and regulation would be as for gaseous carbon dioxide. Any combination of these options may be used, as desired and suitable for a particular load, truck, or operation.

Because the truck is empty, the drum provides a very large headspace for any gaseous carbon dioxide to be retained. In certain embodiments, the opening of the drum may be partially or completely closed in order to retain carbon dioxide within the drum, either during transport back to the wash station, or at the wash station, or both.

2) Addition of Carbon Dioxide at a Wash Facility.

Additionally or alternatively, carbon dioxide may be added to the drum of the ready-mix truck during the washing process at the wash station. Any or all of the options described above for addition of carbon dioxide after the load has been poured and before the truck returns to the wash facility may also be used during washing at the wash station: carbonated or super-carbonated wash water, dry ice, gaseous carbon dioxide, a mix of gaseous and solid carbon dioxide. If carbon dioxide has already been added to the drum prior to the truck reaching the wash station, one or more characteristics of the water can be useful to determine the extent of reaction of the carbon dioxide. Measurements such as pH, temperature, and the like, as described elsewhere herein, can be useful. The amount of additional carbon dioxide that would then be added can be calculated from the measurement(s).

The washing can be done as a single wash, or it can be split into two or more washes, one or more of which can include carbonation. Thus, the washing may be done as 1, 2, 3, or more than 3 washes. Of these, one or more may include carbonation. It is possible that by splitting the washes, in combination with carbonation, less water may be needed than if a single wash is used. If saddlebag water addition is counted as a wash, then, typically, a minimum of two washes would be used (first is saddlebag water, second is at wash station). If more than one wash is used at the wash station, then it is 3, 4, etc. washes. Of these total washes, one or more may include a carbonation step, e.g., there can be 2 total washes (saddlebag and wash station) where one wash includes a carbonation step (e.g., addition of saddlebag water at job site, or the wash step at the wash station), or both washes include a carbonation step. As another example, there can be 3 washes (saddlebag and two separate washes at wash station) in which one wash includes a carbonation step (e.g., saddlebag at job site or one of the 2 washes at the wash station), or 2 washes include a carbonation step (e.g., saddlebag at job site and one of the 2 washes at the wash station, or both washes at the wash station), or all three washes include a carbonation step.

The carbon dioxide may be added manually, or automatically, or a combination of the two. If the carbon dioxide is added as carbonated wash water, typically, the usual wash routine can be used, and some or all of the wash water is carbonated or supercarbonated. If the concrete in the truck is already partially carbonated, e.g., if it has been carbonated during the trip to the wash facility, a desired additional amount of carbon dioxide may be calculated, possibly based on one or more characteristics as described above, e.g., pH, and the amount of carbonated wash water and normal (uncarbonated) wash water adjusted accordingly. If the concrete in the truck has not been carbonated, an amount of carbon dioxide may be calculated as described below, and the amount of carbonated wash water and normal (uncarbonated) wash water adjusted accordingly. Alternatively, the wash water may be used as normal, without any particular calculations or adjustments.

In some cases, additionally or alternatively, carbon dioxide may be added as solid carbon dioxide. Thus, dry ice, which may be adjusted to a particular size or range of sizes, may be added to the drum in a desired amount. The addition can be a simple as a manual addition by the truck driver or other personnel.

Additionally or alternatively, carbon dioxide may be added as gaseous carbon dioxide, or as a mixture of gaseous and solid carbon dioxide. In this case, an injection system is used. In these cases, in general, a delivery system for the carbon dioxide includes a source of carbon dioxide (e.g., a tank of liquid carbon dioxide), a conduit from the source to an injector for placing the carbon dioxide in the truck drum, and a system for positioning the injector so that the injection of carbon dioxide directs carbon dioxide into the drum of the truck, generally at a desired location in the drum, though in some cases very little is required beyond aiming the injector into the drum. A system may include a plurality of injectors to handle a plurality of trucks, e.g., simultaneously, such as at least 2, 3, 4, 5, 6, 7, 8, 9, 10, or more than 10 injectors. The injectors may all utilize the same source of carbon dioxide, with appropriate piping and valving. Typically, the system will also include a controller.

The injector is positioned so that delivery of carbon dioxide into the drum will occur into the opening of the drum and at a desired location of the drum. This can be as simple as the truck driver backing the truck to a designated spot, where the delivery system is situated so that it is properly aligned to inject carbon dioxide into the drum with little or no additional adjustment (e.g., injector is situated to be in proximity to opening of drum when truck backed in, then the truck driver may need to move the injector manually to the final position). In certain embodiments, an automated system may be used to assist in positioning the injector, or even to completely position it with no human intervention. The system further includes an actuator to start and stop delivery of carbon dioxide to the drum, e.g., a valve, and a connection between the valve and a controller that controls the start and stop of delivery. Generally, the system will also include a system to measure flow rate of the carbon dioxide. In a system that uses liquid→gas and solid, this can be, e.g., a system as described in U.S. Pat. No. 9,376,345.

The controller can be as simple as a button or switch that the truck driver toggles after backing the truck to the bay. It will be appreciated that such a "switch" can be any suitable switch, such as the touchscreen of a wireless device, e.g., a smartphone. Flow can continue for a designated time, then halted. Again, the simplest method for this is for the truck driver to hit the switch again. However, it can be preferable to have an automatic controller, to avoid human error and to more finely modulate delivery, so that the flow of carbon dioxide is halted automatically on signal from the controller. This may be after a certain time, or a certain amount of carbon dioxide is delivered (from flow rate and time), and/or based on one or more characteristics of the wash water which can be measured, e.g., by sensors, such as pH, specific gravity, temperature, etc., and communicated to the controller, which then halts or adjusts flow based on a predetermined algorithm. The automatic controller can also automatically start flow when the truck and injector are properly positioned, using appropriate positioning sensors to determine this point. The controller can also alert the truck driver as to when the truck is properly positioned in relation to the injector, or when the truck or injector is out of position.

An exemplary control system, which may be used for any suitable system in which wash water is treated with carbon dioxide, and, in particular in systems in which the carbonated wash water is re-used as mix water, utilizes input regarding one or more conditions of a wash water holder and/or its environment, such as at least 2, 3, 4, 5, or 6 conditions, processes the input, then signals one or more actuators, such as at least 2, 3, 4, 5, or 6 actuators, e.g., a valve that regulates carbon dioxide flow, based on the processing. Inputs can include, but are not limited to, one or more of wash water pH, wash water temperature, carbon dioxide content of air in contact with wash water (e.g., air in a headspace above a tank), and/or a calculated amount of carbon dioxide to be added. In the latter case, the calculation can be based on, e.g., volume of wash water, known or estimated amount of concrete in wash water, known or estimated percentage of cement in the concrete, known or estimated carbon dioxide uptake required to reach an acceptable endpoint, e.g., acceptable pH, and/or acceptable carbon dioxide uptake. Thus, one exemplary control system utilizes inputs that include wash water pH, temperature, and/or carbon dioxide concentration directly above the water, e.g., in a holding tank or reclaimer. In certain embodiments all three of pH, temperature, and carbon dioxide concentration are used; in certain embodiments two of pH, temperature, and carbon dioxide concentration are used; in certain embodiments only one of pH, temperature, and carbon dioxide concentration are used, for example, carbon dioxide concentration above the wash water. Additional sensors and/or information that may input to a controller, can include a flow meter to determine carbon dioxide flow rate, a sensor to determine the level of water in the holding tank (which level may vary depending on a variety of conditions), and/or information from a pump or pumps, such as pumps that pump new wash water into a holding tank, e.g., from a reclaimer, and/or such as pumps that pump water into a recirculation loop. In the case of a pump from a reclaimer, the pump or pumps typically have a fixed flow rate, so information regarding time that the pump is on can be sufficient for the controller to determine an amount of new wash water that has been added to the system; given the typical amount of cement in a load, the controller can, e.g., adjust carbon dioxide flow to wash water to account for the anticipated amount of material to be carbonated, and keep ahead of the carbonation demand. Alternatively, or additionally, the controller may send signals to other sensors, e.g., pH, temperature, and/or carbon dioxide, to read values more frequently so that the system can adjust more quickly to the added load.

Additional sensors can also include a sensor to monitor pressure behind a carbon dioxide control valve (typically used to send an alarm signal if the pressure is outside acceptable limits), and a sensor for the temperature of incoming gas, which indicates whether the carbon dioxide source, e.g., tank, can keep up with demand; such a sensor can indicate whether the source is being overwhelmed by demand, because in such case liquid carbon dioxide droplets may form.

Figure 88:
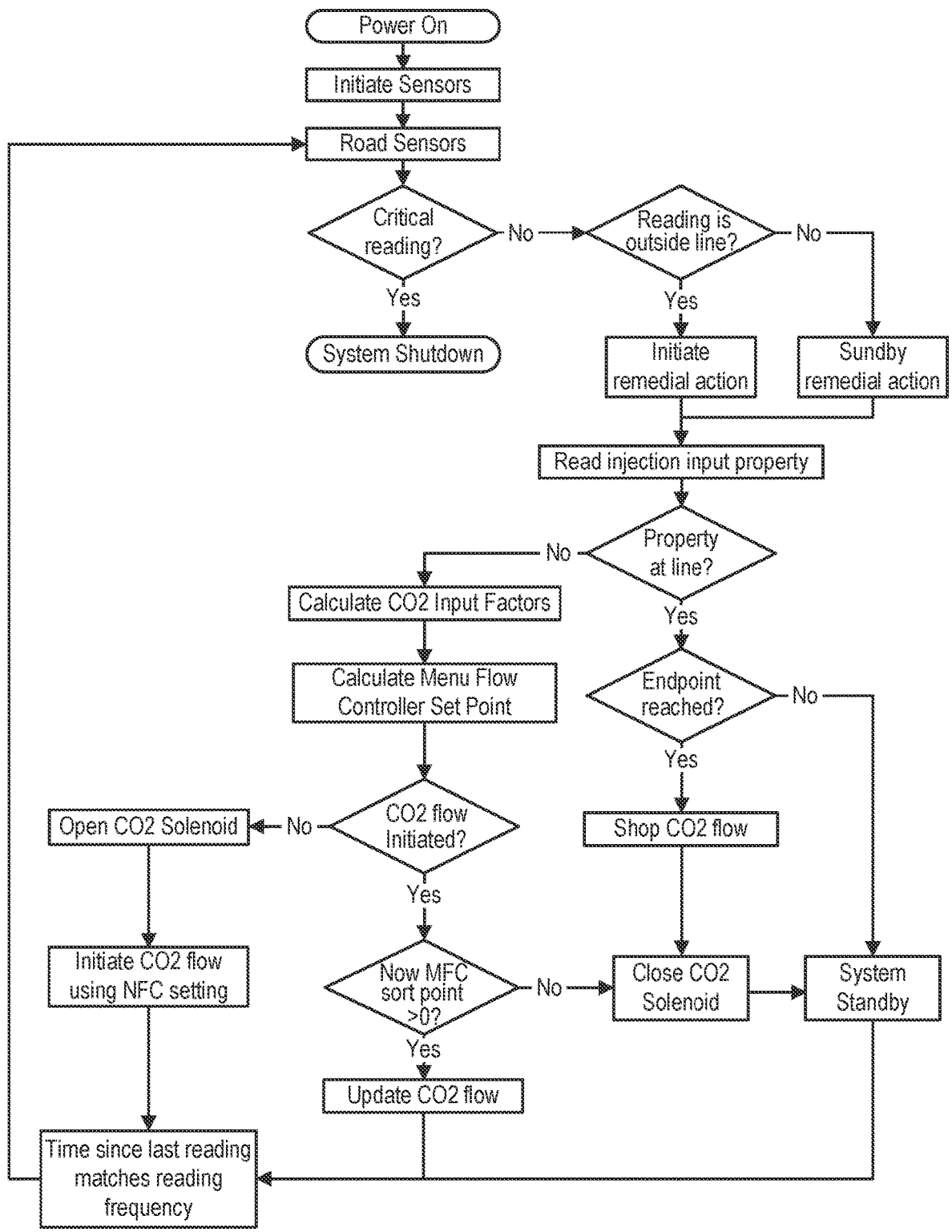
FIG. 88 shows exemplary control logic for treatment of wash water with carbon dioxide.

Exemplary general control logic is shown in FIG. 88. In this logic, sensors can be one or more suitable sensors, such as the sensors described herein. If one or more readings is beyond a critical level, the system will shutdown. If not, the system will proceed as shown in FIG. 88.

For convenience, the system will be described in terms of using all three sensors; it will be understood that fewer or more sensors may be used. Thus, in an exemplary embodiment, a pH sensor/meter, a temperature sensor such as a thermocouple, and a $CO_2$ sensor/meter are used as sensors. The sensors are operably connected to a control system, e.g., wired connection, wireless connection, or a combination. The control system is also connected to the carbon dioxide addition equipment for the wash water, and, optionally, a pump or pumps. Any suitable control system can be used, such as a programmable logic controller (PLC). The control system may be stand-alone, or integrated with an overall control system for the wash water facility, or a combination thereof. Additional equipment can include a first pneumatic cylinder and a second pneumatic cylinder, one or both of which can extend and contract, a mass flow meter for $CO_2$ gas flow metering and control, and a water line solenoid in a clean water line, to regulate flow of clean water to rinse the pH probe. The system can include a pump; an exemplary pump is one that serves to agitate the water in a holding tank, so that solids don't settle. Pumps alternatively or in addition can include reclaimer pumps.

The wash water temperature sensor, e.g., thermocouple, can be placed anywhere in contact with the wash water in the system, but typically is submerged to ensure the mass of the sensor does not impact the reading. A single wash water temperature sensor may be used, or more than one temperature sensor may be used, such as at least 2, 3, 4, 5, or 6 wash water temperature sensors.

The $CO_2$ sensor is placed above the surface of the wash water, e.g., in a location of upward-flowing wash water. The distance of the $CO_2$ sensor from the surface of the water may be any suitable distance so long as the sensor can detect carbon dioxide emitted from the wash water, i.e., carbon dioxide that has been contacted with the wash water but that has not been absorbed in/reacted with the wash water, so that it is escaping to the atmosphere above the wash water (headspace). For example, the sensor may be 0.1-100, or 1-100, or 1-50, or 5-100, or 5-50 cm above the surface of the wash water, or any other suitable distance. If the $CO_2$ sensor is in a fixed position, the distance from the surface of the water can vary as water level varies, e.g., from additional loads, use of water, etc. Thus, the system may also include a sensor to sense the level of the wash water in the tank. The controller may adjust the weight given to the carbon dioxide value depending on distance from the surface, e.g., if the sensor is further from the surface more carbon dioxide has to build up before the sensor will read it, and the controller may adjust flow to a different degree, for example, reduce flow more, or at a different rate, for example, more quickly, than if the sensor is closer to the surface of the water. Additionally or alternatively, a $CO_2$ sensor may be configured to stay a constant distance, or within a constant range of distances, from the surface of the wash water. For example, a $CO_2$ sensor may be on a float, with the gas-sensing portion a certain distance above the waterline of the float, or be provided with a mechanism to move the sensor based on, e.g., readings of the level of the wash water. Any other suitable method and apparatus for maintaining a constant distance from the surface of the wash water may be used. The system may use a single $CO_2$ sensor or more than one, such as at least 2, 3, 4, 5, or 6 $CO_2$ sensors.

Input from a sensor to signal the height of water in the tank may alternatively or additionally be used to regulate one or more aspects of the system. For example, when the water level is low, changes will tend to be more rapid, and the interval between samples may be decreased, and/or carbon dioxide flow rate decreased.

The pH sensor or sensors can be used in any suitable location that allows accurate readings of wash water pH. Any suitable sensor which can withstand the conditions typical of concrete wash water may be used. To obtain an accurate reading and prevent fouling of the sensor, the sensor is typically contacted with wash water in which the solids have been allowed to settle to a sufficient degree to obtain an accurate reading and to not foul the sensor. This may be done in any suitable manner. For example, a portion of wash water may be removed from the tank for a pH measurement and, e.g., allowed to settle before a measurement is taken. In another example, a pneumatic cylinder can be extended into the wash water at a location of downward-flowing wash water, for example, about 12 inches into the wash water, or any other suitable distance. The water inside the cylinder will not be exposed to the motion of the overall wash water, and solids can settle out. After an appropriate interval to allow sufficient solids to settle, for example, at least 5, 10, 15, 20, 30, 40, 50, or 60 seconds, a second pneumatic cylinder, which includes the pH sensor, is extended into the first cylinder to take a pH reading of the water inside the first cylinder. After a reading is complete, the probe is retracted from the first cylinder, and is subjected to appropriate treatment to prepare for the next reading, which can be, e.g., rinsing of the probe with clean water released from a clean water line by action of a solenoid in the line. The first cylinder is also retracted from the wash water at some time between samples so that a fresh sample can be obtained for the next reading. A single pH sensor may be used, or more than one may be used, such as at least 2, 3, 4, 5, or 6 pH sensors.

The sensor or sensors send signals to the control system. The readings from the various sensors can be reviewed to ensure that proper sampling has occurred, for example confirmation logic checks that the reading is in the expected range based on reading time, that change in value between readings is reasonable, i.e., not too high or too low. If an anomaly is detected, an error signal can be sent and standby logic to ensure continued safe operation (e.g., for temperature, pH); in the case of $CO_2$ sensor malfunctioning, an alarm may sound and/or the system may be shut down to ensure safety. If readings are determined to be proper, then the control system may determine, based on one or more readings, if any adjustment to $CO_2$ flow rate should be made.

Generally, the variable or variables will be determined to be within a suitable range, and if within the range, at what point in the range it is; this may be any suitable form of interpolation. The values for each variable may be combined, either as is or as weighted variables. The suitable ranges for each value can be determined by routine testing at the site. The range for pH may be any suitable range, such as from 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11.0, 11.2, 11.4, 11.6, 11.8, 12.0, 12.2, 12.4, 12.6, 12.8, 13.0, 13.2, 13.4, 13.6, 13.8, 14.0, or 14.5 to 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11.0, 11.2, 11.4, 11.6, 11.8, 12.0, 12.2, 12.4, 12.6, 12.8, 13.0, 13.2, 13.4, 13.6, 13.8, 14.0, 14.5, or 15.0. The range for temperature may be any suitable range, such as from 5, 7, 8, 9, 10, 11, 12, 13, 14, 15, 16, 17, 18, 19, 20, 21, 22, 23, 24, 25, 26, 27, 28, 29, or 30° C. to 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 50, 52, or 55° C.; generally tanks are run in the open and the lower limit may be adjusted according to air temperature, while the upper limit may be determined by the concrete production facility, which may not use mix water above a certain temperature. The range for carbon dioxide may be any suitable range, such as from 340, 350, 360, 370, 380, 390, 400, 410, 420, 430, 440, 450, 460, 470, 480, 490, 500, 520, 540, 560, 580, 600, 620, 640, 660, 680, 700, 720, 740, 760, 780, 800, 825, 850, 875, 900, 925, 950, 975, 1000, 1050, 1100, 1150, 1200, 1250, 1300, 1350, 1400, 1450, 1500, 1550, 1600, 1700, 1800, 1900, 2000, 2100, 2200, 2400, 2600, 2800, 3000, 3200, 3400, 3600, 3800, 4000, 4200, 4400, 4600, or 4800 ppm to 350, 360, 370, 380, 390, 400, 410, 420, 430, 440, 450, 460, 470, 480, 490, 500, 520, 540, 560, 580, 600, 620, 640, 660, 680, 700, 720, 740, 760, 780, 800, 825, 850, 875, 900, 925, 950, 975, 1000, 1050, 1100, 1150, 1200, 1250, 1300, 1350, 1400, 1450, 1500, 1550, 1600, 1700, 1800, 1900, 2000, 2100, 2200, 2400, 2600, 2800, 3000, 3200, 3400, 3600, 3800, 4000, 4200, 4400, 4600, 4800, or 5000 ppm. Since tanks are generally open to the atmosphere, the lower limit typically will not be below the atmospheric level of carbon dioxide, which is rising, thus determined at the site or as of date. The maximum upper limit may be constrained by regulations regarding worker safety, which vary, and can be as low as 1000 ppm, or may be, e.g., 5000 ppm. However, in general the upper limit will be lower than worker safety limits in order to more efficiently control carbon dioxide use in the system, and to limit waste. A separate carbon dioxide sensor may be installed at the site in worker areas and be set to give an alarm at a certain level, or even to shut down carbon dioxide feed into the system. This sensor is not necessarily communicating with the overall system, e.g., it may be a standalone alarm.

Samples may be taken at any suitable interval, which may be constant or may vary depending on conditions, e.g., as described elsewhere, sampling rate may increase when a load from, e.g., a reclaimer is sensed. Exemplary sampling intervals are from 1, 2, 3, 4, 5, 7, 10, 20, 30, 40, or 50 seconds, 1, 2, 3, 4, 5, 6, 7, 8, 9, 10, 11, 12, 13, 14, 15, 17, or 20 minutes, to 2, 3, 4, 5, 7, 10, 20, 30, 40, or 50 seconds, 1, 2, 3, 4, 5, 6, 7, 8, 9, 10, 11, 12, 13, 14, 15, 17, 20, 22, or 25 minutes. In order to obtain accurate readings at each sample time, several readings may be taken from one or more of the sensors, such as at least 2, 3, 4, 5, 6, 7, 8, 9, 10, 12, 15, 17, or 20 readings. Such readings may be averaged, or the control system may contain logic that allows choice of the most likely accurate reading or readings from the group.

Exemplary control logic to control $CO_2$ flow rates, based on all three of pH, temperature, and $CO_2$ above the surface (e.g., in headspace), is as follows, using upper and lower limits that are merely exemplary (any suitable ranges may be used), and using linear interpolation (an suitable interpolation may be used):

Adjustable variables
Sensor interval (min)=5
pH (Lower Limit, LL)=7
pH (Upper Limit)=13
$CO_2$ PPM (LL)=400
$CO_2$ PPM (UL)=1000
Temp C (LL)=20° C.
Temp C (UL)=40° C.
MAX FLOW=max flow determined onsite for the configuration used to ensure 100% uptake in new washwater. May be adjusted according to factors that affect uptake, such as volume of water in the tank (e.g., water level in the tank).

Below is some of the logic that can be incorporated into the logic to control flow rates based on the condition of the wash water. This logic uses a linear interpolation between 100% and 0% of max uptake flow between expected min/max sensor readings for simplicity but changing the $CO_2$ factor, pH factor and temperature factor equations would be relatively simple when, e.g., data that supports the change. All variables are given equal weighting but that can be adjusted, as well, as appropriate.

Conditions:
if pH<pH(LL) then pH factor=0
if pH >pH(UL) then pH factor=1
if pH (LL)<pH<pH(UL) then pH factor=(pH−pH(LL)/(pH(UL)−pH(LL)))
if $CO_2$<$CO_2$ (LL), then $CO_2$ factor=1
if $CO_2$>$CO_2$ (UL) then $CO_2$ factor=0
if $CO_2$ (LL)<$CO_2$<$CO_2$ (UL) then $CO_2$ factor=($CO_2$ (UL)−$CO_2$)/(Co2 (UL)−Co2 (LL))
if Temp <Temp C (LL) then Temp factor=1
if Temp >Temp C (UL) then Temp factor=0
if Temp C (LL)<Temp <Temp C (UL) then Temp factor= (Temp (UL)−Temp)/(Temp (UL)−Temp (LL))
Flow=MAX FLOW×((pH Factor×$CO_2$ factor×Temp factor)/3).

This flow equation is merely exemplary; it will be appreciated that any suitable weighting of factors may be used; in the case of the example equation, a value of 0 for any factor would shut down carbon dioxide flow, as values are multiplied, but any suitable numerical manipulation may be used to produce a desired result. In general, the combination of factors should not be above 1.0, i.e., max flow. Also, it may be desired, as in the example, that any one of the factors exceeding an upper or lower limit, depending on the factor, can shut down carbon dioxide flow.

Thus, in certain embodiments the invention provides a method of treating waste concrete in concrete mixer comprising adding water to the mixer to wash out the mixer and adding carbon dioxide to the mixer, to produce carbonated wash water in the mixer. At least a portion of the carbon dioxide added to the mixer is added as carbon dioxide dissolved in wash water for the mixer. The concentration of carbon dioxide in the wash water can be any concentration as described herein, such as at least 1, 2, 3, 4, 5, 6, 7, 8, 9, or 10 g/L water. In certain embodiments, such as when a supersaturated wash water is used, concentrations of carbon dioxide in the wash water can exceed 10 g/L, such as at least 12, 13, 14, 15, 16, 17, 18, 19, or 20 g/L. Additionally or alternatively, at least a portion of the carbon dioxide added to the mixer can be added as solid and/or gaseous carbon dioxide. The mixer can be any suitable mixer. In certain embodiments, the mixer is a transportable mixer, such as a drum of a ready-mix truck. The method can include transporting at least a portion of the carbonated wash water to a wash water treatment system. The wash water treatment system can, e.g., treat wash water comprising the carbonated wash water to remove aggregates. The wash water treatment system can additionally or alternatively add additional carbon dioxide to the wash water comprising carbonated wash water. Any suitable method for adding carbon dioxide, such as methods described herein, may be used to add the carbon dioxide.

Dosing of Carbon Dioxide

Regardless of the form of the carbon dioxide, the total amount of carbon dioxide to be used in the truck on the drive back to the wash station and/or at the station may be determined by the cement content of the concrete mix in the truck, the expected amount of concrete that will be coating the inside of the truck, the expected or desired level of carbon dioxide uptake by the cement, and the expected efficiency of uptake (e.g., carbon dioxide loss due to leakage from the drum of the truck). For example, a truck with a capacity of 8 $m^3$ may be carrying concrete with a cement content of 15%, and it is known or estimated that approximately 500 pounds of concrete remains in the truck after dumping its load, regardless of load size. A maximum uptake of 50% carbon dioxide bwc is expected for this cement type, and an efficiency of uptake of 80% is expected. The calculated dose of carbon dioxide for maximum carbonation would be 500×0.15/0.50×0.80=~188 lb of carbon dioxide. In general, the amount of concrete in the empty truck will not be precisely known; a surrogate is the specific gravity of the wash water as soon as enough water is added to create a slurry; from the specific gravity and volume, a mass of solids may be calculated and, from that and the proportion of cement in the concrete mix that was carried in the truck, the amount of cement in the wash water can be calculated. Thus, in certain embodiments, the dose of carbon dioxide to be used for wash water (either in a single truck or in a combination of more than one truck) may be expressed as an amount by weight solids, where a percentage of cement and other carbon-dioxide-reacting or -absorbing materials is known or estimated, and/or efficiency of carbonation is known or estimated, e.g., at least 1, 2, 5, 7, 10, 15, 20, 25, 30, 35, 40, 45, 50, 55, 60, 65, 70, 75, 80, 85, 90, or 95% carbon dioxide by weight solids, and/or not more than 2, 5, 7, 10, 15, 20, 25, 30, 35, 40, 45, 50, 55, 60, 65, 70, 75, 80, 85, 90, 95 or 100% carbon dioxide by weight solids. Higher doses may be used, e.g., beyond 100% by weight solids, depending on the cement content of the wash water, the expected efficiency of carbonation, etc.

Less than a complete (full) dose may be used in any embodiment of the invention. This can be for any reason; e.g., the desired or available systems for carbon dioxide delivery will not allow sufficient carbon dioxide to be delivered, or it is desired to keep the carbon dioxide reactions to a certain level in the time period between dumping the load of concrete and final washing at the batching facility, or between washing and further treatment, etc. As described elsewhere herein, an aged wash water may require less than a complete dose (e.g., a dose calculated based on fresh concrete in the truck) to provide the desirable level of reaction. Although a full or complete dose may be calculated for a given truck, load, and mix design, as described elsewhere herein, less than a full or complete dose of carbon dioxide may be given, e.g., less than 95, 90, 80, 70, 60, 50, 40, 30, 20, or 10% of a complete dose, and/or more than 5, 10, 15, 20, 30, 40, 50, 60, 70, 80, or 90% of a full dose. In certain embodiments of the invention, the dose of carbon dioxide used to treat wash water is such that the total amount of carbon dioxide delivered to a subsequent concrete mix using the carbonated mix water (and calculated only from carbon dioxide in the mix water, ignoring any other carbon dioxide added to the subsequent concrete mix), is less than 2.0, 1.5, 1.3, 1.0, 0.9, 0.8, 0.7, 0.6, 0.5, 0.4, 0.3, 0.2, or 0.1% by weight cement in the subsequent mix, for example, less than 1.0%, or less than 0.8%, or less than 0.5%, or less than 0.3%, or less than 0.1%, such as less than 0.5%. The amount of carbon dioxide in the wash water may be determined, e.g., by multiplying the total amount of carbon dioxide delivered to the wash water by the efficiency (measured or calculated) of absorption of carbon dioxide by the wash water and dividing by volume of the wash water. Suitable adjustments may be made for the typical case where a holding tank contains wash water from multiple trucks, and may be used on an ongoing basis to provide mix water, based on truck contents and water use, and other appropriate measurements. In certain embodiments, the carbon dioxide content the wash water (e.g., carbonates, bicarbonate, carbonic acid, and/or dissolved carbon dioxide) may be determined by chemical or other suitable measurements. It can be assumed that virtually all of the carbon dioxide content of a carbonated wash water, either dissolved or as reaction products with cementitious materials, is due to carbonation of the wash water.

It certain embodiments, a full dose, or dose that is calculated to be a full dose, may be delivered at the job site and/or during transport to the wash station; in some cases, less than a full dose is desired. In some cases, testing at the batching facility can show whether carbon dioxide uptake is complete; if not, additional carbon dioxide may be added at the batching facility, e.g., during washing of the drum or at a later step, to achieve a full dose or the desired less than full dose. In certain embodiments, no carbon dioxide until the truck is back at the batching facility. In certain embodiments, a partial dose is used at the job site and/or during the drive back to the batching facility, and one or more further partial doses are delivered at the batching facility, e.g., during washing or later, as described above.

In certain embodiments of the invention, the dose of carbon dioxide is determined mainly or exclusively by the methods above; e.g., no further pre-testing beyond, in some cases, specific gravity, is required. In some cases, dose is calculated simply from known or assumed amounts of concrete left in the truck and the mix design of the truck, including the amount of cement in the concrete and, in some cases, the type of cement in the concrete, as well as known or assumed efficiencies of carbonation, without the need to test wash water at all, and in particular, no need for testing for an initial dose of carbon dioxide.

The carbon dioxide added to the wash water will initially dissolve in the water and then form various products from reaction, such as bicarbonates, and carbonates (e.g., calcium carbonate). Carbon dioxide in the wash water, in the form of dissolved carbon dioxide, carbonic acid, bicarbonates, and carbonates, will be carried over into cement in which the which the wash water is used as mix water. Thus, the cement mix will contain a certain amount of carbon dioxide (including dissolved carbon dioxide, carbonic acid, bicarbonate, and carbonate) contributed by the carbonated wash water, which may be expressed as percent by weight cement in the mix. For example, a wash water may have a solids content 150,000 ppm, or 15%, which would give a specific gravity of approximately 1.10. If carbon dioxide is added to the wash water and the uptake by the wash water is 30%, then 4.5% of the water is carbon dioxide, mainly as carbonation products. If a concrete mix is then made using the carbonated wash water at a water/cement ratio of 0.5, then the amount of carbon dioxide (as dissolved carbon dioxide, carbonic acid, bicarbonate, and carbonate) in the concrete mix is 2.25% bwc. These numbers are merely exemplary. Wash water solids content, efficiency of uptake, w/c ratio, amount of mix water that is wash water, and the like, can vary. Thus, the amount of carbon dioxide provided by carbonated wash water in a concrete mix that comprises carbonated wash water can be at least 0.01, 0.05, 0.1, 0.2, 0.5, 0.7, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.2, 4.4, 4.6, 4.8, 5.0, 5.5, 6.0, 6.5, 7.0, 7.5, 8.0, 8.5, 9.0, 9.5, 10.0, 10.5, 11.0, 11.5, 12, or 12.5% bwc, and/or not more than 0.05, 0.1, 0.2, 0.5, 0.7, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.2, 4.4, 4.6, 4.8, 5.0, 5.5, 6.0, 6.5, 7.0, 8.0, 9.0, 10.0, 10.5, 11.0, 11.5, 12.0, 12.5, 13.0, 14, 15, 16, 17, 18, 19, 20, 22, 25, or 30% bwc. For example, the invention provides a method of preparing a concrete mix comprising (i) adding concrete materials to a mixer, wherein the concrete materials comprise cement; adding mix water to the mixer, wherein the mix water comprises carbonated concrete wash water in an amount such that the total carbon dioxide or carbon dioxide reaction products (expressed as carbon dioxide) supplied by the carbonated mix water to the concrete mix is at least 0.01, 0.05, 0.1, 0.2, 0.5, 0.7, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.2, 4.4, 4.6, 4.8, 5.0, 5.5, 6.0, 6.5, 7.0, 7.5, 8.0, 8.5, 9.0, 9.5, 10.0, 10.5, 11.0, 11.5, 12, or 12.5% bwc, and/or not more than 0.05, 0.1, 0.2, 0.5, 0.7, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.2, 4.4, 4.6, 4.8, 5.0, 5.5, 6.0, 6.5, 7.0, 8.0, 9.0, 10.0, 10.5, 11.0, 11.5, 12.0, 12.5, or 13.0% bwc, for example, at least 0.5, 1.0, 1.5, or 2.0%, and/or not more than 2.5, 2.0, 1.5, or 1.0%, or for example, not more than 2%, or not more than 2.5%, or not more than 3.0%, or not more than 3.5%, or not more than 4.0%; or, for example, at least 0.01% bwc, or at least 0.05% bwc, or at least 0.1% bwc, or at least 0.5% bwc, or at least 1.0% bwc, or at least 2.0% bwc, or at least 3.0% bwc, or at least 4.0% bwc, or at least 5.0% bwc; or, for example, in a range of between 0.01 and 13.0%, bwc, or a range of between 0.01 and 12.0% bwc, or a range of between 0.01 and 11.0%, bwc or a range of between 0.01 and 10.0%, bwc, or a range of between 0.01 and 8.0%, bwc, or a range of between 0.01 and 6.0%, bwc or a range of between 0.01 and 4.0%, bwc, or in a range of between 0.1 and 13.0%, bwc, or a range of between 0.1 and 12.0% bwc, or a range of between 0.1 and 11.0%, bwc or a range of between 0.1 and 10.0%, bwc, or a range of between 0.1 and 8.0%, bwc, or a range of between 0.1 and 6.0%, bwc or a range of between 0.1 and 4.0%, bwc, or in a range of between 1.0 and 13.0%, bwc, or a range of between 1.0 and 12.0% bwc, or a range of between 1.0 and 11.0%, bwc or a range of between 1.0 and 10.0%, bwc, or a range of between 1.0 and 8.0%, bwc, or a range of between 1.0 and 6.0%, bwc or a range of between 1.0 and 4.0%, bwc and (iii) mixing the water and the concrete materials to produce a concrete mix. It will be appreciated that the amount of carbonated wash water in the total mix water may be any suitable amount, such as amounts described herein.

Carbon Dioxide Delivery in Reclaimers and Piping from Reclaimer to Pond or Slurry Tank.

Some facilities utilize reclaimers to reclaim aggregate, e.g., sand and gravel, from the wash water. The water may then further be used, generally with more processing, either as part of mix water or as wash water; any remaining water is disposed of in the usual manner. In a typical reclaimer, water with grit and solid components is pumped through the process, and sand and gravel are separated out, e.g., by sieving. The water is then sent to a settlement pond, and/or to a tank for reuse. In the case of water sent to a settlement pond, water may be transported to a tank, where carbon dioxide is added to the water; e.g. a recirculation line allows carbon dioxide to be added to the water in the line, then sent back to the tank; if a tank is already present, then a carbonation apparatus may be added, for example, a recirculation line. This water can be carbonated or super-carbonated, additionally or alternatively with carbon dioxide added to the water during the pumping process, so that as carbon dioxide is consumed in carbonation reactions, more carbon dioxide is supplied to the water. Carbon dioxide can additionally or alternatively be supplied into piping as the water is pumped to a settlement pond or a slurry tank. In an optimum situation, sand and gravel are separated out as usual, but the water in, e.g., a slurry tank is available for use again without further dilution, or with less dilution than would otherwise be required. For example, the process may produce water, e.g., water in a slurry tank, from a reclaimer that has a specific gravity that is greater than, e.g., 1.03, 1.04 1.05, 1.06, 1.07, 1.08, 1.10, 1.11, 1.12, 1.13, 1.14, 1.15, 1.16, 1.17, 1.18, 1.19, or 1.20, but that is suitable for use as mix water. This is different from existing reclaimers, where the water in, e.g., a slurry tank, typically requires dilution to lower the specific gravity to acceptable levels. In the present process, little or no additional processing may be needed (though additionally or alternatively carbonation at the slurry tank may be used, if necessary or desired) because the carbonation process halts or greatly retards deleterious reactions of the cementitious material while leaving it available for reaction in a second concrete batch, and also adjusts the pH of the water to more acceptable levels. For example, in the process, filtering and/or settling of solids is generally not necessary; indeed, an advantage of the methods and compositions of the invention is that materials from one batch may be recycled into another batch or batches, potentially allowing less material, e.g., cement to be used, and decreasing or even eliminating costs associated with disposing of wash water materials.

Retrofit of Existing Facility to Provide Reclamation:

Most concrete facilities do not include a reclaimer, but could benefit from being able to reuse wash water and, potentially, aggregates from wash water. At present, most solid material is simply allowed to settle out in one or more settlement ponds, and is periodically disposed of, with little or no reuse, while the water in the settlement pond must be further treated to meet environmental standards before disposal. If, instead, wash water is carbonated, either before placement in the pond, or during its time in the pond, or both, then some or all of the water may be used as mix water, reducing or eliminating the costs and equipment required to treat the water for disposal. In addition, some or all of the aggregates may be available for reuse, instead of hardening and becoming useless.

As an example, in one type of operation, wash waters from trucks are dumped into a first bay, where solids settle out, harden, and are generally dumped. The top water from the first bay goes over a weir into a second bay where, generally, solids are further allowed to settle, top water is taken off, often sent to a third bay, and the water, now essentially free of solids but still with a high pH, silicates, calcium etc., is treated for disposal or, in some cases, for at least partial reuse. In presently available systems, the treatment in the third bay, where there are no solids present, may be with carbon dioxide. The present invention allows for a retrofit of the first or second bay, where solids are still present, so that instead of being a settlement pond, it is a slurry pond where carbonation occurs; the carbonated wash water is then suitable for use as mix water, rather than merely being disposed of. This can be done by the use of agitators, recirculating pumps, or a combination of these, where carbon dioxide is added either directly into the pond (e.g., through bubble mats, as described elsewhere herein) or in the lines in the recirculation pumps, or both. Other methods of adding carbon dioxide, e.g., at impellors or eductors, etc., are as described herein. Other means of carbon dioxide addition, such as solid carbon dioxide, or a mixture of gaseous and solid, may also be used, as described herein.

In certain embodiments, a wall is added to the first bay, e.g., a wall with a notch to allow water to flow through the notch (e.g., a weir) to an area of the first tank beyond the wall. The wall can be placed to provide a division in the first tank to allow solids, such as aggregate, to settle, but allow the remaining water, with suspended solids, to flow over the notch into a second part of the first bay. Optionally, a second wall can be added on the other side of the first wall, in order to reduce the volume of the area into which water flows over the notch. The water can be pumped out of the area, e.g., with a sump pump or similar pump, into a holding tank, where it can be carbonated, e.g., by use of a recirculation loop, where water is pumped out of the tank into a pipe and carbon dioxide added to the water in the pipe, then the carbonated water is led back into the tank. The carbonated water in the holding tank can then be led back to the batching plant, for use in subsequent batches of concrete. Addition of carbon dioxide to the water can be controlled as described elsewhere herein. In these embodiments, it may not be necessary to have a second or third bay, or their volumes may be reduced.

With this retrofit, some or all of the water from the first or second pond becomes useable as mix water, often at a higher specific gravity than would otherwise be possible, for example, at a specific gravity greater than, e.g., 1.03, 1.04 1.05, 1.06, 1.07, 1.08, 1.10, 1.11, 1.12, 1.13, 1.14, 1.15, 1.16, 1.17, 1.18, 1.19, or 1.20, whereas before the retrofit, little or none of the water from the pond was reused as mix water, but instead was disposed of With the retrofit, cementitious materials from previous batches also become available in subsequent batches (see calculations, below). Appropriate sensors and control systems may be used to monitor carbon dioxide addition, as well as monitor appropriate characteristics of the water, also as described herein, and to modify carbon dioxide delivery, as well as to control redirection of water back into the batching system for use as mix water. In this way, as much as 100% of the wash water may be recycled into mix water, e.g., at least 10, 20, 30, 40, 50, 60, 70, 80, 90, or 95% of the wash water may be recycled into mix water. For a typical truck, which uses ~120 L wash water/m³ of concrete carried in the truck to clean the truck, and a typical mix, which uses ~130 L water/m³ concrete, it is, indeed, possible to recycle 100% of the wash water into subsequent batches of concrete.

A retrofit may additionally or alternatively include a retrofit at the wash station, or at the truck, or both, to carbonate wash water before it reaches the ponds. At the truck level this includes addition of a source of carbon dioxide, which may be solid, gaseous (in solution or free), or a system to deliver both solid and gaseous carbon dioxide, as described elsewhere herein. For example, a truck may be retrofitted so that its saddlebags can hold carbonated water, if necessary. The batching site may be retrofitted to include a system for carbonating water and for supplying it to truck saddlebags (this would include a source of carbon dioxide, appropriate piping and injection systems, optionally a system for supersaturating water with carbon dioxide, and delivery system to deliver carbonated water to saddlebags, and appropriate control systems). Alternatively or additionally, the truck may be retrofitted to provide a system to carry dry ice for delivery to the drum after the load is delivered, which can be as simple as an insulated container. The batching facility may include a storage system for the dry ice and, optionally, a system for producing dry ice. If it is desired to produce dry ice of appropriate size range for a particular mix or load, as described elsewhere herein, the batch facility or the truck itself may further be outfitted with a system for producing dry ice of the desired size. Additionally or alternatively, the truck may be retrofitted with a system to deliver gaseous carbon dioxide to the drum of the truck, which includes a source of carbon dioxide, a conduit to deliver the carbon dioxide from the source to the drum, and, typically, a metering and control system to regulate addition of carbon dioxide to the drum. All of these retrofits may further include appropriate control systems, such as sensors (e.g., pH and other sensors, as described elsewhere herein, or in the simplest case, a timer, as well as sensors to determine the flow of carbon dioxide), a processor, and one or more actuators (e.g. valves) to control the flow of carbon dioxide according to the desired dose/rate, or other parameters. If it is desired to provide a mixture of solid and gaseous carbon dioxide to the drum of the truck, then the same basic setup as for gaseous is used, except that piping must be such that it can withstand the temperature of liquid carbon dioxide, and the injector should be a snow horn of appropriate design to produce the desired mix of solid and gaseous carbon dioxide.

At the wash station level, this includes equipment as described elsewhere herein for supplying carbon dioxide at the wash station, including the appropriate source or sources of carbon dioxide, appropriate conduits, injectors, positioning, metering, and control systems if carbon dioxide is injected into the drum, systems for carbonating or supercarbonating water if that method is used, and for delivering the carbonated water to the wash line.

It will be appreciated that, if a plant is retrofitted to carbonate the wash water, either at the job site/during transport, or at the wash station, or both, sufficient carbonation of wash water may occur so that no further carbonation at the ponds need by pursued; in some cases, however, additional carbonation at the ponds is necessary. In addition, through carbonation in the truck after pouring and during transport, and/or during wash, aggregate in the concrete in the truck can become available for reuse. Using the example of a settlement system with two ponds, if the wash station and/or truck is equipped to carbonate the leftover concrete, the aggregate material in the first pond can remain as discrete particles and be recovered and sieved, as appropriate, for use as aggregate in subsequent batches. The water may be ready at this point to be used as mix water, or it may require further treatment, e.g., further carbonation, to be so used.

Further possibilities, e.g., for retrofitting, are as follows:
Agitation of the wash water can be considered in three or more general approaches Customer has an Existing Wash Water Tank and an Agitation System:
retrofit CO2 treatment system can include a pump to move the water to/through the treatment step (either inline or in a separate tank). The pump is not the primary source of agitation and thus only needs to start when CO2 treatment starts and is controlled based on one or all of the sensors (Temp, pH, CO2 level in headspace)

Storage Tank with No Agitation:
Pumps are used to keep material suspended in the tank. Pump moves the water to/through the treatment step (either inline, the same tank or in a separate tank). The pump is on at any time the CO2 is injected with start/stop based upon the sensor logic.

Customer has a Pond with No Agitation:
Retrofit CO2 treatment adapted to pond. A pump is used to move the water to/through the treatment step (either inline or in a separate tank). The pump would need to be on all the time while CO2 is injected. Pump and CO2 start/stop are determined by the sensor logic examining the wash water supply.

In addition, there are various possibilities for the location of addition of carbon dioxide and/or admixture (described elsewhere herein) to wash water. In an exemplary ready-mix operation, wash water is added initially in the truck, after its load is dumped, to keep the remaining concrete from hardening. At this point, admixture, e.g., a set-retarding admixture, may be added to wash water in the drum of the truck. Alternatively or additionally, carbon dioxide may be added to wash water in the drum of the truck. The truck then proceeds to a wash station, where further water may be added to the drum. At this point, admixture, e.g., a set-retarding admixture, may be added to wash water in the drum of the truck. Alternatively or additionally, carbon dioxide may be added to wash water in the drum of the truck. The wash water is typically then pumped to a holding tank, and admixture and/or carbon dioxide can be added to the wash water in the line from the truck to the tank. In an operation in which a reclaimer is used, admixture and/or carbon dioxide may be added as described elsewhere herein. In some operations, additional holding tanks may be used, and at any one or more of these, admixture and/or carbon dioxide may be added. As described herein, the addition may occur in the tank itself or may occur in a recirculation line in which wash water is removed from the tank and circulated through a loop; see, e.g., Example 14. At some point, wash water is moved from, e.g., a holding tank, back to the drum of a ready-mix truck (or into a central mixer) to be used as part or all of the mix water for a new batch of concrete. Carbon dioxide and/or admixture may be added in the line from the tank to the mixer (truck drum or central mixer).

The invention also provides kits as appropriate for the various types and combinations of retrofits, as described herein. These can be packaged at a central facility where appropriate components and sizes are selected, according to the operation to be retrofitted, and shipped to the operation, generally with all necessary parts and fittings so that installation at the facility is easy and efficient.

It will be appreciated that the above discussion regarding retrofits applies equally to the building of new facilities, though some modifications may not be necessary when a facility is built from scratch, whereas other modifications may become necessary, as will be apparent to one of skill in the art.

Benefits of Carbonation of Wash Water

The benefits of carbonation of wash water include a reduction in the carbon footprint of the concrete operation, reduced water usage, reduced waste output, and increased recycled content usage.

By use of the methods and compositions of the invention, it is possible to get back some percentage of cementitious quality of cement, say at least 10, 20, 30, 40, 50, 60, 70, 80, 90, or 95 of cementitious quality. The producer can then reduce amount of cement in next batch by corresponding amount. E.g., a truck with 500 lb residual concrete, 15% cement, is treated by process and compositions of invention and the resultant slurry contains the cement with 80% of its cementitious properties retained. If all the wash water can be transferred over to the next mix as mix water, then 500× 0.15×0.80lb, or 60 lb less cement need be used in the next batch. If 90% of remainder of the concrete is aggregate that can be recovered because of the carbonation process, then an additional 450 lb of aggregate may be reduced in the subsequent load. These improvements contribute to a lower carbon footprint, reduced waste output, and increased recycled content usage.

In addition, as shown in the Examples and described herein, concrete made with wash water treated as described herein exhibits greater strength, especially greater early strength, that concrete made with untreated water. Thus, less new cement may be used in a mix that uses carbonated wash water than in the same mix that uses normal mix water, which further reduces carbon footprint.

Further, carbonation of a cement mix, even one using normal water, results in strength increases in the resultant poured material, and correspondingly less need for cement in the batch. See, e.g., U.S. Pat. No. 9,388,072. When used in conjunction with carbonated wash water, the results can be additive, or even synergistic, thus, with use of both methods the operator can reduce carbon footprint while at the same time saving money on the most expensive main component of concrete: cement.

Also as described herein, water reuse at a facility using the methods and compositions of the invention can be increased dramatically, in some cases to 100% (e.g., reuse of wash water in subsequent mixes of at least 10, 20, 30, 40, 50, 60, 70, 80, 90, or 95% of the wash water), with a corresponding reduction in waste output, again, in some cases, at or near 100% (e.g., decrease of waste water from wash water of at least 10, 20, 30, 40, 50, 60, 70, 80, 90, or 95% compared to using uncarbonated wash water). This imparts significant cost savings, as well as reducing carbon footprint further because of the reduction in energy use that would go toward treating and disposing of the wash water.

Disposal and regulatory costs, as well as cement costs, can be reduced by using the methods and compositions described herein. Admixtures, which normally may be needed, e.g. when wash water is used as mix water, related to workability, can often be reduced or eliminated when carbonated wash water is used.

In many cases, carbonated wash water may not only be used as mix water, but can be recycled as wash water.

Mechanism of carbonation of wash water. Without being bound by theory, it is thought that when carbon dioxide is introduced into wash water, it quickly is converted to carbonate anion due to the high alkalinity of the wash water; the carbonate anion reacts with calcium and forms a coating on suspended cement particles, reducing their reactivity in the wash water. They are thus "put to sleep" by the carbon dioxide, thus reducing/eliminating acceleration, but contributing to later strength. Variability is also reduced when using wash water that has been carbonated.

Sulfates

The inventors have found that the methods and compositions of the invention also can help to favorably alter sulfate content in a concrete batch made with mix water that includes carbonated wash water. Carbon dioxide-treated wash water can be a tool to deal with undersulfated binder. In general, a concrete mix that contains a high ratio of aluminates to sulfates may not be a viable mix when used as is. For example, the use of supplementary cementitious materials (SCMs) that contribute aluminates can mean that a cement that has a proper aluminate-sulfate balance is now in a cement blend that is undersulfated. Carbonated wash water can contain significant concentrations of sulfates in solution. If the sulfate content of the carbonated wash water is known, then an appropriate amount of carbonated wash water mixes can be added to compensate for this. In this case the wash water could have a low solids content because the sulfates are in solution.

Compositions.

Further provided herein are compositions, such as carbonated wash water compositions. In certain embodiments, the invention provides a carbonated concrete wash water composition comprising (i) wash water from concrete; (ii) carbon dioxide and carbon dioxide reaction products with the wash water. The wash water can be primarily composed of water used to rinse out a concrete mixer, e.g., a drum of a ready mix truck, or a combination of wash waters from a plurality of mixers, e.g., a plurality of ready-mix trucks. The amount of carbon dioxide and carbon dioxide reaction products in the carbonated concrete wash water can be at least 0.1, 0.2, 0.5, 0.7, 1.0, 1.2, 1.5, 1.7, 2.0, 2.5, 3.0, 3.5, 4.0, 4.5, 5.0, 5.5, 6.0, 7.0, 8.0, 9.0, 10.0, 11.0, 12.0, 13.0, 14.0, 15.0, 17.0, 20.0, or 25% by weight solids in the wash water composition; for example at least 0.5% by weight solids in the wash water composition, in some cases at least 2% by weight solids in the wash water composition, such at least 5% by weight solids in the wash water composition, or at least 10% by weight solids in the wash water composition. The specific gravity of the carbonated wash water can be at least 1.01, 1.02, 1.03, 1.04, 1.05, 1.06, 1.07, 1.08, 1.09, 1.10, 1.11, 1.12, 1.13, 1.14, 1.15, 1.17, 1.20, or any other specific gravity as described herein; for example, at least 1.03, such as at least 1.05, or at least 1.10. The pH of the carbonated wash water composition can be any pH or range of pHs as described herein, such as at least 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, or 8.5, and/or not more than 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.7, 9.0, 9.3, 9.5, 9.7, 10, 10.3, 10.5, 10.7, 11.0, 12.0, or 13.0; for example, the pH of the carbonated wash water can be less than 9.0, such as less than 8.5, or less than 8.0. Compositions can further include (iii) additional cement, that is not cement in the wash water, e.g., a cement mix produced from dry cement and carbonated wash water. Such mixes can further include aggregates, admixtures, etc.

Carbon Dioxide Sequestration and Economic Advantages

A concrete production facility utilizing the methods and compositions described herein can incur considerable yearly savings, due to reuse of solids in wash water (thus avoiding use of a certain amount of new cement), avoided landfill costs, and other economic benefits, such as reduced or no additional water treatment costs because some or all of wash water is recycled. In addition, there will be considerable sequestration/offset of carbon dioxide. Thus, in certain embodiments, the invention provides a method of sequestering and/or offsetting carbon dioxide by treating wash water, concrete byproducts (such as returned concrete), or a combination thereof, with carbon dioxide, and optionally re-using some or all of the solids in the wash water as cementitious material in subsequent concrete batches. See Example 9. In certain embodiments, at least 0.1, 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, or 15% of the carbon dioxide produced in manufacturing cement to be used at a concrete facility, transportation emissions, other emissions associated with concrete manufacture and use, or a combination thereof, is offset by the process. "Offset," as that term is used herein, includes the amount of carbon dioxide emissions avoided (e.g., through reduced cement use), as well as the amount of carbon dioxide actually sequestered, e.g., as part of carbonated wash solids and the like. In certain embodiments, the process provides a savings of at least 0.1, 0.5, 1, 1.5, 2, 2.5, 3, 3.5, 4, 4.5, 5, 5.5, 6, 6.5, 7, 7.5, 8, 8.5, 9, 9.5, or 10% of the annual production costs of the concrete facility (e.g., compared to a period of time before carbonation, adjusted as appropriate for fluctuations in loads, costs, etc.). Further cost benefits may be realized in areas where there is a price on carbon, e.g., cap and trade or carbon tax, where the offset carbon dioxide may be a source of further revenue. Additional or alternative carbon dioxide offsets can be achieved by treating concrete produced in the facility with carbon dioxide while the concrete is being mixed, e.g., by applying gaseous carbon dioxide, or solid carbon dioxide, or a mixture of gaseous and solid carbon dioxide, for example in a dose of less than 3, 2, 1.5, 1.2, 1.0, 0.8, 0.6, 0.5, 0.4, 0.3, 0.2, or 0.1 bwc, to the mixing concrete mix. See, e.g., U.S. Pat. Nos. 9,108,883 and 9,738,562. This treatment can result in a concrete product that requires less cement than the uncarbonated product, because, in addition to the carbon dioxide directly sequestered in the concrete, the carbonated concrete product has greater strength after setting and hardening than uncarbonated concrete product of the same mix design, and, consequently, a concrete product that requires at least 1, 2, 3, 4, 5, 6, 7, 8, 9, 10, 11, 12, 13, 14, 15, 16, 17, 18, 19, 20, 22, 25, or 30% less cement than the uncarbonated product. In such a case, carbon dioxide offset merely from carbonating the concrete mix may be at least 1, 2, 3, 4, 5, 6, 7, 8, 9, 10, 11, 12, 13, 14, 15, 16, 17, 18, 19, 20, 22, 25, or 30%. When concrete wash water treatment with carbon dioxide and, e.g., re-use of some or all of the solids in the wash water in subsequent concrete batches is combined with carbonation of concrete batches at a concrete facility, the total carbon dioxide offset can be at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 35, 37, 40, 42 or 45%.

Admixtures.

One or more admixtures may be added to the concrete wash water and/or to concrete made with the wash water. The addition may occur at one or more points in the process, as described elsewhere herein. Whether or not an admixture is used, the type of admixture, the point in the process at which admixture is added, and/or the amount of admixture added, can depend, e.g., on the type and amount of cement in the wash water. In some cases, addition of carbon dioxide to a wash water from a concrete batch can alter the properties of a subsequent batch which is made using the carbonated wash water as part or all of the mix water.

A decrease in the particle size of a powder in a binder system can lead to reduced workability (silica fume additions are an illustrative example). A workability impact can be observed for both CO2-treated and untreated wash water, so the particle size distribution may not be pivotal. An admixture that flocculates fine particles to effectively serve to increase the median particle size and reduce the effective specific surface area, etc., can mitigate negative effects associated with the CO2 induced reduction in particle size.

The use of chemicals in the flocculation of precipitated calcium carbonate (PCC) may act favorably on the CO2 treated solids given their outward surface may effectively behave as calcium carbonate. With PCC, highly charged polyelectrolytes are known to produce strong large flocculants and higher flocculation rates. Both bridging and charge neutralization occur in polyelectrolyte induced PCC flocculation. See, e.g., R. Gaudreault., N. D. Cesare., D. Weitz., T. G. M. van de Ven; "Flocculation kinetics of precipitated calcium carbonate"; Colloids and Surfaces A: Physicochem. Eng. Aspects 340, p56-65, 2009 https://doi.org/10.1016/j.colsurfa.2009.03.008

Without being bound by theory, PCC flocculation with positively charged polyelectrolytes indicates two mechanisms. A polymer with a high charge density and low molar mass such as polyethylenimine could induce PCC flocculation by neutralizing the charge, thus eliminating the electrostatic repulsive force. Whereas a high molar weight polymer with low charge density, such as polyacrylamide, interacts with PCC by a combination of electrostatic and bridging forces. See, e.g., A. Vanerek, B. Alince, T. G. M. van de Ven, "Interaction of calcium carbonate fillers with pulp fibres: effects of surface charge and cationic polyelectrolytes", J. Pulp Pap. Sci., 26(9), p317-322, 2000. Natural carbohydrates can also be used, e.g., starch (such as potato, corn, and/or tapioca starches), dextran, lignin. A starch derivative Glycidyl tetradecyl dimethylammonium chloride (GTDAC) can also be used. See, e.g., Y. Wei, F. Cheng, H. Zheng, "Synthesis and flocculating properties of cationic starch derivatives", Carbohydr. Polym., 74(3), p673-679, 2008, Y. Wei, F. Cheng, H. Zheng, "Synthesis and flocculating properties of cationic starch derivatives", Carbohydr. Polym., 74(3), p673-679, 2008. Another possible admixture is pectin (a biopolymer of D-galacturonic acid), whereon the addition of $Al^{3+}$ and $Fe^{3+}$ could greatly increase pectin's flocculating efficiency. Cationic ions neutralized and stabilized negatively charged pectin and bound particles by electrostatic attraction. See, e.g., H. Yokoi, T. Obita, J. Hirose, S. Hayashi, Y. Takasaki, "Flocculation properties of pectin in various suspensions", Bioresour. Technol., 84(3), p287-290, 2002. https://doi.org/10.1016/S0960-8524(02)00023-8.

Another potential admixture is cellulose or cellulose derivatives, e.g. electrosterically stabilized nanocrystalline cellulose (ENCC); dissolved carboxylated cellulose (DCC); rod-like dialdehyde cellulose (DAC) nanofibers, also referred to as sterically stabilized nanocrystalline cellulose (SNCC); dissolved DAC as dialdehyde modified cellulose (DAMC). ENCC/DCC showed a high flocculation efficiency with PCC particles and induced PCC flocculation by a combination of electrostatic and bridging forces. ENCC/DCC induces the maximum PCC flocculation when PCC particles reach to isoelectric point. The flocculation of PCC induced by SNCC: SNCC particles can bridge PCC to induce flocculation at low dosage (above 1 mg/g). SNCC induced the maximum flocculation when its fractional coverage was more than half coverage because SNCC particles become unstable after deposition on PCC. Adsorption isotherms of three SNCCs and dialdehyde modified cellulose (DAMC) on PCC particles were measured. It was found that DAMC had a higher affinity than three SNCCs with different aldehyde contents, and the affinity of SNCC increased with reaction time. This indicates DAMC chains adsorb stronger than nanocrystalline parts of SNCC on PCC. See, e.g., Dezhi Chen, Theo G. M. van de Ven, Flocculation kinetics of precipitated calcium carbonate induced by electrosterically stabilized nanocrystalline cellulose, Colloids and Surfaces A: Physicochemical and Engineering Aspects, Volume 504, 2016, Pages 11-17, ISSN 0927-7757, https://doi.org/10.1016/j.colsurfa.2016.05.023; Chen, Dezhi. "Flocculation Kinetics Of Precipitated Calcium Carbonate Induced By Functionalized Nanocellulose." (2015). PhD Thesis.

Another useful admixture is cationic polysaccharides, with N-alkyl-N,N-dimethyl-N-(2-hydroxypropyl)ammonium chloride pendent groups attached to a dextran backbone. The flocculation performance of the hydrophobically modified cationic dextran highly depended on its hydrophobicity and charge density, and was less dependent on molar mass. See, e.g., L. Ghimici, M. Nichifor, "Novel biodegradable flocculant agents based on cationic amphiphilic polysaccharides", Bioresour. Technol., 101(22), p8549-8554, 2000. Doi: 10.1016/j.biortech.2010.06.049.

Another useful admixture is cationic derivatives of dialdehyde cellulose (CDAC). CDACs showed very good flocculation performance in neutral and acidic suspensions, while a low flocculation activity was observed in alkaline suspensions because CDACs were broken down into small fragments at alkaline pH. See, e.g., Liimatainen, H, Sirviö, J, Sundman, O, Visanko, M, Hormi, O & Niinimaki, J 2011, 'Flocculation performance of a cationic biopolymer derived from a cellulosic source in mild aqueous solution' BIORESOURCE TECHNOLOGY, vol 102, no. 20, pp. 9626-9632. DOI: 10.1016/j.biortech.2011.07.099.

Another useful admixture is graft copolymers of carboxymethylcellulose (CMC) and polyacrylamide. Copolymers with fewer and longer PAM chains exhibited better flocculation performance. See, e.g., D. R. Biswal, R. P. Singh, "Flocculation studies based on water-soluble polymers of grafted carboxymethyl cellulose and polyacrylamide", J. Appl. Polym. Sci., 102(2), p1000-1007, 2006. doi: 10.1002/app.24016.

The flocculation kinetics of PCC has been studied in relation to cationic potato starch (C-starch), anionic potato carboxymethyl starch (A-starch), cationic polyacrylamide (C-PAM), Anionic polyacrylamide (A-PAM), Poly(ethylene oxide) (PEO), PEO cofactor, PVFA/NaAA, glyoxalated-PAM (PAM-glyoxal), cationic polyacrylamide (C-PAM), and polyamine (Pam) polyethlylenimine (PEI). See, e.g., Gaudreault, R., Di Cesare, N., Weitz, D., & van de Ven, T. G. (2009). Flocculation kinetics of precipitated calcium carbonate. Colloids and Surfaces A: Physicochemical and Engineering Aspects, 340(1-3), 56-65. doi: 10.1016/j.colsurfa.2009.03.008. During polymer induced flocculation, the particle size increases from its initial value to a plateau value. PEO/cofactor, A-PAM and C-PAM retention aid systems, are very cost effective in inducing PCC aggregation, and create very large aggregates at high polymer dosage. C-PAM, glyoxalated-PAM and the polyamine coagulant (Pam) do not significantly induce filler aggregation. Both PEO/cofactor and C-PAM, gave higher flocculation rates and larger flocculant sizes making them useful, for process water clarification. Neither PEO nor cofactor alone, without salt, induce PCC aggregation. PCC aggregates induced by PVFA/NaAA and C-starch have floc sizes less sensitive to dosage in region I. PEO/cofactor, which is known to cluster, gave faster flocculation rate and larger flocs; because the polymer cluster enlarge the effective polymer size leading to larger flocs. The A-PAM is highly charged and gives strong flocs due to strong binding to PCC. PAM-glyoxal, C-PAM (dry strength), and polyamine cause little or no flocculation, because they act as dispersants, similar to PEI.

The effect of cationic polyacrylamide on precipitated calcium carbonate flocculation: Kinetics, charge density and ionic strength has also been studied. See, e.g., Peng, P. and Garnier, G., 2012. Effect of cationic polyacrylamide on precipitated calcium carbonate flocculation: Kinetics, charge density and ionic strength. Colloids and Surfaces A: Physicochemical and Engineering Aspects, 408, pp. 32-39. doi: 10.1016/j.colsurfa.2012.05.002. Cationic polyacrylamide (CPAM). The adsorption kinetics of CPAM onto PCC can be explained by the balance of the electrostatic and van der Waals interactions, hydrogen bonding and steric hindrance between the adsorbed and dissolved CPAM molecules and CC. Increasing the ionic strength of the PCC suspension consistently screened the charge of CPAM molecules so that the initially dominant electrostatic attractions between CPAM and PCC in the absence of salt shifted to hydrogen bonding dominated attraction at high ionic strength (I=0.1). At low ionic strengths (I=0.01), both electrostatic attractions and hydrogen bonding were important in controlling the interaction between CPAM and PCC.

Admixture to Retain Solids in Suspension.

In certain embodiments, carbonated wash water is treated with one or more admixtures to create a mixture where the solids remain suspended with little or no agitation. These can include viscosity-modifying admixtures (VMAs). VMAs can be comprised of a wide range of different chemistries. Some VMAs are based on fine inorganic materials like colloidal silica, while others are comprised of more complex synthetic polymers such as styrene-maleic anhydride terpolymers and hydrophobically modified ethoxylated urethanes (HEUR). The more common VMAs are based on cellulose-ethers and biopolymers (xanthan, welan, and diutan gums). Further VMAs include biopolymer polysaccharides such as S-657, welan gum, xanthan, rhamsan, gellan, dextran, pullulan, curdlan, and derivatives thereof; (b) marine gums such as algin, agar, carrageenan, and derivatives thereof; (c) plant exudates such as locust bean, gum arabic, gum Karaya, tragacanth, Ghatti, and derivatives thereof; (d) seed gums such as guar, locust bean, okra, psyllium, mesquite, or derivatives thereof; and (e) starch-based gums such as ethers, esters, and derivatives thereof (f) associative thickeners such as hydrophobically modified alkali swellable acrylic copolymer, hydrophobically modified urethane copolymer, associative thickeners based on polyurethanes, cellulose, polyacrylates, or polyethers. In another classification scheme (Khayat, K. H., 1998. *Viscosity-enhancing admixtures for cement-based materials—An overview*. Cement and Concrete Composites 20, 171-188. https://doi.org/10.1016/S0958-9465(98)80006-1) VMAs are classified in various classes: Class A are water-soluble synthetic and natural organic polymers that increase the viscosity of the mixing water. Class A type materials include cellulose ethers, polyethylene oxides, polyacryl-amide, polyvinyl alcohol, etc. Class B are organic water-soluble flocculants that become adsorbed onto cement grains and increase viscosity due to enhanced interparticle attraction between cement grains. Class B materials include styrene copolymers with carboxyl groups, synthetic polyelectrolytes, and natural gums. Class C are emulsions of various organic materials which enhance interparticle attraction and supply additional superfine particles in the cement paste. Among the materials belonging to Class C are acrylic emulsions and aqueous clay dispersions. Class D are water-swellable inorganic materials of high surface area which increase the water retaining capacity of the paste, such as bentonites, silica fume and milled asbestos. Class E are inorganic materials of high surface area that increase the content of the fine particles in paste and, thereby, the thixotropy. These materials include fly ash, hydrated lime, kaolin, various rock dusts, and diatomaceous earth, etc. In another classification scheme, Kawai classified water-soluble polymers as natural, semi-synthetic, and synthetic polymers. Natural polymers include starches, guar gum, locust bean gum, alginates, agar, gum arabic, welan gum, xanthan gum, rhamsan gum, and gellan gum, as well as plant protein. Semi-synthetic polymers include: decomposed starch and its derivatives; cellulose-ether derivatives, such as hydroxypropyl methyl cellulose (HPMC), hydroxyethyl cellulose (HEC), and carboxy methyl cellulose (CMC); as well as electrolytes, such as sodium alginate and propyleneglycol alginate. Finally, synthetic polymers include polymers based on ethylene, such as polyethylene oxide, polyacrylamide, polyacrylate, and those based on vinyl, such as polyvinyl alcohol. In some cases, a viscosity-modifying agent can be used with a superplasticizer, such as a a hydrocolloid such as welan gum or hydroxypropylmethyl cellulose and a superplasticizer such as sulfonated naphthalene, sulfonated melamine, modified lignosulfate, their derivatives and mixtures thereof. Thus, the wash water can include a stable hydrocolloid composition in which the hydrocolloid is uniformly dispersed in a superplasticizer such as sulfonated naphthalene, sulfonated melamine, modified lignosulfate, their derivatives and mixtures thereof. Suitable hydrocolloids include welan gum, methylcellulose, hydroxypropylmethyl cellulose (HPMC), hydroxyethyl cellulose (HEC), polyvinyl alcohol (PVA), starch, and the like. The mixture is then stabilized by a rheological control agent consisting of reticulated cellulose fibers. The composition is rapidly hydratable and useful as a stabilizing additive in many cement and drilling fluid applications. Further useful admixtures are described in Naik, H. K., Mishra, M. K., Rao Karanam, U. M., 2009, The Effect of Drag-Reducing Additives on the Rheological Properties of Fly Ash-Water Suspensions at Varying Temperature Environment. Coal Combustion and Gasification Products 1, 25-31, doi: 10.4177/CCGP-D-09-00005.1 https://www.researchgate.net/publication/209640967_The_Effect_of_Drag-Reducing_Additives_on_the_Rheological_Properties_of_F-ly_Ash-Water_Suspensions_at_Varying_Temperature_Environment In this case, the cationic surfactant cetyl trimethyl ammonium bromide (CTAB) was selected for its eco-friendly nature. It is less susceptible to mechanical degradation) and also known potential to positively influence turbulent flow with very small amount. It is also least affected by the presence of calcium and sodium ions in tap water. The chemical formula of CTAB is C19H42BrN. The surfactant can be procured from, e.g., LOBA Chemie Pvt. Ltd., Mumbai, India. The molecular weight of the surfactant is 364.46.

For the surfactant drag-reducing additives, the rod-like micelle structures are thought to be the key to give complicated rheological fluid properties including viscoelasticity. The counter-ion acts as a reagent to reduce ion radius of the surfactant to deform micellar shape from globular to rod-like micelles. These rod-like micelles entangle together to make a certain network structure. Counter-ions will play a role as catalysts for the breakdown and reformation of the entanglement points. The counter-ion selected for this investigation can be, e.g. sodium salicylate (NaSal) (HOC6H4COONa) having molecular weight 160.10 obtained from, e.g., LOBA Chemie Pvt. Ltd., Mumbai, India.

Set Retarders

In certain embodiments, a set retarder is added to the wash water before it is carbonated, e.g., while the wash water is still in the truck, or in any suitable manner to introduce the set retarder before carbonation of the wash water. Set retarders A set retarder is generally a substance that can delay the time before cement hydrates, for example, in a concrete mix. Set retarders are well-known in the concrete industry, and any suitable set retarder may be used. Set retarders include carbohydrates, i.e., saccharides, such as sugars, e.g., fructose, glucose, and sucrose, and sugar acids/bases and their salts, such as sodium gluconate and sodium glucoheptonate; phosphonates, such as nitrilotri(methylphosphonic acid), 2-phosphonobutane-1,2,4-tricarboxylic acid; and chelating agents, such as EDTA, Citric Acid, and nitrilotriacetic acid. Other saccharides and saccharide-containing admixes include molasses and corn syrup. An exemplary set retarder is sodium gluconate. Other exemplary admixtures that can be of use as set retarders include sodium sulfate, citric acid, BASF Pozzolith XR, firmed silica, colloidal silica, hydroxyethyl cellulose, hydroxypropyl cellulose, fly ash (as defined in ASTM C618), mineral oils (such as light naphthenic), hectorite clay, polyoxyalkylenes, natural gums, or mixtures thereof, polycarboxylate superplasticizers, naphthalene HRWR (high range water reducer). Additional set retarders that can be used include, but are not limited to an oxy-boron compound, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide. Illustrative examples of retarders are set forth in U.S. Pat. Nos. 5,427,617 and 5,203,919, incorporated herein by reference.

The set retarder is added to the concrete or concrete wash water in any suitable amount; generally, dosing is well-established for a particular set retarder and desired effect. It will be appreciated that dosing may have to be approximate for some uses, e.g., when used with concrete coated on the inside of a ready-mix drum, and often operators will add excess set retarder to ensure that setting and hardening do not occur. This excess may be taken into account when carbonating the concrete or concrete wash water, and additional carbonation of the new concrete added to the old may be used in order to offset the excess set retarder, as necessary.

Thus, in certain embodiments, the invention provides methods and compositions for treating concrete wash water, that has been treated with set retarders, with carbon dioxide. This may be used when a truck is returned to the batch site and washed but the wash water is not removed from the truck; typically such a truck will sit overnight at the batching facility, then a new load of concrete will be introduced into the truck the next day. The wash water with set retarder contains components of the load that was in the truck, including cement. The wash water with set retarder may be treated with carbon dioxide after the addition of set retarder and before and/or during the addition of a new load of concrete to the truck. For example, the concrete wash water may have been exposed to set retarder, and then have sat, e.g., in the truck drum, for at least 0.5, 1, 2, 3, 4, 5, 6, 7, 8, 9, 10, 11, 12, 13, 14, 15, 16, 17, 18, 19, 20, 22, 24, 28, 32 hours, and/or for not more than 1, 2, 3, 4, 5, 6, 7, 8, 9, 10, 11, 12, 13, 14, 15, 16, 17, 18, 19, 20, 22, 24, 28, 32, or 36 hours, then carbon dioxide is added to the wash water. This may occur before a new load is added to the truck, e.g., at least 1, 2, 3, 4, 5, 6, 7, 8, 9, 10, 15, 20, 30, 40, 50, or 60 minutes before the new load, or at least 1, 1.5, 2, 2.5, 3, 4, 5, 6, or 8 hours before the new load, and/or not more than 2, 3, 4, 5, 6, 7, 8, 9, 10, 15, 20, 30, 40, 50, or 60 minutes before the new load, or not more than 1, 1.5, 2, 2.5, 3, 4, 5, 6, 8, or 10 hours before the new load. Additionally or alternatively, carbon dioxide may be added as the new load is added, or carbon dioxide addition may occur both before and during addition of the new load. Carbon dioxide may be added in an amount sufficient to reverse some or all of the effect of the set retarder on the cement in the wash water with set retarder; the carbon dioxide dose may be any suitable dose, calculated as by weight cement in the wash water; it will be appreciated that such a calculation often must be based on estimates of the amount of concrete sticking to the drum of the truck, and typically in addition the mix design of the load or loads that were in the truck prior to washing is also used to estimate cement content. Alternatively, a fixed amount of carbon dioxide may be used, such as an amount known to provide an excess of carbon dioxide so that all cement will react. The carbon dioxide dose may also be adjusted according to the amount of set retarder in the wash water, which may be, e.g., recorded by the operator, or may be as specified by protocol, or may be estimated. It will be appreciated that if excess set retarder is used in the wash water, then additional carbon dioxide may be necessary in order to prevent effects on the next load added to the wash water. In such cases, it may be useful to add carbon dioxide as the next load is added, or immediately before, so that carbon dioxide will not exit the treated wash water into the atmosphere. Exemplary doses are described elsewhere herein, for example, a dose of 0.001-5.0% bwc. Additionally or alternatively, carbon dioxide may be added to the new batch of concrete; typically, such a dose will be below 2%, such as less than 1.5%, or less than 1%, or in some cases less than 0.5% by weight cement (bwc).

In certain embodiments, concrete wash water is moved to a holding tank; this water can be treated with one or more set retarders at some point, either in the truck, or in the tank, or a combination thereof, then carbon dioxide can be introduced at a later point, e.g., when it is desired to re-use the wash water in a new batch of concrete. For example, wash water treated with set retarder can be exposed to carbon dioxide before its use as mix water and/or during its use as mix water. In this way, without being bound by theory, it is thought that the cement is kept in a "dormant" state by use of the set retarder, then that state is reversed by carbonation reactions from addition of the carbon dioxide.

In certain embodiments the invention provides methods and compositions for treating concrete, that has been treated with one or more set retarders, with carbon dioxide. This can occur, e.g., when a truck returns to a batching facility after only part of its load is used at a job site. In this case the concrete may be treated with set retarder at the job site or later; thus, the concrete may be batched then set retarder may be added a certain amount of time after batching, for example, at least 0.1, 0.2, 0.5, 0.7, 1, 1.5, 2, 2.5, 3, 3.5, 4, 5, 6, or 8 hours after batching, and/or not more than 0.2, 0.5, 0.7, 1, 1.5, 2, 2.5, 3, 3.5, 4, 5, 6, 8, or 10 hours after batching. The truck generally returns to the batching facility, and it may be desired to load additional concrete into the truck in addition to the returned concrete. Carbon dioxide can be added to the returned concrete, that has been treated with one or more set retarders, in any suitable dose, as described elsewhere herein; for example, at a dose of 0.001-5.0% bwc; the carbon dioxide may be added at any suitable time after set retarders are added, though this may be dependent on a number of factors, such as return time to the batching facility, storage time at the batching facility, and the like; thus in certain embodiments, carbon dioxide may be added at least 0.1, 0.5, 1, 1.5, 2, 2.5, 3, 3.5, 4, 5, 6, 7, 8, 9, 10, 11, 12, 13, 14, 15, 17, 20, 25, 30, 35, or 40 hours after set retarder is added to the concrete, and/or not more than 0.5, 1, 1.5, 2, 2.5, 3, 3.5, 4, 5, 6, 7, 8, 9, 10, 11, 12, 13, 14, 15, 17, 20, 25, 30, 35, or 40 hours after set retarder is added to the concrete. The concrete may then be used with additional concrete in a new batch of concrete; such use may occur simultaneously or nearly simultaneously with carbon dioxide addition, or may occur at any suitable time after carbon dioxide addition, such as at least 1, 2, 5, 7, 10, 15, 20, 25, 30, 40, or 50 min after carbon dioxide addition, or at least 1, 1.5, 2, 2.5, 3, 3.5, 4, 5, or 6 hours after carbon dioxide addition, and/or not more than 2, 5, 7, 10, 15, 20, 25, 30, 40, or 50 min after carbon dioxide addition, or not more than 1, 1.5, 2, 2.5, 3, 3.5, 4, 5, 6 or y hours after carbon dioxide addition. The new concrete may additionally be treated with carbon dioxide, so that in some embodiments both the old concrete and the new concrete are treated with carbon dioxide; as discussed, this may happen simultaneously or the old concrete may be treated with carbon dioxide, then new concrete is treated, for example, as it is mixed with the old concrete. The dose of carbon dioxide for the new concrete may be any suitable dose as described herein.

In some cases, set retarder is added to a concrete batch at the batching facility, or in the truck on the way to the job site, because factors such as expected traffic on the way to the job site, temperature, and the like, necessitate that the batch not begin to set too soon. In this case, it can be desirable to reverse the effect of the set retarder before pouring at the job site, i.e., in this case and other cases described herein, the set retarder acts as an "off switch," and the carbon dioxide acts as an "on switch" for the cement in the concrete. Carbon dioxide will be added to the concrete at some other location than the batching facility in these embodiments, for example, in the truck on the way to, or at, the job site. A truck may be equipped with a portable carbon dioxide delivery system, such as a source of carbon dioxide and a conduit for transporting carbon dioxide to the drum of the truck. Additionally or alternatively, a carbon dioxide delivery system may be sited at or near the job site, and trucks may arrive at the carbon dioxide delivery site, then the concrete contained therein may be treated with carbon dioxide at an appropriate time before its use at the job site; in this way, trucks may have a larger time window for transporting the concrete and its use, and factors such as traffic, delays at the job site, and the like, become less of an issue; the concrete is "dormant" due to the set retarder, then activated by use of the carbon dioxide. The dose of carbon dioxide may be suitable any dose as described herein, such as a dose of 0.001-5.0% bwc; also as described elsewhere, the dose may be dependent on the type of cement in the concrete, the type and amount of set retarder, the expected time of use of the concrete after the addition of carbon dioxide, temperature, and the like. The carbon dioxide may be added at any suitable time before the expected time of use of the concrete, for example, at least 1, 2, 3, 4, 5, 7, 10, 15, 20, 30, 40, or 50 minutes before the expected time of use, or at least 1, 1.5, 2, 2.5, or 3 hours before the expected time of use, and/or no more than 2, 3, 4, 5, 7, 10, 15, 20, 30, 40, or 50 minutes before the expected time of use, or no more than 1, 1.5, 2, 2.5, 3, or 3.5 hours before the expected time of use. Thus in certain embodiments the invention provides a method of treating concrete comprising treating concrete with a set retarder, then treating the concrete with carbon dioxide. The set retarder is generally added at a batching facility, though it may be added in the drum of the truck after it has left the batching facility, for example, if traffic delays and/or delays at the job site become known. The carbon dioxide is added en route to the job site and/or at the job site; typically it is added into the drum of the ready-mix truck, though it may also be added during the transport of the concrete from the drum to, e.g., the forms at the job site.

In certain embodiments, set retarder and carbon dioxide are added to a concrete mix in order to provide a desired combination of improved workability and acceptable set time. One or more set retarders may be added to a concrete mix in order to improve workability; however, this often comes at the cost of a delayed set time. In order to shorten set time but retain workability, a set accelerant admixture may be used. However, although set retarders are generally relatively inexpensive, set accelerants are often expensive and also often contain undesirable chemical species, such as chloride. Thus, it is desirable to use a substance that can accelerate set to within a desired time frame that is not highly expensive; carbon dioxide is one such substance. In these cases, carbon dioxide and set retarder may be added in any suitable sequence, such as sequentially with set retarder first, then carbon dioxide; or as carbon dioxide first, then set retarder; or simultaneously or nearly simultaneously, e.g., the timing of addition of set retarder and carbon dioxide is such that they are both being added to a concrete mix during at least a portion of their respective addition times. Thus, in certain embodiments, carbon dioxide is added to a concrete mix, then a set retarder is added after carbon dioxide addition (i.e., after carbon dioxide addition begins; depending on the length of time for carbon dioxide addition, set retarder addition may start before carbon dioxide addition ends, though this would not typically be the case); the set retarder may be added, for example, at least 0.1, 0.5, 1, 2, 3, 4, 5, 7, 10, 15, 20, 30, 40, or 50 minutes after carbon dioxide addition, or at least 1, 1.5, 2, 2.5, 3, 3.5, or 4 hours after carbon dioxide addition; and/or not more than 0.5, 1, 2, 3, 4, 5, 7, 10, 15, 20, 30, 40, or 50 minutes after carbon dioxide addition, or not more than 1, 1.5, 2, 2.5, 3, 3.5, 4, 5, or 6 hours after carbon dioxide addition. In other certain embodiments, set retarder is added to a concrete mix, then carbon dioxide is added after set retarder addition (i.e., after set retarder addition begins; depending on the length of time for set retarder addition, carbon dioxide addition may start before set retarder addition ends, though this would not typically be the case); the carbon dioxide may be added, for example, at least 0.1, 0.5, 1, 2, 3, 4, 5, 7, 10, 15, 20, 30, 40, or 50 minutes after set retarder addition, or at least 1, 1.5, 2, 2.5, 3, 3.5, or 4 hours after set retarder addition; and/or not more than 0.5, 1, 2, 3, 4, 5, 7, 10, 15, 20, 30, 40, or 50 minutes after set retarder addition, or not more than 1, 1.5, 2, 2.5, 3, 3.5, 4, or 4.5 hours after set retarder addition. It is also possible to add set retarder, carbon dioxide, or both, in divided doses, where the timing of each dose of one may be relative to the dose of the other in any suitable manner. For example, a certain amount of set retarder may be added, then carbon dioxide, then a final dose of set retarder; this is merely exemplary, and any suitable number of doses for set retarder and/or carbon dioxide, as well as any suitable timing of addition, may be used.

It will be appreciated that set accelerants are available as admixtures; such set accelerants may be used in addition to carbon dioxide. However, these admixtures tend to be expensive, and also often contain undesirable chemical species such as chloride, and it is desirable to use carbon dioxide as a less expensive alternative as much as possible.

Dose of carbon dioxide The concrete or concrete wash water, with set retarder, may be exposed to any suitable dose of carbon dioxide. For example, the dose may be not more than 5%, 4, 3%, 2.5%, 2%, 1.5%, 1.2%, 1%, 0.8%, 0.7%, 0.6%, 0.5%, 0.4%, 0.3%, 0.2%, 0.1%, 0.05%, 0.01%, or 0.05% bwc and/or at least 0.001, 0.005, 0.01, 0.05, 0.1, 0.2, 0.3, 0.4, 0.5, 0.6, 0.7, 0.8, 0.9, 1.0, 1.2, 1.5, 2.0, 2.5, 3.0, 4.0, or 4.5% bwc, such as a dose of 0.001-5%, or 0.001-4%, or 0.001-3%, or 0.001-2%, or 0.001-1.5%, 0.001-1.2%, 0.001-1%, 0.001-0.8%, 0.001-0.6%, 0.001-0.5%, 0.001-0.4%, 0.001-0.3%, 0.001-0.2%, or 0.001-0.1% bwc, or a dose of 0.01-5%, or 0.01-4%, or 0.01-3%, or 0.01-2%, 0.01-1.5%, 0.01-1.2%, 0.01-1%, 0.01-0.8%, 0.01-0.6%, 0.01-0.5%, 0.01-0.4%, 0.01-0.3%, 0.01-0.2%, or 0.01-0.1% bwc, or a dose of 0.02-1.5%, 0.02-1.2%, 0.02-1%, 0.02-0.8%, 0.02-0.6%, 0.02-0.5%, 0.02-0.4%, 0.02-0.3%, 0.02-0.2%, or 0.02-0.1% bwc, or a dose of 0.04-1.5%, 0.04-1.2%, 0.04-1%, 0.04-0.8%, 0.04-0.6%, 0.04-0.5%, 0.04-0.4%, 0.04-0.3%, 0.04-0.2%, or 0.04-0.1% bwc, or a dose of 0.06-1.5%, 0.06-1.2%, 0.06-1%, 0.06-0.8%, 0.06-0.6%, 0.06-0.5%, 0.06-0.4%, 0.06-0.3%, 0.06-0.2%, or 0.06-0.1% bwc, or a dose of 0.1-1.5%, 0.1-1.2%, 0.1-1%, 0.1-0.8%, 0.1-0.6%, 0.1-0.5%, 0.1-0.4%, 0.1-0.3%, or 0.1-0.2% bwc. The dose of carbon dioxide may be dependent on various factors, such as the type of cement in the concrete or concrete wash water, type and amount of set retarder used, timing of the addition of carbon dioxide after set retarder, temperature, expected time between addition of carbon dioxide and use of the concrete, and the like.

Form of Carbon Dioxide

The carbon dioxide may be added to the concrete or concrete wash water, with set retarder, in any suitable form, such as a gas, liquid, solid, or supercritical form; in certain embodiments, carbon dioxide comprising solid carbon dioxide can be used. This may be in the form of a mixture of solid and gaseous carbon dioxide, which can be formed from liquid carbon dioxide as it exits a conduit under pressure and is exposed to lower pressure, such as atmospheric pressure. See, e.g., U.S. Pat. No. 9,738,562. Additionally or alternatively, solid carbon dioxide alone may be added, such as as pellets or shavings, or other suitable form, which may be determined at least in part by the desired speed of sublimation of the carbon dioxide and its subsequent entry into solution. See, e.g., U.S. Pat. No. 9,738,562. In certain embodiments, only gaseous carbon dioxide is used.

Further Admixtures

This section summarizes some further useful admixtures for use in the methods and compositions herein. For additional listings see Report on Chemical Admixtures for Concrete, Reported by ACI Committee 212, American Concrete Institute, ACI 212.3R-16, ISBN 978-1-942727-80-4, incorporated herein by reference in its entirety.

Admixtures useful in the methods and compositions herein include:

Accelerators: cause increase in the rate of hydration and thus accelerate setting and/or early strength development. In general, accelerating admixtures for concrete use should meet the requirements of ASTM C494/C494M for Type C (accelerating admixtures) or Type E (water-reducing and accelerating admixtures). Examples include inorganic salts, such as chlorides, bromides, fluorides, carbonates, thiocyantes, nitrites, nitrates, thiosulfates, silicates, aluminates, and alkali hydroxides. Of particular interest are calcium-containing compounds, such as CaO, $Ca(NO_2)_2$, $Ca(OH)_2$, calcium stearate, or $CaCl_2$, and magnesium-containing compounds, such as magnesium hydroxide, magnesium oxide, magnesium chloride, or magnesium nitrate. Without being bound by theory, it is thought that, in the case of carbonated cement, the added calcium or magnesium compound may provide free calcium or magnesium to react with the carbon dioxide, providing a sink for the carbon dioxide that spares the calcium in the cement mix, or providing a different site of carbonation than that of the cement calcium, or both, thus preserving early strength development. In addition, the anion, e.g., nitrate from a calcium-containing admixture may influence C—S—H particle structure. Other set accelerators include, but are not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (e.g., chloride). Stable C—S—H seeds may also be used as accelerators.

In certain embodiments an accelerator can include one or more soluble organic compounds such as one or more alkanolamines, such as triethylamine (TEA), and/or higher trialkanolamines or calcium formate. The term "higher trialkanolamine" as used herein includes tertiary amine compounds which are tri(hydroxyalkyl) amines having at least one $C_3$-$C_5$ hydroxyalkyl (preferably a $C_3$-$C_4$ hydroxyalkyl) group therein. The remaining, if any, hydroxyalkyl groups of the subject tertiary amine can be selected from $C_1$-$C_2$ hydroxyalkyl groups (preferably $C_2$ hydroxyalkyl). Examples of such compounds include hydroxyethyl di(hydroxypropyl)amine, di(hydroxyethyl) hydroxypropylamine, tri(hydroxypropyl)amine, hydroxyethyl di(hydroxy-n-butyl) amine, tri(2-hydroxybutyl)amine, hydroxybutyl di(hydroxypropyl)amine, and the like. Accelerators can also include calcium salts of carboxylic acids, including acetate, propionate, or butyrate. Other organic compounds that can act as accelerators include urea, oxalic acid, lactic acid, various cyclic compounds, and condensation compounds of amines and formaldehyde.

Quick-setting admixtures may be used in some embodiments, e.g., to produce quick-setting mortar or concrete suitable for shotcreting or for 3D printing. These include, e.g., ferric salts, sodium fluoride, aluminum chloride, sodium aluminate, and potassium carbonate.

Miscellaneous additional accelerating materials include silicates, finely divided silica gels, soluble quaternary ammonium silicates, silica fume, finely divided magnesium or calcium carbonate. Very fine materials of various composition can exhibit accelerating properties. In certain embodiments, admixture can include nucleation seeds based on calcium-silicate hydrate (C—S—H) phases; see e.g. Thomas, J. J., et al. 2009 J. Phys Chem 113:4327-4334 and Ditter et al. 2013 BFT International, January, pp. 44-51, which are incorporated by reference herein in their entireties.

In certain embodiments, a set accelerator including one, two, or three of triisopropanolamine (TIPA), N,N-bis(2-hydroxyethyl)-N-(2-hydroxypropyl)amine (BHEHPA) and tri(2-hydroxybutyl) amine (T2BA) is used, for example, a set accelerator comprising TIPA. Any suitable dose may be used, such as 0.0001-0.5% bwc, such as 0.001-0.1%, or 0.005-0.03% bwc. See U.S. Pat. No. 5,084,103.

In certain embodiments, carbonation of a cement mix is combined with use of an admixture comprising an alkanolamine set accelerator, e.g., TIPA, where the alkanolamine set accelerator, e.g., TIPA, is incorporated in an amount of 0.0001-0.5% bwc, such as 0.001-0.1%, or 0.005-0.03% bwc. In some of these embodiments, the alkanolamine, e.g., TIPA,-containing admixture is added before and/or during carbonation, e.g., as part of the initial mix water. In some of these embodiments, the alkanolamine, e.g., TIPA,-containing admixture is added after and/or during carbonation. In some embodiments, the alkanolamine, e.g., TIPA,-containing admixture is added as two or more doses, which may be added at different times relative to carbonation (e.g., two doses, one before and one after carbonation, etc.). Additionally or alternatively, carbonation may proceed in two or more doses with, e.g., one or more doses of an alkanolamine, e.g., TIPA,-containing admixture added before, after, or during one or more of the carbon dioxide doses. Other components may be present in the alkanolamine, e.g., TIPA,-containing admixture, including one or more of set/strength controller, set balancer, hydration seed, dispersant, air controller, rheology modifier, colorant, or a combination thereof. Suitable commercially available products include BASF Master X-Seed 55 (BASF Corporation, Admixture Systems, Cleveland, Ohio). The total dose of carbon dioxide delivered to the cement mix in these embodiments may be any suitable dose, such as those described herein, for example, 0.001-2% bwc, such as 0.001-1.0% bwc, or 0.001-0.5% bwc Air Detrainers: also called defoamers or deaerators, decrease air content. Examples include nonionic surfactants such as phosphates, including tributylphosphate, dibutyl phosphate, phthalates, including diisodecylphthalate and dibutyl phthalate, block copolymers, including polyoxypropylene-polyoxyethylene-block copolymers, and the like, or mixture thereof. Air detrainers also include octyl alcohol, water-insoluble esters of carbonic and boric acid, and silicones. Further examples of air detrainers include mineral oils, vegetable oils, fatty acids, fatty acid esters, hydroxyl functional compounds, amides, phosphoric esters, metal soaps, polymers containing propylene oxide moieties, hydrocarbons, alkoxylated hydrocarbons, alkoxylated polyalkylene oxides, acetylenic diols, polydimethylsiloxane, dodecyl alcohol, octyl alcohol, polypropylene glycols, water-soluble esters of carbonic and boric acids, and lower sulfonate oils.

Air-entraining admixtures: The term air entrainer includes any substance that will entrain air in cementitious compositions. Some air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves concrete's resistance to surface scaling caused by chemical deicers. Air entrainment also increases the workability of fresh concrete while eliminating or reducing segregation and bleeding. Materials used to achieve these desired effects can be selected from wood resin and their salts, natural resin and their salts, synthetic resin and their salts, sulfonated lignin and their salts, petroleum acids and their salts, proteinaceous material and their salts, fatty acids and their salts, resinous acids and their salts, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Solid materials can also be used, such as hollow plastic spheres, crushed brick, expanded clay or shale, or spheres of suitable diatomaceous earth. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

Alkali-aggregate reactivity inhibitors: Reduce alkali-aggregate reactivity expansion. Examples include barium salts, lithium nitrate, lithium carbonate, and lithium hydroxide.

Antiwashout admixtures: Cohesive concrete for underwater placements. Examples include cellulose and acrylic polymer.

Bonding admixtures: Increase bond strength. Examples include polyvinyl chloride, polyvinyl acetate, acrylics, and butadiene-styrene copolymers.

Coloring admixtures: Colored concrete. Examples include modified carbon black, iron oxide, phthalocyanine, umber, chromium oxide, titanium oxide, cobalt blue, and organic coloring agents.

Corrosion inhibitors: reduce steel corrosion activity in a chloride-laden environment. Examples include calcium nitrite, sodium nitrite, sodium benzoate, certain phosphates or fluosilicates, fluoaluminates, and ester amines.

Dampproofing admixtures: retard moisture penetration into dry concrete. Examples include soaps of calcium or ammonium stearate or oleate, butyl stearate, and petroleum products.

Foaming agents: produce lightweight, foamed concrete with low density. Examples include cationic and anionic surfactants, and hydrolyzed protein.

Fungicides, germicides, and insecticides: Inhibit or control bacterial and fungal growth. Examples include polyhalogenated phenols, dieldrin emulsions, and copper compounds.

Gas formers: Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Hydration control admixtures: Suspend and reactivate cement hydration with stabilizer and activator. Examples include carboxylic acids and phosphorus-containing organic acid salts.

Permeability reducers: Decrease permeability. Examples include latex and calcium stearate.

Pumping aids: Improve pumpability. Examples include organic and synthetic polymers, organic flocculents, organic emulsions of paraffin, coal tar, asphalt, acrylics, bentorite and pyrogenic silicas, and hydrated lime.

Retarders: Retard setting time, and can include water-reducing set-retarding admixtures, which reduce the water requirements of a concrete mixture for a given slump and increase time of setting (see water reducers), or those that increase set time of concrete without affecting the water requirements. In general, set retarders can be classified in four categories, any of which may be used in embodiments herein: 1) lignosulfonic acids and their salts and modifications and derivatives of these; 2) hydroxylated carboxylic acids and their salts and modifications and derivatives of these; 3) carbohydrate-based compounds such as sugars, sugar acids, and polysaccharides, and 4) inorganic salts such as borates and phosphates. Thus, set retarders include carbohydrates, i.e., saccharides, such as sugars, e.g., fructose, glucose, and sucrose, and sugar acids/bases and their salts, such as sodium gluconate and sodium glucoheptonate; phosphonates, such as nitrilotri(methylphosphonic acid), 2-phosphonobutane-1,2,4-tricarboxylic acid; and chelating agents, such as EDTA, Citric Acid, and nitrilotriacetic acid. Other saccharides and saccharide-containing admixes include molasses and corn syrup. In certain embodiments, the admixture is sodium gluconate. Other exemplary admixtures that can be of use as set retarders include sodium sulfate, citric acid, BASF Pozzolith XR, firmed silica, colloidal silica, hydroxyethyl cellulose, hydroxypropyl cellulose, fly ash (as defined in ASTM C618), mineral oils (such as light naphthenic), hectorite clay, polyoxyalkylenes, natural gums, or mixtures thereof, polycarboxylate superplasticizers, naphthalene HRWR (high range water reducer). Additional set retarders that can be used include, but are not limited to an oxy-boron compound, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide. Further retarders include nitrilotri(methylphosphonic acid), and 2-phosphonobutane-1,2,4-tricarboxylic acid. Illustrative examples of retarders are set forth in U.S. Pat. Nos. 5,427,617 and 5,203,919, incorporated herein by reference Shrinkage reducers: Reduce drying shrinkage. Examples include polyoxyalkylenes alkyl ether and propylene glycol.

Water reducers: Water-reducing admixtures (also called dispersants, especially HRWR) are used to reduce the quantity of mixing water required to produce concrete of a certain slump, reduce water-cement ratio, reduce cement content, or increase slump. Typical water reducers reduce the water content by approximately 5-10%; high range water reducers (HRWR) reduce water content even further. Adding a water-reducing admixture to concrete without reducing the water content can produce a mixture with a higher slump; for example, in certain cases in which high doses of carbon dioxide are used to carbonate a cement mix, slump may be reduced, and use of a water reducer may restore adequate slump/workability.

Water reducers for use in the compositions and methods herein may meet one of the seven types of water reducers of ASTM C494/C494M, which defines seven types: 1) Type A—water reducing admixtures; 2) Type B—retarding admixtures (described above); 3) Type C—accelerating admixtures (also described above); 4) Type D—water-reducing and retarding admixtures; 5) Type E—water reducing and accelerating admixtures; 6) Type F—water-reducing, high range admixtures; or 7) Type G—water-reducing, high-range, and retarding admixtures. Materials generally available for use as water-reducing admixtures typically fall into one of seven general categories, and formulations useful herein may include, but are not limited to, compounds from more than one category: 1) lignosulfonic acids and theirs salts and modifications and derivatives of these; 2) hydroxylated carboxylic acids and their salts and modifications and derivatives of these; 3) carbohydrate-based compounds such as sugars, sugar acids, and polysaccaharides; 4) salts of Sulfonated melamine polycondensation products; 5) salts of sulfonated napthalene polycondensation products; 6) poly-carboxylates; 7) other materials that can be used to modify formulations, including nonionic surface-active agents; amines and their derivatives; organic phosphonates, including zinc salts, borates, phosphates; and certain polymeric compounds, including cellulose-ethers, silicones, and Sulfonated hydrocarbon acrylate derivatives.

An increase in strength is generally obtained with water-reducing admixtures as the water-cement ratio is reduced. For concretes of equal cement content, air content, and slump, the 28-day strength of a water-reduced concrete containing a water reducer can be 10% to 25% greater than concrete without the admixture. Type A water reducers can have little effect on setting, while Type D admixtures provide water reduction with retardation (generally a retarder is added), and Type E admixtures provide water reduction with accelerated setting (generally an accelerator is added). Type D water-reducing admixtures usually retard the setting time of concrete by one to three hours. Some water-reducing admixtures may also entrain some air in concrete.

High range water reducer (HRWR, also called superplasticizer or plasticizer), Type F (water reducing) and G (water reducing and retarding), reduce water content by at least 12%.

Examples of water reducers include lignosulfonates, casein, hydroxylated carboxylic acids, and carbohydrates. Further examples, including HRWR (superplasticizers or plasticizers) include polycarboxylic ethers, polycarboxylates, polynapthalene sulphonates (sulfonated napthalene formaldehyde condensates(for example LOMAR D™. dispersant (Cognis Inc., Cincinnati, Ohio)), polymelamine sulphonates (sulfonated melamine formaldehyde condensates), polyoxyethylene phosphonates (phosphonates-terminated PEG brushes), vinyl copolymers. Further examples include beta naphthalene sulfonates, polyaspartates, or oligomeric dispersants.

Polycarboxylate dispersants (water reducers which are also called polycarboxylate ethers, polycarboxylate esters) can be used, by which is meant a dispersant having a carbon backbone with pendant side chains, wherein at least a portion of the side chains are attached to the backbone through a carboxyl group or an ether group. Examples of polycarboxylate dispersants can be found in U.S. Pub. No. 2002/0019459 A1, U.S. Pat. Nos. 6,267,814, 6,290,770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, 5,912,284, 5,840,114, 5,753,744, 5,728,207, 5,725,657, 5,703,174, 5,665,158, 5,643,978, 5,633,298, 5,583,183, and 5,393,343. The polycarboxylate dispersants of interest include but are not limited to dispersants or water reducers sold under the trademarks GLENIUM® 3030NS, GLENIUM® 3200 HES, GLENIUM 3000NS® (BASF Admixtures Inc., Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

Viscosity and Heology Modifying Admixtures.

Viscosity-modifying admixtures (VMAs) are typically water-soluble polymers used in concrete to modify its rheological properties. VMAs influence the rheology of concrete by increasing its plastic viscosity; the effect of yield stress widely varies with the type of VMA, from no increase to a significant one. Plastic viscosity is defined as the property of a material that resists change in the shape or arrangement of its elements during flow, and the measure thereof, and yield stress is defined as the critical shear stress value below which a viscoplastic material will not flow and, once exceed, flows like a viscous liquid. Rheology modifying agents can be used to modulate, e.g., increase, the viscosity of cementitious compositions. Suitable examples of rheology modifier include firmed silica, colloidal silica, cellulose ethers (e.g., hydroxyethyl cellulose, hydroxypropyl methylcellulose), fly ash (as defined in ASTM C618), mineral oils (such as light naphthenic), hectorite clay, polyoxyalkylenes, polysaccharides, polyethylene oxides, polyacrylamides or polyvinyl alcohol, natural and synthetic gums, alginates (from seaweed), or mixtures thereof. Other materials include finely divided solids such as starches, clays, lime, and polymer emulsions. Rheology-modifying admixtures (RMA) are admixtures that affect the flow characteristics of concrete by lowering the yield stress or force required to initiate flow without necessarily changing the plastic viscosity. The addition of an RMA to concrete might not alter its slump but will improve workability and flow characteristics. RMAs have been used in low-slump concrete applications, for example, when concrete is placed using slipform paving machines to place concrete pavements, curbs, and barriers, and potentially in 3D printing. The can also be used in self-consolidating concrete (SCC) or highly workable concretes. Rheology-modifying admixtures include those reported by Bury and Bury, 2008, Concrete International, 30:42-45, incorporated herein by reference in its entirety.

Shrinkage Reduction and Compensation Admixtures.

The shrinkage compensation agent which can be used in the cementitious composition can include but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® is an example of a shrinkage reducing agent and is available from BASF Admixtures Inc. of Cleveland, Ohio. Exemplary shrinkage reduction admixtures (SRAs) include polyoxyalkylenes alkyl ethers or similar compositions. Exemplary shrinkage compensation admixtures (SCAs) include calcium sulfoaluminate and calcium aluminate, calcium hydroxide, magnesium oxide, hard-burnt and dead-burnt magnesium oxide.

Extended Set-Control Admixtures.

Extended set-control admixtures (ESCAs) or hydration-controlling admixtures (HCAs) are sued to stop or severely retard cement hydration process in unhardened concrete. They may be used to shut down ongoing hydration of cementitious products in returned/waste concrete or in wash water that has been treated in the truck or in a concrete reclaimer system, which allows these products to be recycled back into concrete production so that they need not be disposed of; or to stabilize freshly batched concrete to provide medium- to very long-term set retardation, which allows concrete to remain plastic during very long hauls or in long-distance pumping situations that require long slump life in a more predictable fashion than normal retarders. These differ from conventional set control admixtures because they stop the hydration process of both the silicate and aluminate phases in Portland cement. Regular set-control admixtures act only on the silicate phases. Examples include carboxylic acids and phosphorus-containing organic acids and salts.

Workability-Retaining Admixtures.

Help retain workability retention of concrete. Examples include hydration-controlling and retarding admixtures that meet the requirements of ASTM C494/C494M Type B or D, or neutral set workability-retaining admixtures meeting the requirements of ASTM C494/C494M Type S. See, e.g., Daczko, 2010, Proceedings fro the $6^{th}$ International Symposium on Self-compacting Concrete and the 4$^{th}$ North American Concerence on the Design and Use of Self-Consolidating Concrete, September Corrosion-Inhibiting Admixtures.

Reduces corrosion of steel in concrete, e.g., rebar. Examples include chromates, phosphates, hydrophosphates, alkalies, nitrites, and fluorides; aine carboxylate, amine-ester organic emulsion, and calcium nitrate.

Permeability-Reducing Admixtures.

Permeability-reducing admixtures (PRAs) have been developed to improve concrete durability though controlling water and moisture movement, as well as by reducing chloride ion ingress and permeability. These typically include, but are not limited, to: 1) hydrophobic water repellants, such as materials based on soaps and long-chain fatty acid derivatives, vegetable oils such as tallows, soya-based materials, and greases, and petroleum such as mineral oil and paraffin waxes., e.g, calcium, ammonium, and butyl stearates; 2) polymer products, such as organic hydrocarbons supplied either as emulsions (latex) or in liquid form, such as coal tar pitches, bitumen or other resinous polymer, or prepolymer materials; 3) finely divided solids, such as inert and chemically active fillers such as talc, bentonite, silicious powders, clay, lime, silicates, and colloidal silica. Supplementary cementitious materials (SCMs) such as fly ash, raw or calcined natural pozzolans, silica fume, or slag cement, although not technically chemical admixtures, can contribute to reducing concrete permeability be be a complementary component; 4) hydrophobic pore blockers; 5) crystalline products, which can be proprietary active chemicals provided in a carrier of cement and sand.

Bonding admixtures include an organic polymer dispersed in water (latex).

Coloring admixtures include natural or synthetic materials, in liquid or dry forms. Pigments include black iron oxide, carbon black, phthalocyanine blue, cobalt blue, red iron oxide, brown iron oxide, raw burnt umber, chromium oxide, phtalocyanine green, yellow iron oxide, and titanium dioxide.

Flocculating admixtures include synthetic polyelectrolytes, such as vinyl acetate-maleic anhydride copolymer.

Fungicidal, germicidal, and insecticidal admixtures include polyhalogenated phenols, dieldrin emulsion, and copper compounds.

Lithium Admixtures to Reduce Deleterious Expansion from Alkali-Silica Reaction.

Deleterious expansions from alkali-silica reaction (ASR) can occur in concrete when susceptible siliceous minerals are present in the aggregate. Exemplary admixtures that prevent these deleterious expansion reactions include solid forms (lithium hydroxide monohydrate and lithium carbonate) and liquid form (30 percent by weight lithium nitrate solution in water). Additional examples include lithium nitrite.

Expansive/gas forming admixtures include metallic aluminum, zinc or magnesium, hydrogen peroxide, nitrogen and ammonium compounds, and certain forms of activated carbon or fluidized coke.

Admixtures for cellular concrete/flowable fill include those based on protein or on synthetic surfactants.

Shotcrete Admixtures.

Shotcrete is define as "mortar or concrete pneumatically projected at high velocity onto a surface." Materials useful as shotcrete admixtures include accelerators, such as alkali-based accelerators, e.g., aqueous silicate or aluminate solutions or alkali-free accelerators such as those based on aluminum sulfates and aluminum hydroxysulfates; high-range water-reducing admixtures such as those known in the art specifically formulated for shotcrete mixtures; and extended set-control admixtures.

Admixtures for manufactured concrete products. These may be used to add production efficiency, improve or modify surface texture, enhance and maintain visual appeal, or provide value-added performance benefits. These include plasticizers such as soaps, surfactants, lubricants, and cement dispersants; accelerators both calcium chloride and non-chloride-based; and water-repellant/efflorescence control admixtures such as calcium/aluminum stearates, fatty acids, silicone emulsions, and wax emulsions.

Admixtures for flowing concrete. Flowing concrete is defined as "concrete that is characterized as having a slump greater than 7½ in (190 mm) while maintaining a cohesive nature." Various admixtures may be used, such as mid-range water reducers and high-range water reducers, viscosity-modifying admixtures, set retarders, set accelerators, and workability-retaining admixtures, as described herein.

Admixtures for self-consolidating concrete (SCC). Exemplary admixtures for inclusion in SCC include high-range water-reducing admixtures, e.g., polycarboxylate-based HRWRAs such as blends of different polycarboxylate polymers that have different rates of absorption on the powder substrates; and viscosity-modifying admixtures.

Admixtures for Very Cold Weather Concrete.

These allow placement of concrete in temperatures below freeing, and include water reducers, accelerators, retarders, corrosion inhibitors, and shrinkage reducers (for their added freezing point depression).

Admixture for very-high-early-strength concrete. VHESC is designed to achieve extremely high early strengths within the first few hours after placement. Admixture systems can include a high-range water reducer, set accelerator, and optionally air-entraining admixture. Also include may be workability-retaining admixtures.

Admixtures for Previous Concrete.

Pervious concrete is a low-slump, open-graded material consisting of portland cement, uniform-sized aggregate, little or no fine aggregate, chemical admixtures, and water, which, when combined, produces hardened concrete with interconnected pores, or voids, that allow water to pass through the concrete easily. Exemplary admixtures include air-entraining admixtures, extended set-control admixtures, water-reducing admixtures, internal curing admixtures, viscosity-modifying admixtures, and latex admixtures.

Admixtures for 3D printing concrete. These include admixtures that allow the printed concrete to stand without forms and other admixtures suited to the requirements of 3D printing.

Modification or Influence on Calcium Carbonate

In certain embodiments, an admixture is used that modulates the formation of calcium carbonate, e.g., so that one or more polymorphic forms is favored compared to the mixture without the admixture, e.g., modulates the formation of amorphous calcium carbonate, e.g., aragonite, or calcite. Exemplary admixtures of this type include organic polymers such as polyacrylate and polycarboxylate ether, phosphate esters such as hydroxyamino phosphate ester, phosphonate and phosphonic acids such as nitrilotri(methylphosphonic acid), 2-phosphonobutane-1,2,4-tricarboxylic acid, chelators, such as sodium gluconate, ethylenediaminetetraacetic acid (EDTA), and citric acid, or surfactants, such as calcium stearate.

Further admixtures of interest include those that influence calcium carbonate formation, reactions, and other aspects of calcium carbonate. For example, magnesium can be a strong inhibitor to calcite growth, and the Mg/Ca ratio may affect the lifetime of amorphous calcium carbonate, e.g., high ratios may increase lifetime, and may influence the type of crystalline polymorph that forms as the initial and long-term product. $CO_3^{2-}/Ca^{2+}$ may also affect these, as may physical mixing, either or both of which may be manipulated. See, e.g., see Blue, C. R., Giuffre, A., Mergelsberg, S., Han, N., De Yoreo, J. J., Dove, P. M., 2017. Chemical and physical controls on the transformation of amorphous calcium carbonate into crystalline $CaCO_3$ polymorphs. Geochimica et Cosmochimica Acta 196, 179-196. https://doi.org/10.1016/j.gca.2016.09.004, incorporated herein by reference in its entirety.

In certain embodiments, admixture can include one or more 2D substrates terminated with functional groups, which may also influence crystal phase, size, shape, and/or orientation. Exemplary strategies for preparing functional group substrates include Langmuir monolayer, surface carbonylation, and alkanethiol self-assembling monolayer (SAM). For example, a stearic acid monolayer has been used to direct $CaCO_3$ crystallization. Various functional groups can be micro-patterned on a substrate to guide $CaCO_3$ crystallization. Thus, in certain embodiments 2D substrates with —COOH, —OH, $SO_3H$, —$CH_3$, —SH, and/or or $PO_4H_2$, can be used to control $CaCO_3$ mineralization. The physical and/or chemical properties of the substrate may be manipulated as suitable for desired outcome. These include chemical character, hydrophilicity, charge (or coordination number) and geometry (or spatial structure) of terminated functional groups, substrate metals and length of alkanethiol molecule. Additionally or alternatively, environmental factors such as temperature and/or initial concentration of $Ca^{++}$ may be manipulated. ACC formation and transformation may be preferred on strong hydrophilic surfaces, for example, on —OH or —SH terminated SAMs. Without being bound by theory, it is thought that $CaCO_3$ nucleates via the same mechanism on—OH, $NH_2$, and —$CH_3$ terminated SAMs. Double-hydrophilic block copolymers based on poly(ethyleneglycol)(PEG), carboxylated polyanilines (c-PANIs) can be used to mediate $CaCO_3$ crystallization, and can provide control over crystal size, shape, and modification, e.g., promote production of purely crystalline calcite and/or vaterite. Addition of —OH and —COOH tailored functional polymer can potentially stabilize ACC precursor phase, which may gradually transform to calcites, if desired. Additionally or alternatively, charged functional groups can be coupled with $Ca^{2+}$ ions to facilitate $CaCO_3$ crystallization. See, e.g., Deng, H., Shen, X.-C., Wang, X.-M., Du, C., 2013. Calcium carbonate crystallization controlled by functional groups: A mini-review. Frontiers of Materials Science 7, 62-68. https://doi.org/10.1007/s11706-013-0191-y, incorporated herein by reference in its entirety; in particular, see Table 1 for potential influences of various admixtures on morphologies.

In certain embodiments admixture may include one or more complexing agents, such as Ethylenediaminetetraaceticacid (EDTA) and/or 1-hydroxyethy-lidene-1,1-diphosphonic acid (HEDP). For example, without being bound by theory, EDTA is reported to retard the crystal growth of calcite and aragonite. Aquasoft 330, a commercial grade HEDP is reported to control the morphology of $CaCO_3$ and calcium oxalate. See, e.g., Gopi, S. P., Subramanian, V. K., Palanisamy, K., 2015. Synergistic Effect of EDTA and HEDP on the Crystal Growth, Polymorphism, and Morphology of CaCO 3. Industrial & Engineering Chemistry Research 54, 3618-3625. https://doi.org/10.1021/ie5034039, incorporated herein by reference in its entirety.

In certain embodiments, admixture may include low molecular weight and polymeric additives, such as block copolymers, poly(ethylene glycol) (PEG), polyelectrolyte, polyacrylamide and cellulose, which can exhibit large influence on the crystallization of $CaCO_3$. See, e.g., Xie et al., 2006; Xu et al., 2008; Xu et al., 2011, Sadowski et al., 2010; Su et al., 2010, all of which are incorporated by reference herein in their entireties. Among various templates, PEG is of particular interest because its molecules contain hydrophilic groups, which can act as a donor to metal ions to form metal complexes with diverse conformation. $CaCO_3$ mineralized without PEG polymer formed rhombohedral calcite crystals of an average size of 12.5 and 21.5 μm after 5 min and 24 h of incubation, respectively. In contrast, $CaCO_3$ precipitates obtained in the presence of PEG but collected after 24 hours of incubation exhibited particles with diameters ranging from 13.4 to 15.9 μm. The slight increase in the particle size observed at a high polymer concentration may be caused by the flocculation effect. Thus, without being bound by theory, it is thought that the presence of poly (ethylene glycol) inhibits the growth of $CaCO_3$ particles in the system. It is known that low and high molecular weight additives can stabilize nonequilibrium morphologies by changing the relative growth rates of different crystal faces through molecular, specific interactions with certain surfaces that modify the surface energy or growth mechanism, or both. Further without being bound by theory, it is also thought that in aqueous solution, $Ca^{2+}$ and $CO_3^{2-}$ firstly form ACC, which quickly transforms into vaterite and calcite within minutes, but at the same time the polymer molecules adsorb on the surface of the particles, which can inhibit the growth of crystal during the process resulting in formation small particles. See, e.g., Polowczyk, I., Bastrzyk, A., Kozlecki, T., Sadowski, Z., 2013. Calcium carbonate mineralization. Part 1: The effect of poly(ethylene glycol) concentration on the formation of precipitate. Faculty of Geoengineering, Mining and Geology, Wroclaw University of Technology, Wroclaw. https://doi.org/10.5277/ppmp130222, which is incorporated by reference herein in its entirety.

In certain embodiments, admixture may include water-soluble macromolecules as soluble additives which may, e.g., affect the crystallization of $CaCO_3$; such additives may be present with insoluble matrices. Exemplary soluble additives include poly(acrylic acid) (PAA); PAAm: Poly(allylamine); PGA: Poly(glutamic acid) sodium salt; DNA: deoxyribonucleic acid, such as sodium salt from salmon sperm (DNA); these admixtures can be used with one or more substrates, when suitable, such as glass, Poly(ethylene-co-acrylic acid) (PEAA) (20 wt % acrylic acid), or chitosan. PEAA and chitosan contain carboxylic acid and amino groups, respectively. These polymers can be spin-coated on glass substrates. In the absence of soluble additives, rhombohedral calcite crystals can grow on all three substrates. Different substrate/macro-molecule combinations can have different effects. For example, for glass, there may be no crystallization with PAA or PAAm, whereas spherical crystals may be obtained with PGA additive (vaterite and calcite) or DNA (calcite). The same effects can be seen with additives on PEAA. With chitosan, PAA and PGA may give thin film states of $CaCO_3$. Without being bound by theory, the carboxylic acid of PAA and PGA and the amino group of chitosan may cause interactions, which results in the formation of thin film crystals. Spherical particles sporadically grow on the surfaces in the presence of DNA. For further discussion of these potential admixtures see, e.g., Kato, T., Suzuki, T., Amamiya, T., Irie, T., Komiyama, M., Yui, H., 1998. Effects of macromolecules on the crystallization of $CaCO_3$ the Formation of Organic/Inorganic Composites. Supramolecular Science 5, 411-415. https://doi.org/10.1016/S0968-5677(98)00041-8, incorporated by reference herein in its entirety.

The admixture (or each admixture) may be added to any suitable final percentage (bwc), such as in the range of 0.01-0.5%, or 0.01-0.3%, or 0.01-0.2%, or 0.01-0.1%, or 0.01-1.0%, or 0.01-0.05%, or 0.05% to 5%, or 0.05% to 1%, or 0.05% to 0.5%, or 0.1% to 1%, or 0.1% to 0.8%, or 0.1% to 0.7% per weight of cement. The admixture (or each admixture in a combination of admixtures) may be added to a final percentage of greater than 0.0001, 0.0002, 0.0005, 0.001, 0.002, 0.005, 0.01, 0.02, 0.03, 0.04, 0.05, 0.06, 0.07, 0.08, 0.09, 0.1, 0.15, 0.2, 0.3, 0.4, 0.5%, 0.6%, 0.7%, 0.8%, 0.9, or 1.0% bwc; in certain cases also less than 10, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.005, 0.002, 0.001, 0.0005, or 0.002% bwc. Other ranges and quantities are as described herein.

In certain embodiments, sodium gluconate is used as a set-retarding admixture, in combination with carbonation of wash water. The sodium gluconate can be added at one or more times in the process as described herein. Any suitable timing and/or amount of sodium gluconate can be used, which, as with any admixture, may depend on the mix design, e.g., type and amount of cement, in the concrete that is in the wash water, and/or the mix design, e.g., type and amount of cement, in the concrete that is produced in a subsequent batch from the carbonated mix water. The exact amount of sodium gluconate can be important and may be determined in testing with the mix designs to be treated. In certain embodiments, the amount of sodium gluconate, expressed by weight cement in the wash water, may be 0.1-5%, or 0.2-4%, or 0.5-3%, or 0.7-2%, or 1.0-2.0%, or 1.2-1.8%, or 1.4-1.6%.

In certain embodiments, carbonated wash water may itself be used to accelerate set, e.g., to produce a concrete that will stick to a desired surface when used as, e.g., shotcrete. In a shotcrete operation concrete mix can be sent to the nozzle as a wet mix, i.e., already mixed with water, or as a dry mix that is mixed with water just before ejection from the nozzle. In the latter case, some or all of the mix water may be carbonated wash water, and the use of carbonated wash water may reduce or eliminate flow of the concrete delivered to the desired surface by the nozzle.

EXAMPLES

Example 1

Samples of grey (wash) water were prepared in the lab. Lab grey water was made by mixing cement with potable water. Specific gravity (SG) range of lab grey water was 1.025 to 1.100. Grey water was allowed to age for either 1 or 4 days before being used as mix water in the preparation of mortar samples. Set time of mortar was measured via penetrometer as per ASTM C403.

Set Time.

In FIG. 1, Acceleration is plotted relative to the set time for a sample made with potable water (SG=1.000). Both SG and age of grey water have large accelerating effect on mortar initial set.

A $CO_2$ treatment was applied to grey water samples in same age and SG range as previous set. As with untreated samples, acceleration is plotted relative to the set time for a sample made with potable water (SG=1.000) (FIG. 1).

Treatment of the grey water with $CO_2$ resulted in two main improvements: 1) Reduced acceleration: the amount of initial set acceleration was greatly reduced by the $CO_2$ treatment of the grey water; and 2) Reduction in age effects: the set time acceleration was not significantly influenced by aging of the $CO_2$ treated grey water samples The reduction in acceleration and age effects helps address two of the primary obstacles associated with grey water reuse. First, the $CO_2$ treatment opens the potential to correlate impacts of the grey water directly to the SG value of the sample regardless of age, and second, the reduction in the scale of the acceleration allows for simple modifications to admixture loadings to fine-tune set time.

Example 2

This Example demonstrates that treatment of concrete wash water (grey water) with carbon dioxide improves set, workability, and other characteristics of concrete made using the wash water, and allows the use of wash water at higher specific gravity than the typical maximum allowed.

In a first set of tests, samples of wash water were produced in the lab by adding known amounts of cementitious materials to potable water sources. The samples of wash water were allowed to age for up to 6 days before being used as mix water in the preparation of mortar samples. Certain samples were subjected to $CO_2$ treatment, which included vigorous mixing and aging of the wash water under a $CO_2$ atmosphere. Typically the exposure to $CO_2$ was initiated in the timeframe of 30-120 minutes after preparation of the wash water and continued until the wash water was used for mortar preparation. Variations on the $CO_2$ treatment were deployed wherein a sample of wash water was only exposed to $CO_2$ once: either directly before use as mix water or in the time frame of 30-120 minutes after the wash water was prepared. The $CO_2$ treatments presented would result in $CO_2$ uptake on the order of 10-40% by weight of cement.

The proportions and properties of wash water prepared for this study are presented in Table 1, below. The density of cement was taken as 3.15 g/mL while the density of slag and class F fly ash were both taken as 2.2 g/mL. Grey water samples were prepared at additional specific gravity values using the same logic presented within this table.

TABLE 1

Compositions of Wash Waters used in the Example

| Wash Washer Type | Mass of water (g) | Mass of cement (g) | Mass of slag (g) | Mass of fly ash (g) | Final Mixture Density (g/mL) | Final Mixture Specific Gravity |
|---|---|---|---|---|---|---|
| 100% OPC | 267.5 | 40 | 0 | 0 | 1.10 | 1.10 |
| 100% OPC | 267.5 | 65 | 0 | 0 | 1.15 | 1.15 |
| 100% OPC | 267.5 | 85 | 0 | 0 | 1.20 | 1.20 |
| 50% SCMs | 267.5 | 23 | 14 | 9 | 1.10 | 1.10 |
| 50% SCMs | 267.5 | 35 | 21 | 14 | 1.15 | 1.15 |
| 50% SCMs | 267.5 | 49 | 29 | 20 | 1.20 | 1.20 |

The concrete wash water samples produced in the lab were used to produce mortar samples and assessed for their impact on fresh properties. The wash water samples were used to prepare mortar samples by combining with 1350 g sand and 535 g of cement in a bench-top paddle style mixer. Set time was measured in accordance with ASTM C403 using the penetrometer method. calorimetry was collect using a Calmetrix iCa18000. Set time and slump results were compared to mortar samples prepared with potable water Set and Workability.

All statements apply to both EF50 and 100% OPC grey water compositions

Set Time.

Figure 2:
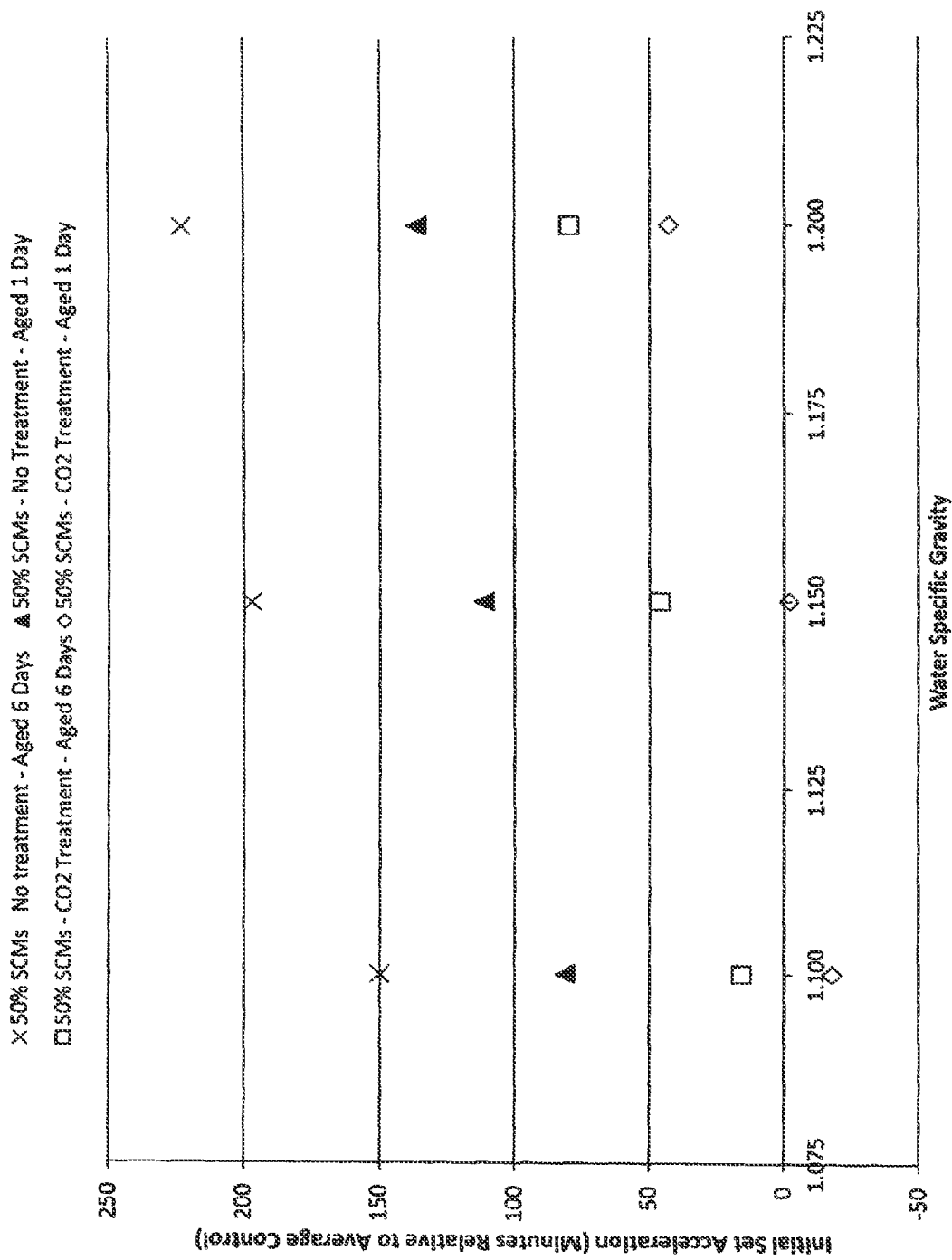
FIG. 2 shows set acceleration in concrete produced with wash (grey) water produced with Ordinary Portland Cement (OPC, 50%) and supplementary cementitious materials (SCM, 50%), where the water was treated and untreated with carbon dioxide, and aged 1 or 6 days.
Figure 4:
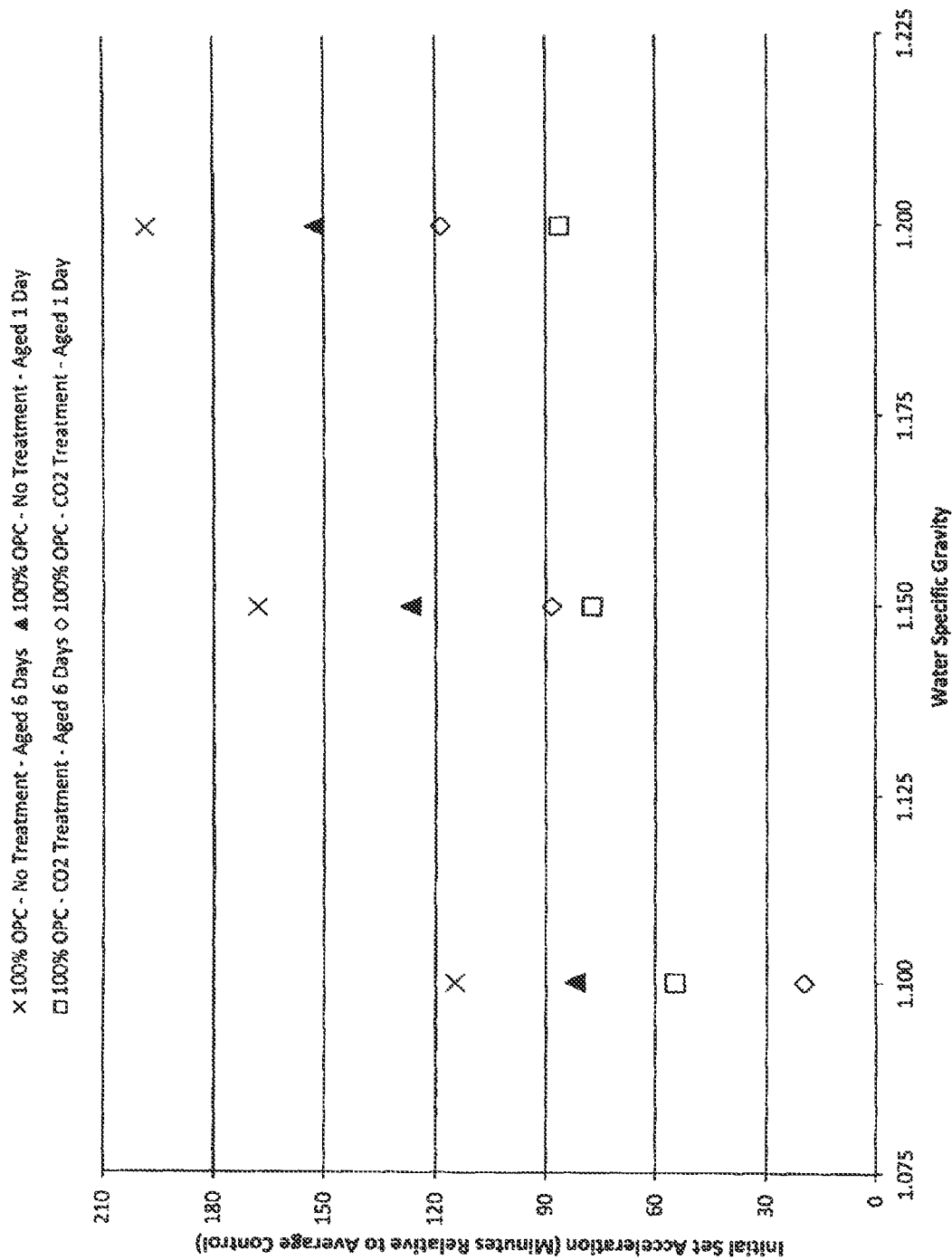
FIG. 4 shows set acceleration in concrete produced with wash (grey) water produced with Ordinary Portland Cement (OPC, 100%), where the water was treated and untreated with carbon dioxide, and aged 1 or 6 days.
Figure 6:
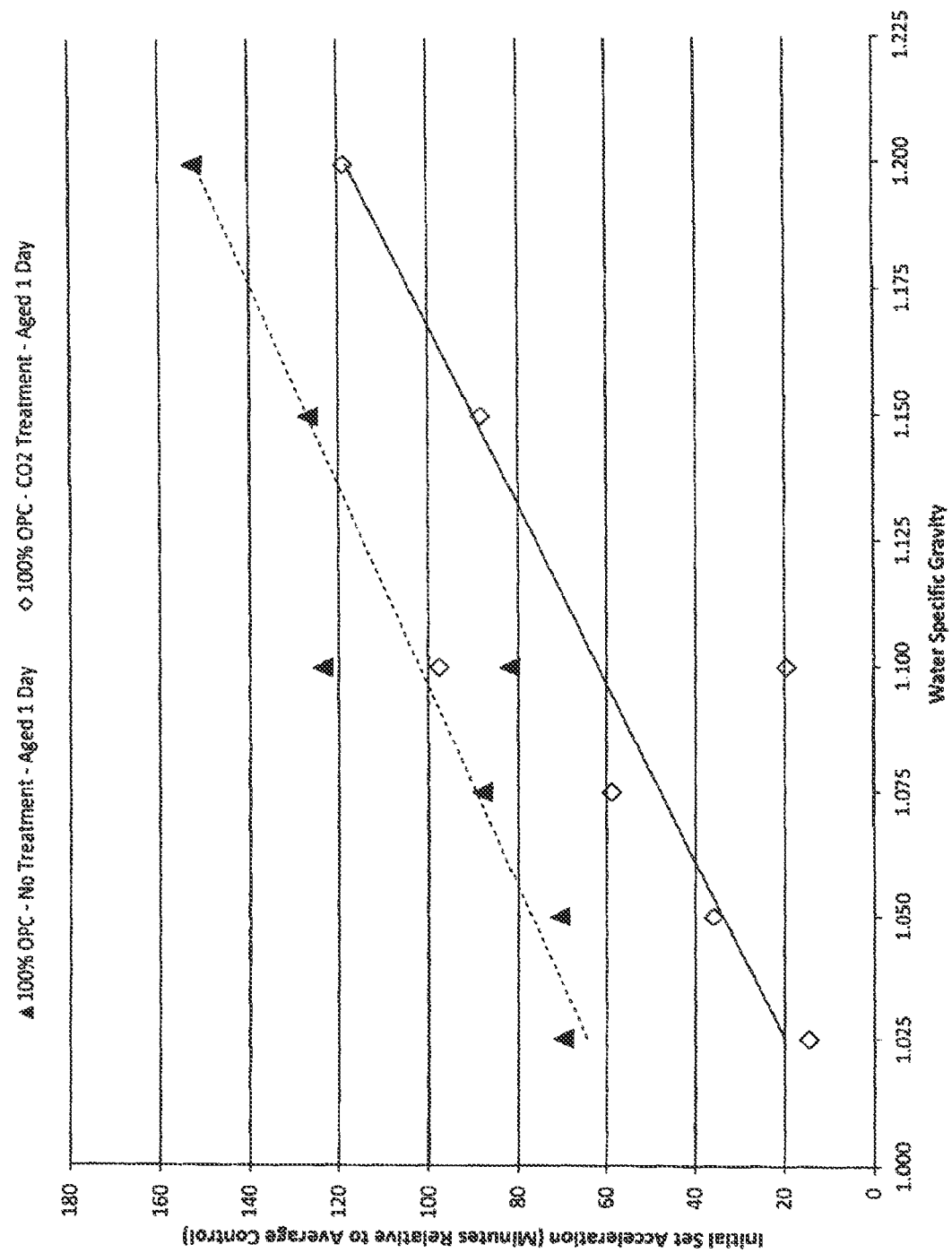
FIG. 6 shows set acceleration in concrete produced with wash (grey) water produced with Ordinary Portland Cement (OPC, 100%), where the water was treated and untreated with carbon dioxide, and aged 1 or 6 days, in a large number of different specific gravities.

In all cases the $CO_2$ treatment greatly reduced the acceleration caused by increases solid contents in the wash water (FIGS. 2, 4 and 6). In addition, in all cases the $CO_2$ treatment greatly reduced the acceleration caused by increases aging of the wash water (FIG. 2).

Figure 3:
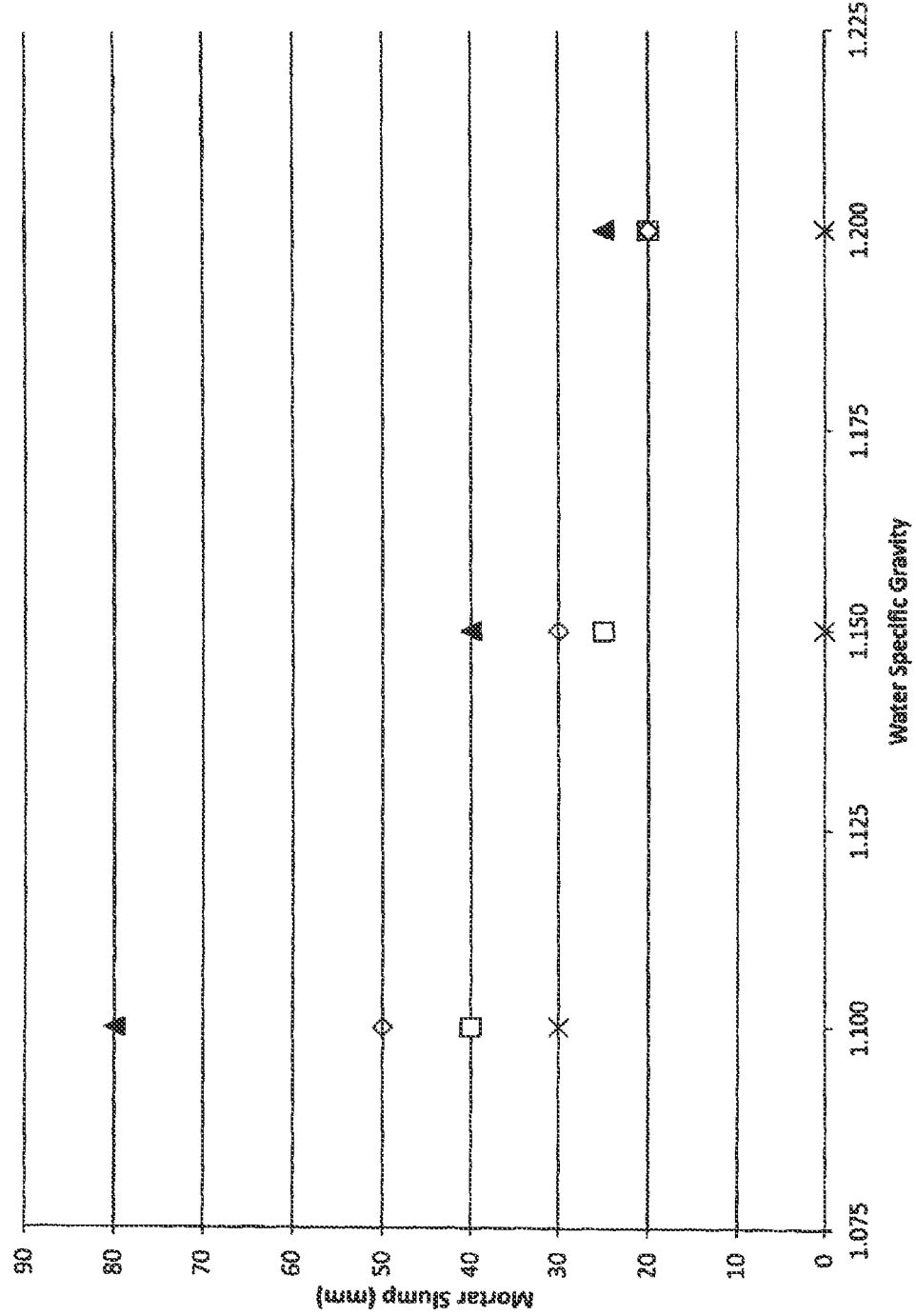
FIG. 3 shows workability (slump) in concrete produced with wash (grey) water produced with Ordinary Portland Cement (OPC, 50%) and supplementary cementitious materials (SCM, 50%), where the water was treated and untreated with carbon dioxide, and aged 1 or 6 days.
Figure 5:
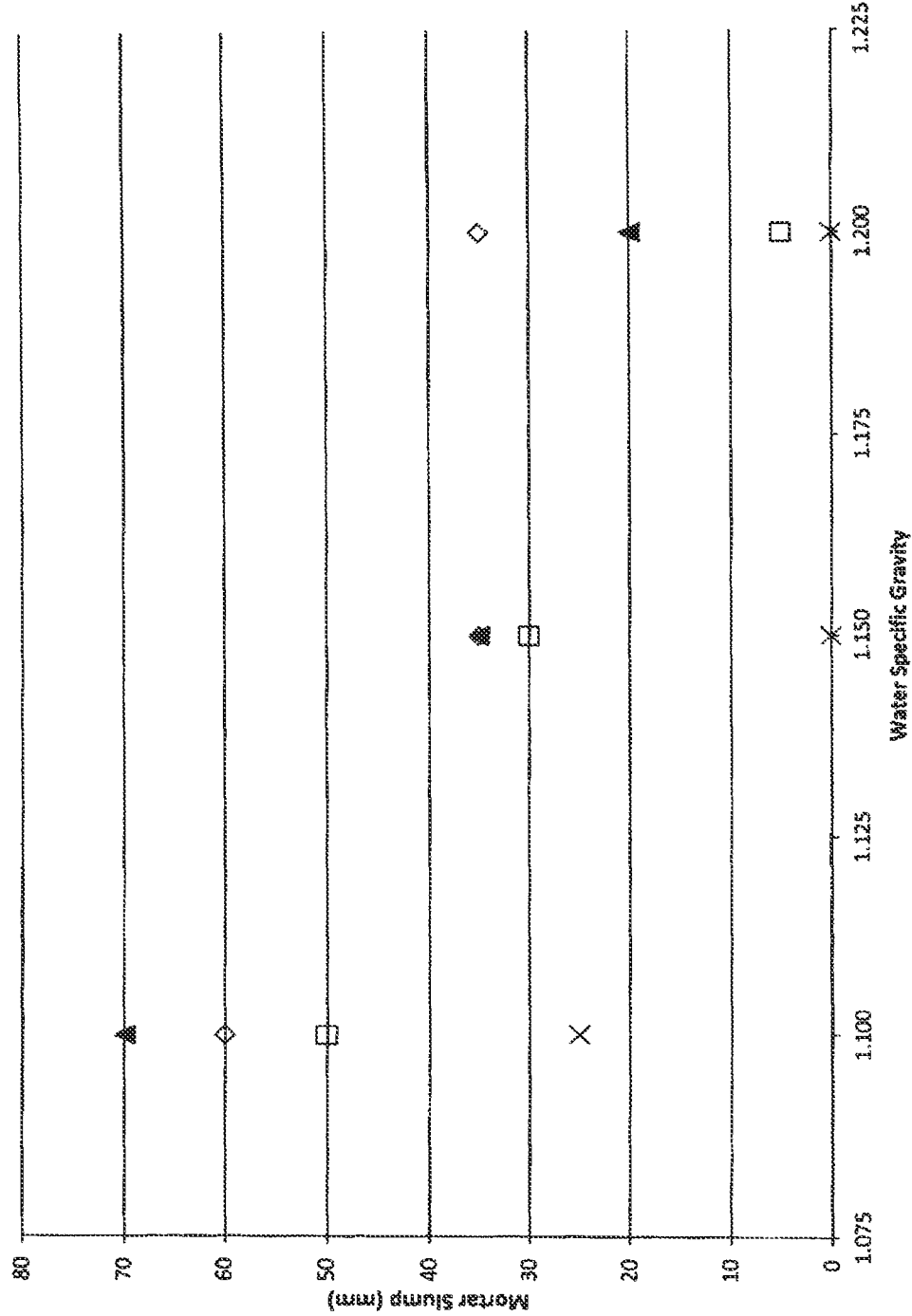
FIG. 5 shows workability (slump) in concrete produced with wash (grey) water produced with Ordinary Portland Cement (OPC, 100%), where the water was treated and untreated with carbon dioxide, and aged 1 or 6 days.

Workability. In all cases the $CO_2$ treatment greatly reduced the loss of workability caused by increases aging of the wash water (FIGS. 3 and 5).

Calorimetry.

Figure 7:
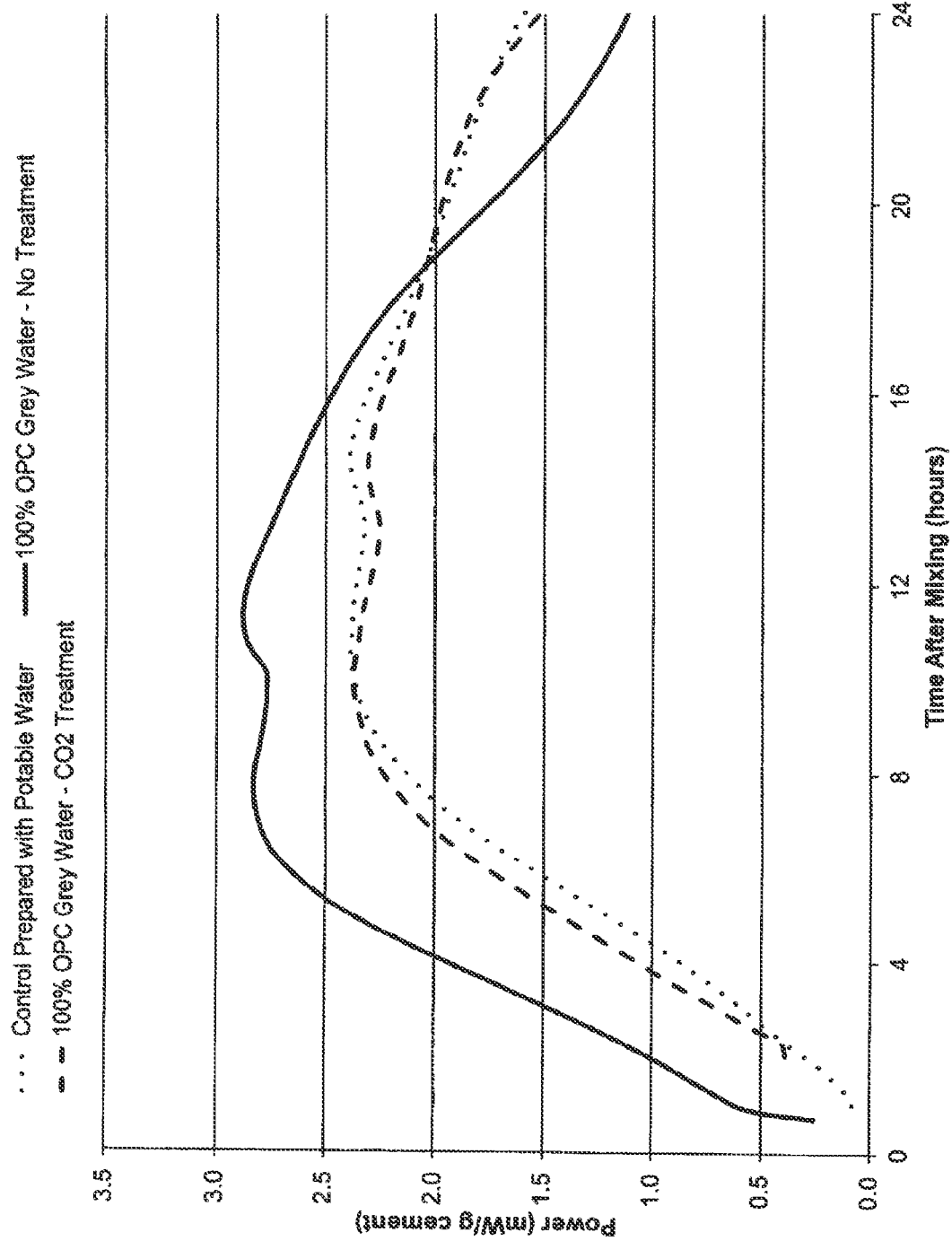
FIG. 7 shows calorimetry, as power vs. time, for concrete produced with wash (grey) water produced with Ordinary Portland Cement (OPC, 100%), where the water was treated and untreated with carbon dioxide, and for concrete prepared with potable water.
Figure 8:
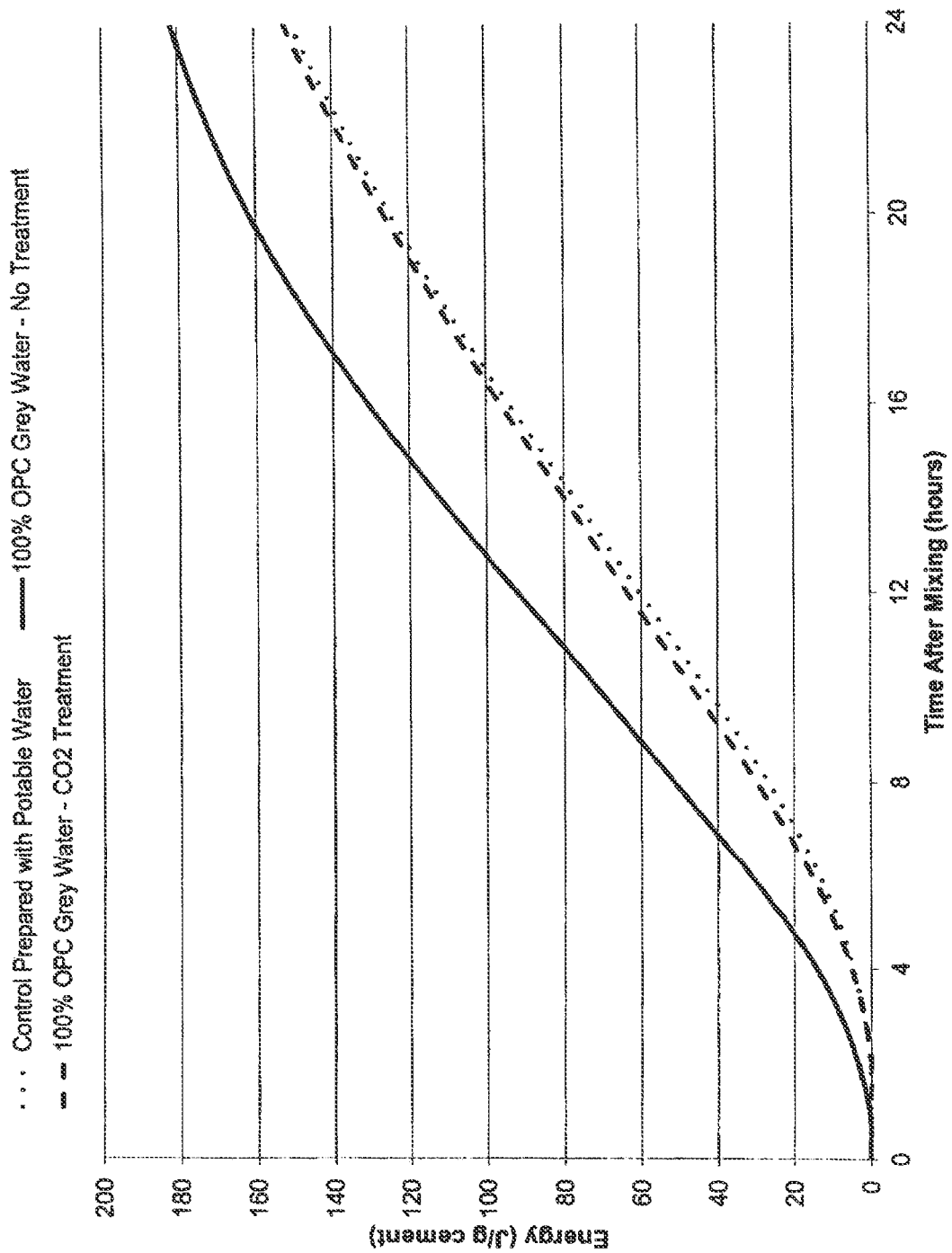
FIG. 8 shows calorimetry, as energy vs. time, for concrete produced with wash (grey) water produced with Ordinary Portland Cement (OPC, 100%), where the water was treated and untreated with carbon dioxide, and for concrete prepared with potable water.

The $CO_2$ treatment has a marked impact on the hydration of cement in mortars prepared with grey water, returning the onset and intensity of features to the same region as the control sample made with potable water. FIGS. 7-8 are representative calorimetry curves as observed from the previously presented experiments. In all cases the grey water was prepared with 100% OPC to have a specific gravity of 1.1 and aged for 1 day. The curves presented compare the calorimetry response for three cases: 100% OPC grey water without $CO_2$ treatment; 100% OPC grey water with $CO_2$ treatment; a control produced with potable water. From both power (FIG. 7) and energy (FIG. 8) perspective it can be observed that the $CO_2$ treatment allows the hydration of cement in the mortar samples to proceed normally: when using the $CO_2$ treatment the onset and intensity of features is inline with those observed for the control produced with potable water Carbon Dioxide Exposure Variables.

In a second set of tests, three different modes of $CO_2$ exposure were tested: Continuous—the grey water was exposed to $CO_2$ starting at approximately 2 hours after mixing until use; Treatment at 2 hours—the grey water was exposed to $CO_2$ once at approximately 2 hours after mixing and untreated until use as mix water; Treatment before use—the grey water was untreated until approximately 15 minutes before use. These three variations were meant to mimic timeframes when $CO_2$ could foreseeably be applied to grey water in an industrial setting. The choice of 2 hours was meant to begin the $CO_2$ treatment after the grey water had been prepared, but before any significant cement hydration had occurred. In practice this timeframe could be anywhere from 15-180 minutes.

Figure 9:
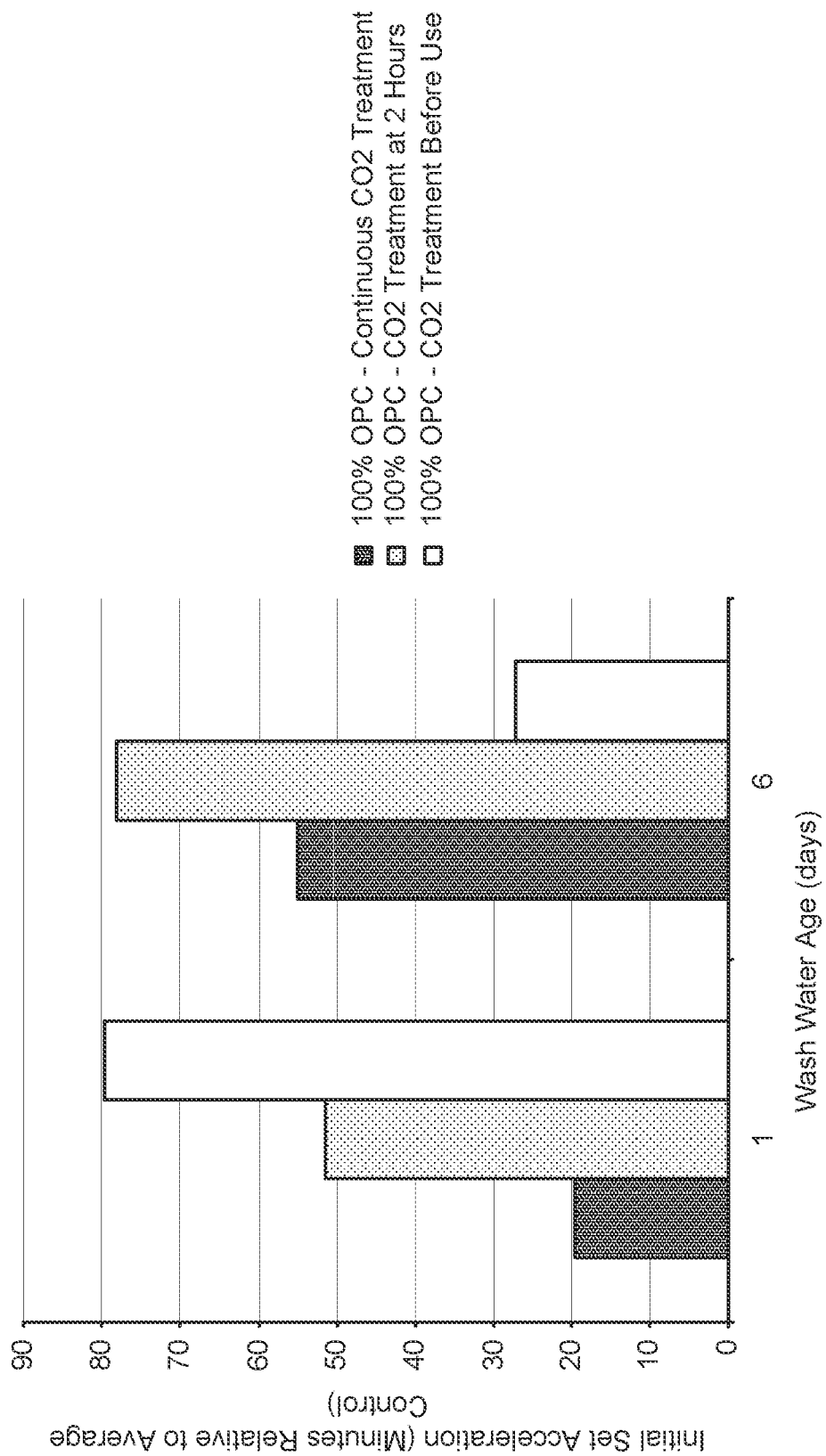
FIG. 9 shows set acceleration in concrete produced with wash (grey) water produced with Ordinary Portland Cement (OPC, 100%), where the wash water was treated with carbon dioxide continuously, at 2 hours after preparation of wash water, or just prior to use in the concrete.
Figure 10:
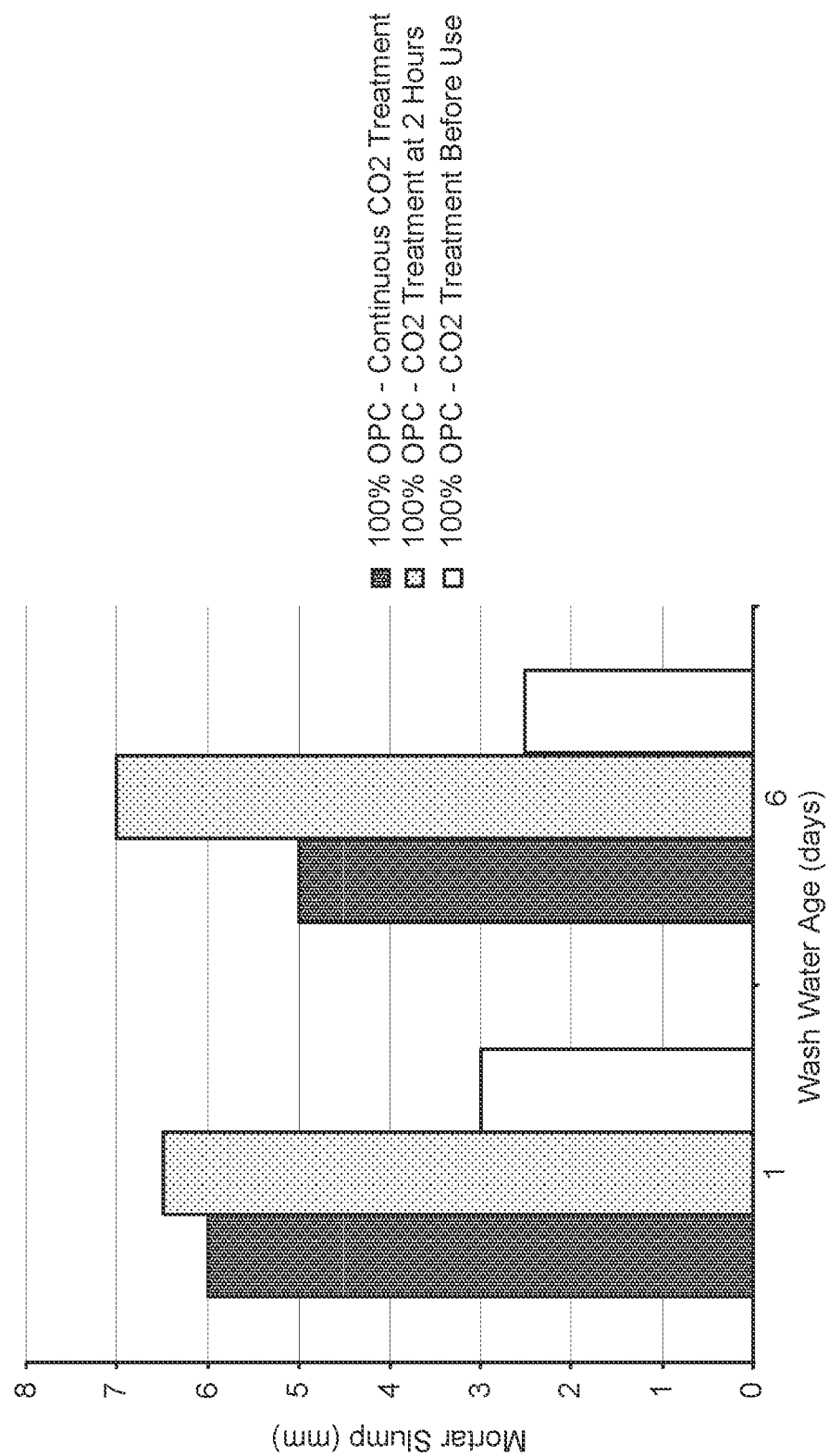
FIG. 10 shows workability (slumpP in concrete produced with wash (grey) water produced with Ordinary Portland Cement (OPC, 100%), where the wash water was treated with carbon dioxide continuously, at 2 hours after preparation of wash water, or just prior to use in the concrete.

Continuous treatment offered the best improvement of set time after 1 day of aging while $CO_2$ treatment before use offered the best improvement after 6 days of aging (FIG. 9). In general treatment at 2 hours provided the best slump impact (FIG. 10).

Strength Assessment. See FIG. 11

Sample of grey water were used to prepare 2"×2"×2" mortar cubes for assessment of compressive strength development. All grey water was aged for 1 day and prepared at a specific gravity of 1.1. Compressive strength tests were performed at 24 hours after mixing. The samples were prepared as follows: A control made with potable water; EF50 grey water without CO2 treatment; EF50 grey water with $CO_2$ treatment; 100% OPC grey water without CO2 treatment; 100% OPC grey water with $CO_2$ treatment; Control with additional EF50 powder; Control with additional 100% OPC powder. Where the additional solids in the grey water are cementitious in nature samples 6 and 7 were prepared with the same amount of solids as in the grey water. In all cases this was introduced as additional anhydrous binder.

Figure 11:
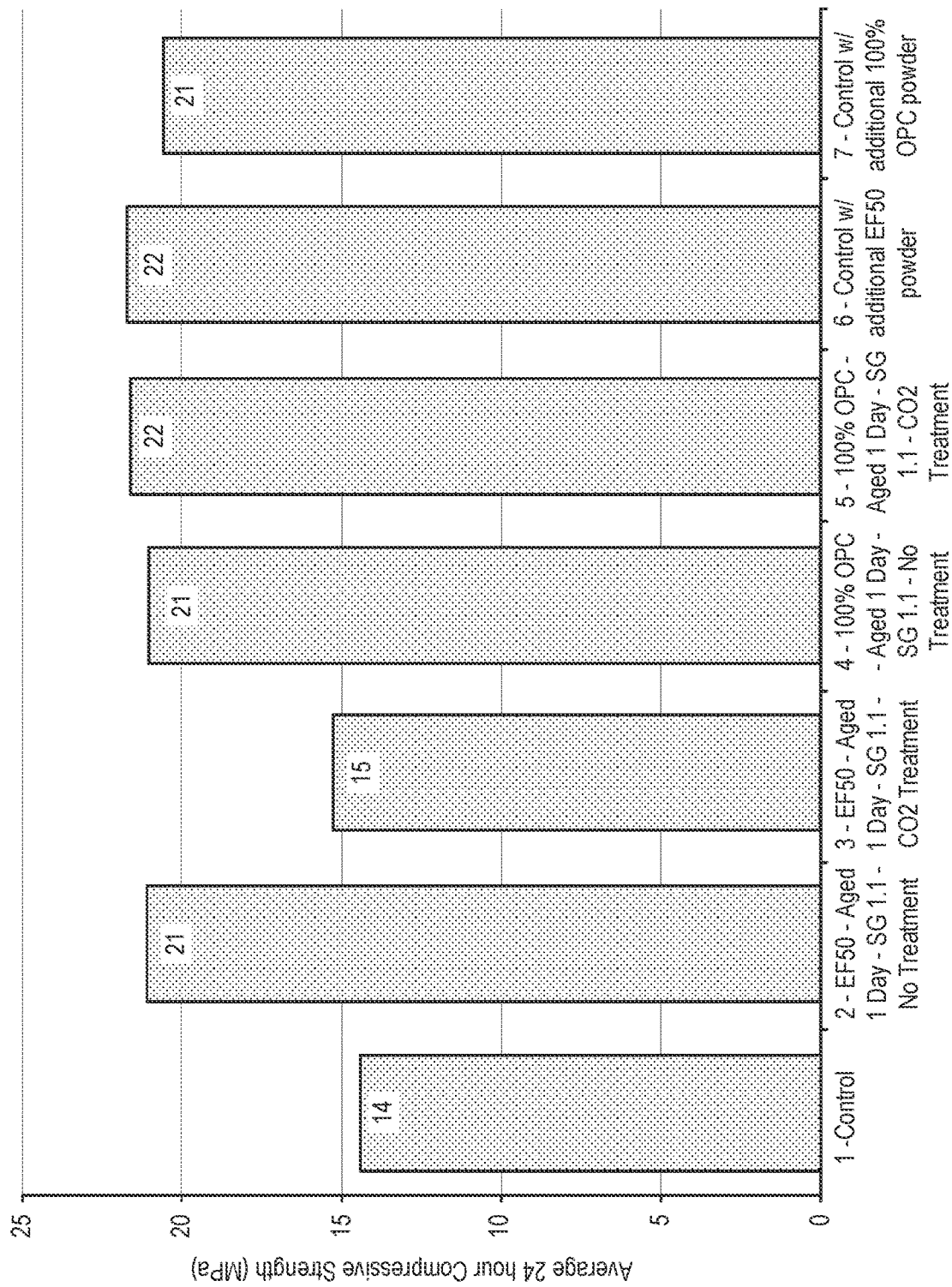
FIG. 11 shows 24-hour compressive strengths for concrete produced with various wash waters, where the wash water was treated or not treated with carbon dioxide.
Figure 13:
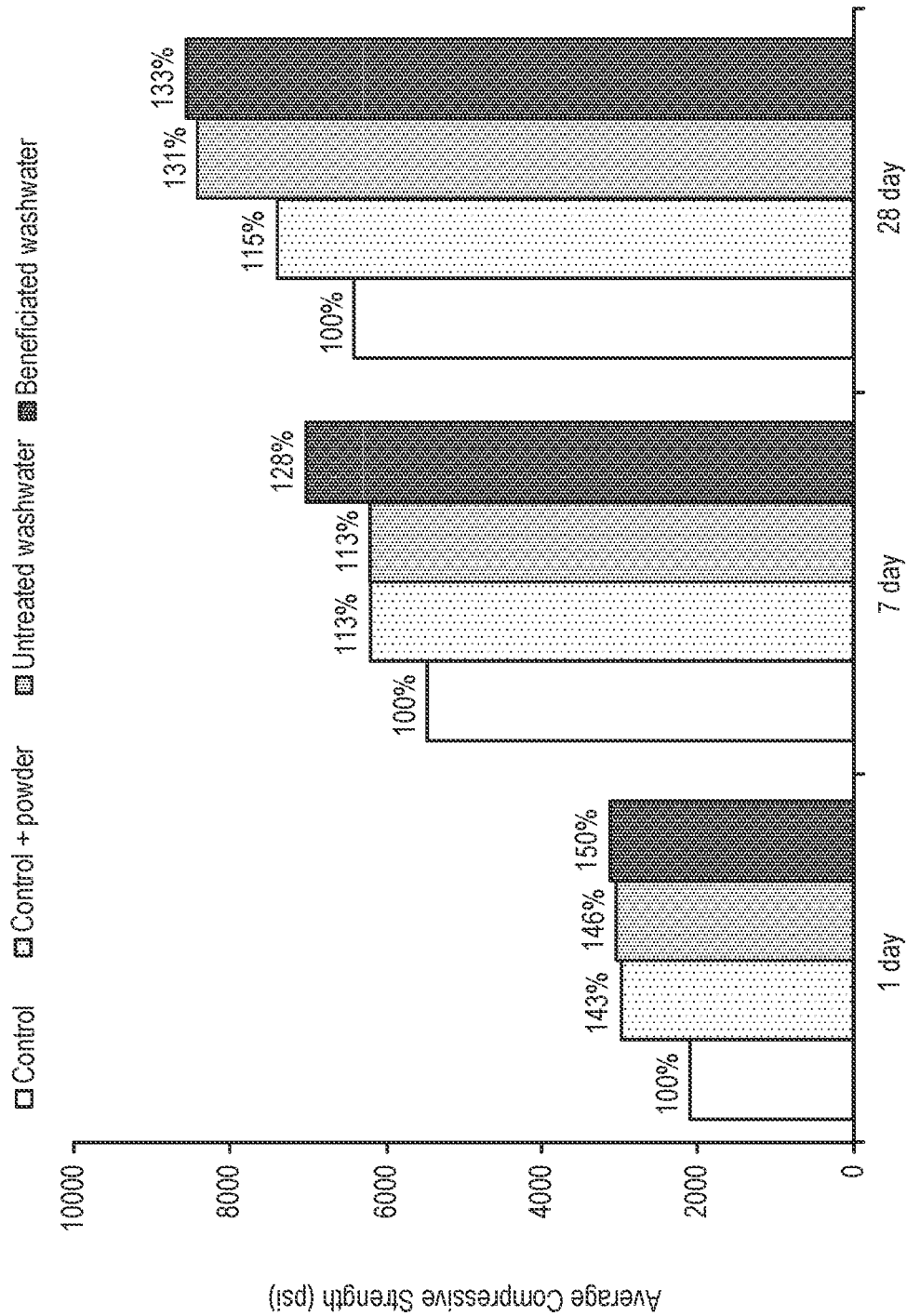
FIG. 13 shows strength enhancement at 7 days for concrete produced with various wash waters, where the wash water was treated or not treated with carbon dioxide.
Figure 14:
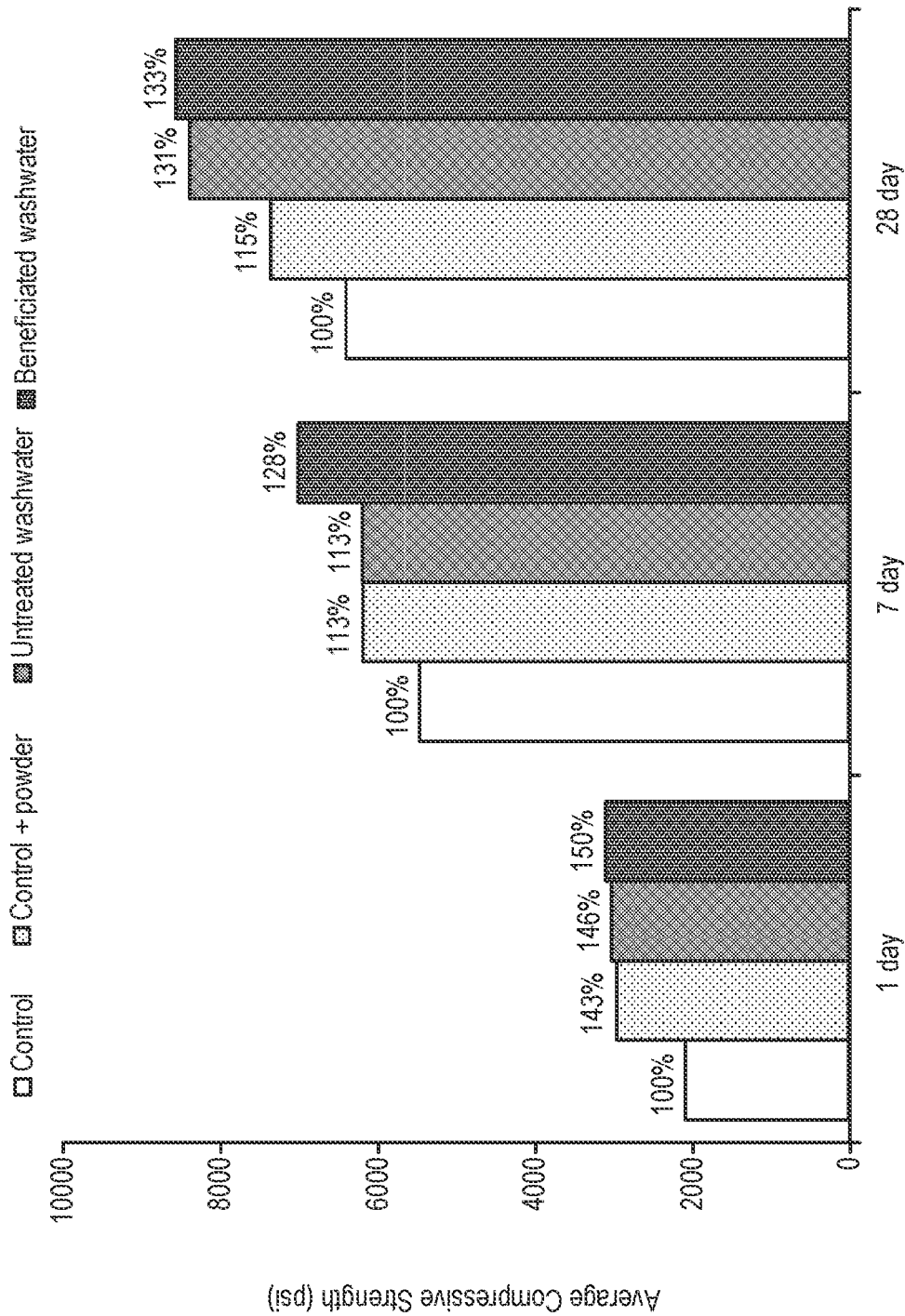
FIG. 14 shows strength enhancement at 28 days for concrete produced with various wash waters, where the wash water was treated or not treated with carbon dioxide.

In all cases the samples performance was equivalent or better than a control produced with potable water (FIG. 11). There was also a strength enhancement at later time points, for example, 7 and/or 28 days. See FIGS. 13 (Washwater of 100% OPC, SG 1.1) and 14 (Washwater 50% cement, 30% slag, 20% class F fly ash).

Cooling.

Figure 12:
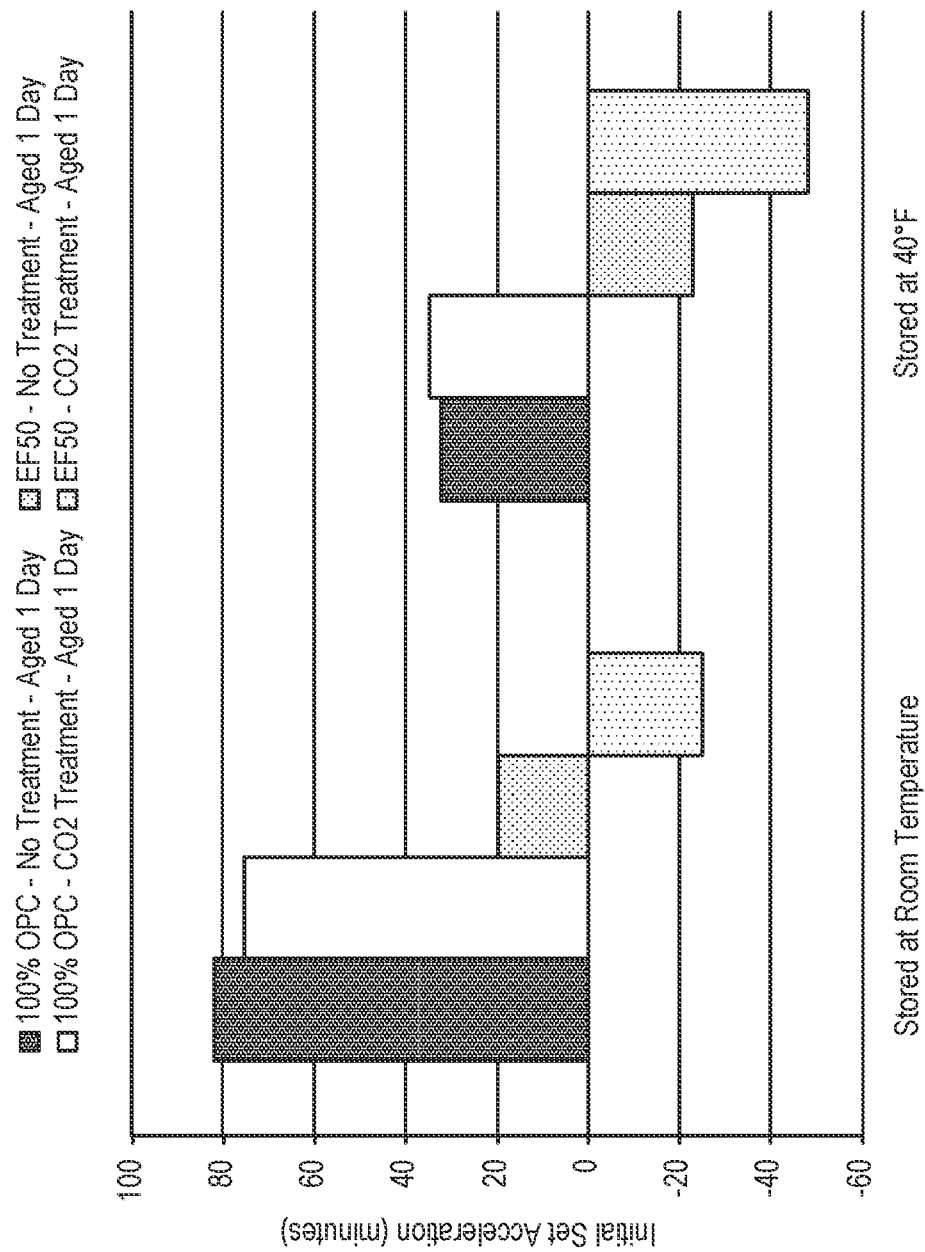
FIG. 12 shows set acceleration in concrete prepared with wash water treated or not treated with carbon dioxide and held at two different temperatures.

Samples of grey water with two different compositions (EF50 and 100% OPC) were prepared at a specific gravity of 1.1 and stored at one of two temperatures: Low temperature=40° F.; Room temperature=approximately 65° F. A combination of cooling and $CO_2$ treatment provided a synergistic improvement in mortar set time, see FIG. 12.

Example 3

Binder powder was added to samples of water and allowed to age either 1 or 7 days. The binder powder for a given water sample matched the composition of the binder for the mortar later produced from the water; e.g., if the mortar were to be made with 100% OPC, binder powder for wash water was 100% OPC; if the mortar were to be made with 75/25 OPC/class F fly ash, a 75/25 OPC/class F fly ash was used. Water was either left untreated, or treated with $CO_2$ consistently over the aging period. An excess of $CO_2$ was supplied to allow thorough carbonation. Following aging of the mix water mortar samples were prepared according to the following recipe: 1350 g EN Sand, 535 g cement. Set time was measured from calorimetry as the thermal indicator of set (the hydration time to reach a thermal power of 50% of the maximum value of the main hydration peak, ASTM C1679).

Figure 15:
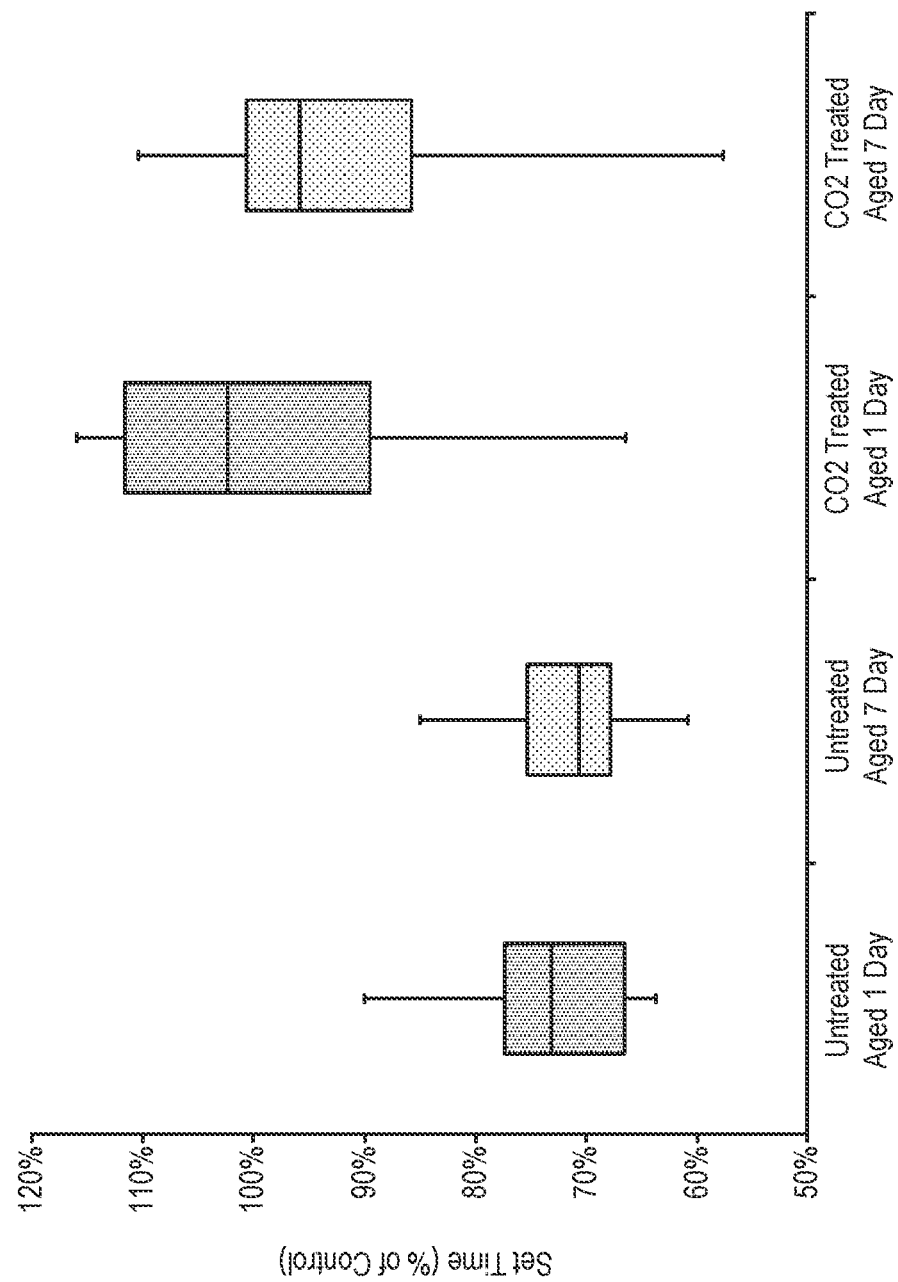
FIG. 15 shows set times for mortar cubes made with wash water treated or untreated with carbon dioxide, and sitting for 1 day or 7 days.
Figure 16:
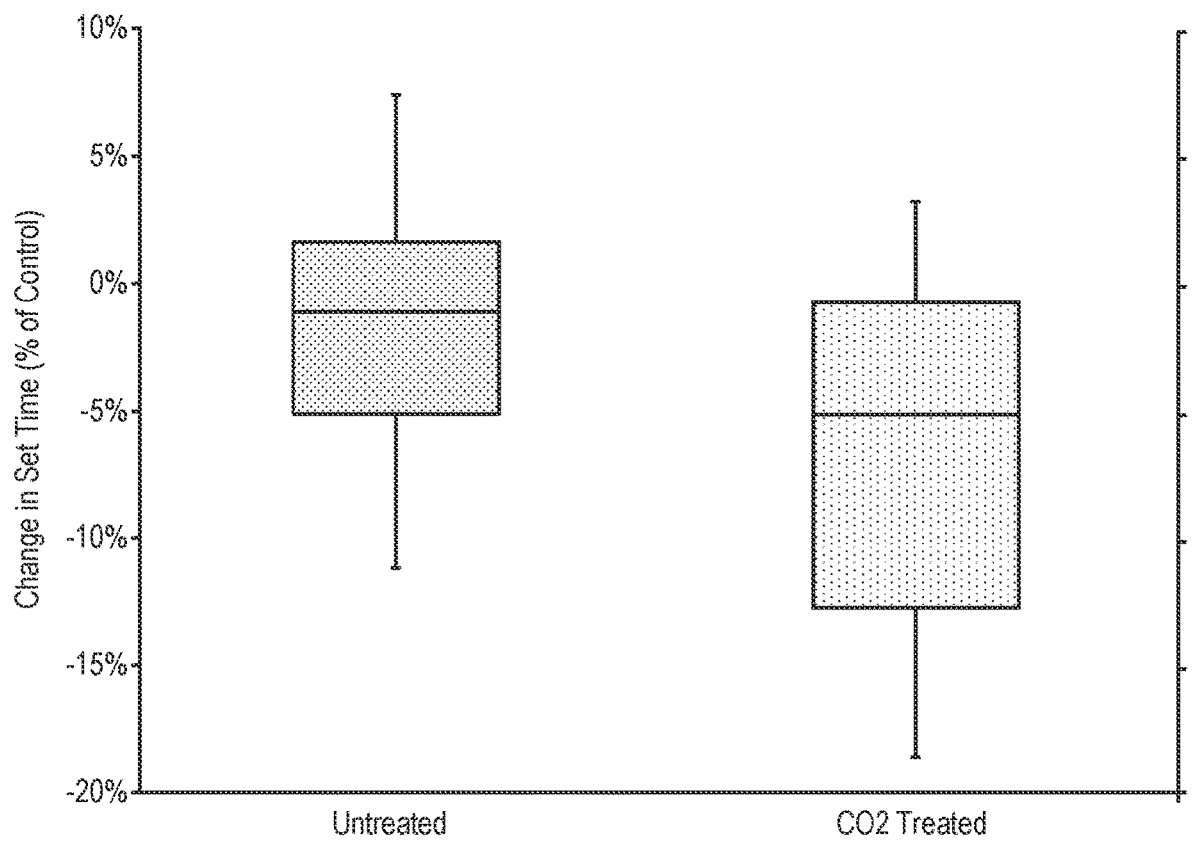
FIG. 16 shows set times at 1 day relative to 7 days.
Figure 17:
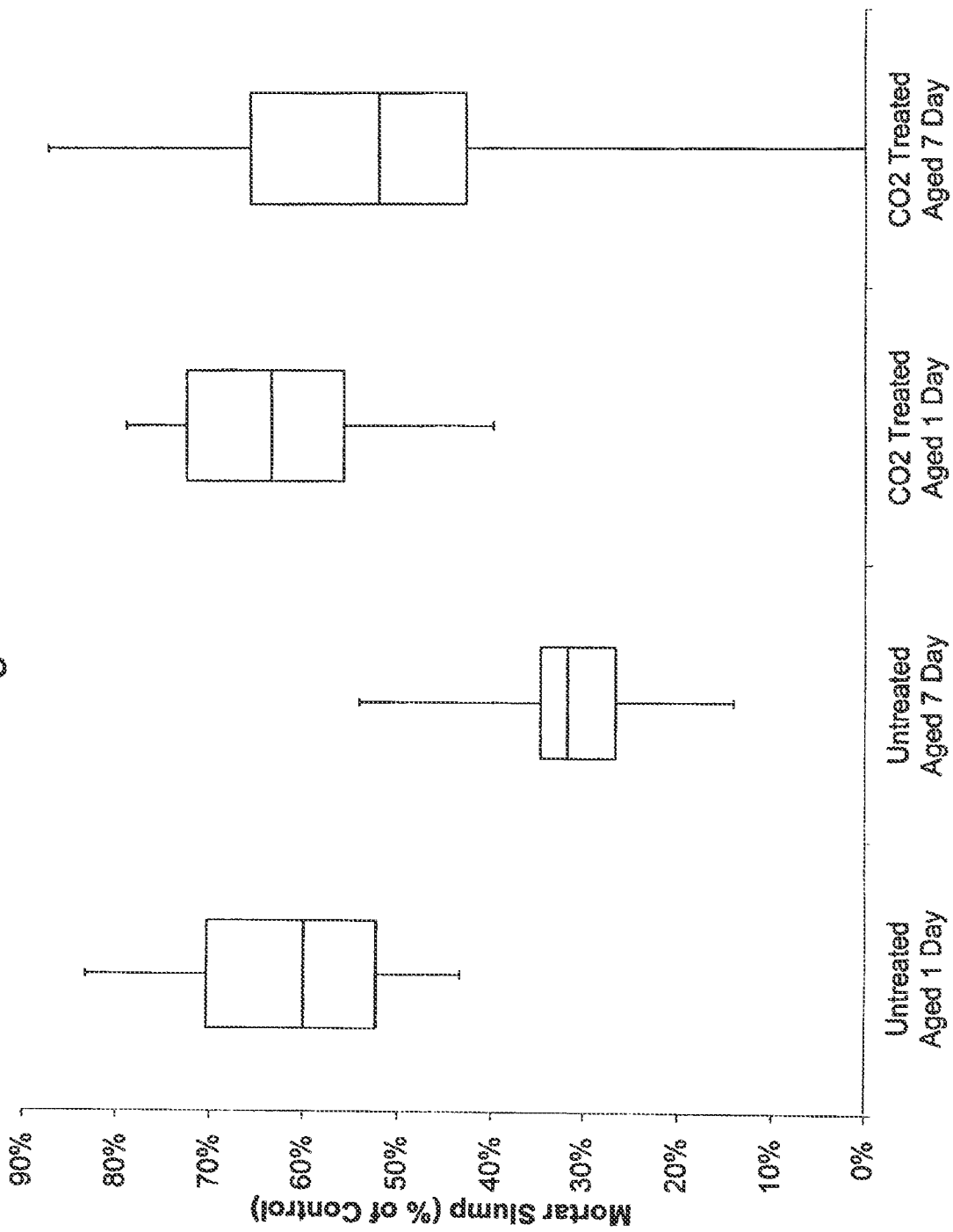
FIG. 17 shows set mortar slump mortar cubes made with wash water treated or untreated with carbon dioxide, and sitting for 1 day or 7 days.
Figure 18:
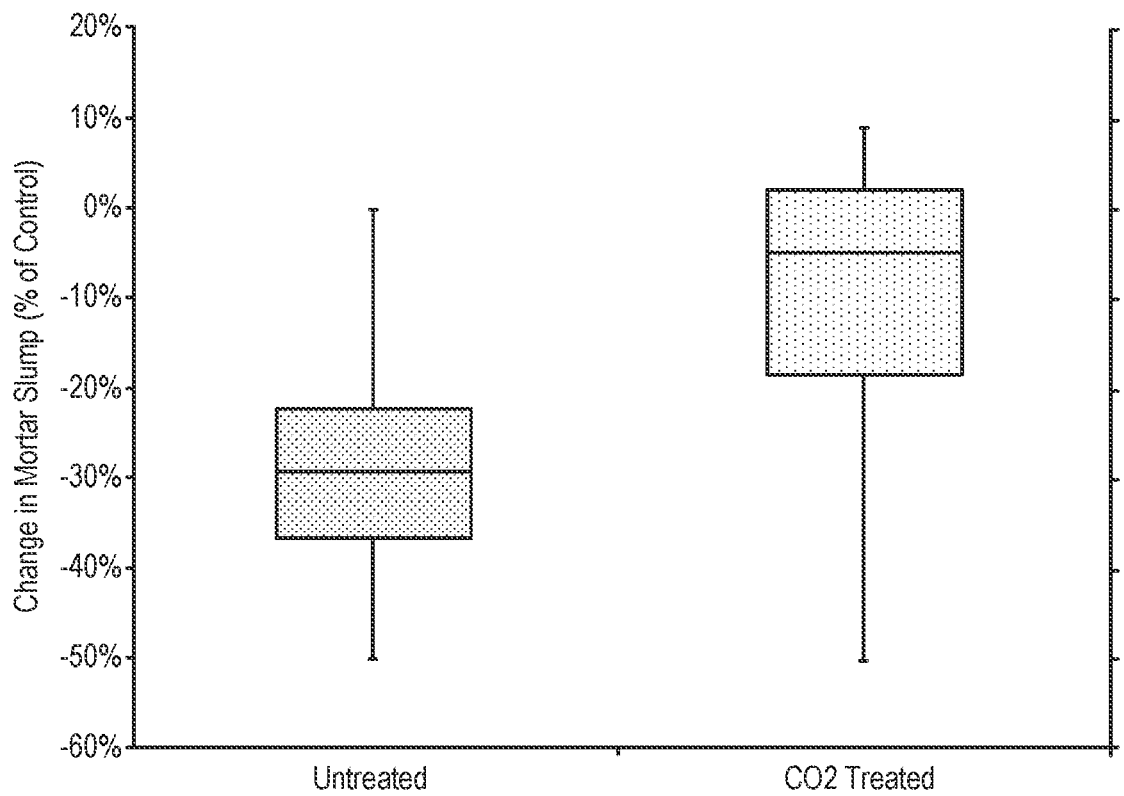
FIG. 18 shows mortar slump for water held at 7 days relative to slump for water held at 1 day.

The results are shown in FIGS. 15-18 and TABLE 2. 15 different batches were aggregated for each condition, and results are shown as BOX PLOTS showing $1^{st}$ quartile, median, and $3^{rd}$ quartile. Whiskers show max and min. FIG. 15 shows set time relative to a potable water control with the same binder composition and w/b. Set time is reduced in untreated water (average 73% to 71%). Set time is improved to neutral if CO2 treatment is used (Average is 98% at 1 day, 91% at 7 days). FIG. 16 shows set time at 7 days relative to set time at 1 day. Water aging did not have a large effect on set time for either case (decline in average by 2% for untreated and 6% in CO2 treated water). FIG. 17 shows mortar slump (workability) relative to a potable water control with the same binder composition and w/b. Slump was compromised when using wash water, and became worse with age if the water was not treated. The average declined from 62% to 32% in the untreated water, and 63% to 51% in the treated water; thus, carbon dioxide treatment mitigated the further decrease in slump in aging wash water compared to untreated. FIG. 18 shows mortar slump at 7 days relative to mortar slump at 1 day. Workability was worse for 7 day wash water than 1 day water if it is untreated, but, as noted, there was small to no change observed if CO2 treatment was applied. The results are also summarized in TABLE 2.

TABLE 2

Effect of CO2 treatment of wash water on set time and workability

| | Slump Summary vs Potable Water Reference | | | | Relative Change in Slump | |
|---|---|---|---|---|---|---|
| | Untreated | Untreated | CO2 Treated | CO2 Treated | | |
| Metric | Aged 1 Day | Aged 7 Days | Aged 1 Day | Aged 7 Days | Untreated | CO2 Treated |
| Average | 62% | 32% | 63% | 51% | −29% | −11% |
| Median | 60% | 32% | 64% | 52% | −29% | −5% |
| Min | 43% | 14% | 40% | 0% | −50% | −50% |
| Max | 83% | 54% | 79% | 88% | 0% | 9% |
| 1st Quartile | 52% | 27% | 56% | 43% | −37% | −18% |
| 3rd Quartile | 70% | 35% | 73% | 66% | −22% | 2% |

| | Set Time Summary vs Potable Water Reference | | | | Relative Change in Set Time | |
|---|---|---|---|---|---|---|
| | Untreated | Untreated | CO2 Treated | CO2 Treated | | |
| Metric | Aged 1 Day | Aged 7 Days | Aged 1 Day | Aged 7 Days | Untreated | CO2 Treated |
| Average | 73% | 71% | 98% | 91% | −2% | −6% |
| Median | 73% | 71% | 102% | 96% | −1% | −5% |
| Min | 64% | 61% | 67% | 58% | −11% | −19% |
| Max | 90% | 85% | 116% | 110% | 8% | 3% |
| 1st Quartile | 67% | 68% | 90% | 86% | −5% | −13% |
| 3rd Quartile | 77% | 75% | 112% | 101% | 2% | −1% |

Example 4

This Example describes the effects of duration of exposure of wash water to carbon dioxide.

Binder powder was added to samples of water to create simulated wash water at specific gravity of 1.1. The water samples were mixed for varying durations, starting about 30 minutes after they were first produced. The water was either left untreated, or treated with $CO_2$ consistently over the mixing period. An excess of $CO_2$ was supplied to allow thorough carbonation. The pH of the water and $CO_2$ uptake of the solids was measured. Water samples were allowed to age either 1 or 7 days. Following aging of the mix water mortar samples were prepared according to the standard recipe. 1350 g EN Sand, 535 g cement.

Figure 19:
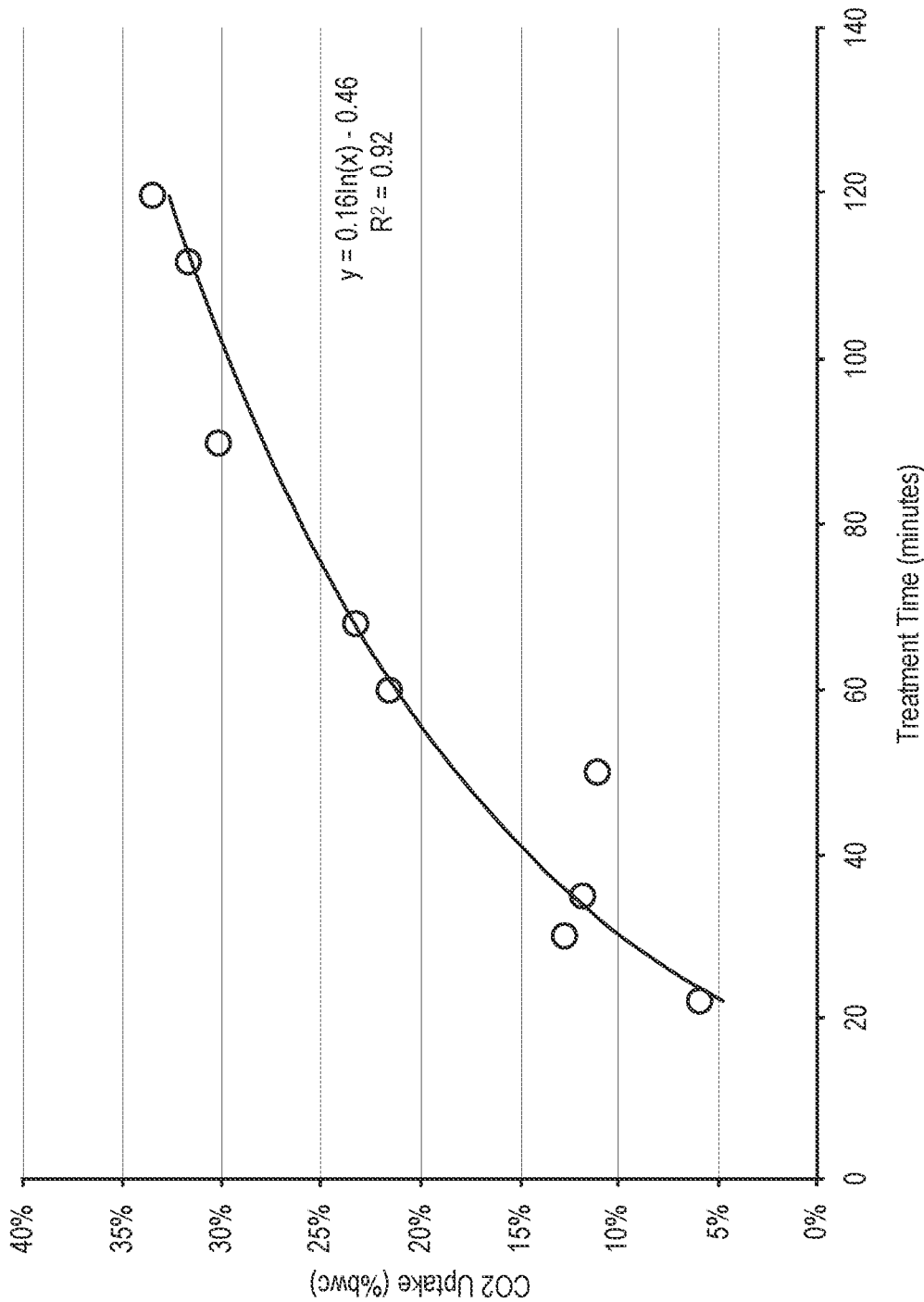
FIG. 19 shows carbon dioxide uptake of solids in wash water relative to time of treatment with carbon dioxide.
Figure 20:
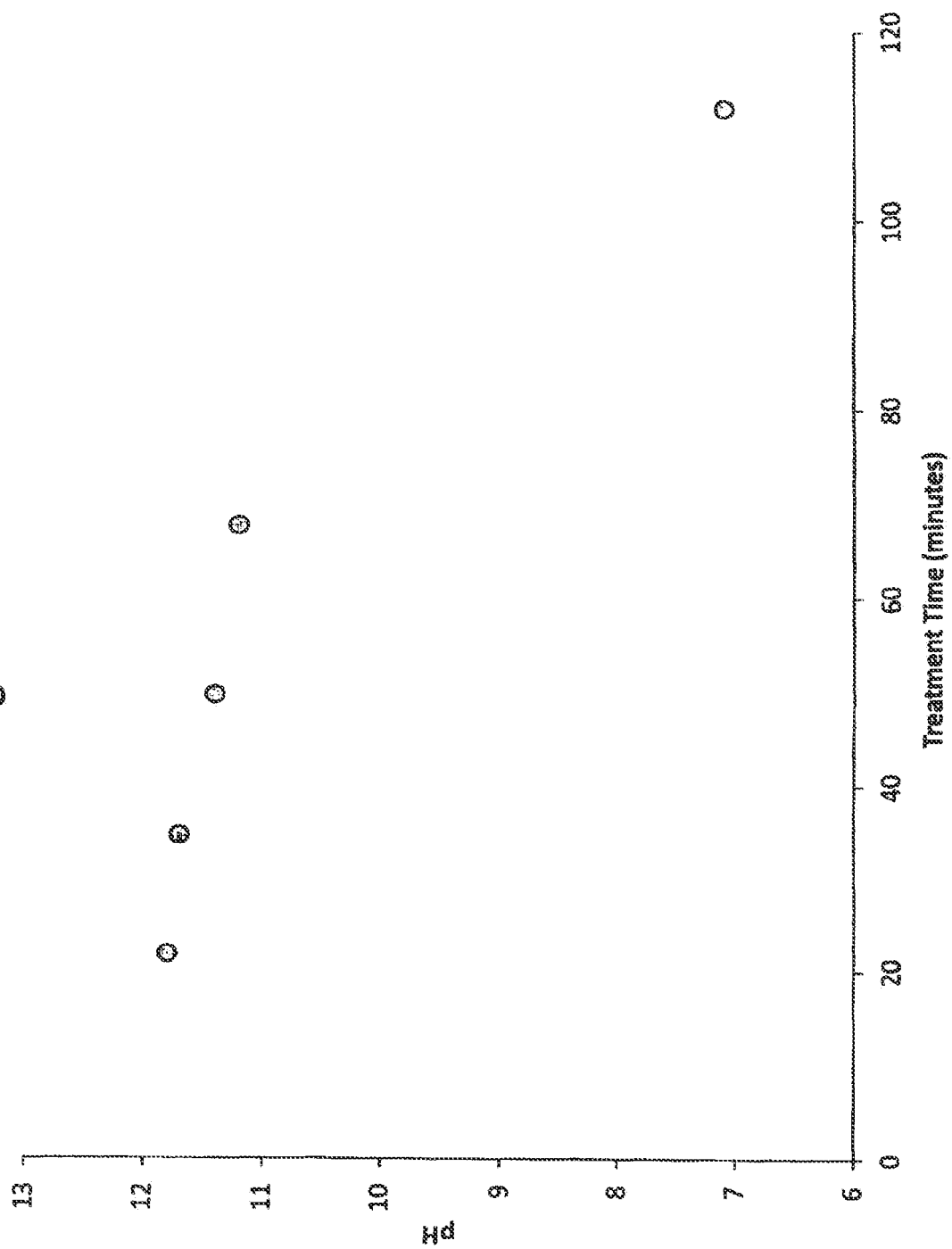
FIG. 20 shows pH of wash water relative to time of treatment with carbon dioxide.
Figure 21:
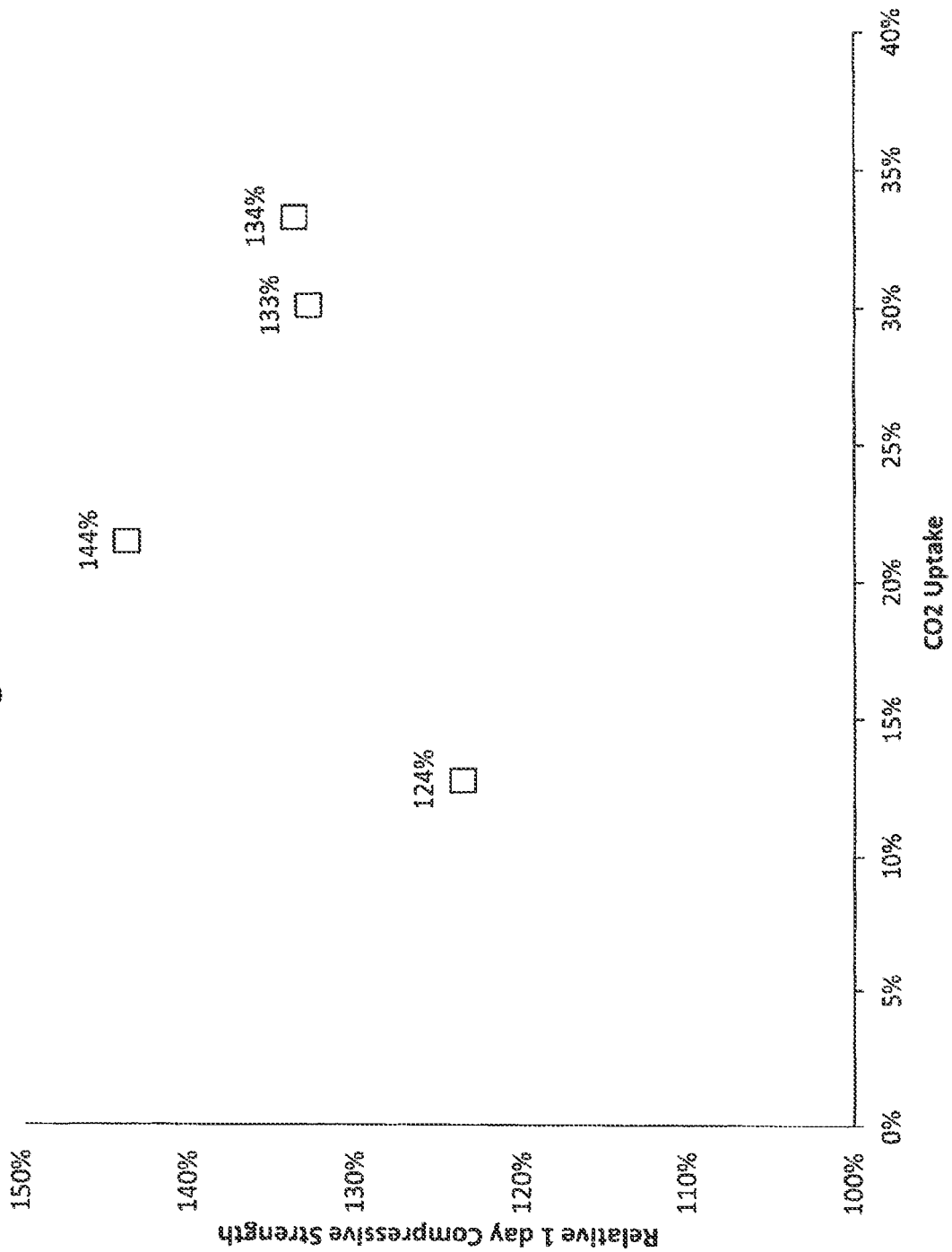
FIG. 21 shows one-day strength of mortar cubes made with wash water treated with carbon dioxide for various times and aged 1 day.
Figure 22:
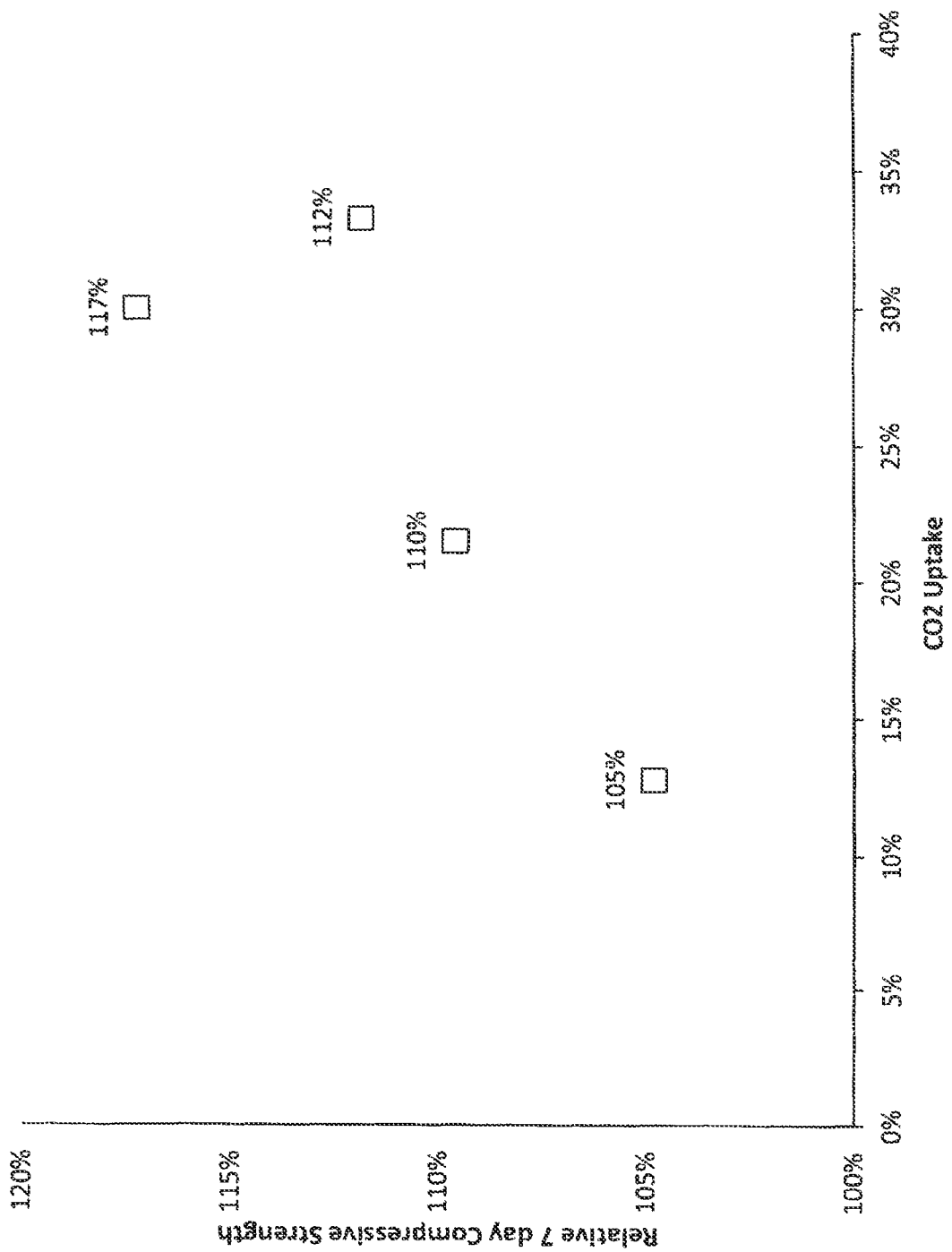
FIG. 22 shows 7-day strength of mortar cubes made with wash water treated with carbon dioxide for various times and aged 1 day.
Figure 23:
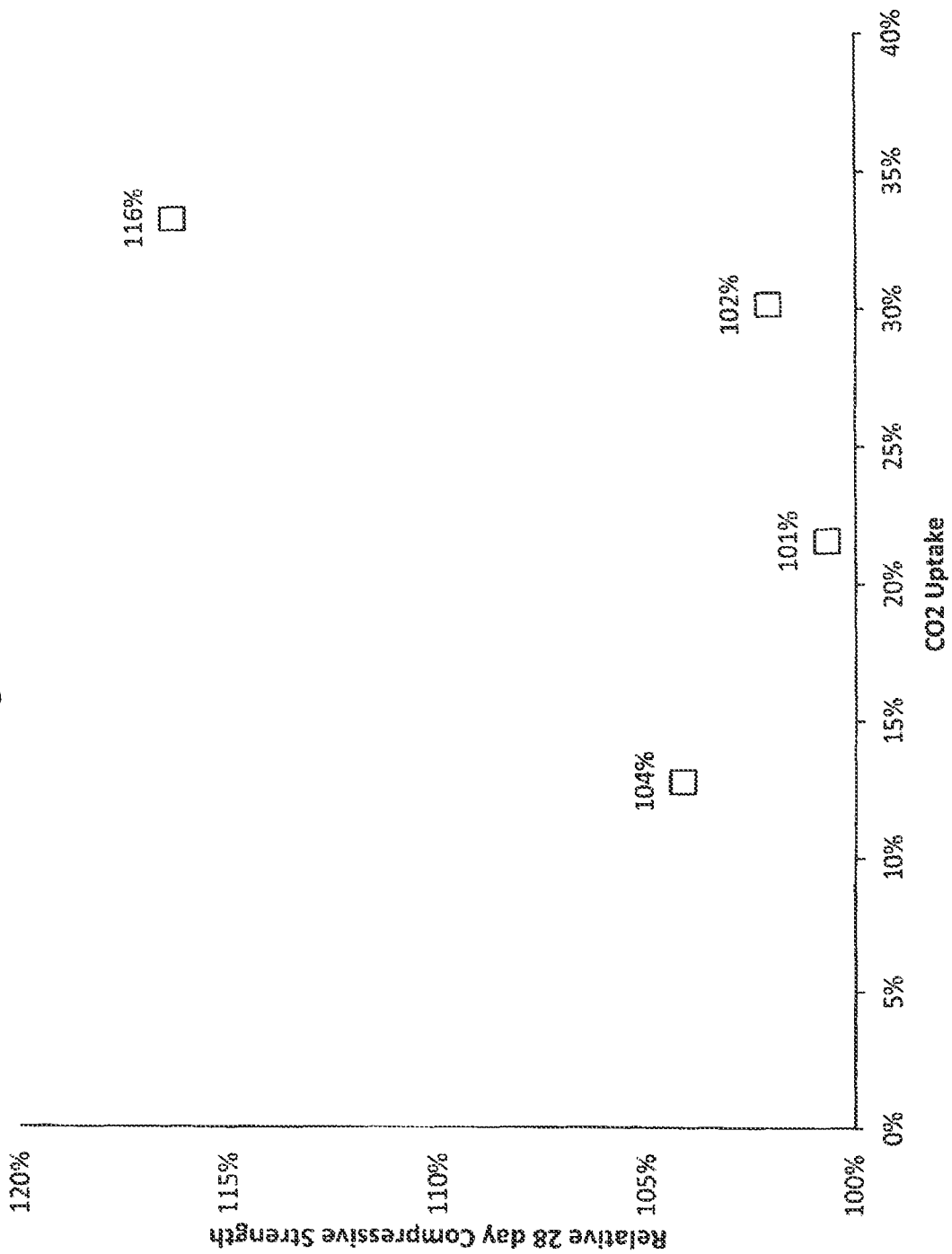
FIG. 23 shows 28-day strength of mortar cubes made with wash water treated with carbon dioxide for various times and aged 1 day.
Figure 24:
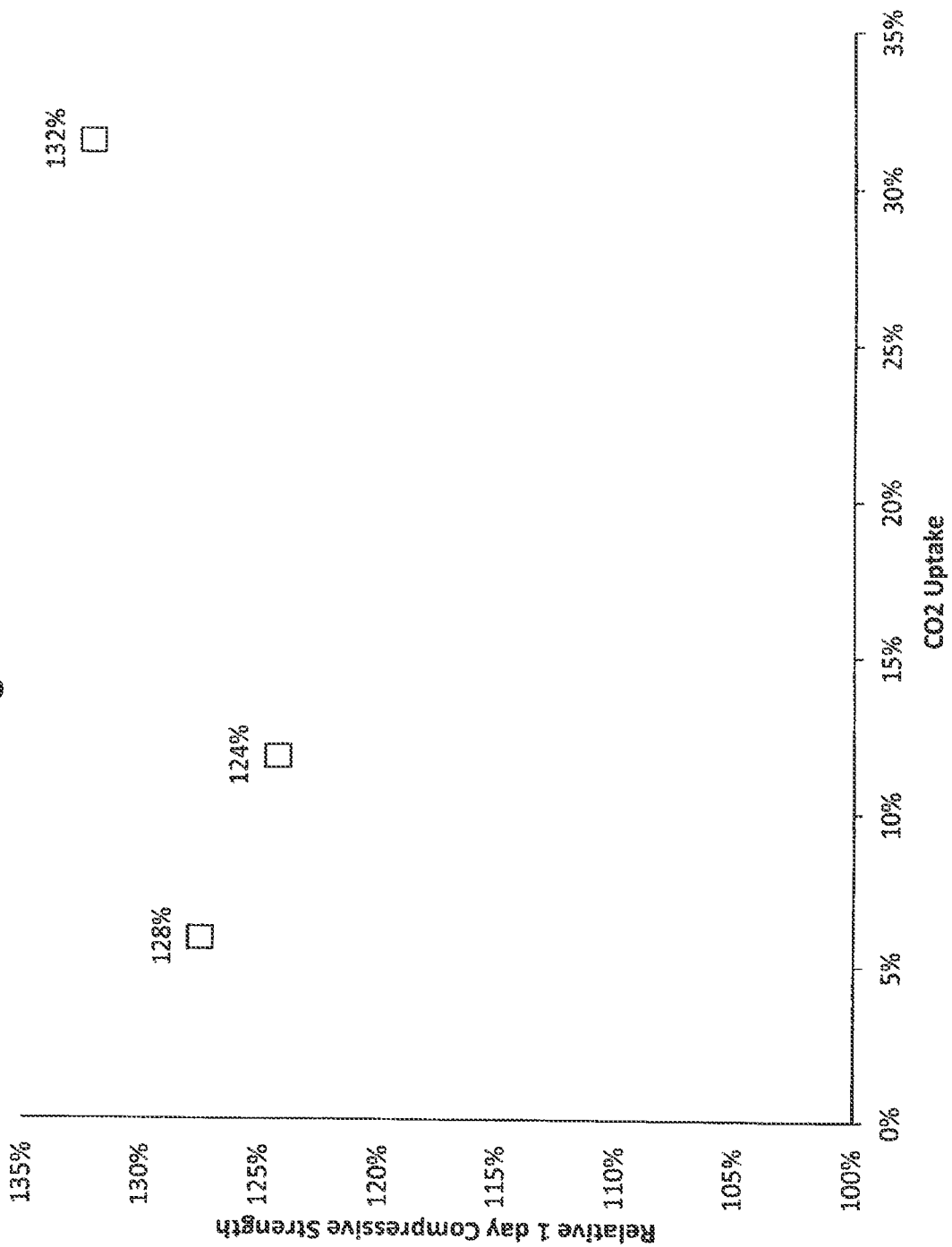
FIG. 24 shows one-day strength of mortar cubes made with wash water treated with carbon dioxide for various times and aged 7 days.
Figure 25:
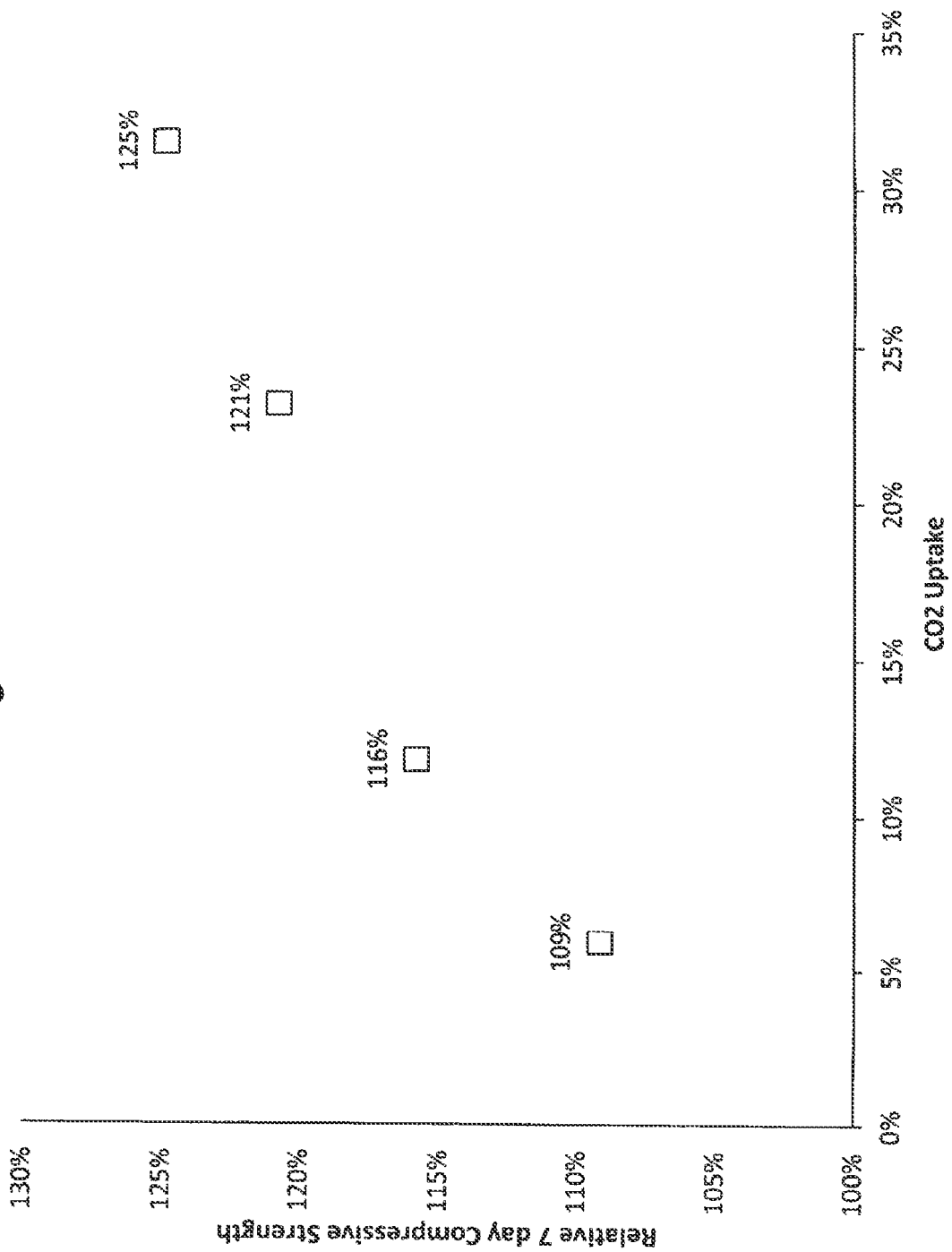
FIG. 25 shows 7-day strength of mortar cubes made with wash water treated with carbon dioxide for various times and aged 7 days.

As expected, CO2 uptake of wash water solids increased with treatment time (FIG. 19), with a corresponding decrease in the pH of the wash water (FIG. 20). One-day (FIG. 21), 7-day (FIG. 22), and 28-day strength (FIG. 23) were all increased in mortar cubes made with wash water aged 1 day that had been treated with carbon dioxide compared to cubes made with untreated wash water. One-day (FIG. 24) and 7-day strength (FIG. 25) were increased in mortar cubes made with wash water aged 7 days that had been treated with carbon dioxide compared to cubes made with untreated wash water; 28-day strength decreased for cubes made with wash water with lower carbon dioxide uptake but increased for those made with wash water with higher carbon dioxide uptake.

Example 5

Cemex Demopolis cement was used as wash water solids (100% cement), added to potable water until specific gravity 1.10, then aged 1 or 7 days, with and without $CO_2$ treatment. Control mortar cubes were produced using potable water, reference cubes were produced using potable water and additional cement equivalent to the solids contained within the wash water.

Figure 26:
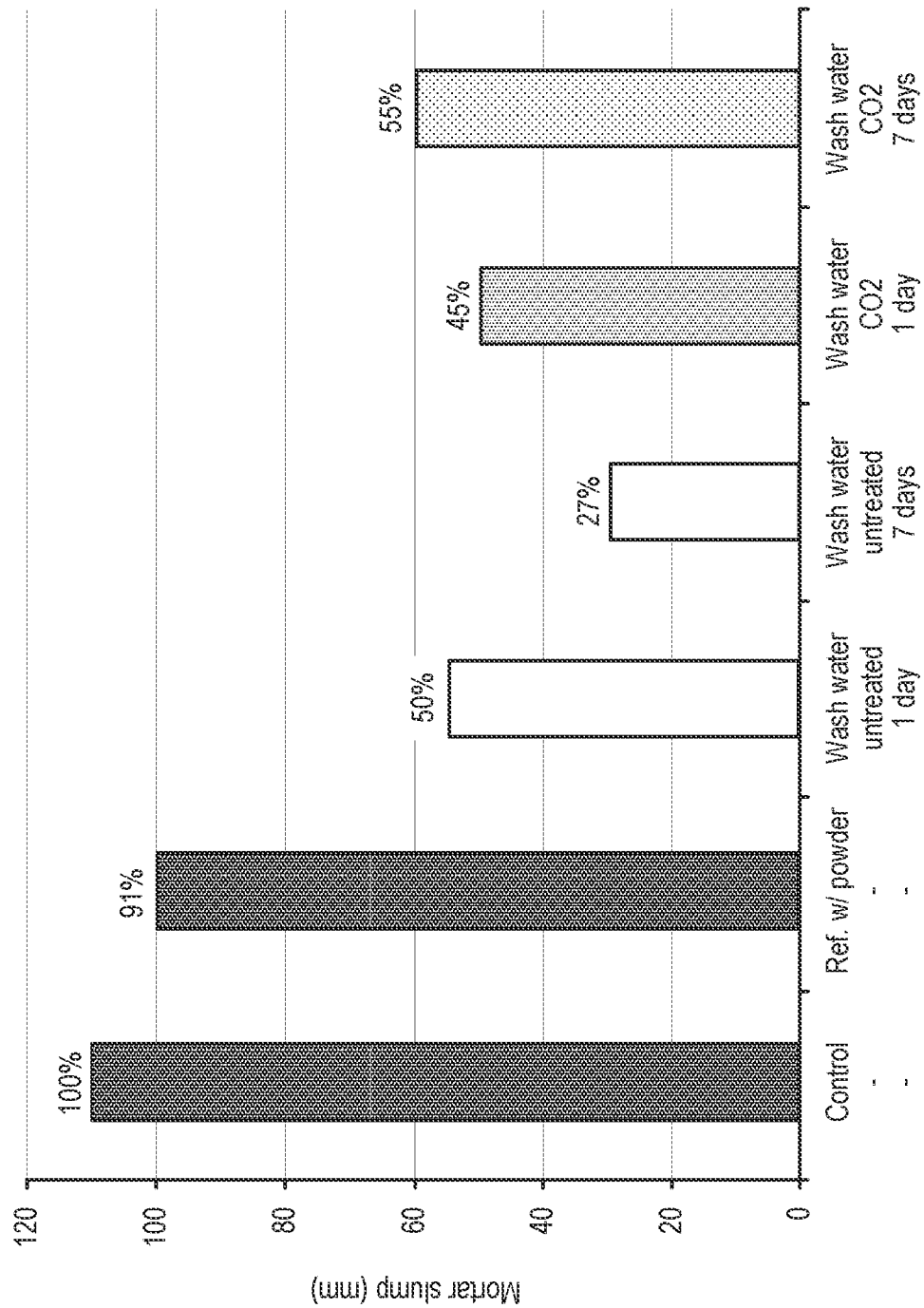
FIG. 26 shows slump in mortar cubes made with wash waters treated or untreated with carbon dioxide.
Figure 27:
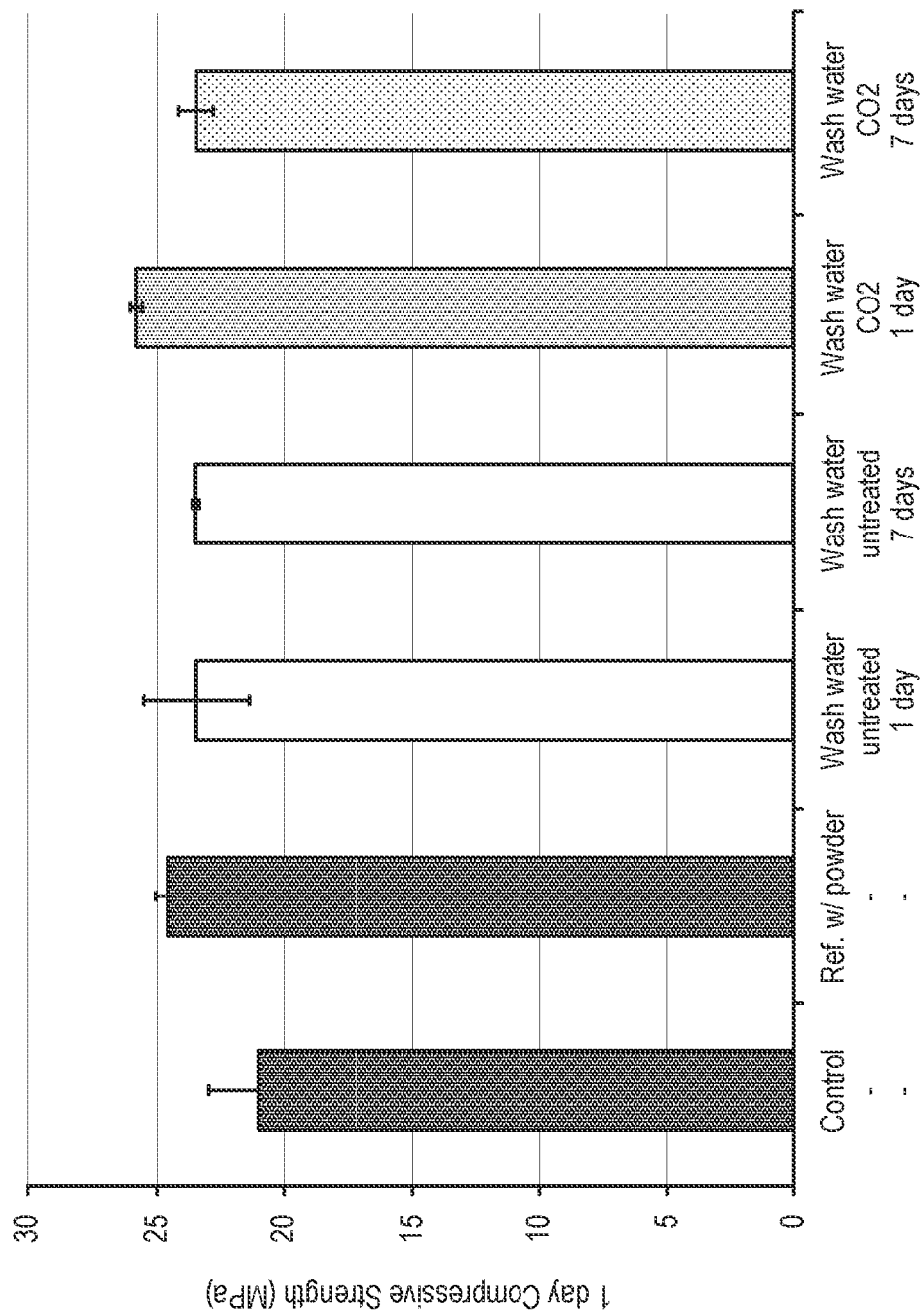
FIG. 27 shows 1-day compressive in mortar cubes made with wash waters treated or untreated with carbon dioxide.
Figure 28:
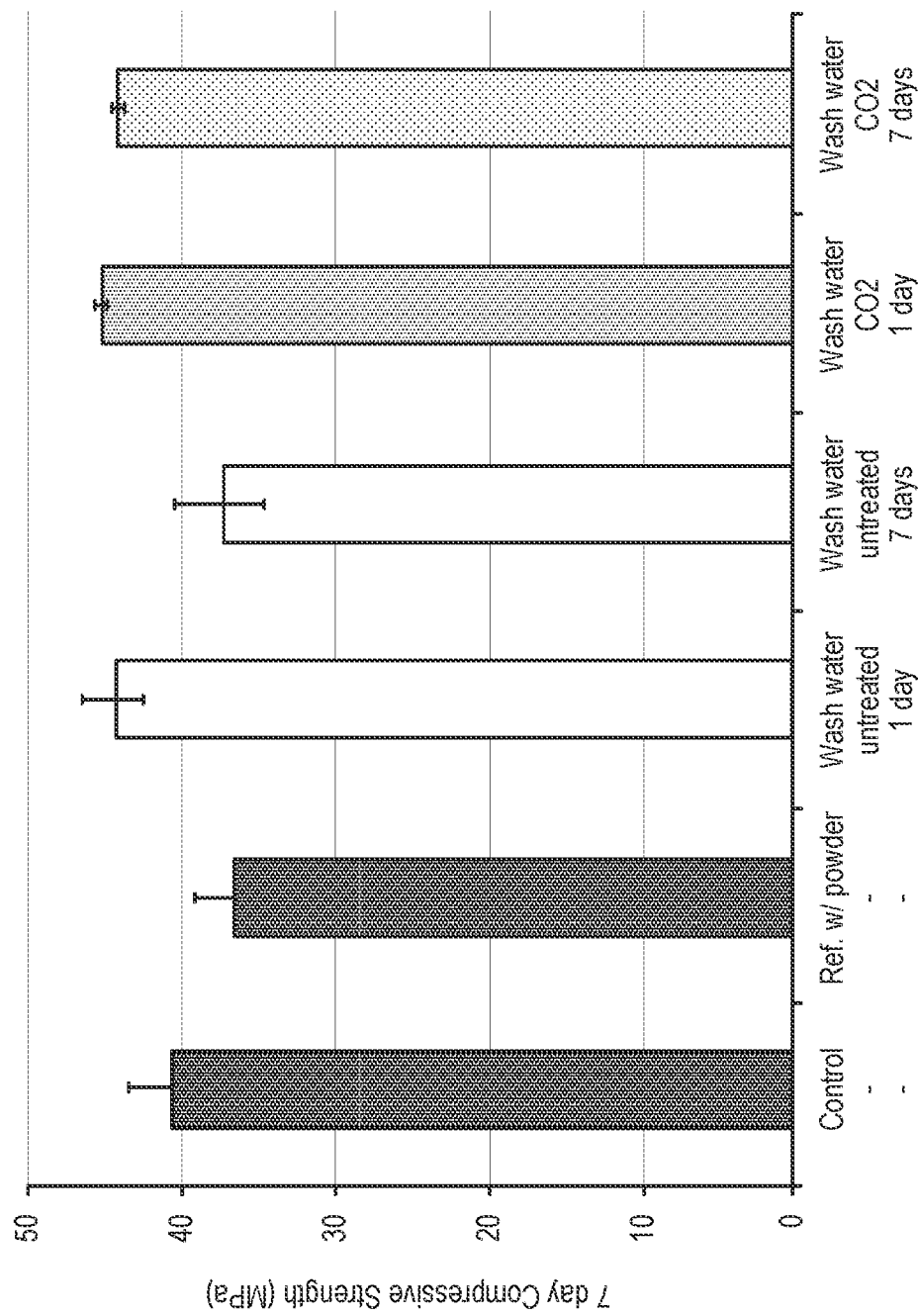
FIG. 28 shows 7-day compressive in mortar cubes made with wash waters treated or untreated with carbon dioxide.
Figure 29:
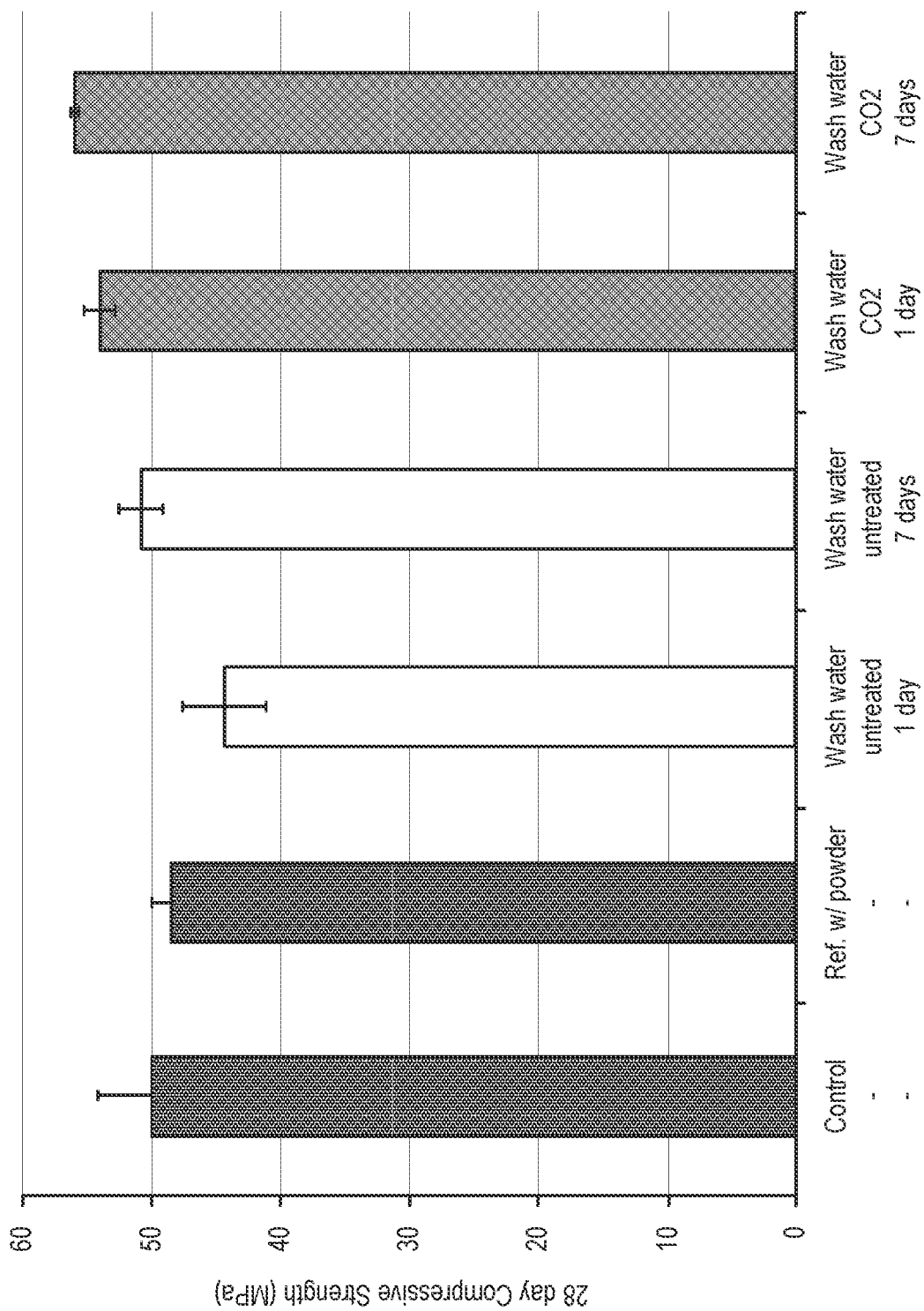
FIG. 29 shows 28-day compressive in mortar cubes made with wash waters treated or untreated with carbon dioxide.
Figure 30:
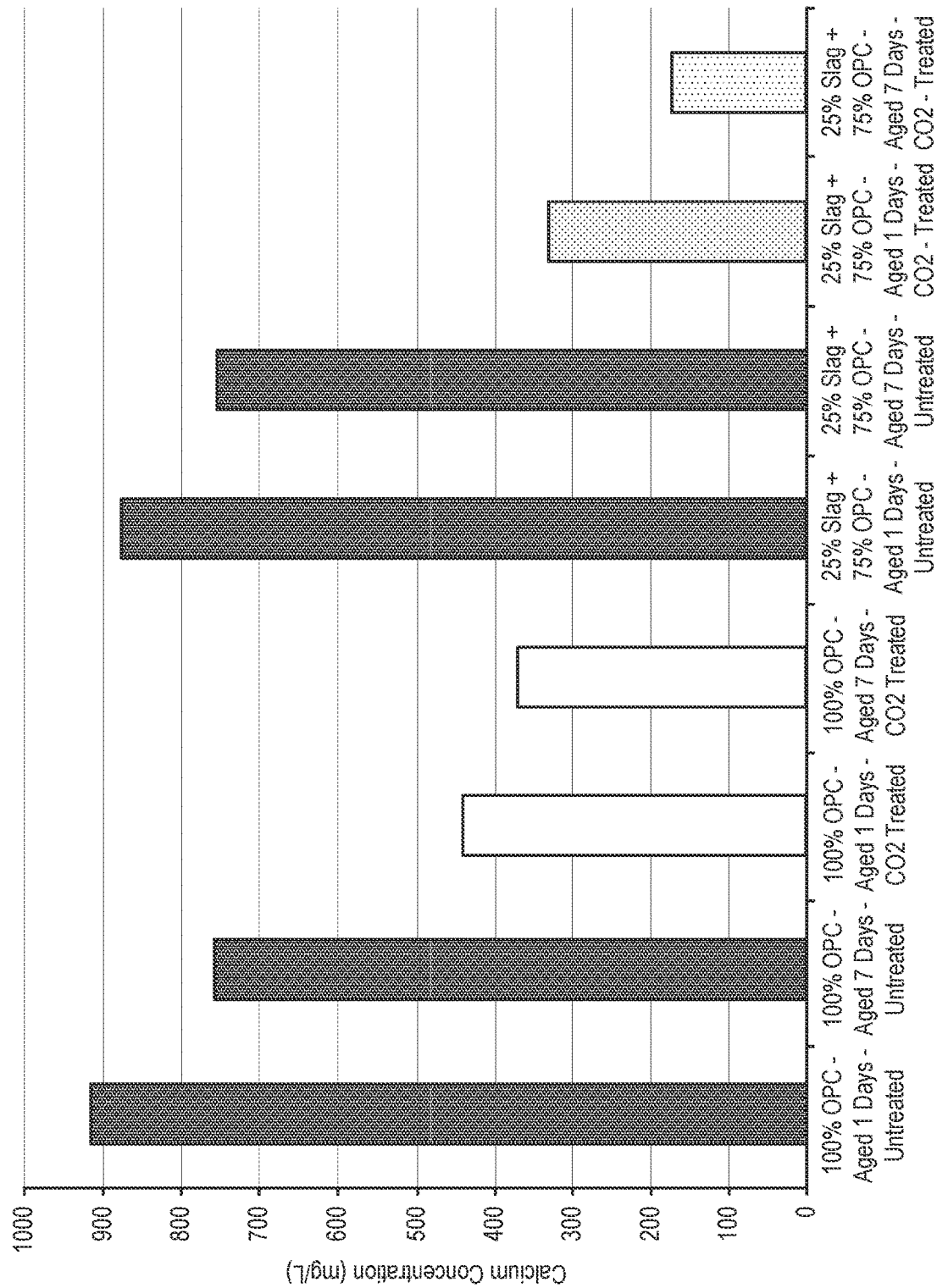
FIG. 30 shows calcium ICP-OES analysis of filtrate of wash waters treated or untreated with carbon dioxide
Figure 31:
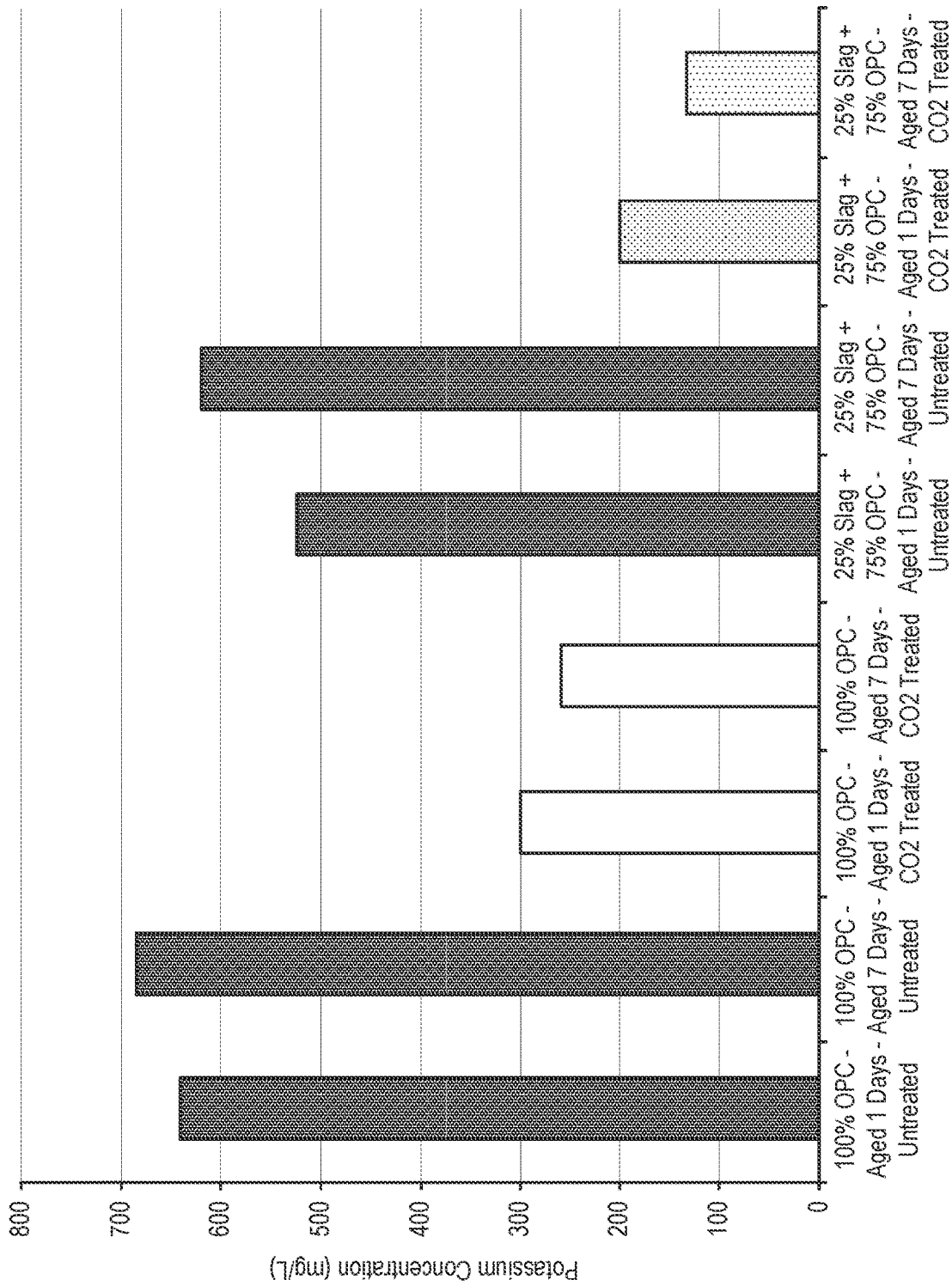
FIG. 31 shows potassium ICP-OES analysis of filtrate of wash waters treated or untreated with carbon dioxide
Figure 32:
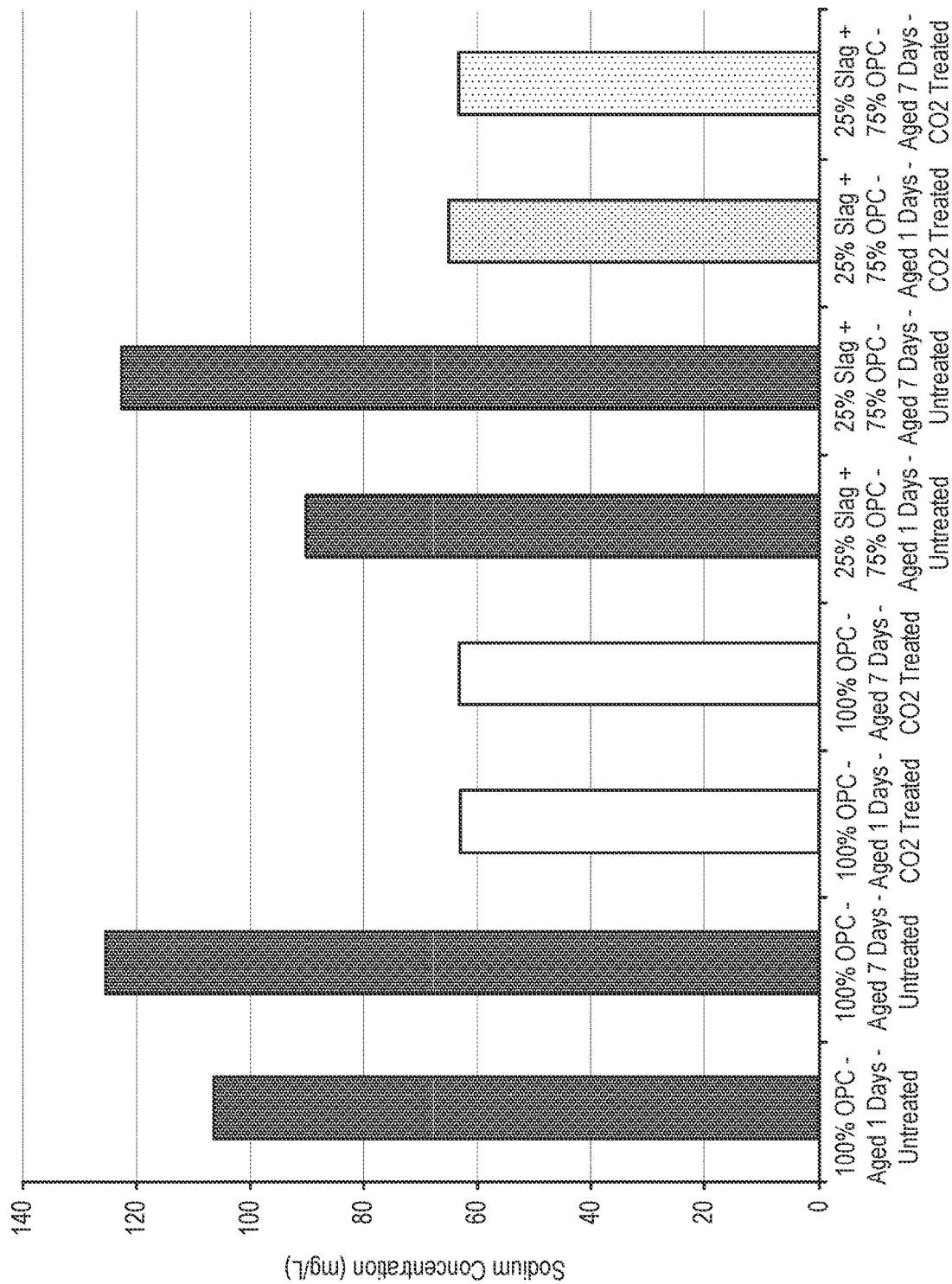
FIG. 32 shows sodium ICP-OES analysis of filtrate of wash waters treated or untreated with carbon dioxide
Figure 33:
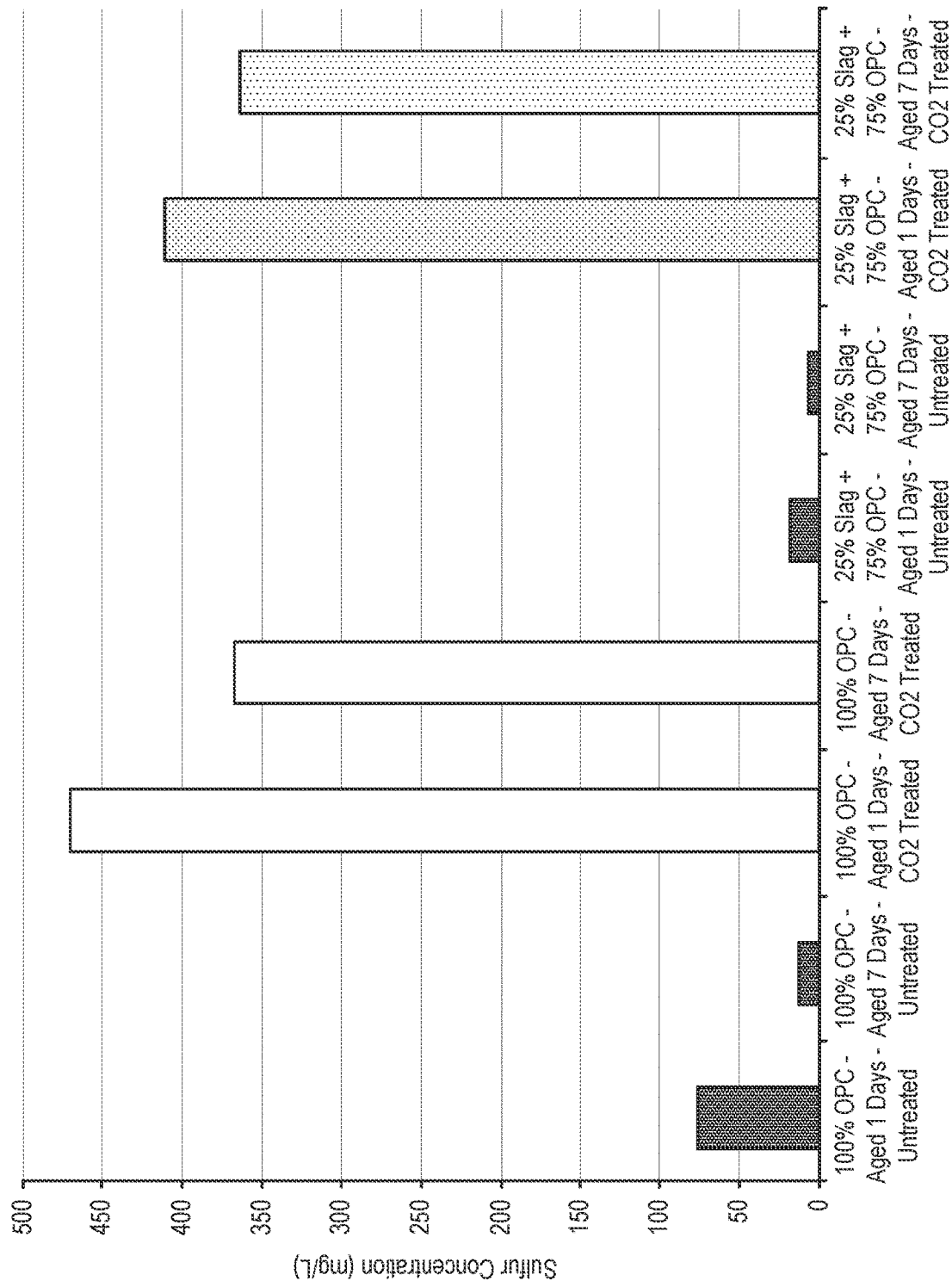
FIG. 33 shows strontium ICP-OES analysis of filtrate of wash waters treated or untreated with carbon dioxide

FIG. 26 shows that adding more cement to the control reduced the workability (slump). If that same amount of cement was present in one day old wash water the workability was reduced by about 50%. If the wash water was untreated and used at 7 days aging then the workability decreased further, but if treated with $CO_2$ the performance at 7 days aging was no worse than at 1 day. FIGS. 27-29 show 1-, 7-, and 28-day compressive strengths for mortar cubes made with the wash waters. In sum, in 5 of 6 comparisons (two of the one day wash water samples and all three of the 7 day wash water samples) mortar the wash water treated with $CO_2$ was stronger than a mortar made with an equivalent amount of extra cement. Samples made with $CO_2$ treated wash water were equivalent or better strength than those with the untreated wash water at any sample age and any wash water age.

Example 6

Lab wash water samples were produced through additions of neat cement and slag into potable water. After aging for 1 or 7 days the solids and liquids were separated via suction filtration for further analysis. Solids were rinsed with isopropyl alcohol to remove any residual water and allowed to dry. Dried solids were submitted for analysis via X-ray diffraction (XRD), nuclear magnetic resonance (NMR) and scanning electron microscopy (SEM). Filtrate was passed through a 0.20 μm filter and submitted for chemical analysis via ICP-OES.

ICP-OES

Figure 34:
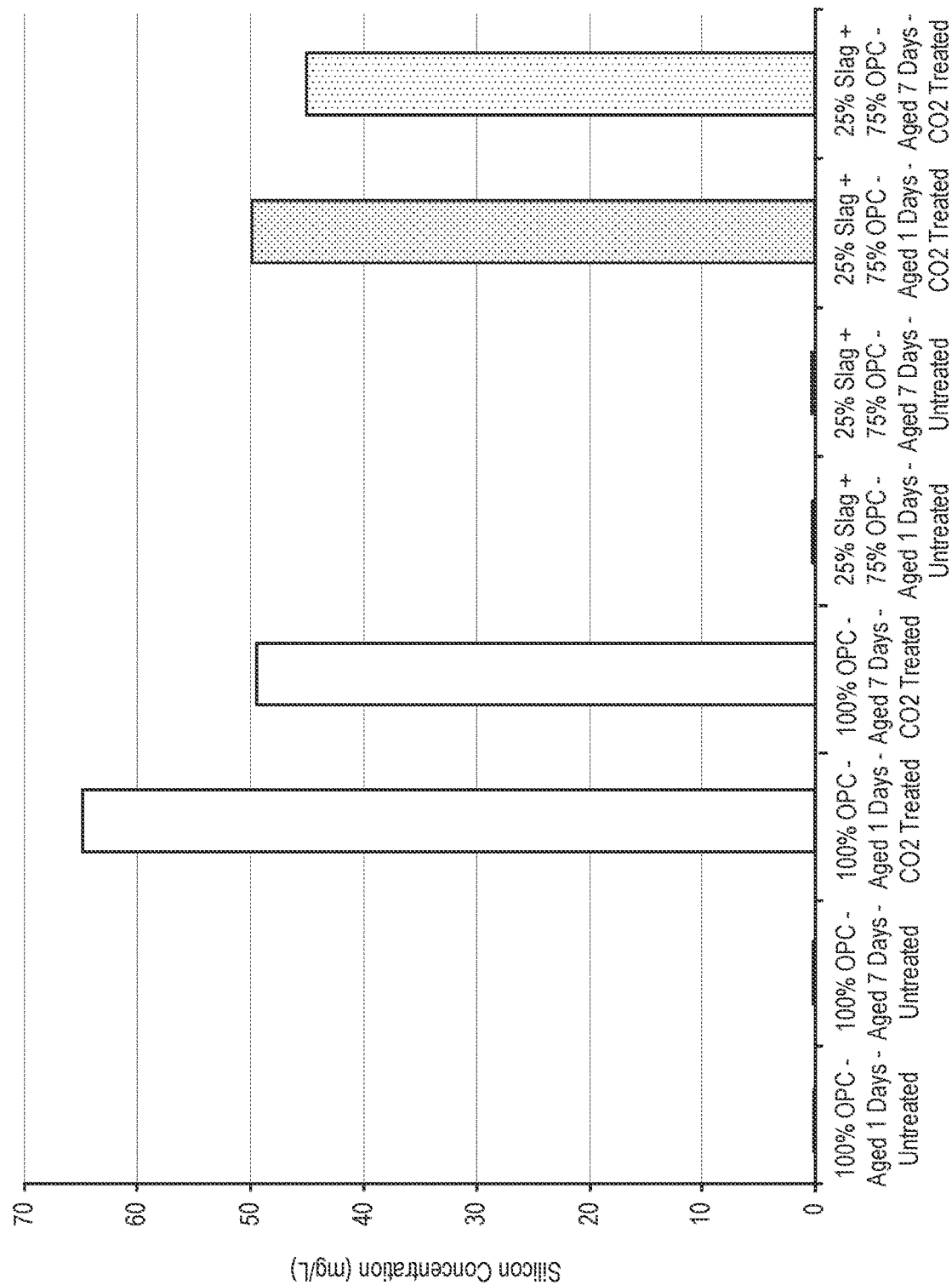
FIG. 34 shows sulfur ICP-OES analysis of filtrate of wash waters treated or untreated with carbon dioxide
Figure 35:
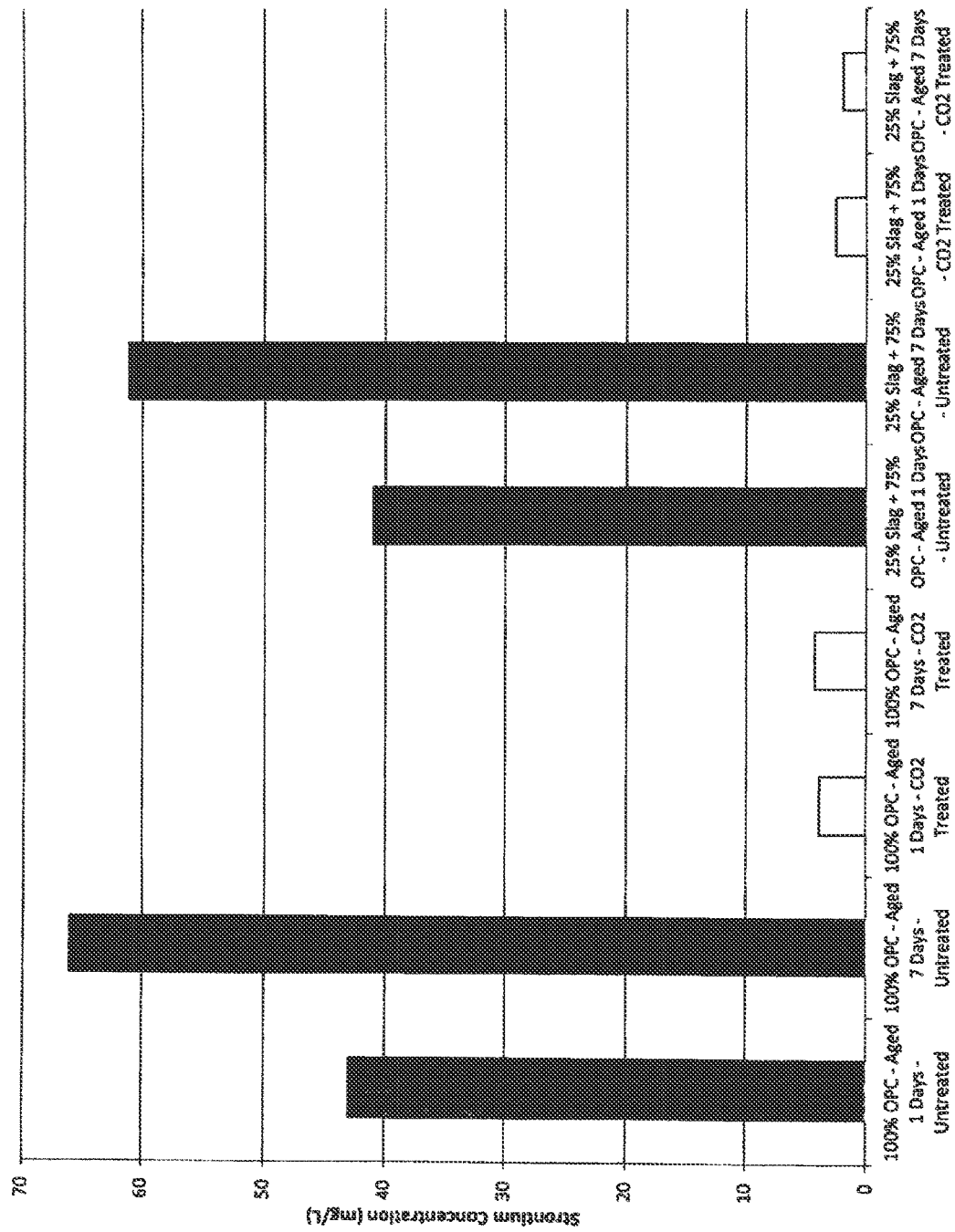
FIG. 35 shows silicon ICP-OES analysis of filtrate of wash waters treated or untreated with carbon dioxide
Figure 36:
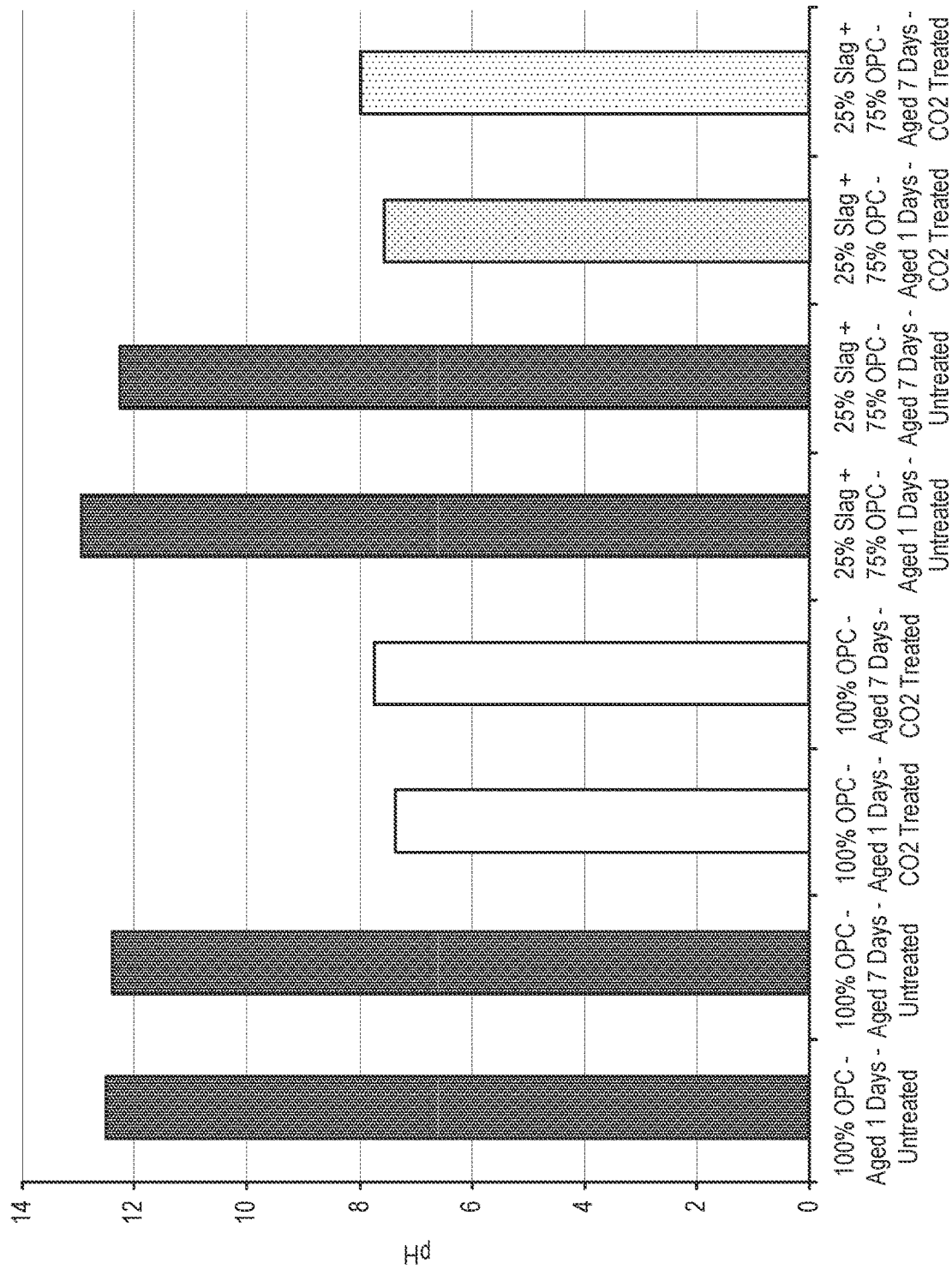
FIG. 36 shows CO2 treatment decreased pH of filtrate of wash waters.

Analysis of filtrate passing 0.20 μm filter shows distinct changes in ions concentrations depending on the water treatment. The following ions were found to be present in lower concentrations following $CO_2$ treatment of the lab-produced wash water: Calcium, Potassium, Sodium, Strontium (FIGS. 30-33). The following ions were found to be present in greater concentrations following $CO_2$ treatment of the lab-produced wash water: Sulfur, Silicon (FIGS. 34 and 35). The $CO_2$ treatment was found to decrease the pH of wash water filtrate (FIG. 36). Data are shown in tabular form in FIGS. 37 and 38.

SEM.

For 100% OPC wash water, at 250 magnification (FIG. 39): Hexagonal particles in untreated cases characteristic of portlandite. At 1000 magnification (FIG. 40): Untreated WW: Observe needle morphology at 1 days and presence of at 7 days suggests ongoing precipitation and growth of hydration products. At 25,000 magnification (FIG. 41): Untreated WW: mixture of fuzzy and needle-like hydration products characteristic of normal cement hydration. Features mature and become larger by 7-days, hence less detail at 25 k magnification in 7-day versus 1-day. CO2 Treated WW: Abundance of small box-like products characteristic of calcite observable at 25 k mag. Microstructure of CO2 treated case appears generally the same between 1 and 7 days of aging.

Figure 43:
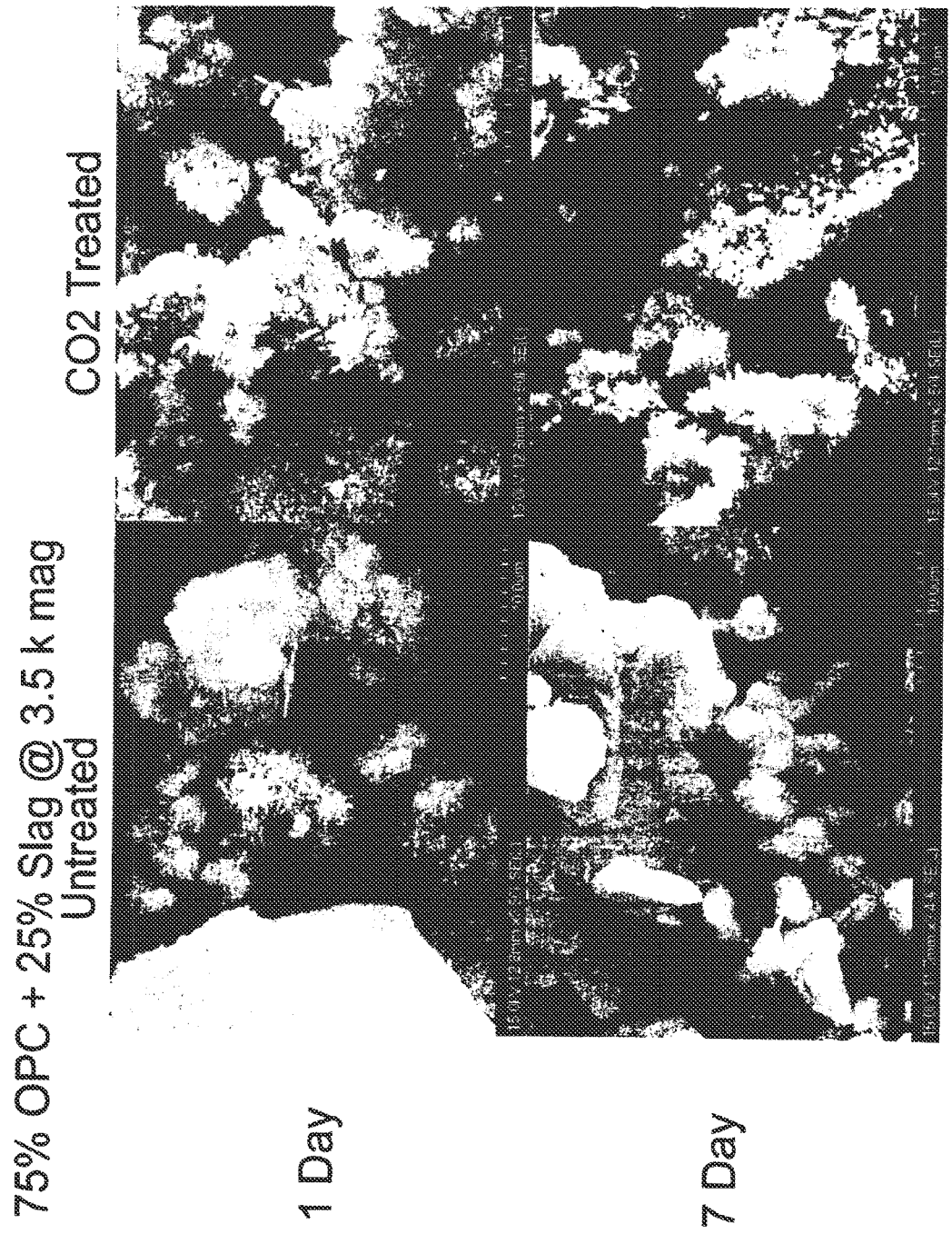
FIG. 43 shows scanning electron micrographs (SEM) for particles in wash waters (75% OPC/25% slag) treated or untreated with carbon dioxide, 3500× magnification.
Figure 44:
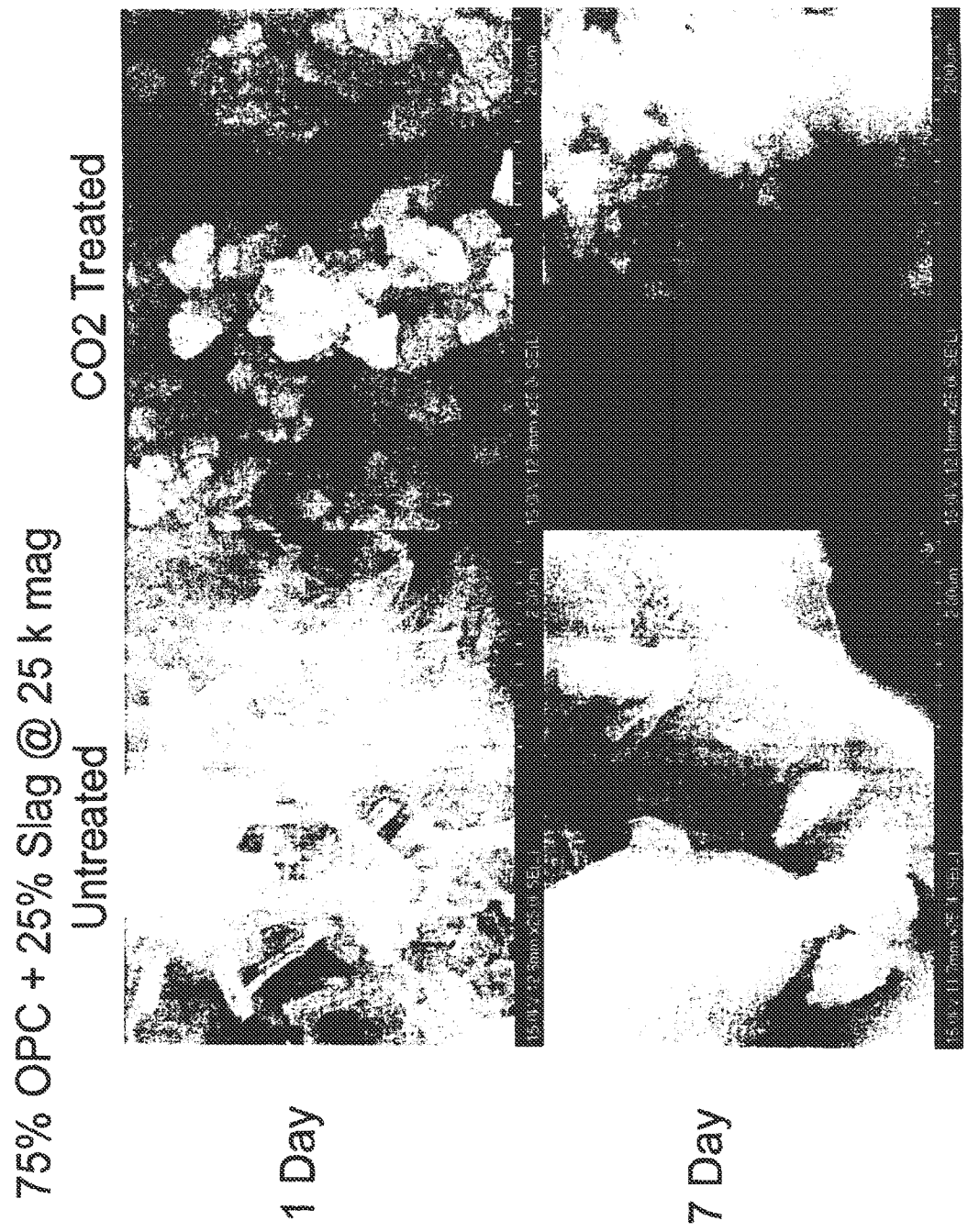
FIG. 44 shows scanning electron micrographs (SEM) for particles in wash waters (75% OPC/25% slag) treated or untreated with carbon dioxide, 25,000× magnification

For 75% OPC+25% Slag wash water: At 250 magnification (FIG. 42): Hexagonal particles in untreated cases characteristic of portlandite. Large, faceted, unreacted particles characteristic of slag At 3500 magnification (FIG. 43): Untreated WW: Observe of fuzzy/needle morphology at 1 days which becomes more smooth by 7 days. Additional smaller plat-like morphologies observable at 7 days. Suggests ongoing maturation of the reaction products. At 25,000 magnification (FIG. 44): Untreated WW: mixture of fuzzy and needle-like hydration products characteristic of normal cement hydration. Features mature and become larger by 7-days, hence less detail at 25 k magnification in 7-day versus 1-day. CO2 Treated WW: Abundance of small box-like products characteristic of calcite observable at 25 k mag. Microstructure of CO2 treated case appears generally the same between 1 and 7 days of aging.

Figure 45:
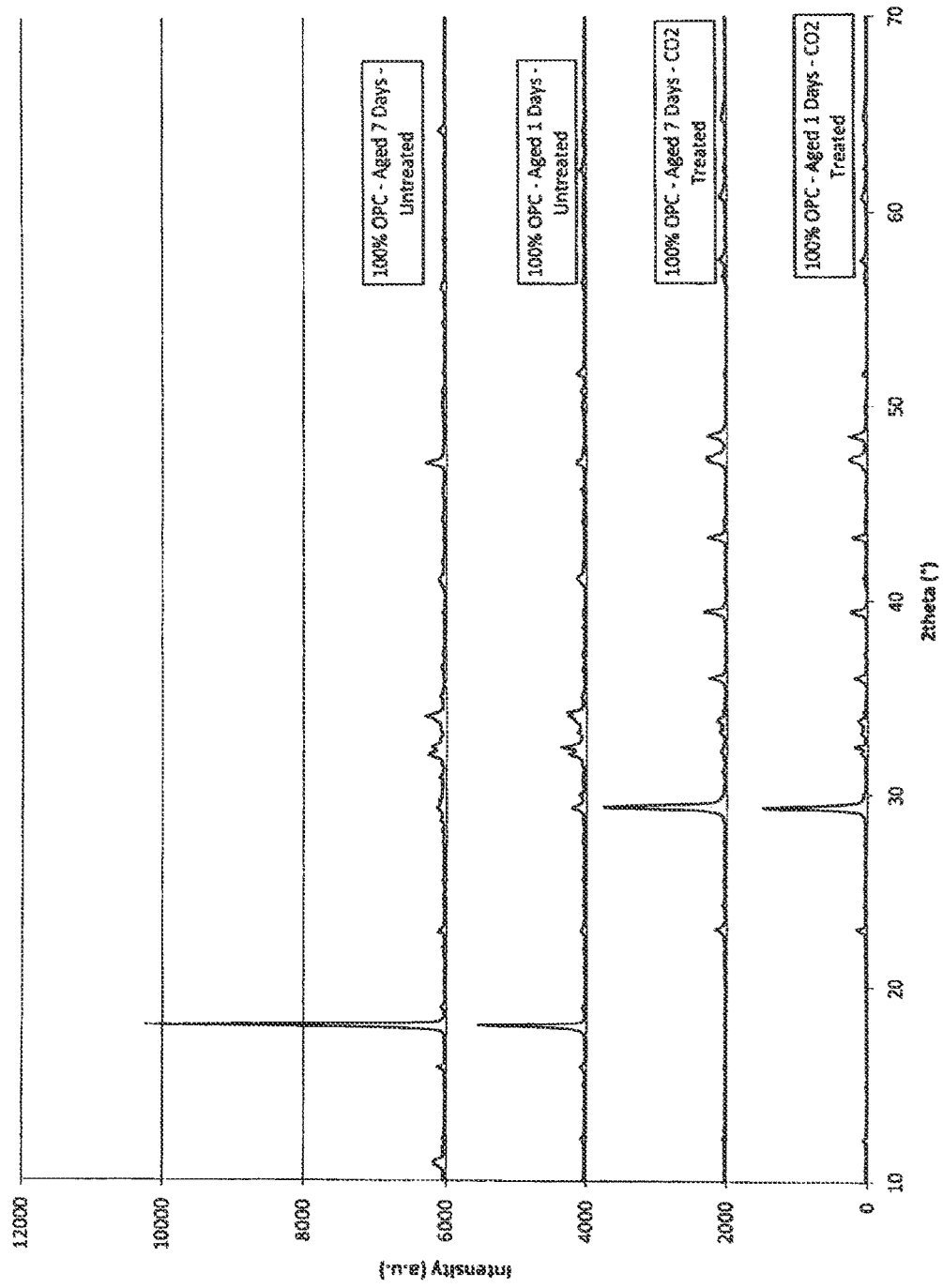
FIG. 45 shows X-ray diffraction (XRD) patterns from wash waters treated or untreated with carbon dioxide.
Figure 46:
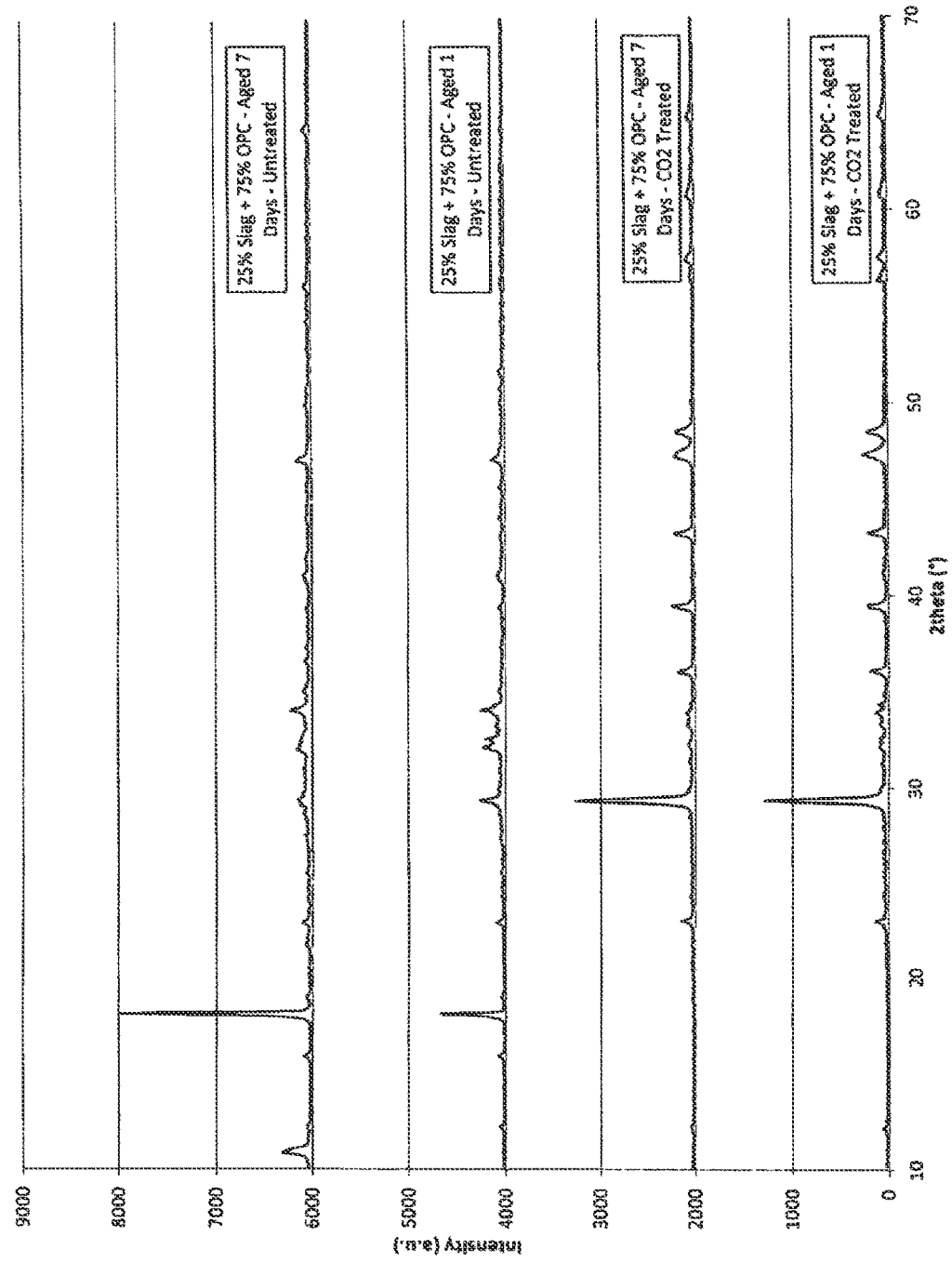
FIG. 46 shows X-ray diffraction (XRD) patterns from wash waters treated or untreated with carbon dioxide.

XRD:

Untreated WW—Large contribution in the XRD pattern from $Ca(OH)_2$ with smaller contributions from various calcium silicates and hydration product. $CO_2$ treated Wash Water—Large contribution in the XRD pattern from $CaCO_3$ with smaller contributions from various calcium silicates and hydration products. No contribution from $Ca(OH)_2$. All $CaCO_3$ is present as calcite, as indicated by large contribution at ~29° All $Ca(OH)_2$ is present as portlandite, as indicated by large contribution at ~18°. See FIGS. 45 and 46.

Figure 47:
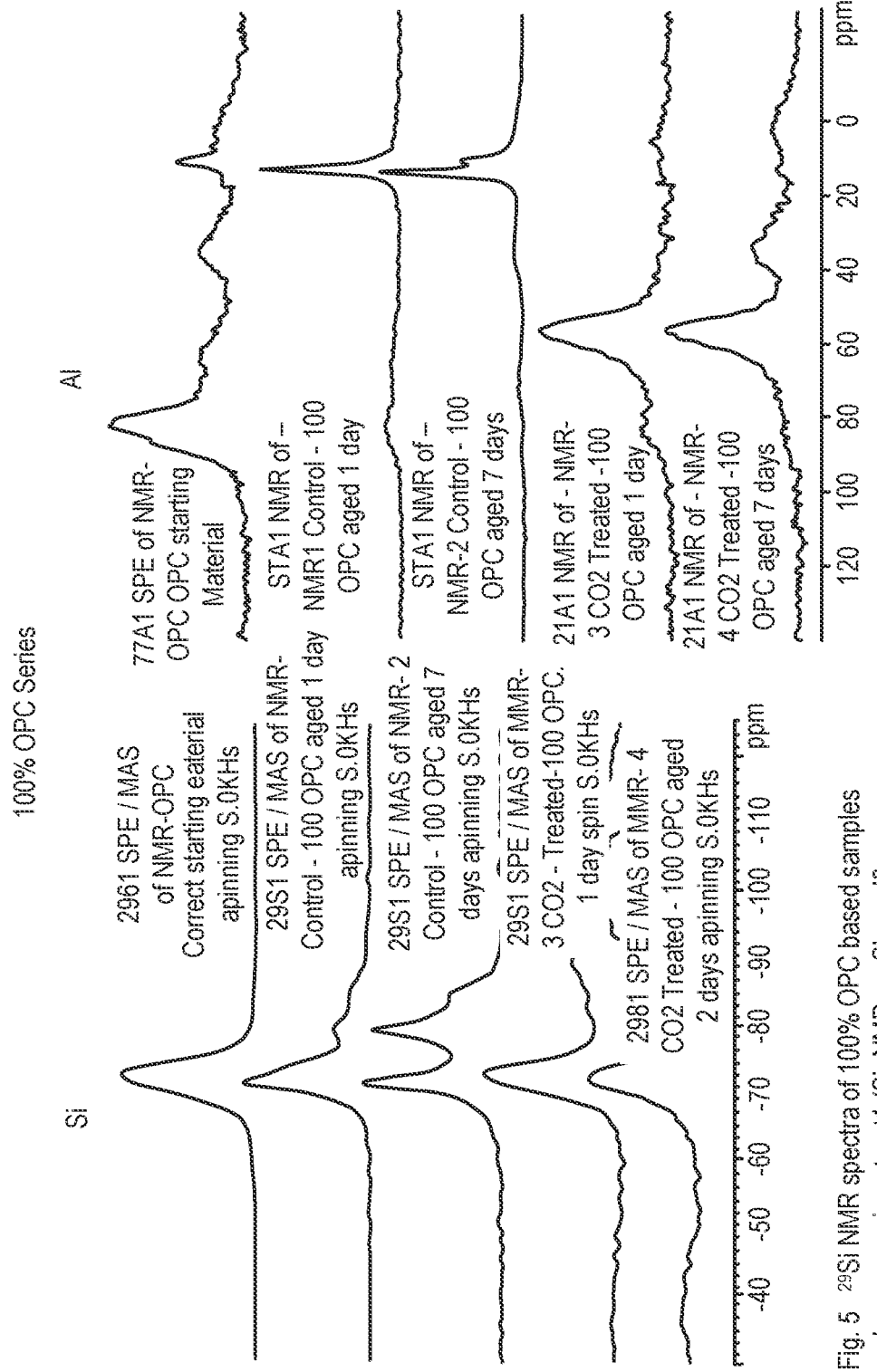
FIG. 47 shows nuclear magnetic resonance (NMR) patterns from wash waters treated or untreated with carbon dioxide.
Figure 48:
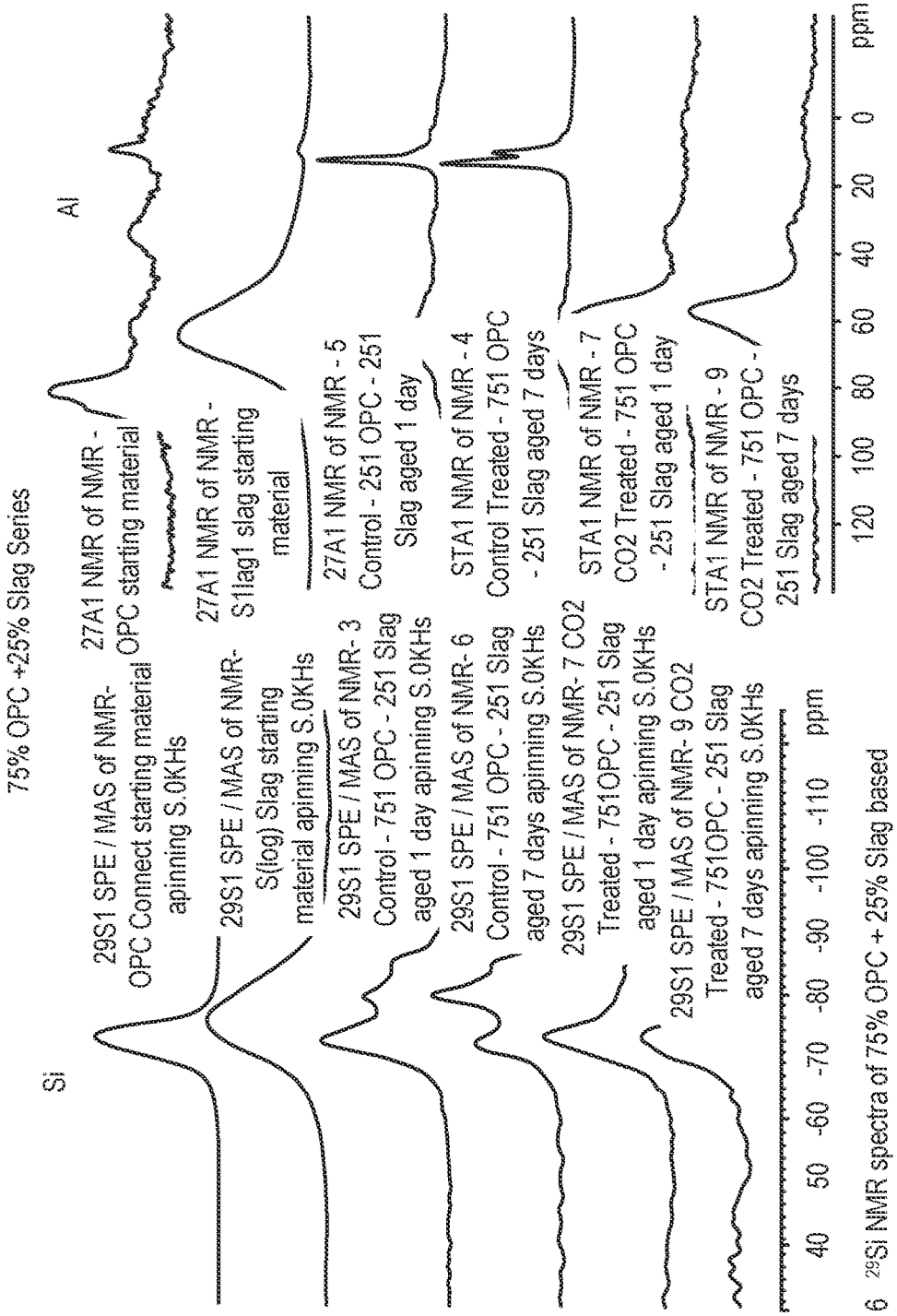
FIG. 48 shows nuclear magnetic resonance (NMR) patterns from wash waters treated or untreated with carbon dioxide.

NMR (FIGS. 47 and 48): Silicon:

Silicon is present in cement and slag. Unreacted cement phases present in all samples, giving peaks around –70 ppm. Unreacted slag phases are present in all samples, giving peaks around –75 ppm. As the silicates react the silicon signal shifts to more negative values due to polymerization. Untreated WW: Silicon environment in untreated WW changes giving more contribution to signal from –75 to –90, increasing with age. This suggests a microstructure that is changing with time. $CO_2$ Treated WW: Silicon environment in $CO_2$ treated WW changes dramatically, giving more contribution to signal from –80 to –120, centered around –100

$CO_2$ treated silicon environment displays less change from 1-7 days as compared to untreated case. This suggests different levels of Si polymerization in the $CO_2$ treated case and less "change" from 1-7 days in the $CO_2$ treated case.

Aluminum:

Aluminum is present in cement and slag. Untreated WW: Al environment in untreated WW produces sharp peak around 10 ppm that changes with sample age. Some signal from unreacted cement Al is visible at 1 day in the 100% OPC case. This suggests a microstructure that is changing with time. $CO_2$ Treated WW: $CO_2$ treatment completely modifies Al environment. $CO_2$ treated Al environment displays less change from 1-7 days as compared to untreated case. This suggests different Al local environment in the $CO_2$ treated case compared to the untreated case. The untreated case has Al in normal hydration products, like ettringite, while the $CO_2$ treatment seems to incorporate Al ions into amorphous C-A-S—H phases. The $CO_2$ treated case demonstrates less "change" in the Al local environment from 1-7 days.

Example 7

Various wash waters that matched the corresponding mortar mix were either untreated or subject to continuous agitation, with and without carbon dioxide treatment, and the performance of mortar cubes made with the wash water, as described elsewhere herein, was measured.

Figure 49:
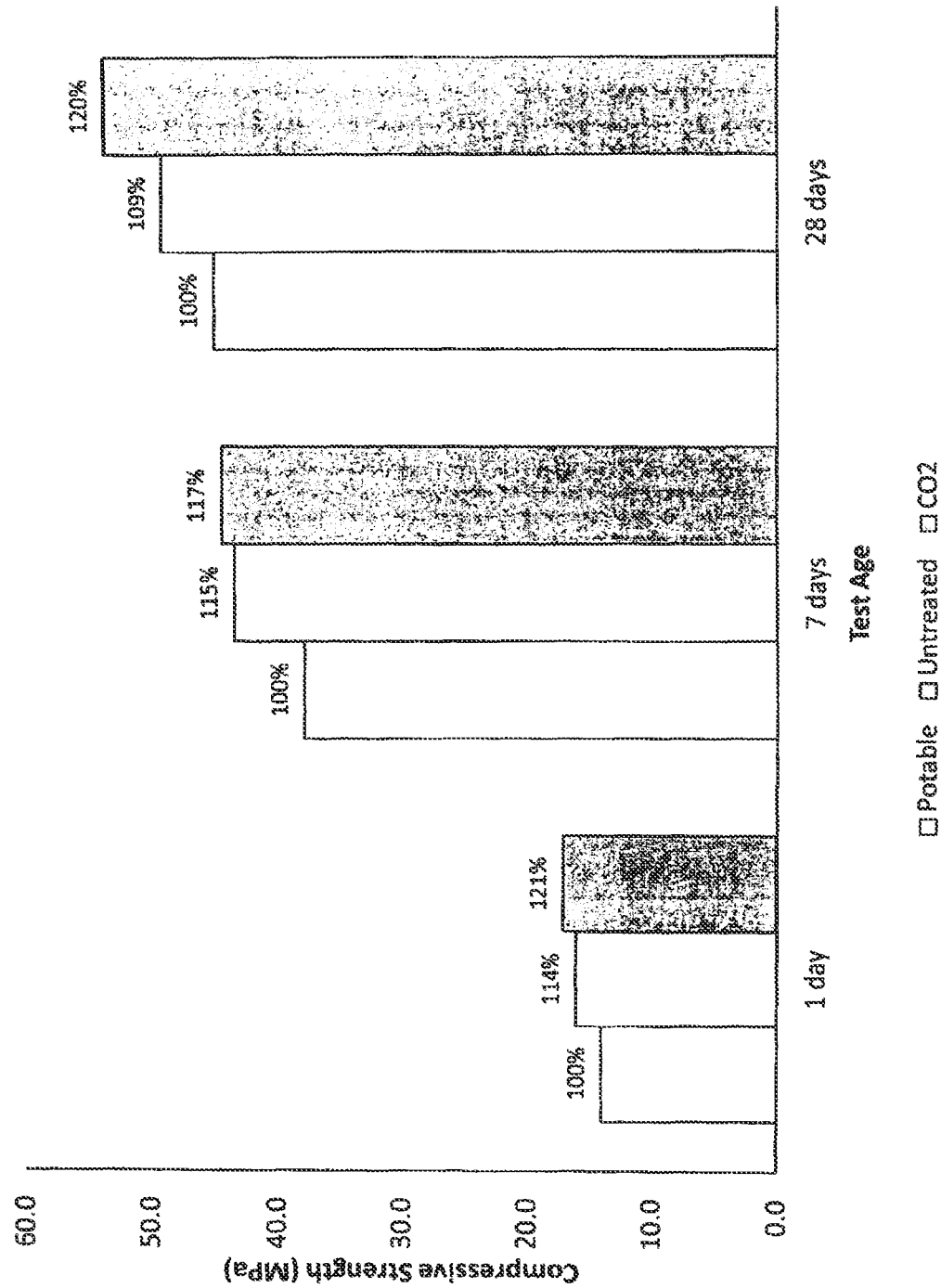
FIG. 49 shows the results for compressive strength of mortar cubes made with one-day old wash water subject to continuous agitation, wash water solids and mortar at 25% slag/75% OPC (Cemex Cemopolis cement).

FIG. 49 shows the results for compressive strength of mortar cubes made with one-day old wash water subject to continuous agitation, wash water solids and mortar at 25% slag/75% OPC (Cemex Cemopolis cement). Wash water increased strength compared to control (potable), and carbon dioxide-treated wash water increased strength even more. Slumps were control: 108, Untreated wash water: 45; CO2-treated wash water, 45 (all slumps in mm).

Figure 50:
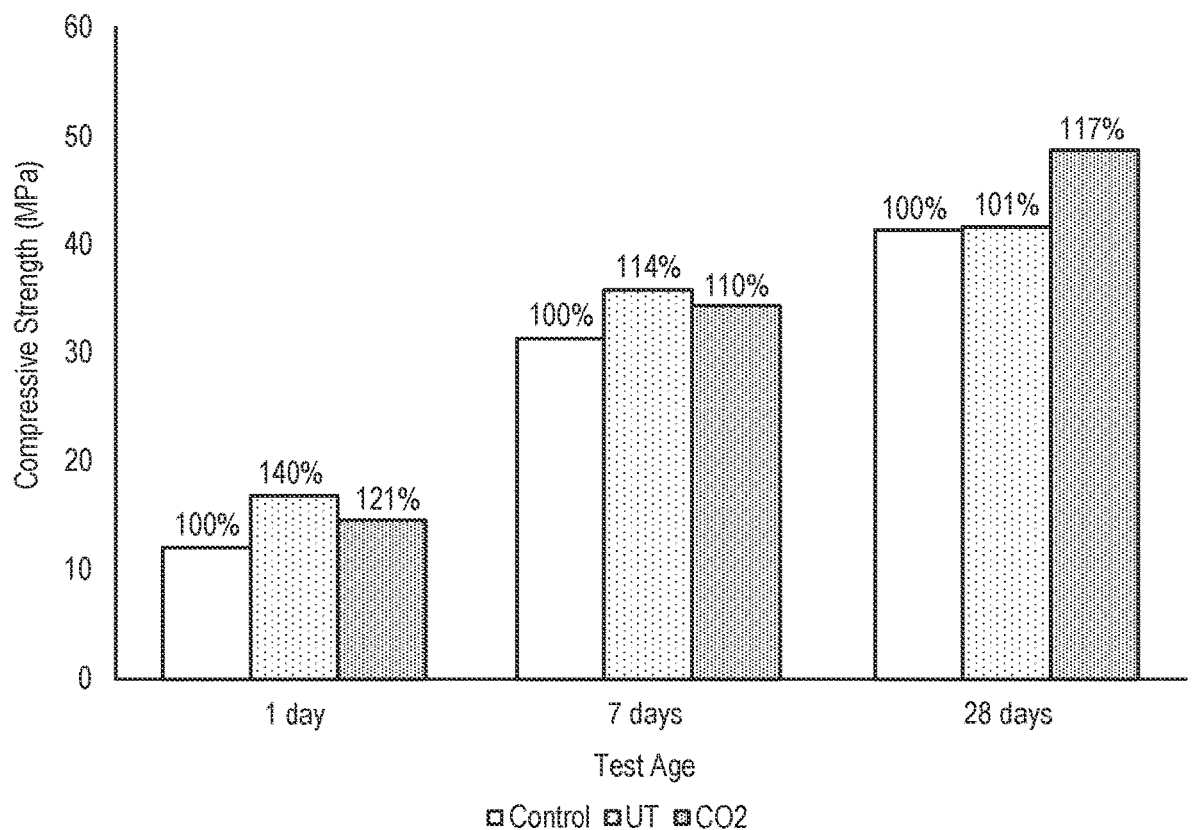
FIG. 50 shows the results for compressive strength of mortar cubes made with one-day old wash water subject to continuous agitation, wash water solids and mortar at 25% class C fly ash/75% OPC (Cemex Cemopolis cement).

FIG. 50 shows the results for compressive strength of mortar cubes made with one-day old wash water subject to continuous agitation, wash water solids and mortar at 25% class C fly ash/75% OPC (Cemex Cemopolis cement). Wash water increased strength, Untreated wash water was better than CO2 treated wash water at 1 and 7 days, but only the CO2 treated water imparted a strength benefit at 28 days. Slumps were control: 125, Untreated wash water: 90; CO2-treated wash water, 90.

Figure 51:
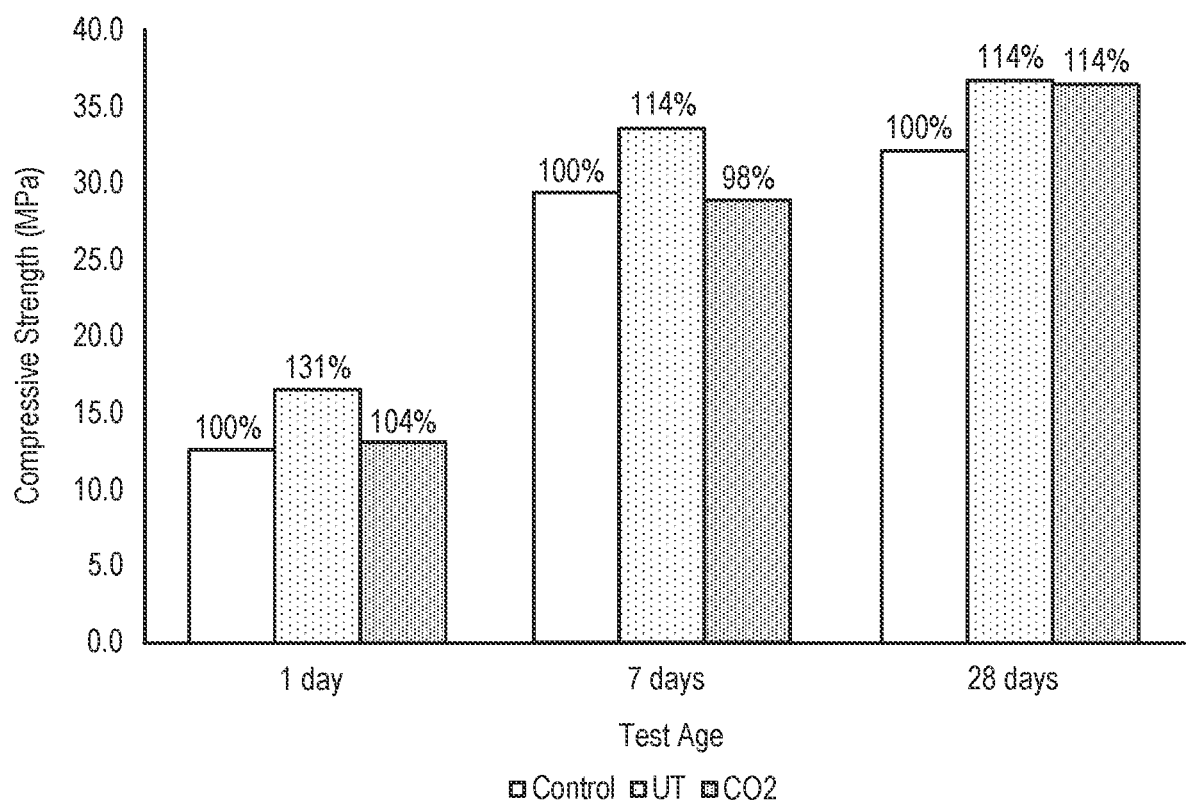
FIG. 51 shows the results for compressive strength of mortar cubes made with one-day old wash water subject to continuous agitation, wash water solids and mortar at 25% class F fly ash/75% OPC (Cemex Cemopolis cement).

FIG. 51 shows the results for compressive strength of mortar cubes made with one-day old wash water subject to continuous agitation, wash water solids and mortar at 25% class F fly ash/75% OPC (Cemex Cemopolis cement). Wash water increased strength, Untreated wash water was better than CO2 treated wash water at 1 and 7 days, but both showed equal benefit at 28 days. Slumps were control: 118, Untreated wash water: 70; CO2-treated wash water, 90.

Figure 52:
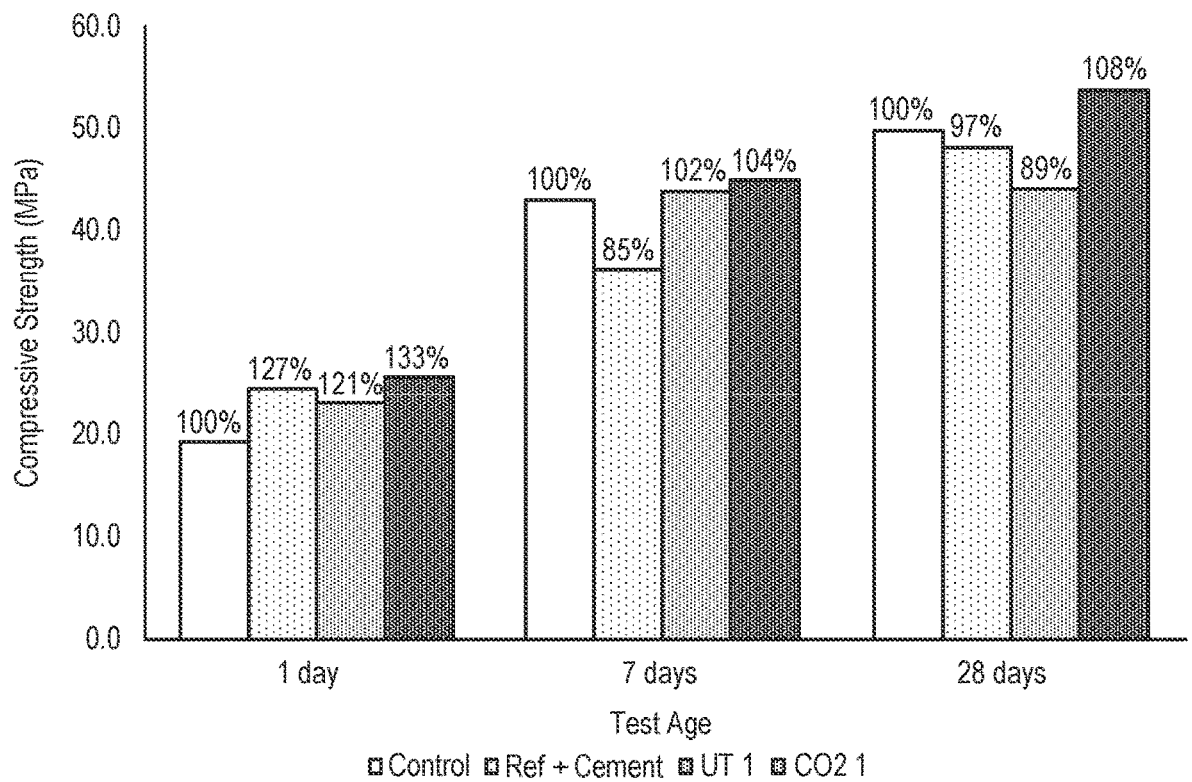
FIG. 52 shows the results for compressive strength of mortar cubes made with one-day old wash water subject to continuous agitation, wash water solids and mortar at 100% OPC (Cemex Cemopolis cement).

FIG. 52 shows the results for compressive strength of mortar cubes made with one-day old wash water subject to continuous agitation, wash water solids and mortar at 100% OPC (Cemex Cemopolis cement). Reference was extra cement equivalent to the mass of the suspended solids in the wash water. Increased cement improved early but not late strength. CO2 wash water was better than untreated wash water at all ages. CO2 wash water was better than extra cement addition at all ages Slumps were control: 110, Reference with cement: 100; Untreated wash water: 55; CO2-treated wash water, 50.

Figure 53:
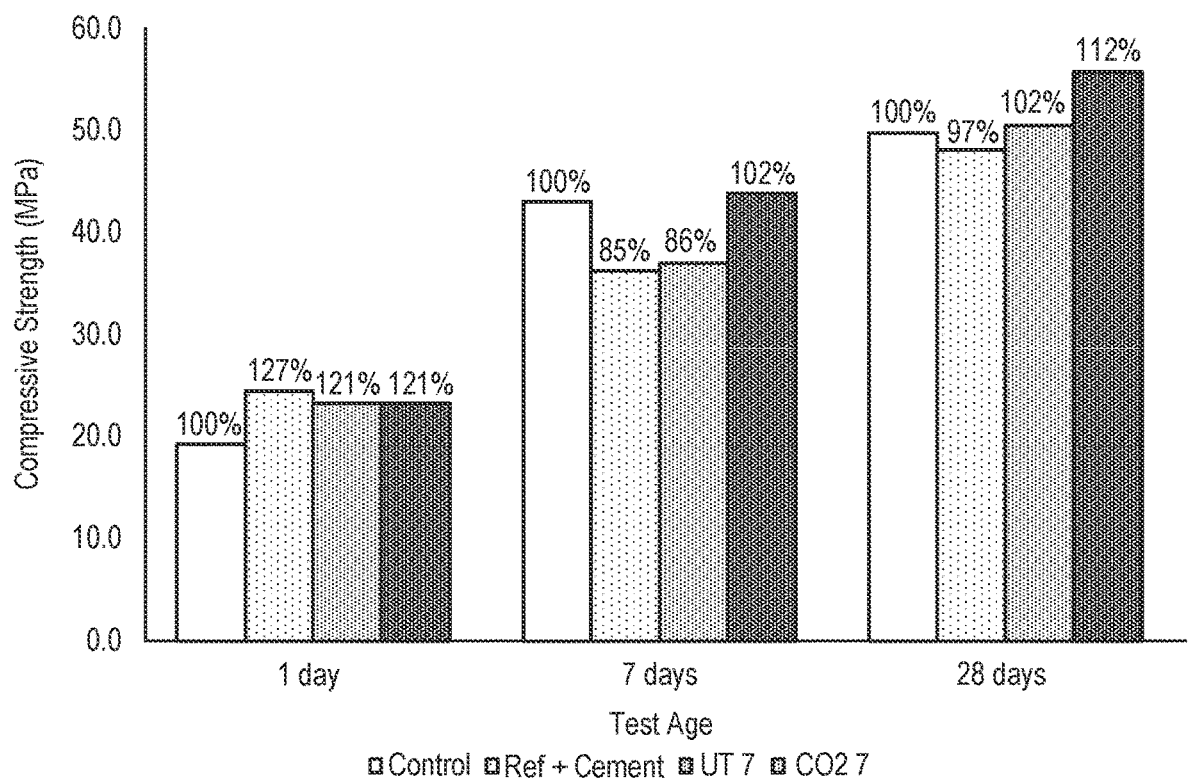
FIG. 53 shows the results for compressive strength of mortar cubes made with seven-day old wash water subject to continuous agitation, wash water solids and mortar at 100% OPC (Cemex Cemopolis cement).

FIG. 53 shows the results for compressive strength of mortar cubes made with seven-day old wash water subject to continuous agitation, wash water solids and mortar at 100% OPC (Cemex Cemopolis cement). Reference was extra cement equivalent to the mass of the suspended solids in the wash water. Increased cement improved early but not late strength. $CO_2$ wash water was equivalent to or better than untreated wash water at all ages. $CO_2$ wash water was better than extra cement addition at later ages, and better than potable water control at 1 and 28 days. Slumps were control: 110, Reference with cement: 100; Untreated wash water: 30; $CO_2$-treated wash water, 60.

Example 8

Lab scale concrete production compared concrete batches made with potable water, untreated wash water and wash water treated with carbon dioxide. The wash water was used at two ages (1 day and 5 days old). The sample production included three different control batches, each at a different w/c. This allows for interpretations of compressive strength if there is a variation in w/b among the test batches.

TABLE 3

Description of water in batches

| Sample | Mix water | Water Age | Batch |
|---|---|---|---|
| Control L, w/b = 0.56 | Potable water | n/a | 1 |
| Control M, w/b = 0.67 | Potable water | n/a | 4 |

TABLE 3-continued

Description of water in batches

| Sample | Mix water | Water Age | Batch |
|---|---|---|---|
| Control H, w/b = 0.75 | Potable water | n/a | 7 |
| Reference UT1 | Untreated | 1 day | 2 |
| Reference UT5 | Untreated | 5 day | 6 |
| CO2-1 | CO2 treated | 1 day | 3 |
| CO2-5 | CO2 treated | 5 day | 5 |

The wash water was sourced from a ready mixed truck through washing it after it had emptied its load. The collected wash water was sieved past a 80 μm screen and then was bottled (2 L plastic bottles). If appropriate, the wash waster was carbonated in the same manner as wash water for the mortar testing (given an excess of $CO_2$ achieved through periodic topping up and under agitation). The specific gravity of the wash water during carbonation was between 1.20 and 1.25. When used in concrete the water was diluted to a specific gravity of about ~1.08.

The batches were produced with a total binder loading of 307 kg/m' including the cement, fly ash, and solids contained within the wash water. The batches with lower and higher w/b ratios deviated from this binder loading. In terms of w/b the binder fraction included the cement, fly ash and solids contained in the wash water. The binder batches was 80% cement and 20% fly ash. Batch comparisons are made relative to the baseline of the Control M batch.

TABLE 4

Concrete mix designs in kg/m³

|  | Control L | Control M | Control H | UTWW 1 | UTWW 5 | CO2WW 1 | CO2WW 5 |
|---|---|---|---|---|---|---|---|
| Cement | 258 | 246 | 221 | 231 | 231 | 231 | 231 |
| Fly Ash | 64 | 61 | 55 | 58 | 58 | 58 | 58 |
| WW Solids | 0 | 0 | 0 | 17 | 18 | 18 | 18 |
| Total Binder | 322 | 307 | 276 | 306 | 307 | 307 | 307 |
| Sand | 847 | 822 | 882 | 822 | 822 | 822 | 822 |
| Stone | 1025 | 995 | 964 | 995 | 995 | 995 | 995 |
| Batch Water | 181 | 207 | 207 | 211 | 207 | 207 | 207 |
| Rel % cement | 105% | 100% | 90% | 94% | 94% | 94% | 94% |
| Rel % fly ash | 105% | 100% | 90% | 94% | 94% | 94% | 94% |
| Rel % binder | 105% | 100% | 90% | 100% | 100% | 100% | 100% |

The wash water batches included less cement and fly ash (each reduced 6%) in a proportion equivalent to the suspended solids contained within the wash water.

The fresh properties were measured and compared relative to the Control M batch.

TABLE 5

Concrete fresh properties

|  | Control L | Control M | Control H | UTWW 1 | UTWW 5 | CO2WW 1 | CO2WW 5 |
|---|---|---|---|---|---|---|---|
| Temperature (° C.) | 20.1 | 20.3 | 19.4 | 19.8 | 19 | 19.7 | 19.8 |
| Slump (in) | 6.0 | 6.5 | 5.0 | 6.0 | 4.5 | 6.0 | 6.0 |
| Air (%) | 1.8% | 1.5% | 1.1% | 1.6% | 1.1% | 1.6% | 1.2% |
| Unit Mass (kg/m3) | 2410 | 2373 | 2381 | 2373 | 2390 | 2376 | 2373 |
| Norm Unit Mass (kg/m3) | 2454 | 2409 | 2408 | 2411 | 2416 | 2414 | 2402 |
| Rel. slump | 92% | 100% | 77% | 92% | 69% | 92% | 92% |
| Relative air | 120% | 100% | 73% | 107% | 73% | 107% | 80% |
| Rel. unit mass | 101% | 100% | 100% | 100% | 101% | 100% | 100% |

Figure 54:
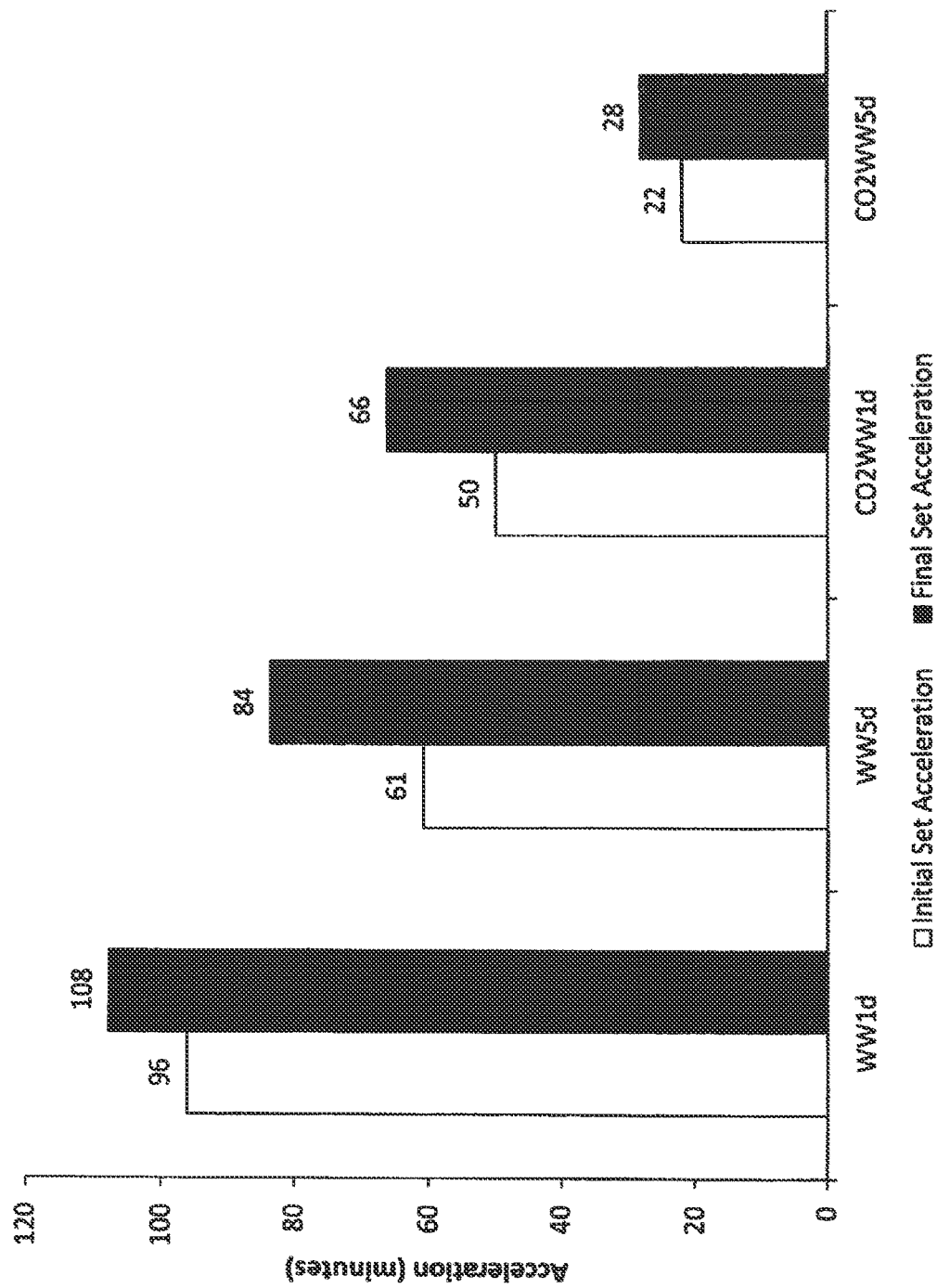
FIG. 54 shows effects of untreated and carbon dioxide-treated wash water used in mortar cubes on set times of the mortar cubes.

The effects of various treatments on set acceleration of mortar cubes made with the wash waters are shown in FIG. 54. The $CO_2$ reduced the set acceleration. The $CO_2$ reduced the Initial set acceleration by 48% for 1 day wash water, and 64% for 5 day old wash water. The $CO_2$ reduced the Final set acceleration by 39% for 1 day wash water, and 66% for 5 day old wash water.

Figure 55:
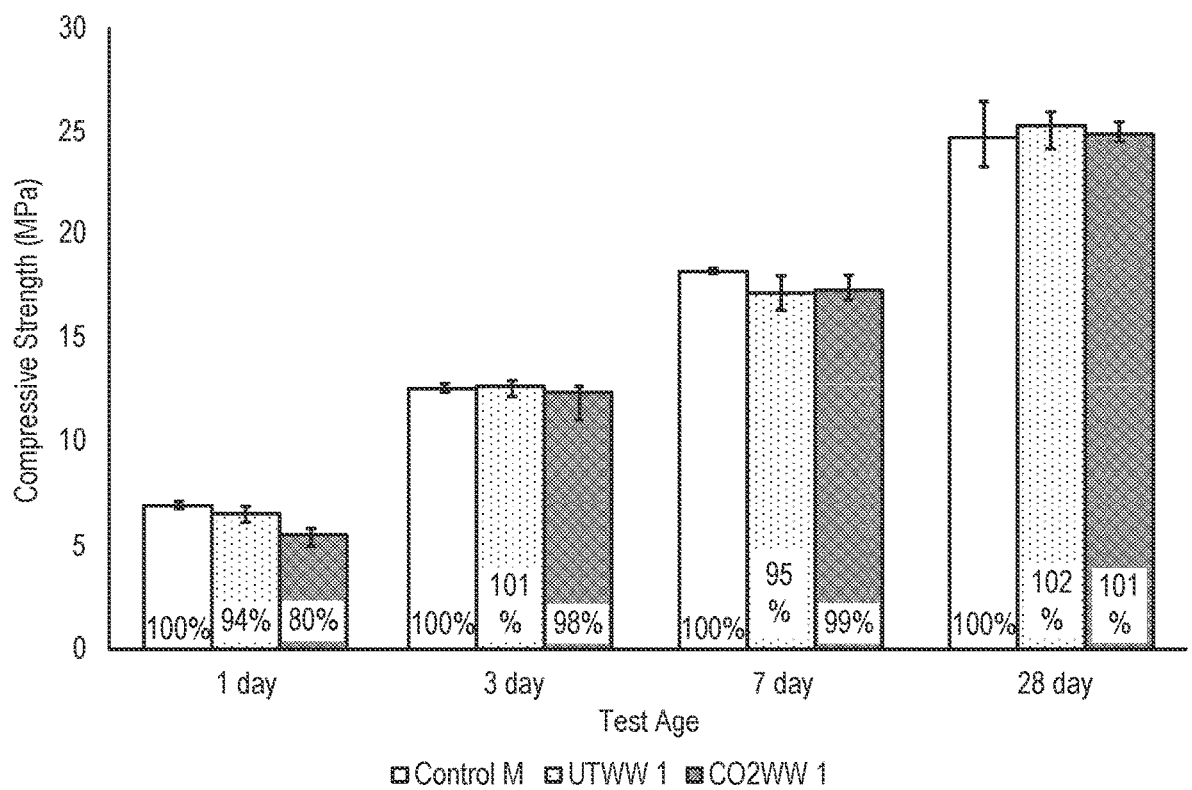
FIG. 55 shows the effects of untreated and carbon dioxide-treated wash water aged one day used in mortar cubes on compressive strengths of the mortar cubes.
Figure 56:
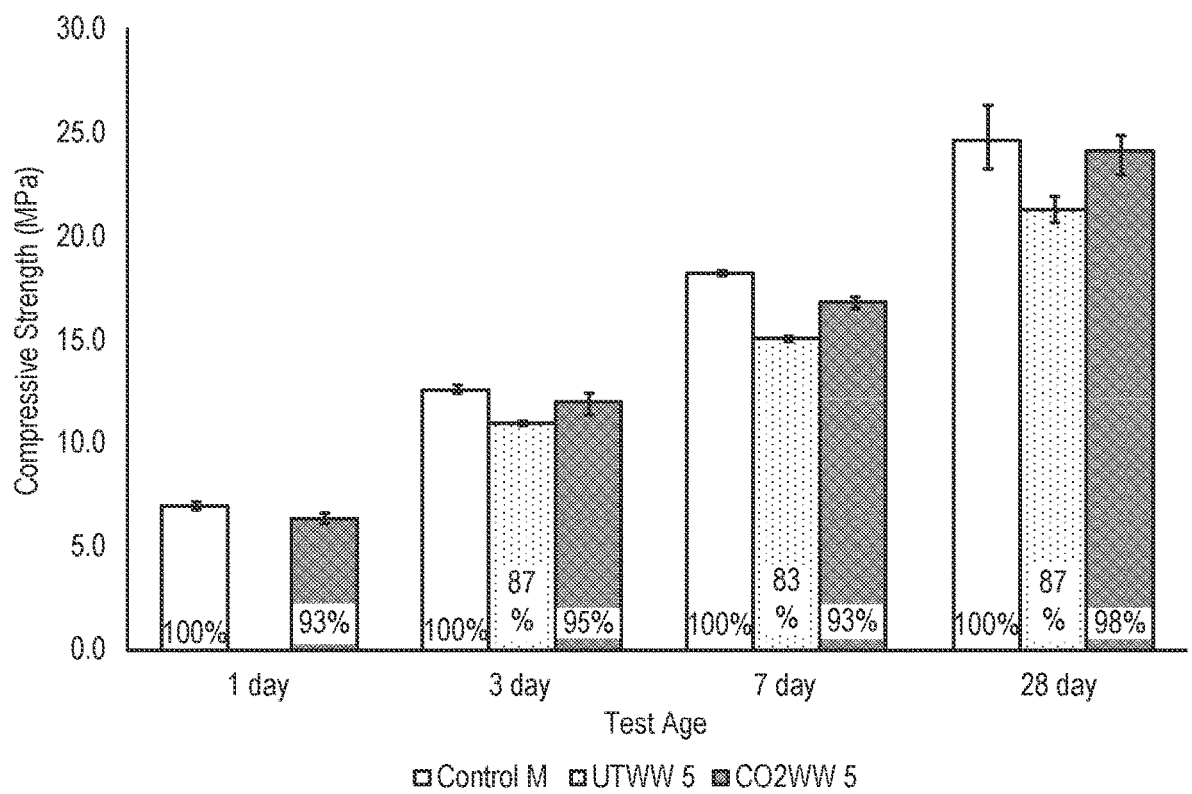
FIG. 56 shows the effects of untreated and carbon dioxide-treated wash water aged five day used in mortar cubes on compressive strengths of the mortar cubes.
Figure 57:
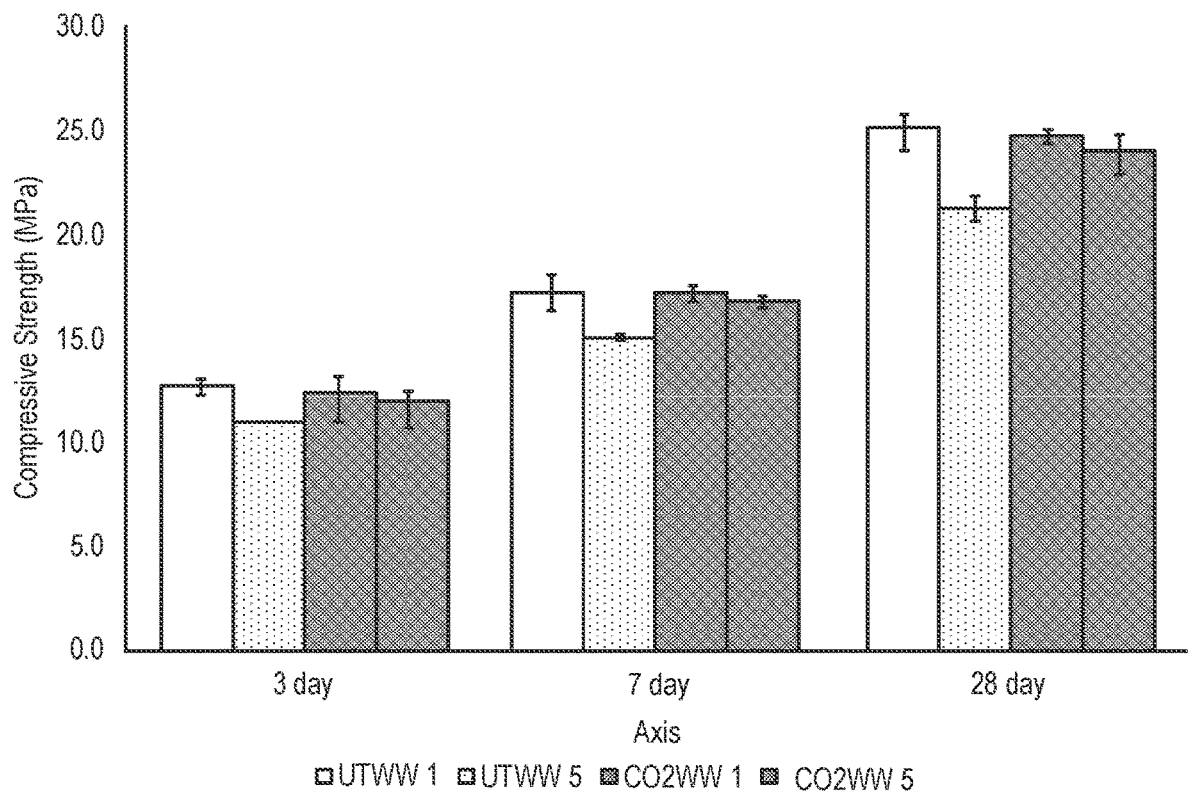
FIG. 57 shows the effects of untreated and carbon dioxide-treated wash water aged one to five day used in mortar cubes on compressive strengths of the mortar cubes.

The effects of various treatments on strength of mortar cubes made with the wash waters are shown in FIGS. 55-57. Concrete was an average of 3 specimens in all cases. FIG. 55 shows that for 1 day old wash water the concrete performs equivalent to the control at 28 days. There is 6 percent less binder in the wash water mix designs, so the corresponding amount of wash water solids contributes to the concrete strength. FIG. 56 shows the strength of concrete produced with untreated wash water aged 5 days is 13 to 17% lower than the control concrete (13% lower at 28 days). If the wash water is treated with $CO_2$ the performance relative to the control is only 2 to 7% lower (2% lower at 28 days $CO_2$ improves the strength of concrete produced with 5 day old wash water. FIG. 57 shows increasing the age of the wash water from 1 to 5 days meant the concrete produced with untreated water showed a strength decrease of 12-15%. If the wash water was treated with CO2 the strength with 5 day old wash water was only 2-3% less than with 1 day old wash water.

It appeared that the air content may have been impacted by the wash water. While there was no apparent impact when using 1 day old wash water, both the batches of concrete made with 5 day old wash water (both untreated and $CO_2$ treated) had an air content about 20 to 30% lower than the control. Unit mass and normalized unit mass (normalized for air differences) were consistent among the batches.

Example 9

In this example, a concrete batching facility utilizes the methods and compositions of the invention to treat concrete truck wash water with carbon dioxide, and to utilize the treated wash water, including solids, in subsequent concrete batches. Table 6 shows expected economic savings as well as carbon dioxide sequestration and offsets; the Table assumes an annual plant concrete production of 75,000 m$^3$; it will be appreciated that values can be adjusted for greater or lesser production, depending on plant size. In addition, depending on efficiencies of operations and other factors, amounts of carbon dioxide sequestered, economic savings, and the like can vary; however, the Table indicates how values for carbon dioxide sequestration and economic offsets may be calculated.

It can be seen that there is both an environmental advantage and an economic advantage to treating concrete wash water and other waste produced in concrete production (e.g., returned concrete) with carbon dioxide, which is typically combined with reuse of wash water solids in subsequent batches. The amount of $CO_2$ offset in this example is 6.7% of the total $CO_2$ emissions of the plant; as carbon dioxide from cement production is a significant portion of world greenhouse gas production, this represents a significant impact on greenhouse gas emissions. Depending on efficiency of carbon dioxide uptake and amount of solids re-used, this number can be even higher, e.g., greater than 8% or even greater than 10%. Additionally, the concrete plant realizes savings of hundreds of thousands of dollars per year, just from the value of cement avoided and the reduction in landfill costs. An additional economic impact, not shown in Table 6, can come in areas where there is a price on carbon, especially if cement production and concrete production are coupled.

TABLE 6

Metrics associated with $CO_2$ treated wash water and reuse in concrete

| Plant Details | Metric | | US | | Comment |
| --- | --- | --- | --- | --- | --- |
| | Value | Unit | Value | Unit | |
| Annual plant production | 75,000 | m$^3$ | 98096 | yd$^3$ | |
| Solids from Washing | | | | | |
| Truck capacity | 8 | m$^3$ | 10.6 | yd$^3$ | Capacity of concrete mixer truck |
| Trucks per year | 9,375 | trucks | | | |
| Mass of material remaining in drum | 272 | kg | 600 | lbs | NRMCA Discussion |
| Washout rate | 50% | | | | Truck washes out drum after every second load |
| Annual Mass of solids from washing out | 1,275 | tonnes | 1,405 | tons | |
| Cement fraction in solids from washing out | 60% | | | | Estimate |
| Cement in solids from washing out | 765 | tonnes | 844 | tons | |
| $CO_2$ sequestered by cement fraction | 40% | % bwc | | | bwc = by weight cement, Based on lab testing |
| Amount of $CO_2$ sequestered annually | 306 | tonnes | 338 | tons | |
| Liquids from Washing | | | | | |
| Wastewater generated per cubic meter of concrete | 120 | L | 32 | gal | From NRMCA Industry-Wide EPD |
| Density of wastewater | 1.00 | kg/L | 8.4 | lbs/gal | Assume only clarified liquid portion of wastewater |
| Fraction of wastewater requiring neutralization | 90% | | | | Assume some liquid lost to evaporation, etc . . . |
| Annual wastewater produced | 8,100 | Tonnes | 8,929 | tons | |
| Initial wastewater pH | 13 | — | | | Assume all [OH—] |
| Final wastewater pH | 7 | | | | |

TABLE 6-continued

Metrics associated with $CO_2$ treated wash water and reuse in concrete

| Plant Details | Metric Value | Unit | US Value | Unit | Comment |
|---|---|---|---|---|---|
| Required change in [OH—] conc | 0.100 | mol/L | | | |
| number of [OH—] moles | 809,999 | mols | | | |
| Molecular weight of $CO_2$ | 44 | g/mol | | | |
| number of $CO_2$ moles | 405,000 | mols | | | Assume $2OH^- + CO_2 \rightarrow CO_3^{2-} + H_2O$ |
| Amount of $CO_2$ sequestered annually | 18 | Tonnes | 20 | tons | |
| Solids from Returned Concrete | | | | | |
| Concrete return rate | 5% | | | | From NRMCA Report "Crushed Returned Concrete as Aggregates for New Concrete" |
| Fraction of returned concrete requiring disposal | 75% | | | | Assume some concrete is rebatched or used for saleable products (barriers, etc . . .) |
| Annual returned concrete disposal | 2,813 | m³ | 3679 | yd³ | |
| Average cement loading | 338 | kg/m³ | 570 | lbs/ yd³ | NRMCA Benchmark cement loading 4000 psi mix 570 lbs/yd3 or 338 kg/m3 |
| Annual cement in returned concrete | 951 | tonnes | 1048 | tons | |
| Amount of $CO_2$ sequestered annually | 380 | tonnes | 419 | tons | |
| Potential $CO_2$ Reduction Cement related emissions generation | | | | | |
| Total annual cement use | 25,350 | tonnes | 27,944 | tons | |
| Cement emissions intensity | 1.040 | | | | PCA EPD 2016 concludes 1.040 |
| Distance cement plant to concrete producer | 117.6 | km/delivery | 73.1 | mi/delivery | NRMCA_BenchmarkReportV2_20161006.pdf |
| Emissions factor of transport | | | 1.430 | Kg $CO_2$/ vehicle-mile | emission-factors_nov_2015.pdf |
| Vehicle emissions | 104.5 | kg $CO_2$/ delivery | 104.5 | kg $CO_2$/ delivery | google search |
| Truck capacity | 27.2 | tonnes | 30 | tons | |
| Specific transport emission of cement | 3.8 | kg $CO_2$/ tonne cement | 3.5 | kg $CO_2$/ ton cement | |
| Total transport emissions of cement | 97.4 | | 107.3 | | |
| Total annual cement related $CO_2$ emissions | 26,461 | tonnes | 29,169 | tons | |
| Solids from Washing | | | | | |
| $CO_2$ Sequestered in solids from washing | 306 | tonnes | 338 | tons | |
| Potential $CO_2$ offset - solids from washing | 1.2% | | 1.2% | | |
| Liquids from Washing | | | | | |
| $CO_2$ sequestered in liquids from washing | 18 | tonnes | 20 | tons | |
| Potential $CO_2$ offset (cement baseline) - liquids from washing | 0.1% | | 0.1% | | |
| Potential $CO_2$ offset (concrete baseline)- liquids from washing | 0.1% | | 0.1% | | |
| Solids from Returned Concrete | | | | | |
| $CO_2$ sequestered in solids from returned concrete | 380 | tonnes | 419 | tons | Needs sophisticated handling to treat effectively (reclaimer, etc . . .) |
| Potential $CO_2$ offset (cement baseline) - solids from returned concrete | 1.4% | | 1.4% | | |
| Potential $CO_2$ offset (concrete baseline)- solids from returned concrete | 1.3% | | 1.3% | | |
| Washwater reuse allowing for cement reduction | | | | | |
| $CO_2$ treated solids available for cement replacement | 1276 | tonnes | 1406 | tons | |
| Rate of cement replacement | 80% | | | | Assume 5 parts treated solids can replace 4 parts virgin cement |

TABLE 6-continued

Metrics associated with CO₂ treated wash water and reuse in concrete

| Plant Details | Metric Value | Unit | US Value | Unit | Comment |
|---|---|---|---|---|---|
| Total cement replaced | 1021 | tonnes | 1125 | tons | |
| Avoided CO₂ from reusing CO₂ treated solids in place of virgin cement | 1061 | tonnes | 117 | tons | |
| Potential CO₂ offset - avoided cement | 4.0% | | 4.0% | | |
| Potential CO₂ offset (concrete baseline) - avoided cement | 3.6% | | 3.6% | | |
| Reduced Cement Transportation | | | | | |
| Cumulative avoided transport emission | 3.9 | tonnes | 4.3 | tons | |
| Potential CO₂ offset (cement baseline)- avoided cement transport | 0.015% | | 0.015% | | |
| Potential CO₂ offset (concrete baseline)- avoided cement transport | 0.013% | | 0.013% | | |
| Combined impacts | | | | | |
| CO₂ Sequestered in solids from washing | 306 | tonnes | 338 | tons | Washwater |
| CO₂ sequestered in liquids from washing | 18 | tonnes | 20 | tons | Washwater |
| CO₂ sequestered in solids from returned concrete | 380 | tonnes | 419 | tons | Washwater |
| Avoided CO₂ from reusing CO₂ treated solids in place of virgin cement | 1061 | tonnes | 1170 | tons | Cement reduction |
| Avoided cement transport emissions | 4 | tonnes | 4 | tons | Cement reduction |
| Total | 1770 | tonnes | 1951 | tons | |
| Cumulative potential CO₂ offset vs. cement emissions | 6.7% | | 6.7% | | |
| Cumulative potential CO₂ offset vs. concrete footprint | 6.0% | | 6.0% | | |
| Cumulative CO₂ utilization | 704 | tonnes | 776 | tons | Excludes avoided |
| Economic Impacts | | | | | |
| Landfill tipping rate | $*50* | $/tonne | $*45* | $/ton | EPA 2014 MSW Landfills - 2012 US National Average |
| Total cement reprocessed in washwater | 1716 | tonnes | 1892 | tons | |
| Cement price | $*165* | $/tonne | $*150* | $/ton | |
| Avoided landfill costs | $85,124 | | $85,124 | | |
| Value of cement avoided | $168,750 | | $168,750 | | |
| Total economic benefit | $253,874 | | $253,874 | | |
| Concrete price | $*128.48* | | $*98.23* | | |
| Concrete producer cost fraction | *80%* | | *80%* | | |
| Plant operating cost | $7,708,779 | | 7,708,779 | | |
| Relative economic impact | −3% | | −3% | | |

Numbers in bold are CO2 sequestered outputs
Numbers in *italics* are *inputs* and *variables*
Numbers in plain text are constants or background calculations The batches were produced with a total binder loading of 307 kg/m³ including the cement, fly ash, and solids contained within the wash water. The batches with lower and higher w/b ratios deviated from this binder loading. In terms of w/b the binder fraction included the cement, fly ash and solids contained in the wash water. The binder batches was 80% cement and 20% fly ash. Batch comparisons are made relative to the baseline of the Control M batch.

Example 10

This Example demonstrates that carbon dioxide treatment of wash water can have an effect on particle size distribution in the wash water.

A Malvern MS3000 was used to measure particle size, stirring speed 2400 rpm, data acquisition time of 60 sec per measurement, 20 measurements per sample, ultrasonic dispersion of 10-20 seconds, liquid medium used was isopropyl alcohol.

Figure 58:
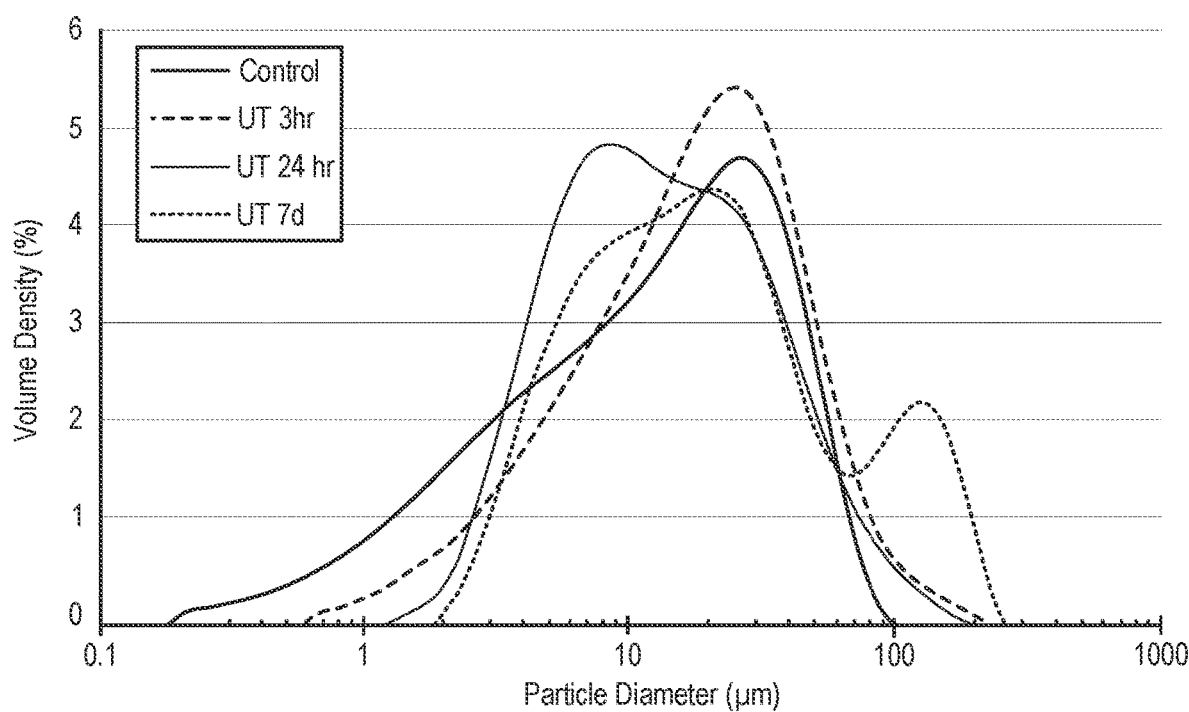
FIG. 58 shows particle distribution in untreated wash water with age.

Eight samples were produced, dried and subjected to particle size distribution analysis
   Anhydrous cement sample
   Paste (w/c 0.5) hydrated 3 hours
   Paste hydrated 3 hours and diluted to specific gravity 1.05
   3 h old 1.05 wash water sample treated with $CO_2$ to neutral pH
   24 hr untreated wash water
   24 hr $CO_2$ treated wash water
   7 day untreated wash water
   7 day $CO_2$ treated wash water In the untreated wash water, the proportion of fines decreased with age, probably as smaller cement particles react (FIG. 58). At 7 days, there is a bimodal particle distribution, and a coarse particle fraction appears. Without being bound by theory, it is thought that hydration product builds up on particles and increases with time.

Figure 59:
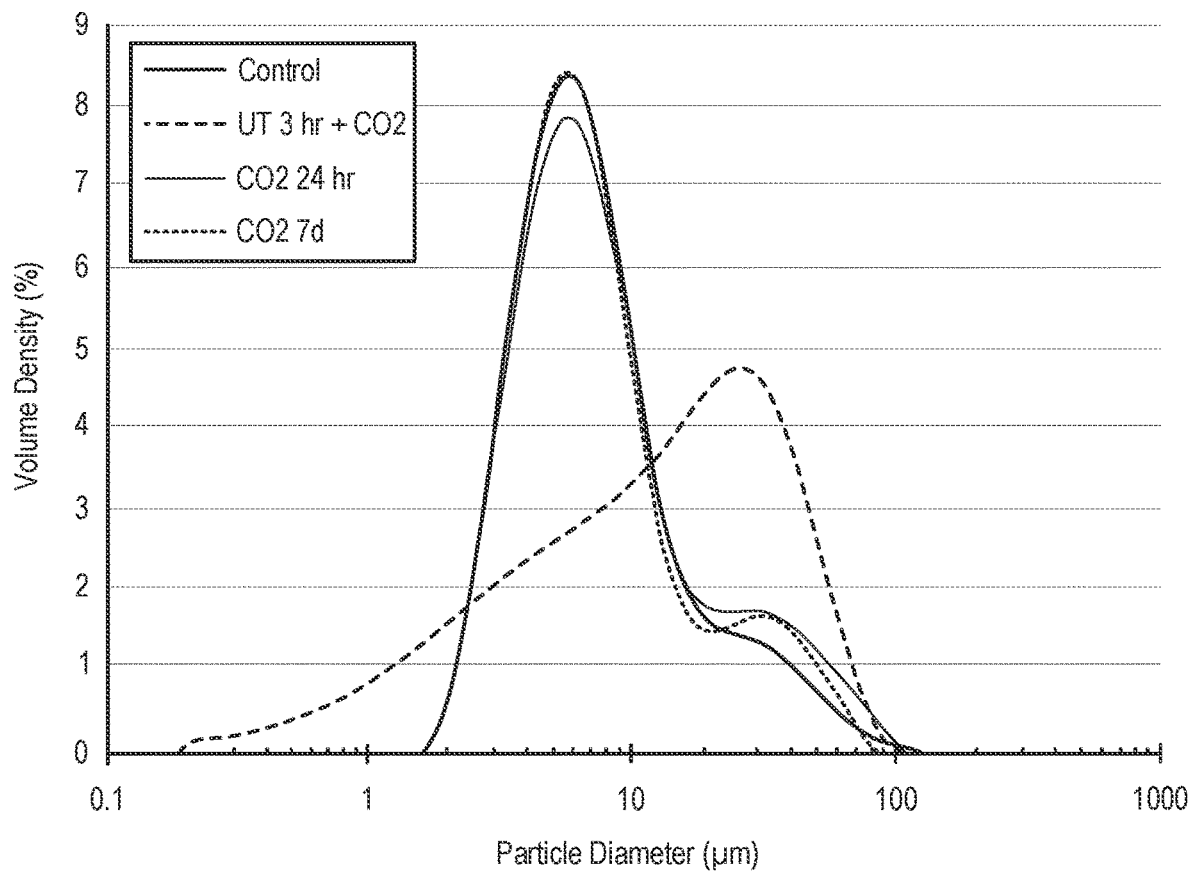
FIG. 59 shows particle distribution in carbon dioxide treated wash water with age.

In the $CO_2$-treated wash water, the particle distribution became finer immediately after $CO_2$ treatment and stays finer (FIG. 59). The distribution did not change with aging (the particles are stable). There was a mild bimodal distribution at 7 days, but no coarsening.

Figure 60:
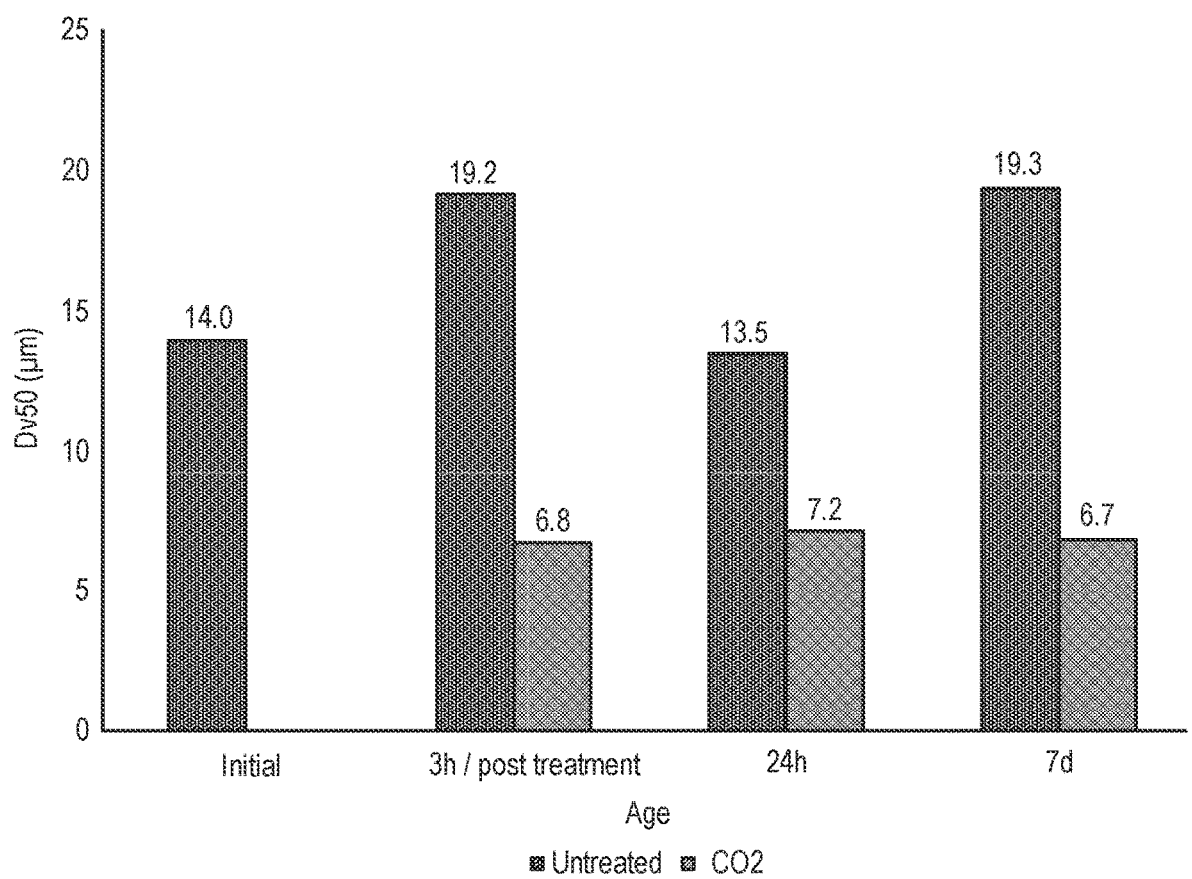
FIG. 60 shows median particle size (Dv50) in untreated and carbon dioxide treated wash water.

The median particle size (Dv50) increased in untreated wash water between 1 and 7 days. The median particle size was decreased by $CO_2$ treatment, with the median particle size about half of the initial particle size, and did not change between 1 and 7 days (FIG. 60).

Figure 61:
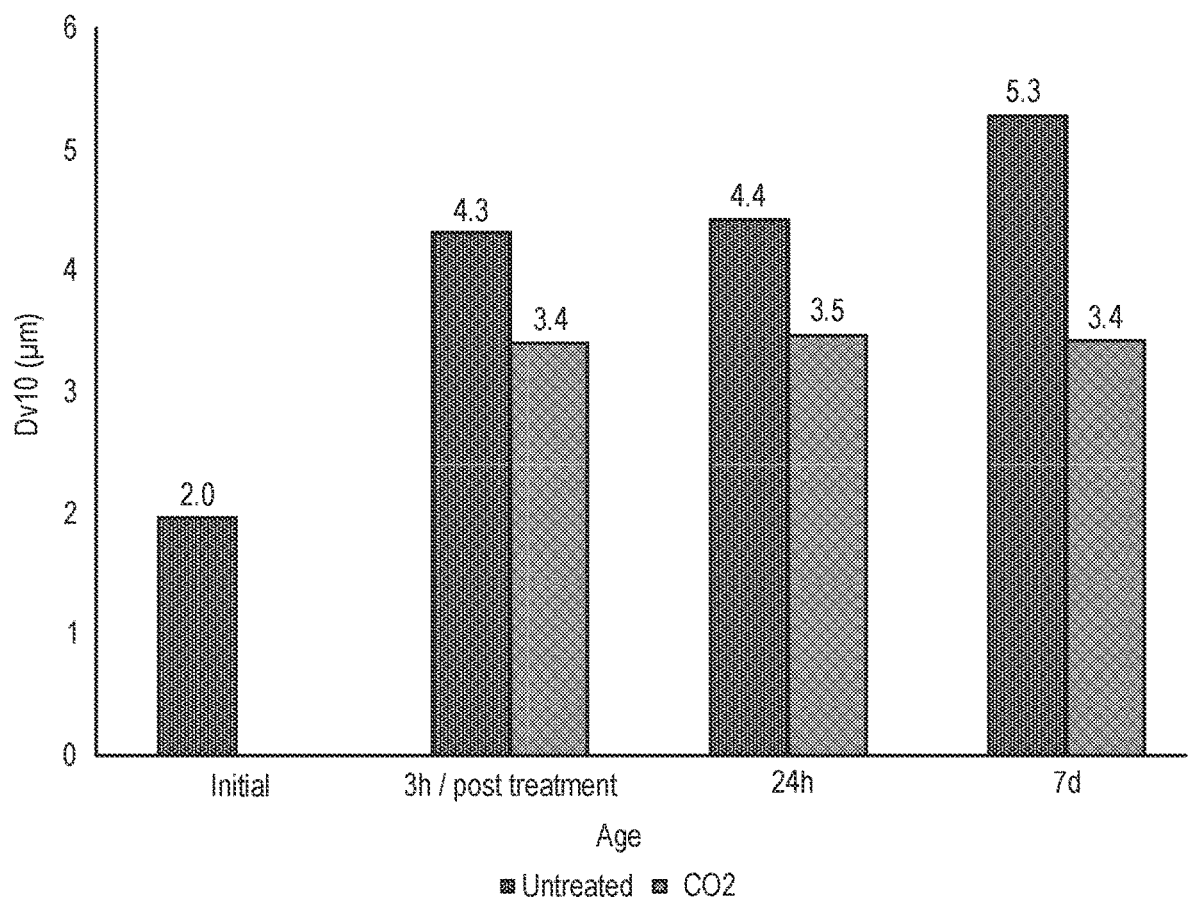
FIG. 61 shows finest fraction of particles (Dv10) in untreated and carbon dioxide treated wash water.

The finest fraction of particles (Dv10, 10% of the particles finer than this diameter) shifted to greater diameters in all treatments. Without being bound by theory, it is thought that the finest cement particles have reacted. The shift is greater in untreated than in $CO_2$-treated wash water. The shift increases as the untreated wash water ages 1 to 7 days, presumably as the finer particles continue to react. In contrast, the finest fraction is stable in $CO_2$-treated wash water aged 1 to 7 days (FIG. 61).

Figure 62:
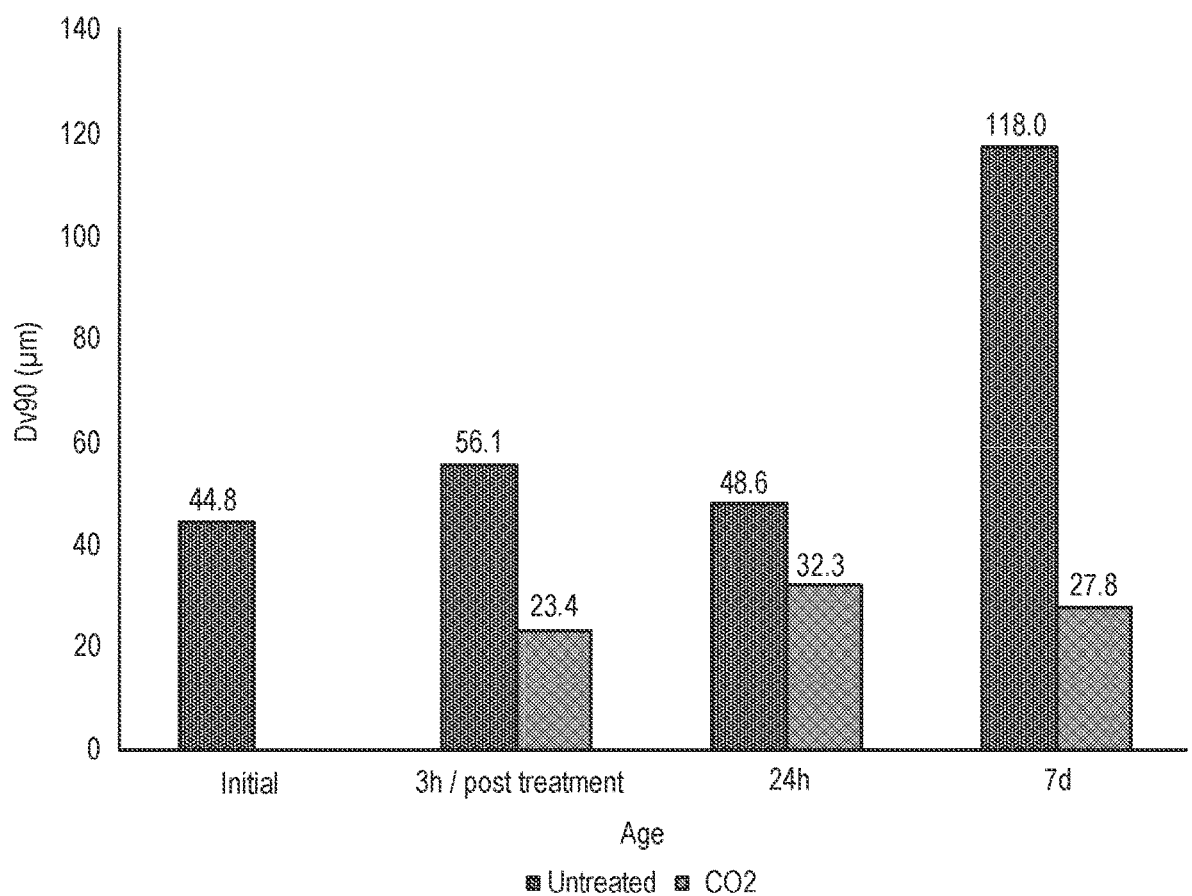
FIG. 62 shows Dv90 in untreated and carbon dioxide treated wash water.

The Dv90 (90% of particles finer than this diameter) shows that particles were coarsening in the untreated wash water, with a large increase seen between 1 and 7 days. In contrast, the $CO_2$ treatment reduces the coarse fraction compared to anhydrous cement, and the particles in the $CO_2$-treated wash water were not coarsening when aged 1 to 7 days (FIG. 62).

Figure 63:
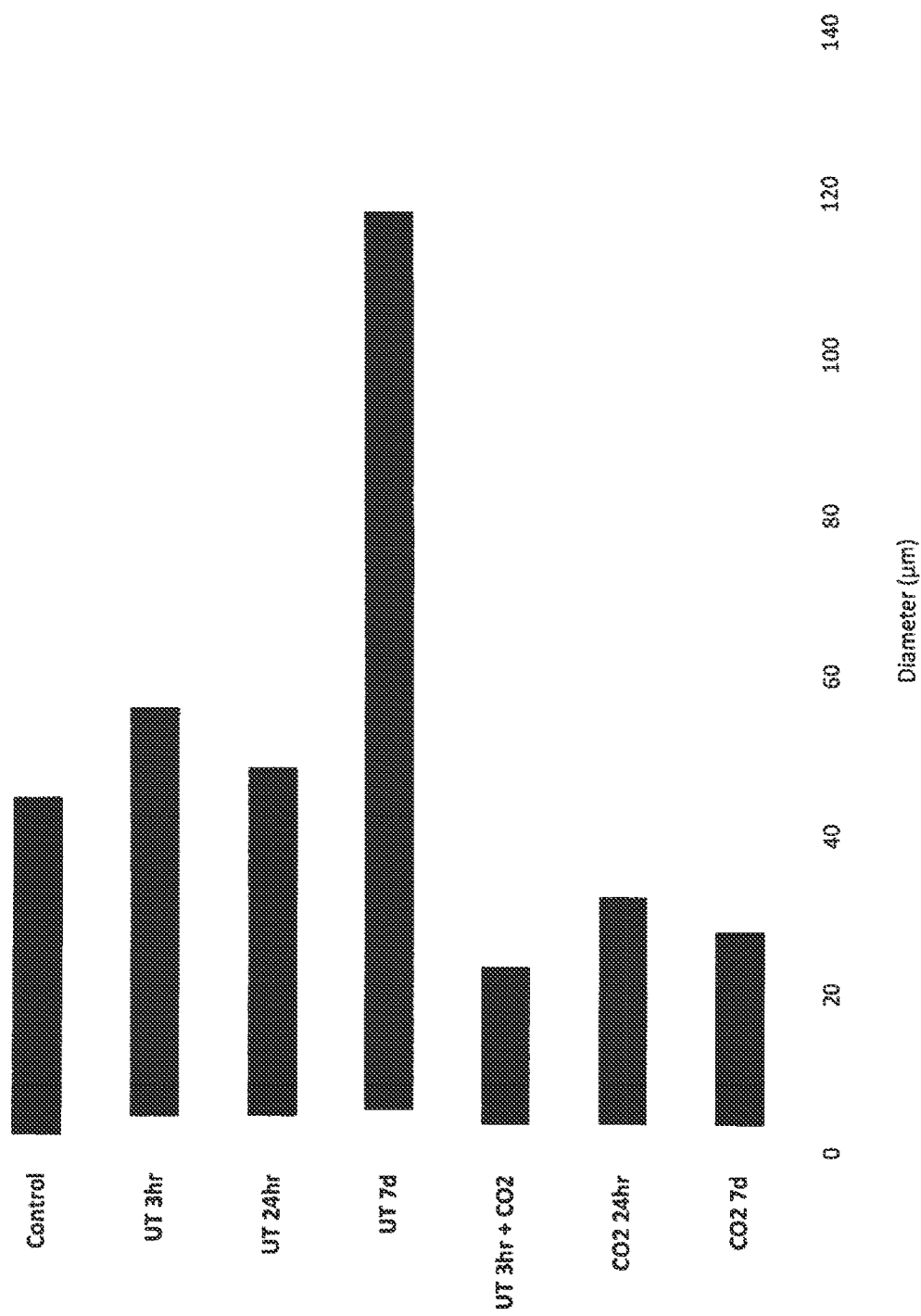
FIG. 63 shows a bar graph of the $10^{th}$, $50^{th}$, and $90^{th}$ percentiles of particle sizes in untreated and treated wash water.

FIG. 63 is a bar plot showing the $10^{th}$, $50^{th}$, and $90^{th}$ percentiles of the various samples.

Figure 64:
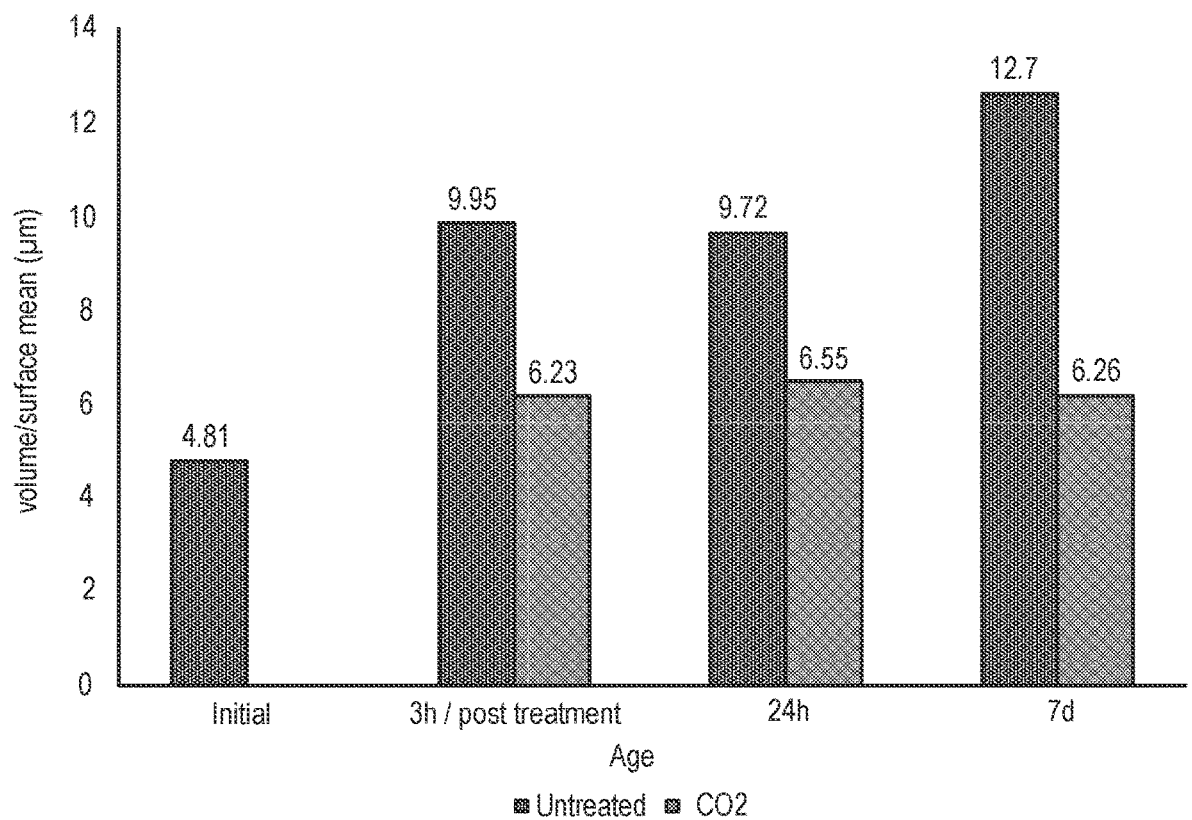
FIG. 64 shows Sauter mean diameters for untreated and carbon dioxide treated wash water.

Sauter mean diameter (SMD) is the diameter of a sphere that has the same volume/surface area ratio as the population of interest. In untreated wash water, it doubles with 3 hr hydration, and increases another 30% from 1 to 7 days. The $CO_2$ treatment decreased the Sauter diameter by 28%. It was stable with aging from 1 to 7 days (FIG. 64).

Figure 65:
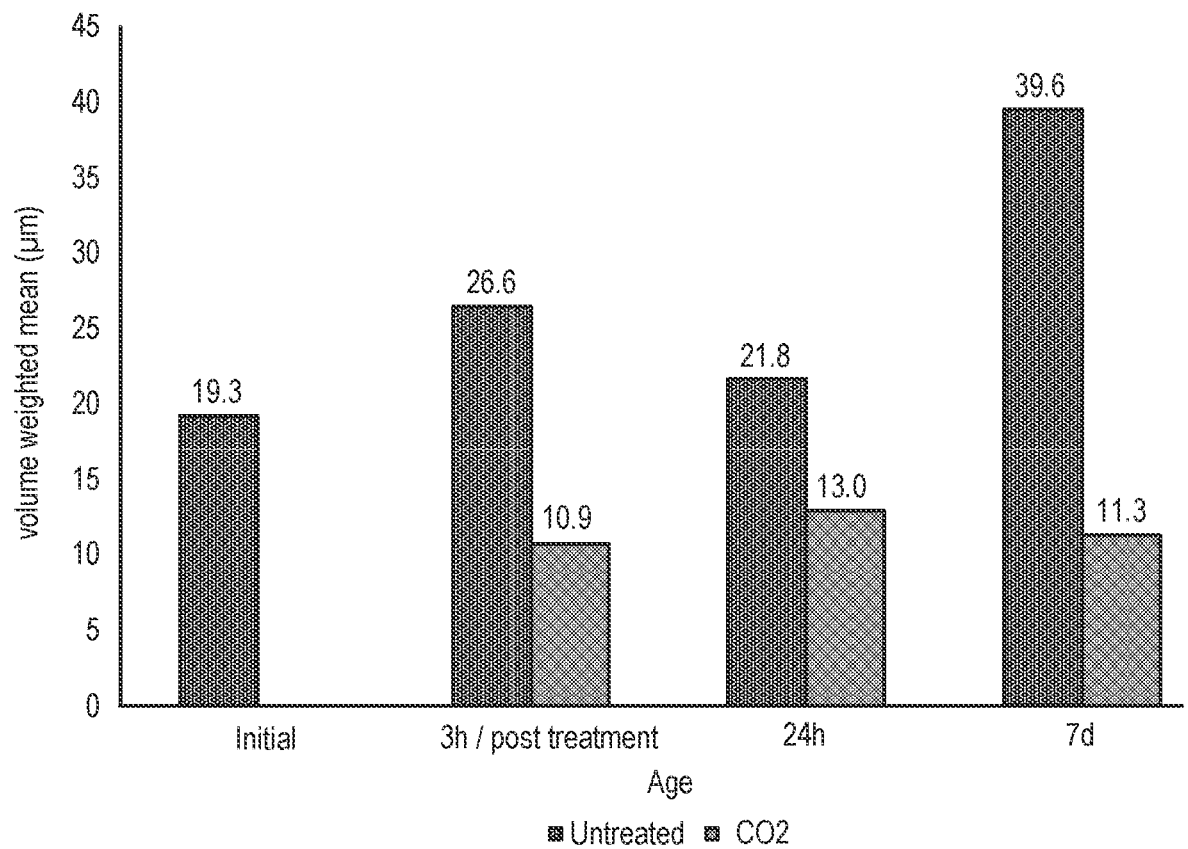
FIG. 65 shows the De Brouckere diameter for particles in untreated and carbon dioxide treated wash water.

The De Brouckere diameter (D(4,3)) is the weighted average volume diameter, assuming spherical particles of the same volume as the actual particles. Often the one number is used to describe a PSD. For untreated wash water the D(4,3) increases, with a doubling over 1 to 7 days aging. The $CO_2$ treatment dropped the D(4,3) to about half that of the initial cement, and it remained stable with aging (FIG. 65).

Figure 66:
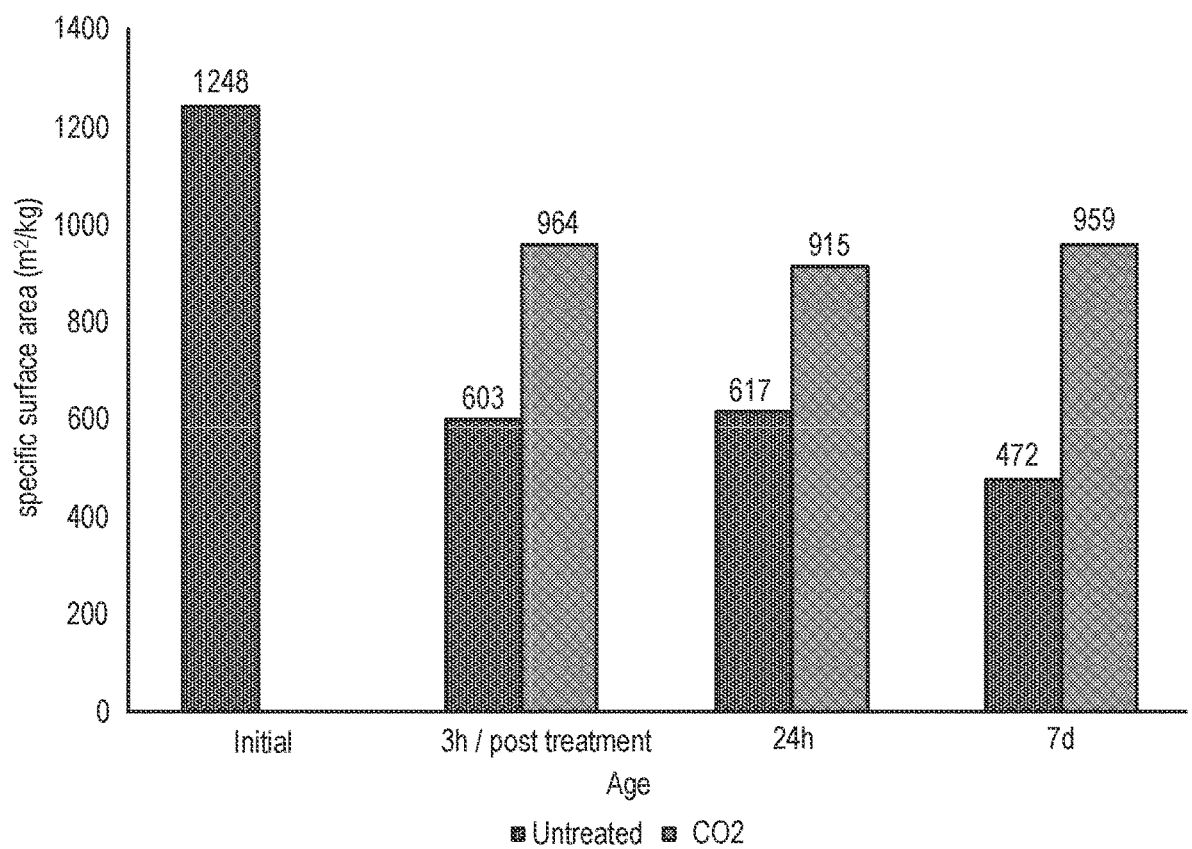
FIG. 66 shows specific surface area (SSA) in untreated wash water with age.
Figure 67:
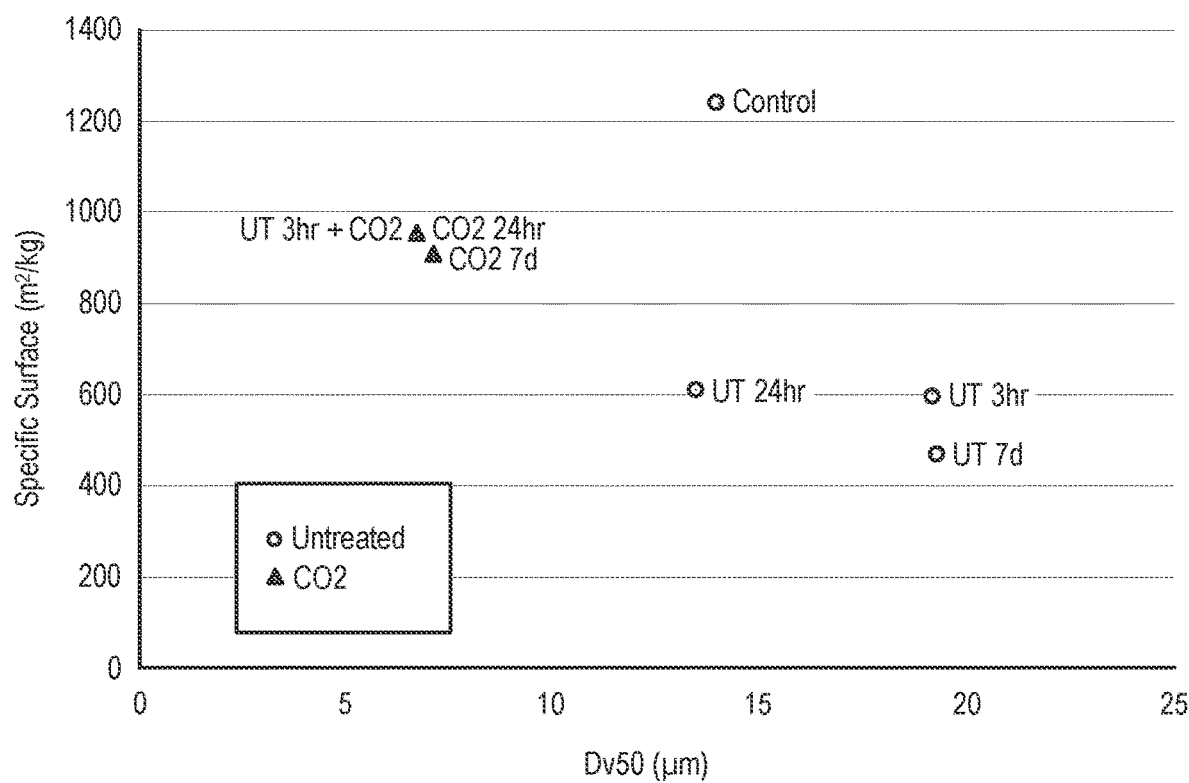
FIG. 67 shows specific surface area (SSA) in carbon dioxide treated wash water with age.

Specific surface area (SSA) by laser diffraction is a calculated value assuming spherical particles. All treatments reduced the specific surface area relative to the starting condition. The untreated wash water SSA was about half the initial value at 24 hours and declined another 25% from 1 to 7 days (FIG. 66). The $CO_2$ treatment caused the SSA to increase 60%, and the SSA was stable at about 25% below the initial value (FIG. 67). The untreated wash water showed a drop in SSA with a coarsening of particles at 3 hours, a shift to finer particles at 24 hrs, and a decline in SSA and increase in median diameter at 7 days. Treatment moved to a lower median diameter and higher SSA, and stayed there.

This Example demonstrates that carbon dioxide treatment can have a rapid and lasting effect on particle size and distribution in wash water, compared to untreated wash water.

Example 11

In this example, the effect of various flow rates of carbon dioxide in wash water samples of differing densities was examined.

Carbon dioxide was delivered at a constant flow rate (12.1 LPM $CO_2$) through an inductor that was circulating 50L of water, with varying mass of solids, in a plastic container. The water was contained in a 77-liter plastic container in which was a submersible pump, ⅓ HP sump pump. On the downstream end of the pump was plastic tubing of 2 foot length, ¼ inch OD. $CO_2$ gas injection occurred at one point along the length of the tubing. Once materials were loaded into the reactor, the pump was activated, and water was agitated through the action of the recycling pump. As described, $CO_2$ delivery was integrated into the pumping step. TABLE 7 shows the various conditions tested:

TABLE 7

Conditions for carbon dioxide injection into wash water

| Sample | Cement (kg) | Fly ash (kg) | Specific Gravity | $CO_2$ Input (LPM) | $CO_2$ Input (g/min) |
| --- | --- | --- | --- | --- | --- |
| 1.05 - M flow - 1C | 3.75 | 0 | 1.05 | 7.9 | 15.6 |
| 1.075 - M flow - 1C | 5.694 | 0 | 1.075 | 7.9 | 15.6 |
| 1.10 - M flow - 1C | 7.683 | 0 | 1.10 | 7.9 | 15.6 |
| 1.05 - H flow - 1C | 3.75 | 0 | 1.05 | 12.1 | 24.0 |
| 1.075 - H flow - 1C | 5.694 | 0 | 1.075 | 12.1 | 24.0 |
| 1.05 - H flow - 0.8C | 2.8125 | 0.9375 | 1.05 | 12.1 | 24.0 |

Variables:
Specific gravity (1.05, 1.07, 1.10)
CO2 Flow rate (15.6 g CO2/min, 24.0 g/min)
Solids: (100% cement, 80% cement with 20% fly ash)
Constants
Water volume 50 litres
Premix time before CO2 addition: 15 min
The results are shown in TABLE 8 and FIGS. 68-82.

TABLE 8

| | Final pH | Final % CO2 | Efficiency | Approx Time to ph 6.5 or lower (min) |
|---|---|---|---|---|
| 1.05 - M flow - 1C | 6.25 | 36% | 58% | 160 |
| 1.075 - M flow - 1C | 6.30 | 33% | 50% | 240 |
| 1.10 - M flow - 1C | 6.25 | 34% | 49% | 330 |
| 1.05 - H flow - 1C | 6.16 | 30% | 56% | 80 |
| 1.075 - H flow - 1C | 6.30 | 33% | 47% | 145 |
| 1.05 - H flow - 0.8C | 6.17 | 24% | 44% | 65 |

Final % CO2 is by weight of cement in the solids

Figure 68:
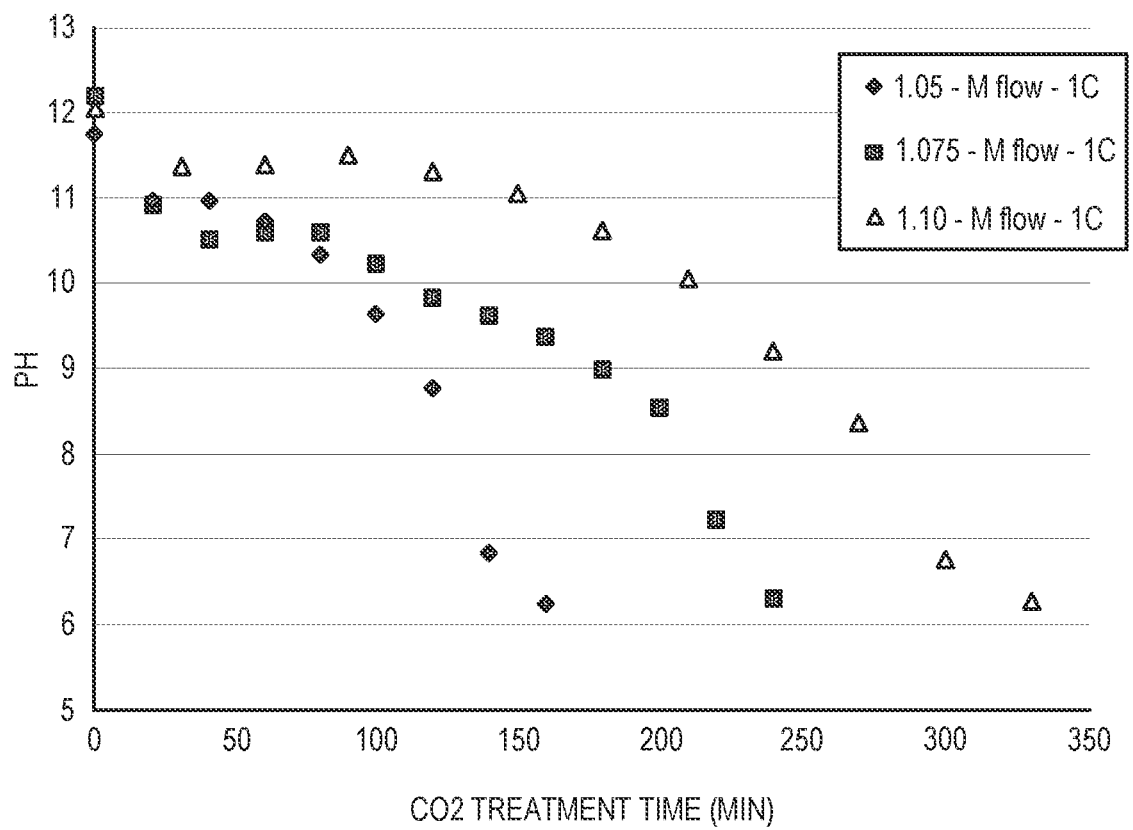
FIG. 68 shows pH decrease over time in wash waters of various specific gravities exposed to carbon dioxide at a medium flow rate.
Figure 69:
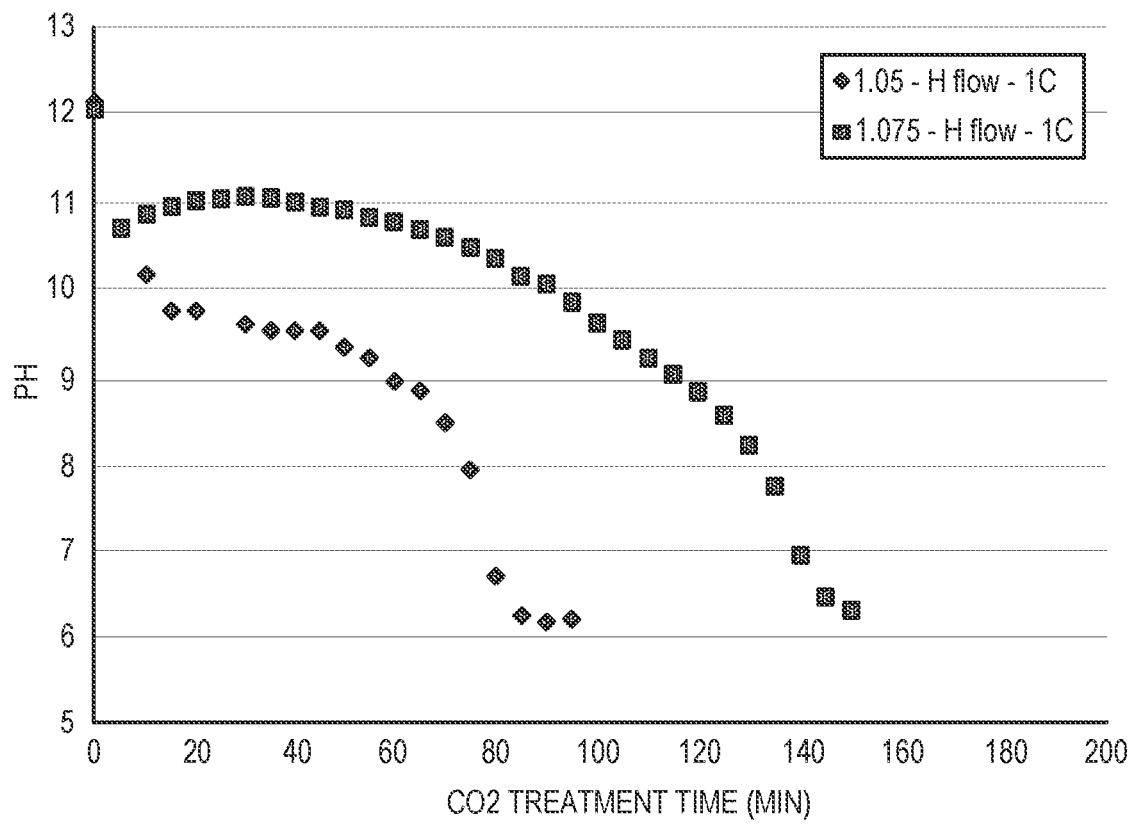
FIG. 69 shows pH decrease over time in wash waters of various specific gravities exposed to carbon dioxide at a high flow rate.
Figure 70:
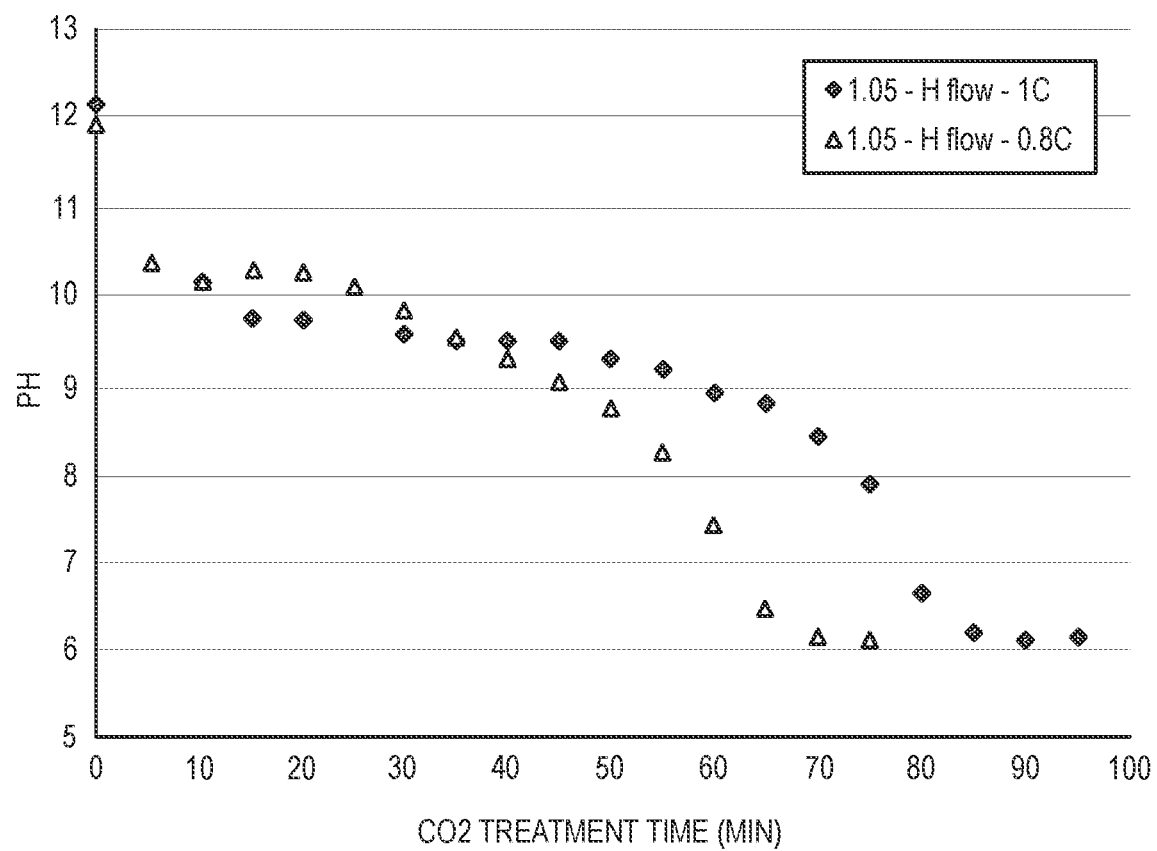
FIG. 70 shows pH decrease over time in wash water of constant specific gravity (solids content), in wash waters of two different cement contents.
Figure 71:
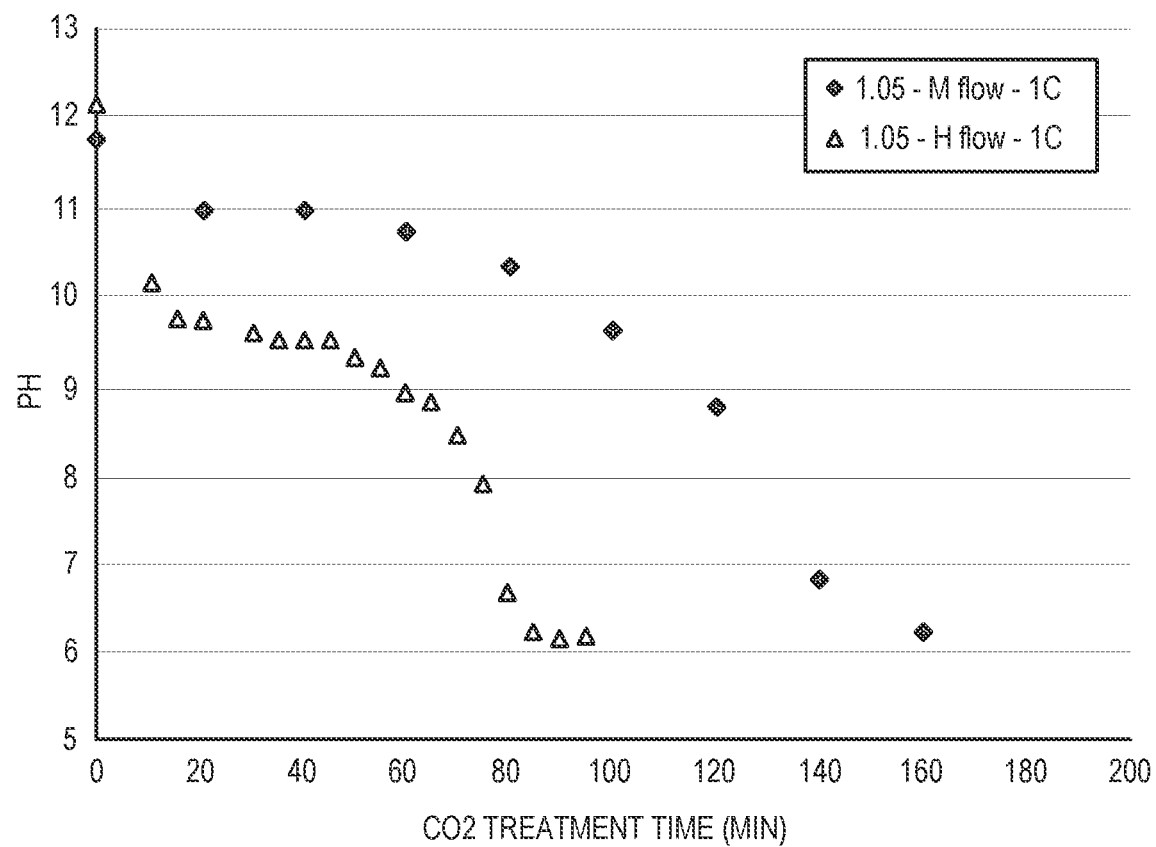
FIG. 71 shows pH decrease over time in wash water of constant specific gravity (solids content) of 1.05, in wash waters exposed to two different rates of carbon dioxide addition.
Figure 72:
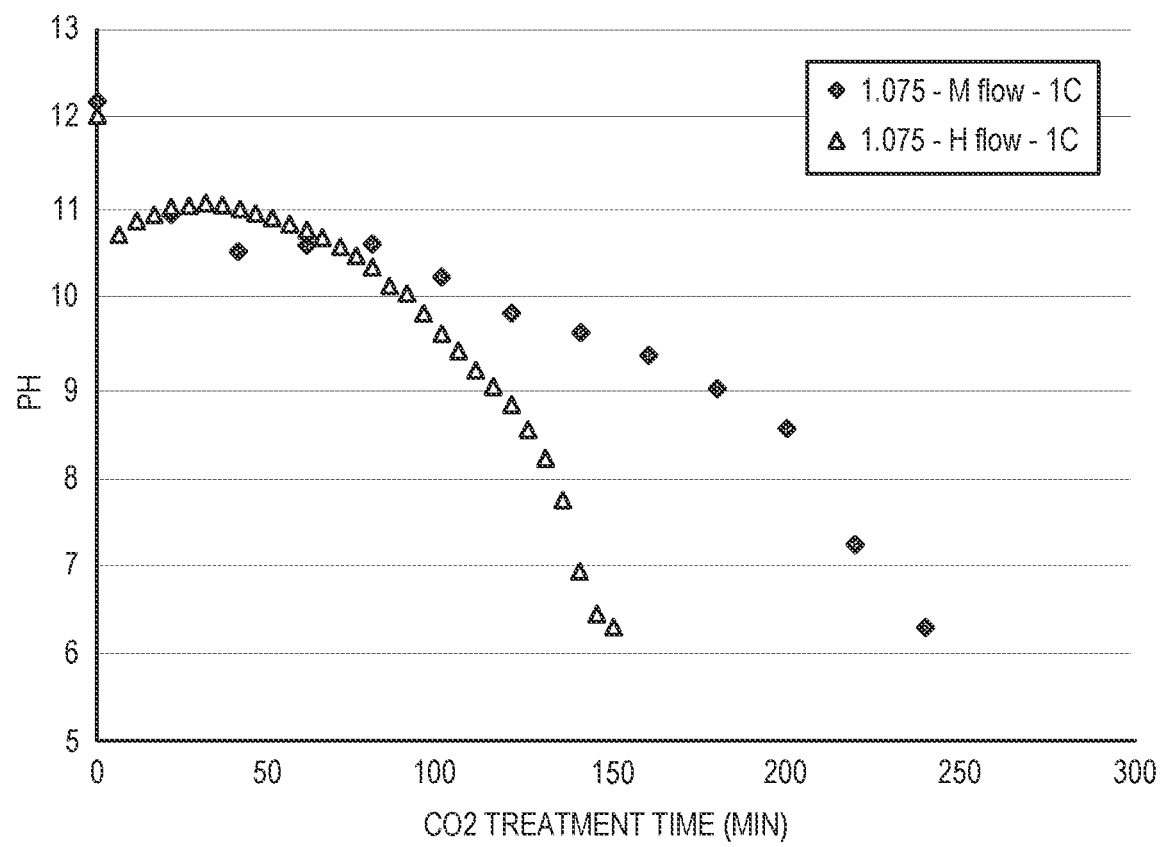
FIG. 72 shows pH decrease over time in wash water of constant specific gravity (solids content) of 1.075, in wash waters exposed to two different rates of carbon dioxide addition.
Figure 73:
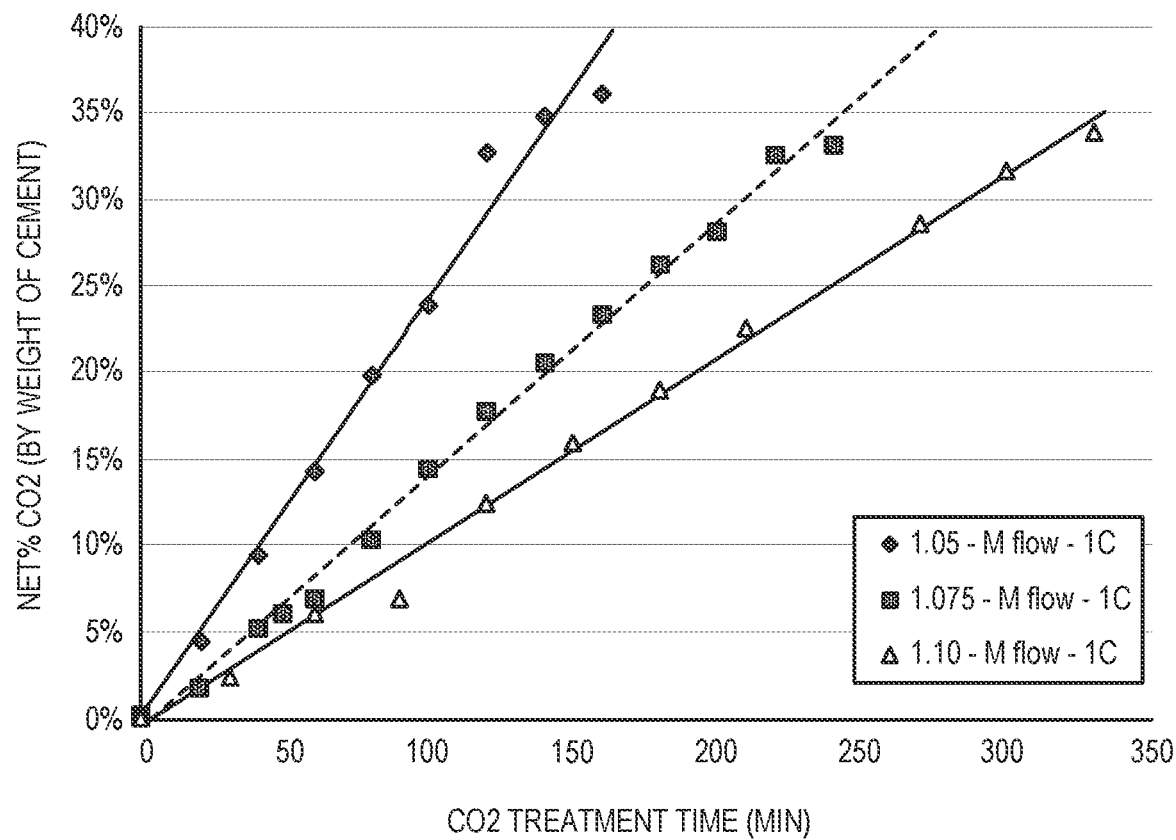
FIG. 73 shows carbon content of solids over time in carbon dioxide-treated wash water at three different specific gravities and medium flow rate of carbon dioxide.
Figure 74:
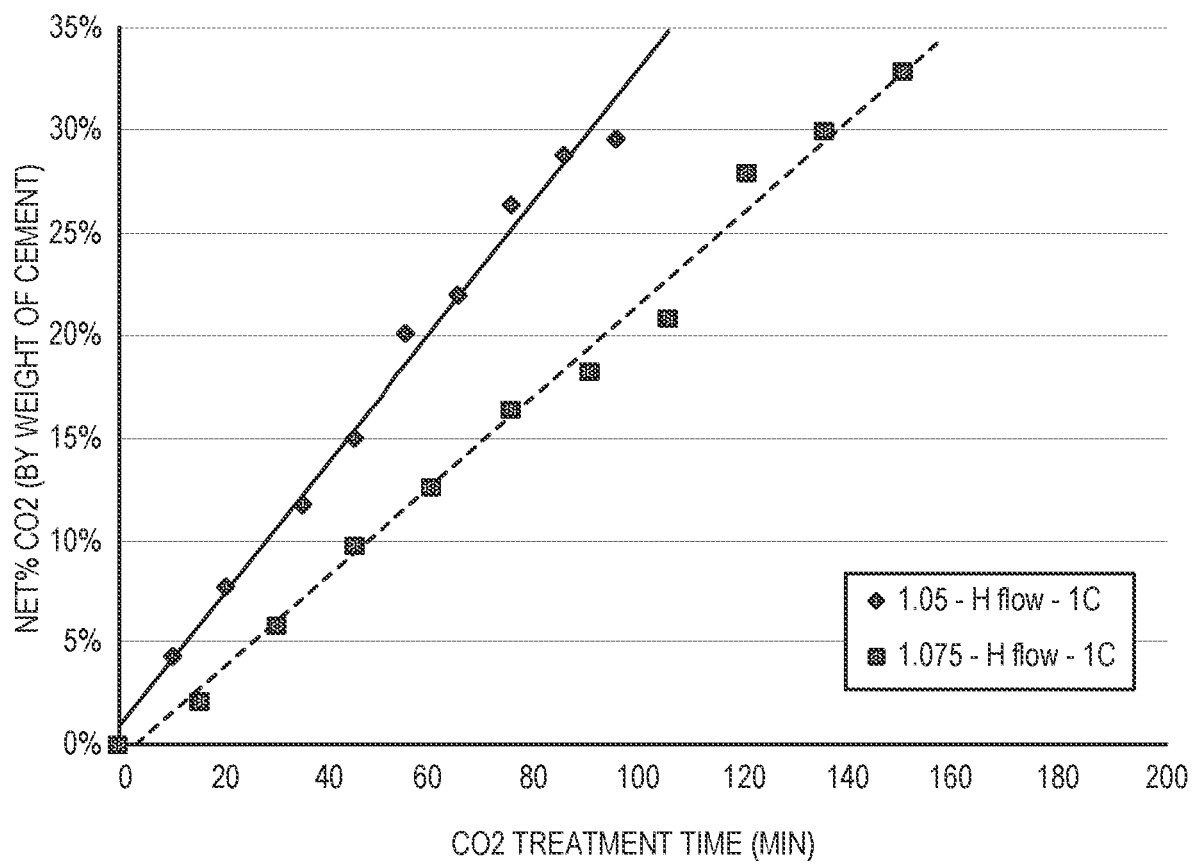
FIG. 74 shows carbon content of solids over time in carbon dioxide-treated wash water at two different specific gravities and high flow rate of carbon dioxide.
Figure 75:
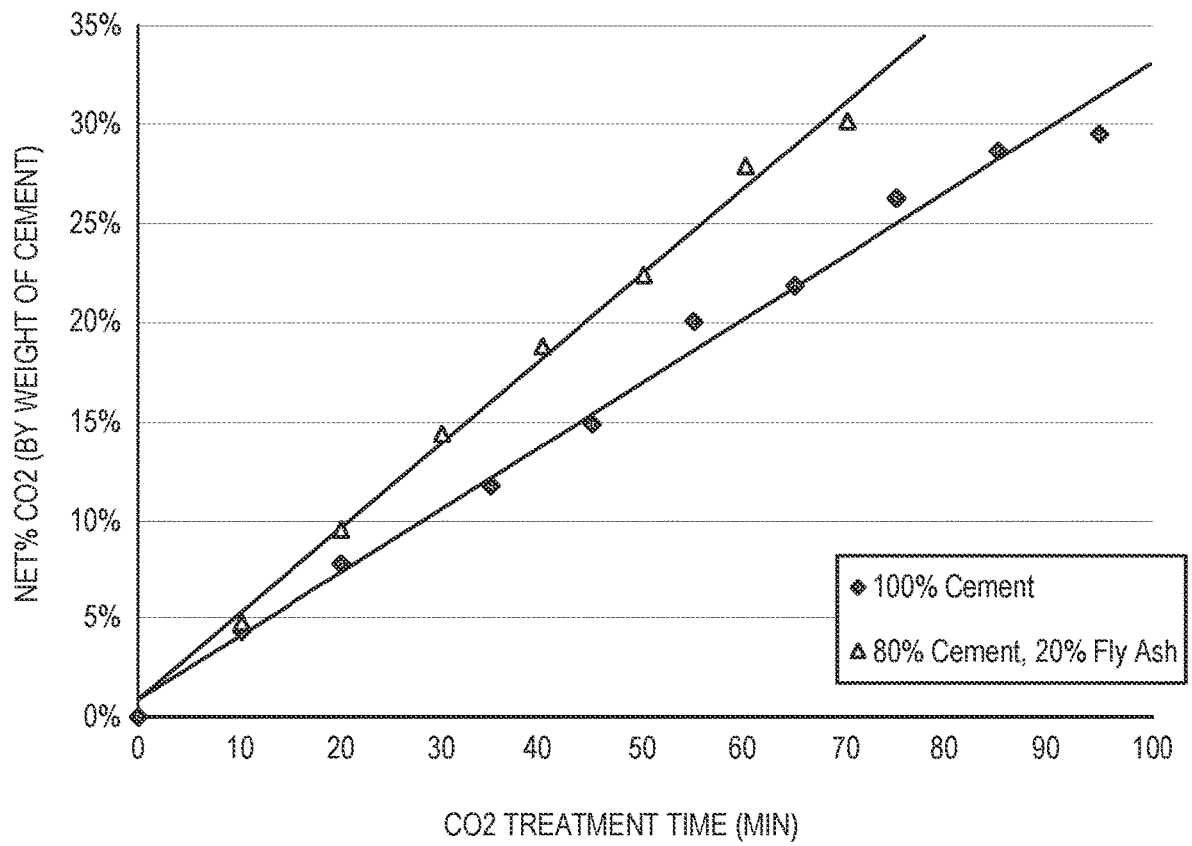
FIG. 75 shows carbon content of solids over time in carbon dioxide-treated wash water at two different cement contents of water.
Figure 76:
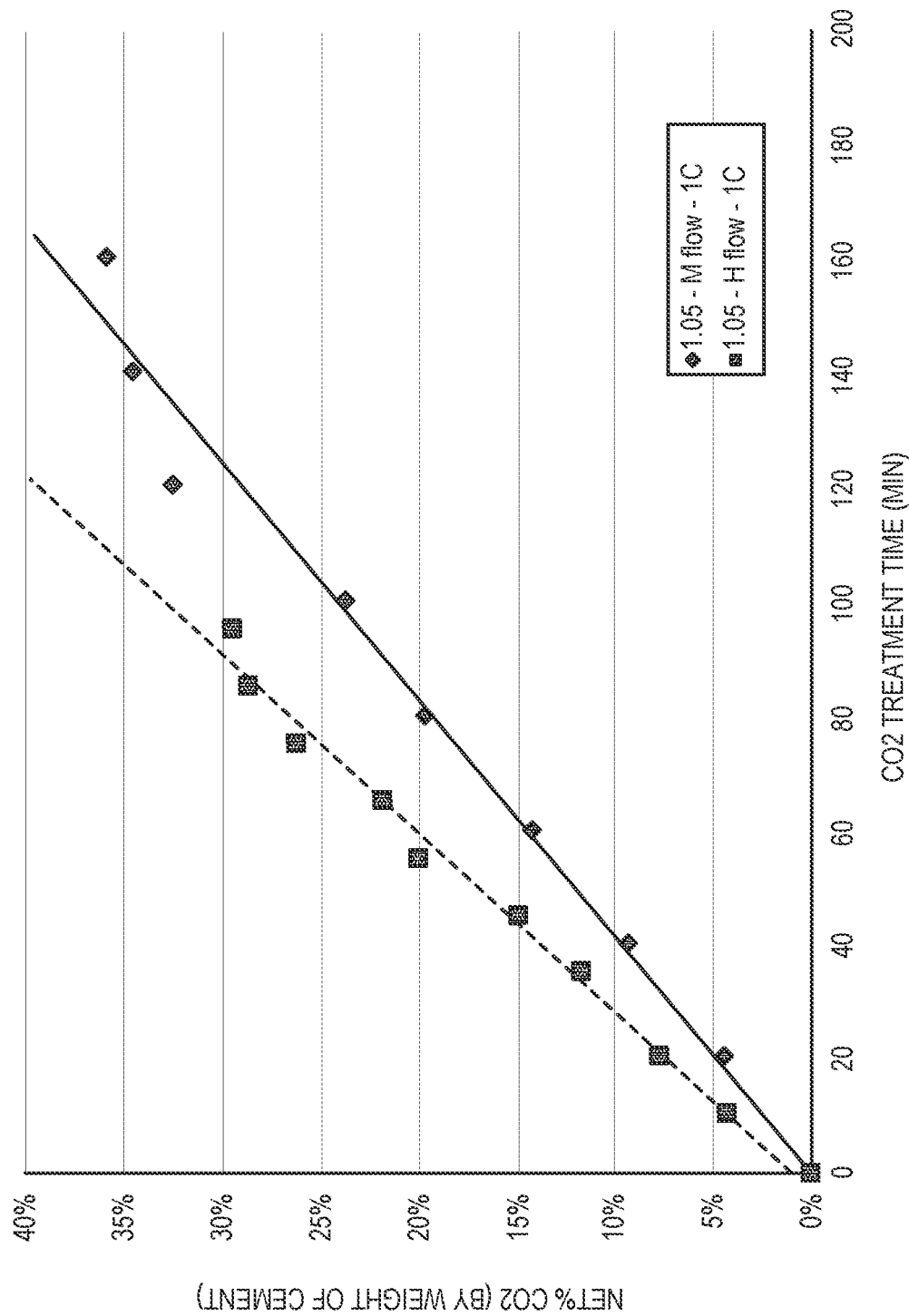
FIG. 76 shows carbon content of solids over time in carbon dioxide-treated wash water of constant specific gravity of 1.05 over time at two different flow rates of carbon dioxide.
Figure 77:
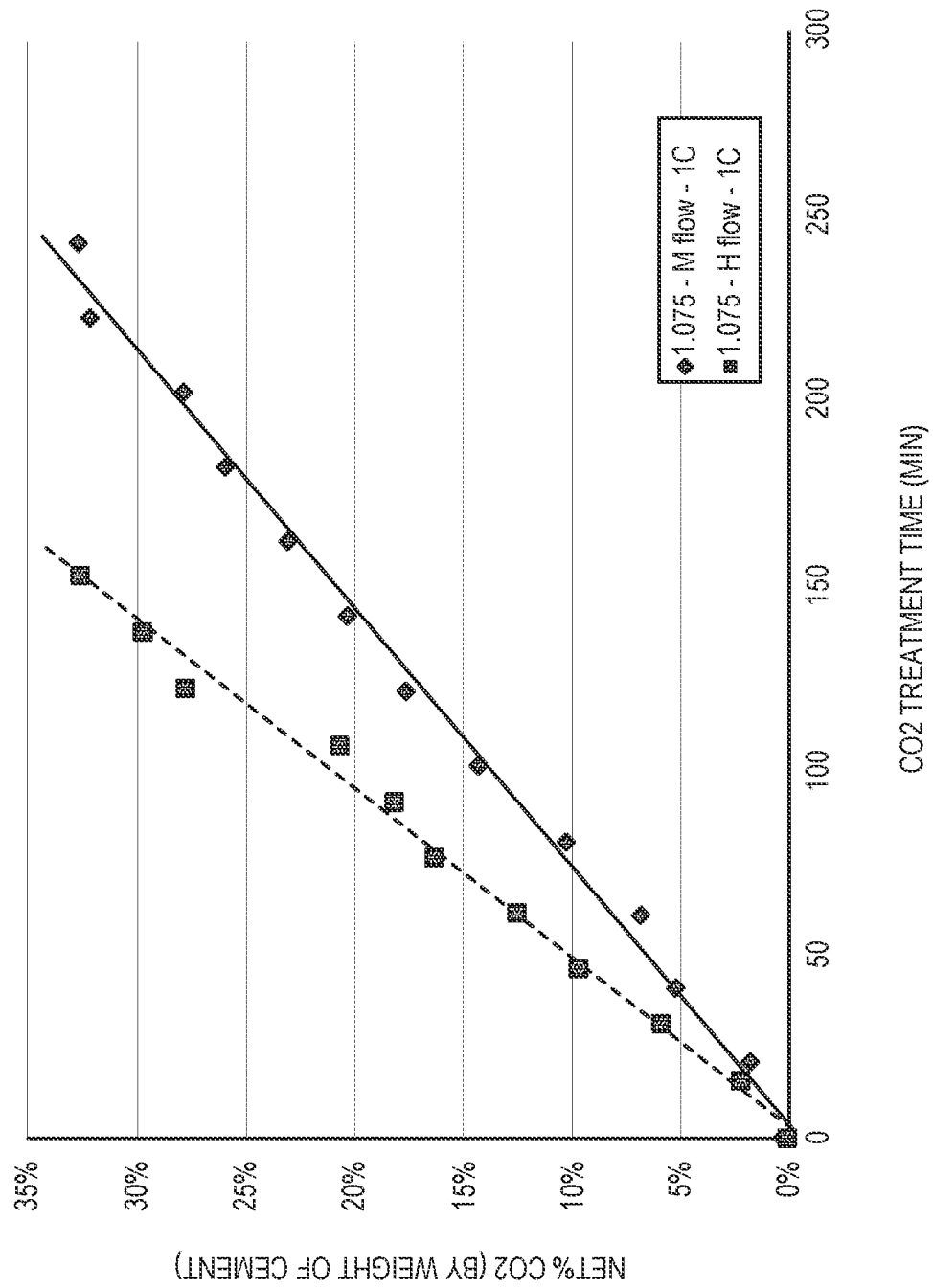
FIG. 77 shows carbon content of solids over time in carbon dioxide-treated wash water of constant specific gravity of 1.075 over time at two different flow rates of carbon dioxide.
Figure 78:
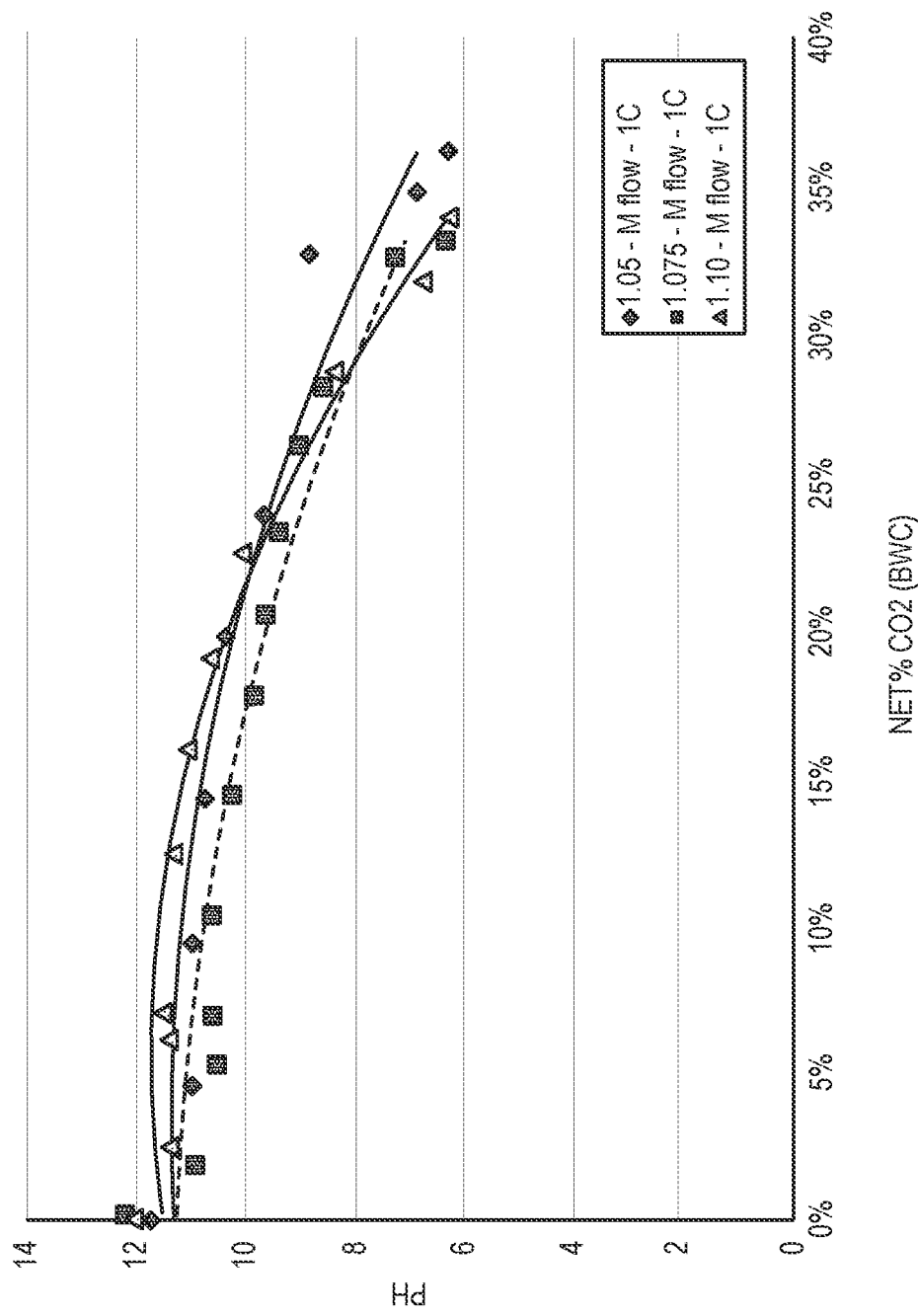
FIG. 78 shows pH vs. carbon content for wash waters of various specific gravities treated with carbon dioxide at a medium flow rate.
Figure 79:
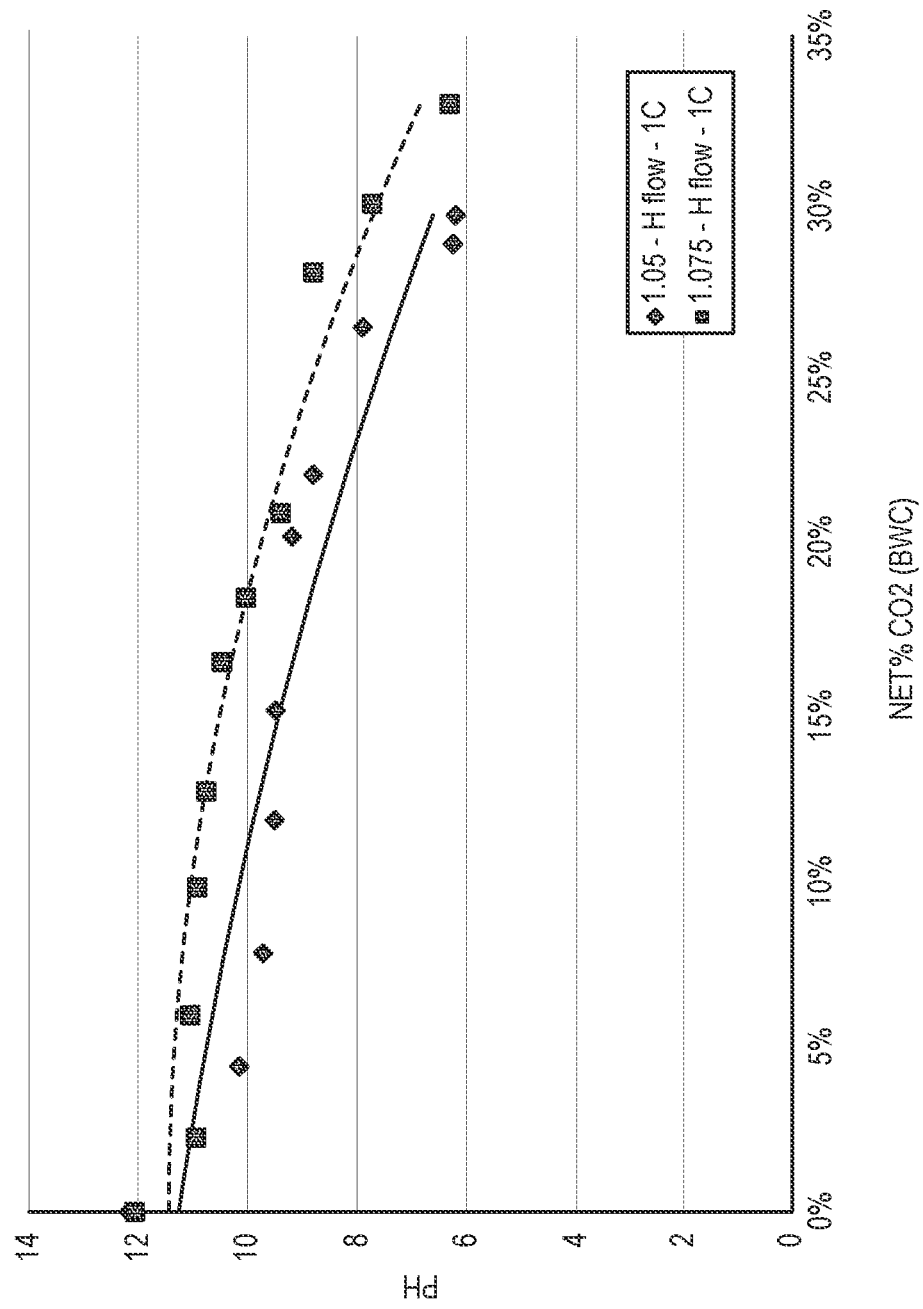
FIG. 79 shows pH vs. carbon content for wash waters of various specific gravities treated with carbon dioxide at a high flow rate.
Figure 80:
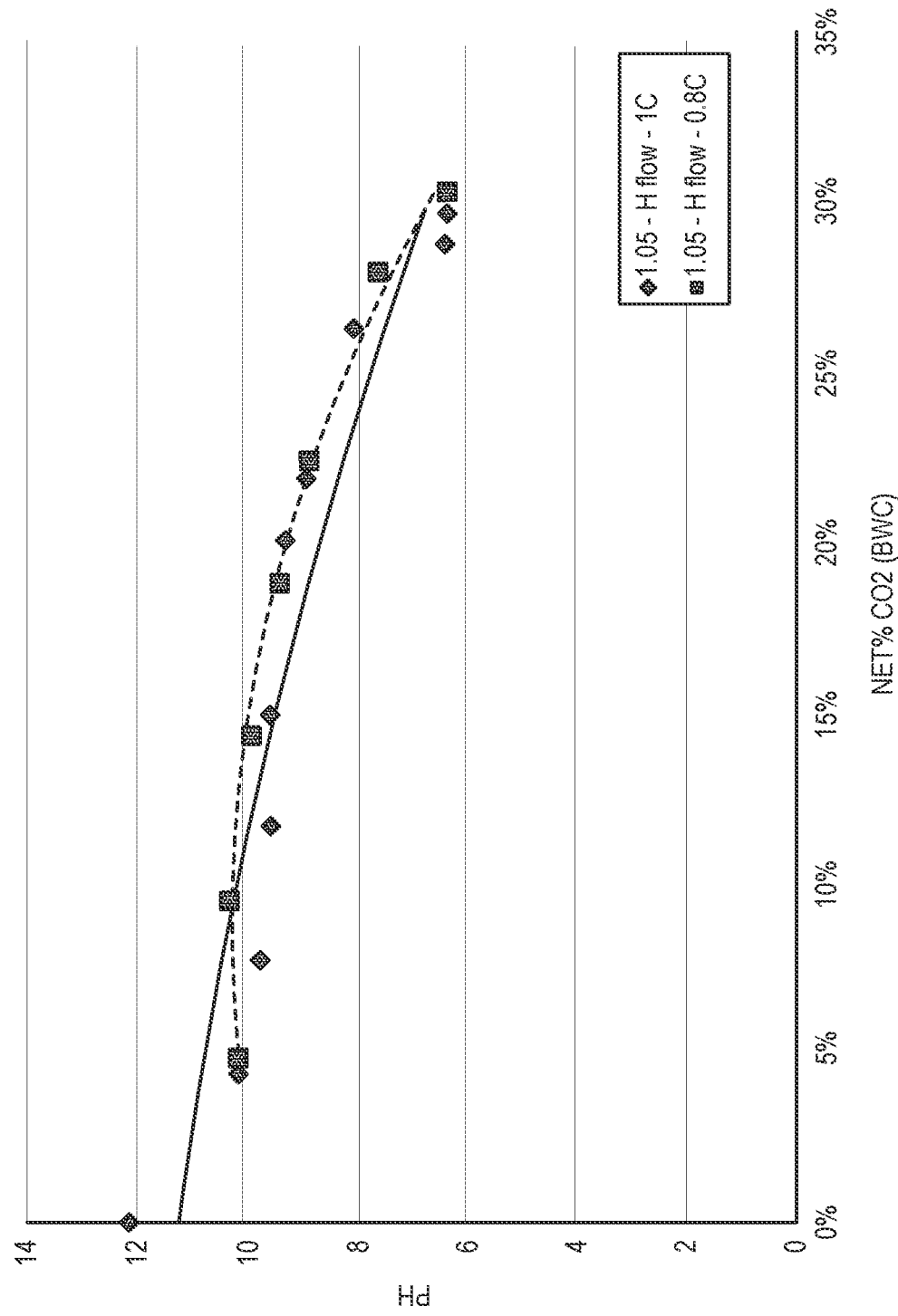
FIG. 80 shows pH vs. carbon content for wash waters of various cement content treated with carbon dioxide at a high flow rate.
Figure 81:
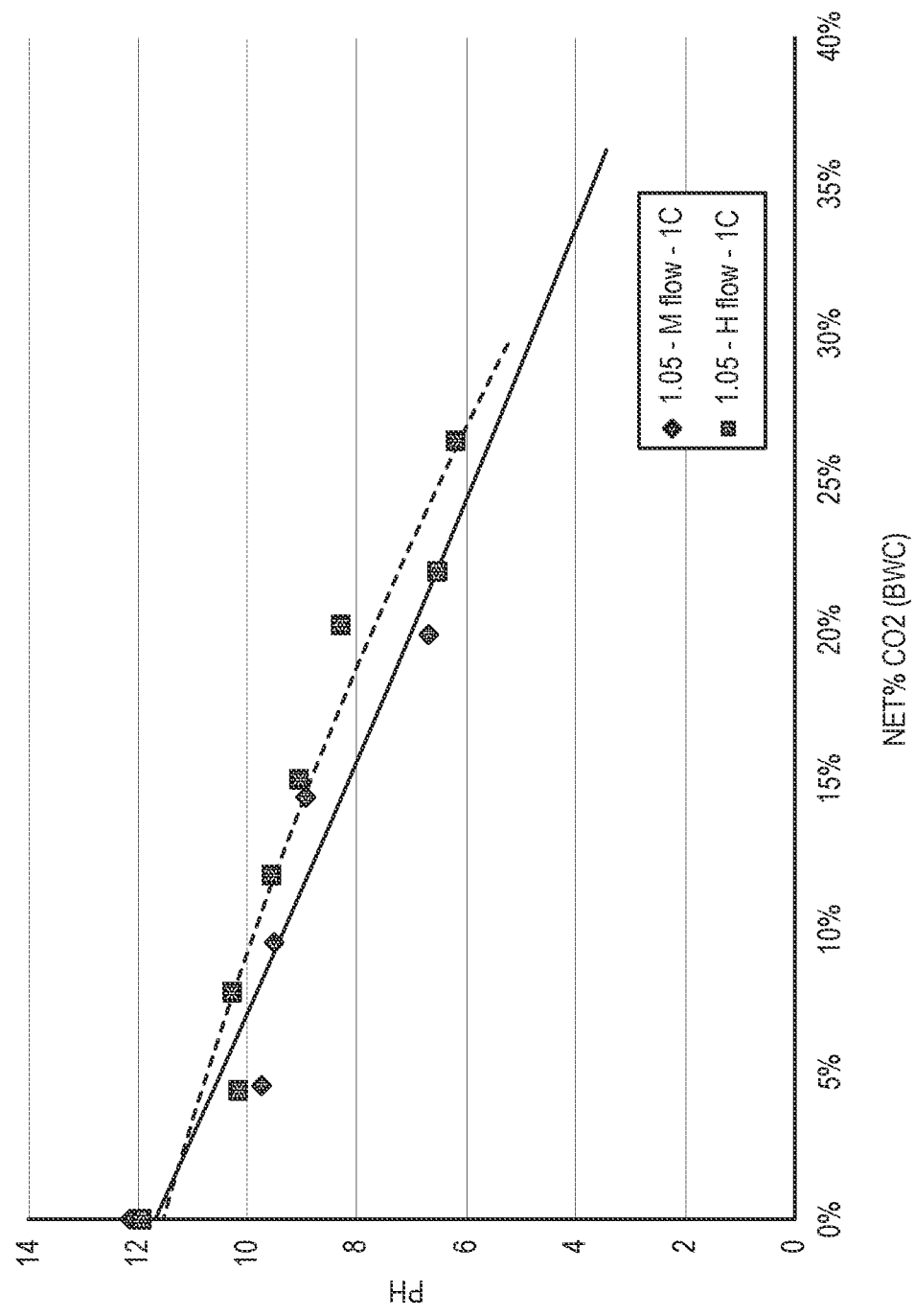
FIG. 81 shows pH vs. carbon content for wash waters of the same specific gravity of 1.05 treated with carbon dioxide at medium and high flow rate.
Figure 82:
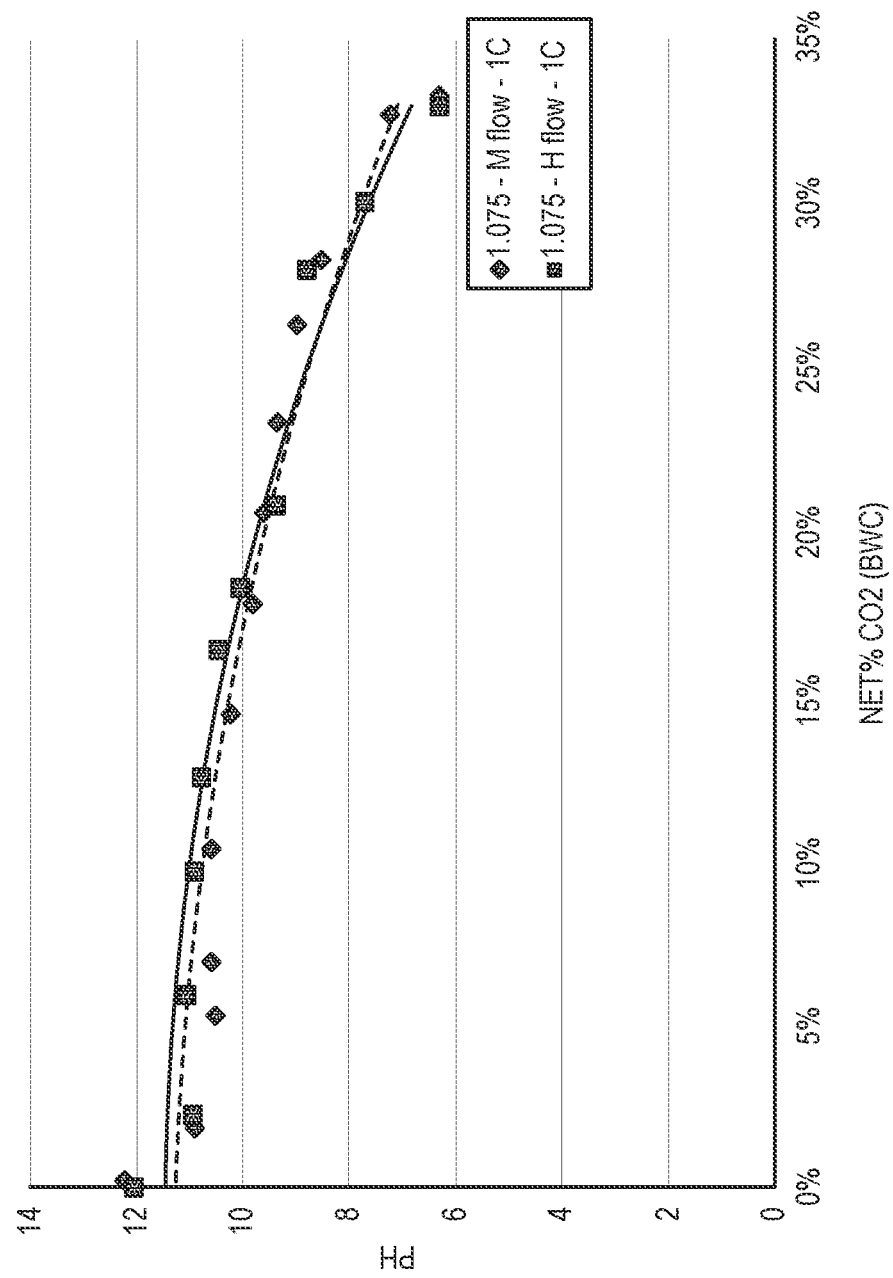
FIG. 82 shows pH vs. carbon content for wash waters of the same specific gravity of 1.075 treated with carbon dioxide at medium and high flow rate.

FIGS. 68 and 69 show that at a constant flow rate, an increase in solids content increased the time to neutralizing the pH. FIG. 70 shows that, for a constant solids content in the water, a reduction in the cement fraction reduced the time to neutral pH. FIGS. 71 and 72 show that, for constant specific gravity (solids content), an increase in the $CO_2$ flow rate reduced the time to neutral pH. FIGS. 73 and 74 show that the carbon content of the solids increased with treatment time in a linear manner. For a given flow rate, an increase in solids content led to an increase in time to the final % $CO_2$. FIG. 75 shows that the carbon content of the solids increased with treatment time, in a linear manner. For a given flow rate and solids content, an increase in the cement fraction of the solids led to an increase in the time to final % $CO_2$. FIGS. 76 and 77 show that, for a given specific gravity/solid content, the rate of $CO_2$ uptake increases if the flow rate increases. FIGS. 78 and 79 show that, for a given flow rate, the change in pH correlates well with the % $CO_2$ uptake of the solids. A change in specific gravity does not have a significant impact on the relationship. If calibrated, the pH may be a suitable predictor of the uptake of the solids. FIG. 80 shows that the uptake/pH relationship appears unaffected by the cement content of the solids. FIGS. 81 and 82 show that a change in flow rate does not notably change the relationship between $CO_2$ uptake and solution pH.

This Example demonstrates the effect of injection rate on rate of carbon dioxide uptake, and indicates that pH may be a reliable indicator of the progress of uptake. This Example used system without feedback control of carbon dioxide injection. Feedback control of injection can improve uptake efficiencies, e.g., to at least 60, 70, 80, 90, 91, 92, 93, 94, 95, 96, 97, 98, or 99%. See Example 14.

Example 12

This Example shows one type of control system and logic for injection of carbon dioxide into a wash water.

Figure 83:
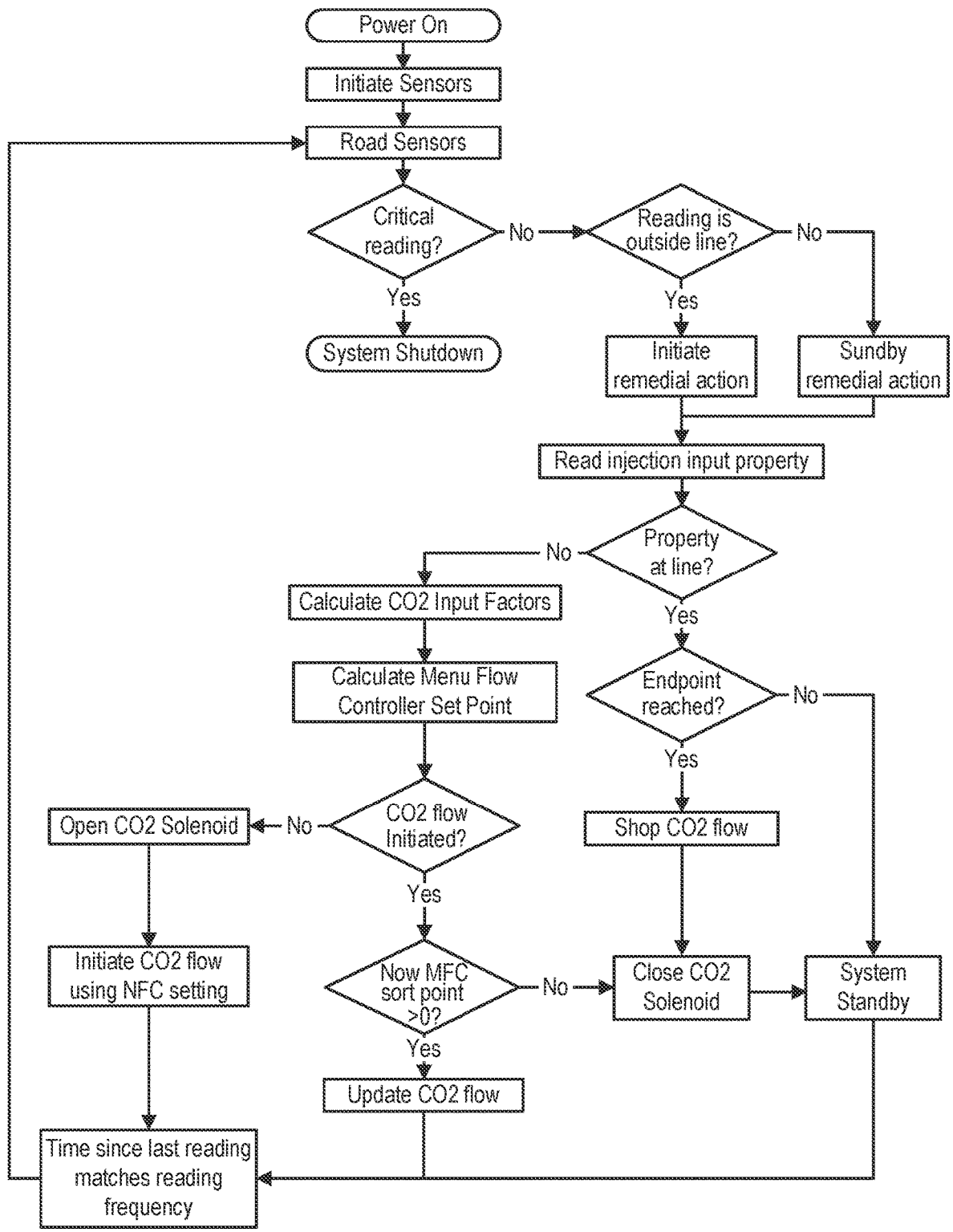
FIG. 83 shows exemplary control logic for treatment of wash water with carbon dioxide.

In some embodiments, carbon dioxide is introduced into wash water, as described herein, and readings are taken of carbon dioxide content in the headspace above wash water in a tank, and temperature of the wash water is also taken. FIG. 83 shows exemplary control logic.

The control logic premise in this Example is that headspace $CO_2$ and wash water temperature readings will impact the $CO_2$ flow rate used. The flow will be 100% of the target flow rate when the conditions favor it to be so, and less than 100% when a sensor feedback identifies that a variable has reach the desired target or detects inefficient $CO_2$ injection. All readings have situations where they alone should stop the flow.

Sensor data should reflect the following: appropriate values depend upon proper sampling and averaging, and a confirmation logic confirms that the readings are in the expected range as based upon the reading time interval. A change in $CO_2$ and temperature between readings is reasonable, though a shift that is too great (too high or too low) can trigger an alarm or error—if an anomaly is detected an error should be sent and standby logic ensure continued safe operation (temperature, pH) and shut down if the $CO_2$ meter is malfunctioning.

Adjustable feedback variables with suggested limits:
CO2 Concentration in the Headspace
Lower limit=400 ppm
Upper limit=1000 ppm
Temperature of the Water
Lower limit=20° C.
Upper limit=40° C.
Maximum Flow
Max flow is determined onsite for the configuration used to ensure full uptake in new washwater over a given treatment interval
pH of the Water
Lower limit=6
Upper limit=14
Specific Gravity of the Water
Lower limit=1.00
Upper limit=1.30

Below is some of the logic that can be incorporated into the logic to control flow rates based on the condition of the wash. This Example uses a linear interpolation between 100% and 0% of maximum uptake flow between expected min/max sensor readings for simplicity, but it will be appreciated that changing the $CO_2$ factor and temperature factor equations would be relatively simple when data supports the change, e.g., non-linear interpolations as appropriate.

Logic examples Conditions:
Determine CO2 Flow Rate Based Upon the Headspace CO2 Concentration, Reduce Flow if the Headspace Concentration Increases
if CO2<CO2 (LL),
then CO2 factor=100
if CO2>CO2 (UL)
then CO2 factor=0
if CO2 (LL)<CO2<CO2 (UL)
then CO2 factor=(CO2 (UL)−CO2)/(1−(100/(CO2 (UL)−CO2 (LL))))

Use Temperature Factor to Change CO2 Flow, Higher Temperatures can be Used to Trigger CO2 Flow Reductions
if Temp <Temp C (LL)
then Temp factor=100
if Temp >Temp C (UL)

then Temp factor=0
if Temp C (LL)<Temp <Temp C (UL)
then Temp factor=(Temp (UL)−Temp))/(100/(Temp (UL)−Temp (LL))
- The temperature readings can also determine cooling loop operation, e.g., increase cooling if the wash water temperature increases. A cooling loop can be a supply of liquid $CO_2$ in a conduit. Liquid supplied to a gas injection needs to undergo a phase change, and the heat from the wash water can be used to achieve the change.
- Determine cooling loop operation based upon the temperature of the wash water, increase cooling if the water temperature increases
- determine mass flow control setting based upon the CO2 in the headspace and the temperature of the wash water, increase cooling if the water temperature increases
- Flow=MAX FLOW×Co2 factor×Temp factor
- Additional factors (pH, specific gravity) may also be included in the flow calculation.

Wash Water System Logic
Initialization:
Read $CO_2$ Max Flow (SLPM) [HMI Input]
Read $CO_2$ Lower and Upper Limit (PPM) [HMI Input]
Read Temp Lower and Upper Limit (deg C.) [HMI Input]
Read pH Lower Limit (pH) [HMI Input]
Read Adjust Time "X" (Sec) [HMI Input]
Read Discharge Pump Flow Rate (LPM) [HMI Input]
Send Zero setpoint (SLPM) to MFC [Analog Output 1—4-20 mA] after 5 secs
Auto Mode (Selector Switch on HMI):
System in IDLE mode
Turn on output relay to Circulation Pump [120 VAC Output 1]
Read pH of water [Analog Input 3—4-20 mA]
Read $CO_2$ sensor [Analog Input 1—4-20 mA]
Read Temperature Sensor [Analog Input 2—4-20 mA]
Read Data from MFC [Analog Input 8—4-20 mA]
  If <pH Limit:
    Remain in IDLE until pH rises above limit
If >pH Limit:
  Calculate $CO_2$ Factor with $CO_2$ sensor reading
  IF $CO_2$<$CO_2$ (LL), CO2 Factor=1.0
  IF $CO_2$>$CO_2$ (UL), CO2 Factor=0.0
  IF $CO_2$ (LL)<$CO_2$<CO2(UL),
    $CO_2$ Factor=(CO2(UL)−$CO_2$)/($CO_2$ (UL)−CO2 (LL))
  Calculate Temp Factor with Temp sensor reading
  IF T<T(LL), Temp Factor=1.0
  IF T>T(UL), Temp Factor=0.0
  IF T(LL)<T<T(UL),
    Temp Factor=(T(UL)−T)/(T(UL)−T(LL))
  Calculate MFC setpoint with $CO_2$ Max Flow, $CO_2$ Factor and Temp Factor
    MFC Setpoint=Max Flow*$CO_2$ Factor*Temp Factor
  Turn on output relay to gas solenoid [120 VAC Output 2]
  Send setpoint to MFC [Analog Output 1—4-20 mA]
  LOOP TIMER—Adjust factors and setpoint every "X" seconds
    Send adjusted setpoint to MFC [Analog Output 1—4-20 mA]
    IF <pH Limit or Critical Alarm Triggers:
      Send Zero setpoint to MFC [Analog Output 1—4-20 mA]
      Turn off relay to gas solenoid [120 VAC Output 2]
      Send system to IDLE Manual Mode (Selector Switch on HMI):
Read pH of water [Analog Input 3—4-20 mA]
Read $CO_2$ sensor [Analog Input 1—4-20 mA]
Read Temperature Sensor [Analog Input 2—4-20 mA]
Read Data from MFC [Analog Input 8—4-20 mA]
Read Manual MFC Flow (SLPM) [HMI Input]
Start/Stop Circulation Pump Switch—Turn on/off output relay to pump [120 VAC Output 1]
Start/Stop Gas Injection Switch
  Turn on/off output relay to gas solenoid [120 VAC Output 2]
  Send Manual MFC Flow to MFC [Analog Output 1—4-20 mA] when switched on
  Send Zero setpoint to MFC [Analog Output 1—4-20 mA] when switched off
Start/Stop Exhaust Fan—Turn on/off relay to fan [120 VAC Output 3]
Start/Stop Cooling Loop—Turn on/off relay to loop [120 VAC Output 4]
IF Critical Alarm Triggers:
  Send 0 setpoint to MFC [Analog Output 1—4-20 mA]
  Turn off relay to gas solenoid [120 VAC Output 2]
Discharge Pump:
Truck Discharge Button
  Read Discharge Volume (L) [HMI Input]
  Calculate Discharge Time (secs)
  Discharge Time=Discharge Volume/Pump Flow Rate*60
  Turn on output relay to discharge pump [120 VAC Output 4]
  Turn off output relay to discharge pump [120 VAC Output 4] when timer expires
Alarms:
High Water Temp—Upper limit+10C—Red bar on bottom of HMI, activate cooling loop [120 VAC Output 4]
Low Water Temp—10C—Red bar on bottom of HMI
Critical Low Water Temp—2C—Critical Alarm (Alarm Pop-up & Shuts down system)
Low $CO_2$ Temp—5C—Critical Alarm (Alarm Pop-up & Shuts down system)
Low $CO_2$ Pressure—20 psi—Critical Alarm (Alarm Pop-up & Shuts down system)
High $CO_2$ Pressure—95 psi—Red bar on bottom of HMI
Critical $CO_2$ Pressure—110 psi—Critical Alarm (Alarm Pop-up & Shuts down system)
High $CO_2$ Sensor—Upper Limit—Red bar on bottom of HMI, activate exhaust fan [120 VAC Output 3]
Critical $CO_2$ Sensor—2000 PPM—Critical Alarm (Alarm Pop-up & Shuts down system)
*Exhaust fan remains on until CO2 level at Lower Limit*
0 Discharge Volume—0 entered as discharge volume—Alarm pop-up (Enter Discharge Volume)
PLC Battery Low—PLC battery below minimum voltage
0 Discharge Pump Flow Rate—Discharge pump flow rate is set to 0
Data:
Data are recorded via HMI (once every 2 seconds)
MFC data—only when gas solenoid is open (i.e. system is injecting CO2, otherwise everything is 0)
All other sensors:
  Auto Mode—All times
  Manual Mode—Only when pump is on
This Example demonstrates one form of control logic. It will be appreciated that fewer, more, or different characteristics may be monitored, and carbon dioxide flow rates adjusted as appropriate.

Example 13

This Example demonstrates that carbon dioxide addition to wash water does not necessarily result in a stable pH.

The following conditions were used:

Water Volume: 50 L

Cement: 3.75 kg

Specific gravity: 1.05

$CO_2$ Flow: 12.1 LPM

Initial pH: 9.8

Initial Temp: 17.3° C.

$CO_2$ applied 90 minutes. pH dropped from 11.8 to 6.2 pH monitored thereafter.

Figure 84:
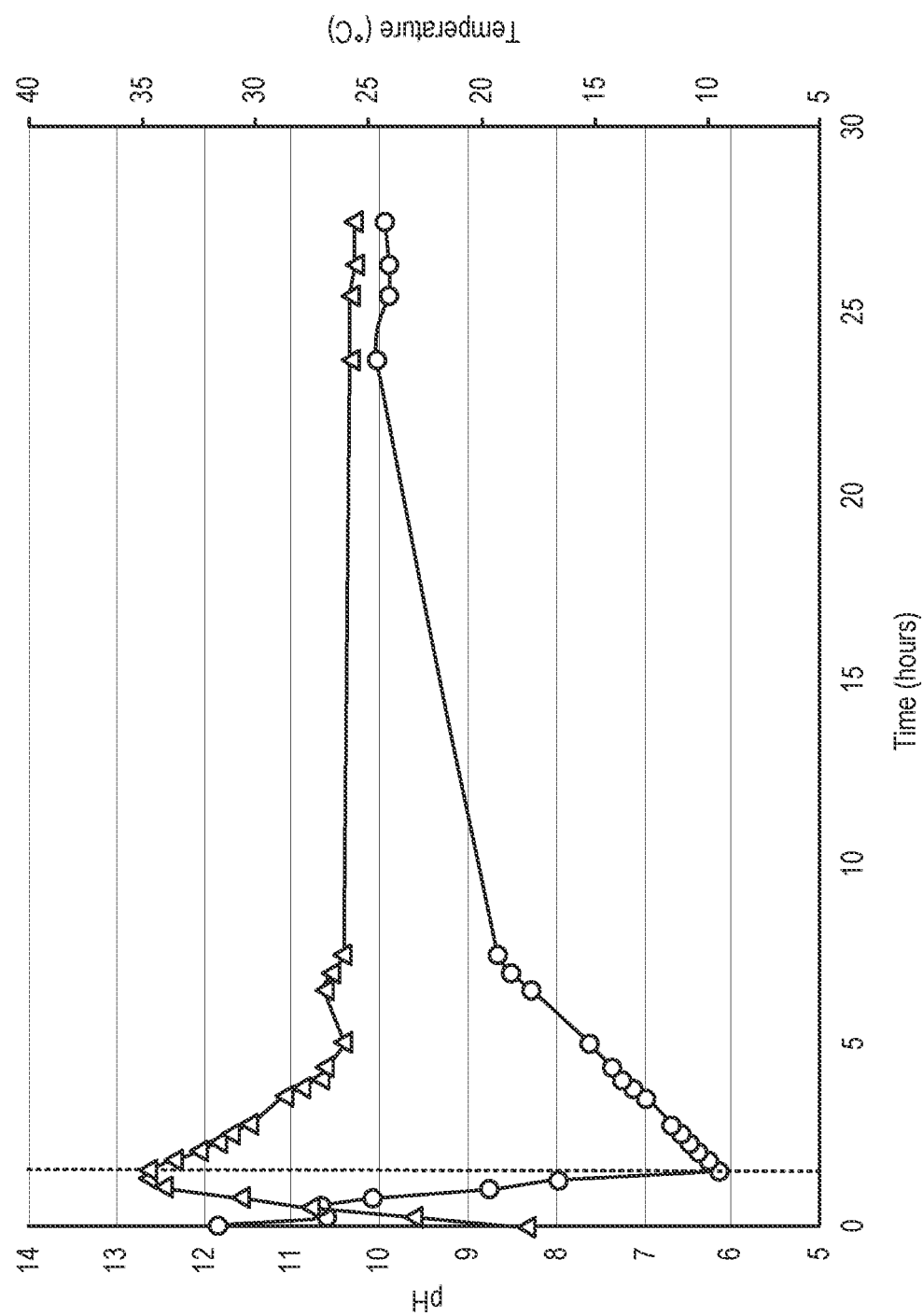
FIG. 84 shows pH and temperature over time for wash water treated with carbon dioxide, during and after carbon dioxide flow.

The apparatus of Example 11 was used. $CO_2$ was applied for 90 minutes, and the pH dropped from 11.8 to 6.2. The $CO_2$ flow was stopped and pH was monitored thereafter. The pH steadily increased in the absence of $CO_2$ addition (see FIG. 84).

Example 14

In this Example, an industrial prototype operation was studied.

Wash water was sampled from two trucks. Conditions are as shown in TABLE 9

TABLE 9

Conditions for industrial prototype test

| | Truck 1 | Truck 2 |
|---|---|---|
| Washout | 11:30 AM | 1:00 PM |
| Batched | 9:54 AM | 11:22 AM |
| Age | 1 h 36 min | 1 h 38 min |
| Quantity | 5.46 m³ | 0.77 m³ |
| Admixture | None | DARACCELL |
| Admix amount | | 1000 mL |
| Strength class | 30 MPa | 35 MPa |

The trucks were washed into a storage container. After each washing the wash out slurry was allowed to settle for 10 minutes. Slurry was then pumped from the storage tank into the treatment vessel. 720 litres of wash water were collected. The treatment vessel had a 3HP pump submerged at the bottom of the vessel, which pumped water through an approximately 15-foot piping loop, extending up out of the vessel and looped over the top, then directed back down to the bottom of the vessel. Carbon dioxide was injected at 4 points in the first two feet of the loop, so that there was a long extent of the loop in which carbon dioxide could be absorbed into the wash water. The carbon dioxide content of the air in the headspace of the vessel was monitored, and the flow rate was adjusted if carbon dioxide content became too high. With this control system, efficiency of carbon dioxide uptake was approximately 90%. The $CO_2$ treatment started at 1:30 μm, so half of the wash water was 3 hours and 36 minutes after the start of the mixing, and half was 2 hours 8 min from the start of mixing.

$CO_2$ was added to the wash water for 3 hours (1 h 47 minutes of $CO_2$, injection paused 38 minutes to change the mass flow meter, injection for 35 minutes more). The pH declined from 12.26 to 11.0. The $CO_2$ in the headspace was close to ambient for the first portion of the test, and slightly elevated later in the test.

Conditions during the test are shown in TABLE 10.

TABLE 10

Conditions during industrial prototype test

| Time (min) | WATER pH | WATER TEMP (° C.) | CO2 in HEADSPACE (ppm) | FLOW (SLPM) | CO2 PRESSURE (psi) | Specific Gravity | Net % CO2 by weight of cement in solids |
|---|---|---|---|---|---|---|---|
| 0 | 12.26 | 19.32 | | | | 1.055 | 0.3% |
| 15 | 12.26 | 19.49 | 498 | 52 | 31.28 | 1.058 | 2.8% |
| 30 | 11.70 | 20.66 | 498 | 49 | 31.24 | 1.055 | 4.8% |
| 45 | 11.63 | 21.93 | 449 | 45 | 31.38 | 1.06 | 8.3% |
| 60 | 11.44 | 22.76 | 449 | 48 | 32.51 | 1.057 | 10.0% |
| 75 | 11.43 | 23.10 | 449 | 48 | 32.74 | 1.058 | 9.8% |
| 90 | 11.04 | 24.85 | 498 | 43 | 32.62 | 1.056 | 14.9% |
| 105 | 11.04 | 24.58 | 449 | 35 | 28.80 | 1.058 | 17.5% |
| 120 | 10.90 | 25.18 | | | n/a | | 17.5% |
| 135 | 11.23 | 25.34 | | | n/a | 1.069 | 16.7% |
| 150 | 11.26 | 25.64 | 648 | 32 | 23.96 | 1.069 | 17.5% |
| 165 | 11.22 | 25.57 | 648 | 28 | 24.21 | 1.07 | 17.6% |
| 180 | 11.00 | 25.68 | 648 | 28 | 24.43 | | 16.1% |

At 1140 min a total of 11.5 kg of carbon dioxide had been delivered to the wash water. A carbon analysis determined the solids had a raw carbon content of 11.8% by final mass of solids. This was determined to be a net carbon content of 13.3% by weight of initial solids mass. The solids were estimated to be 90% binder and 10% sand. The binder was estimated to be 80% cement and 20% fly ash. Thus, an estimate of the $CO_2$ uptake by weight of cement was determined to be 17.8% by weight of initial cement.

The specific gravity of the wash water at the conclusion was 1.08. An estimated 778 kg of wash water was comprised of 87 kg of solids, and 691 kg of water. The 87 kg of solids contained 11.8% CO2 by mass meaning there was 10.3 kg of bound CO2 and 76.7 kg baseline solids (which includes some undetermined amount of chemically bound water). As compared to the total delivery of the $CO_2$ the carbon dioxide was mineralized at a rate of 89%.

Figure 85:
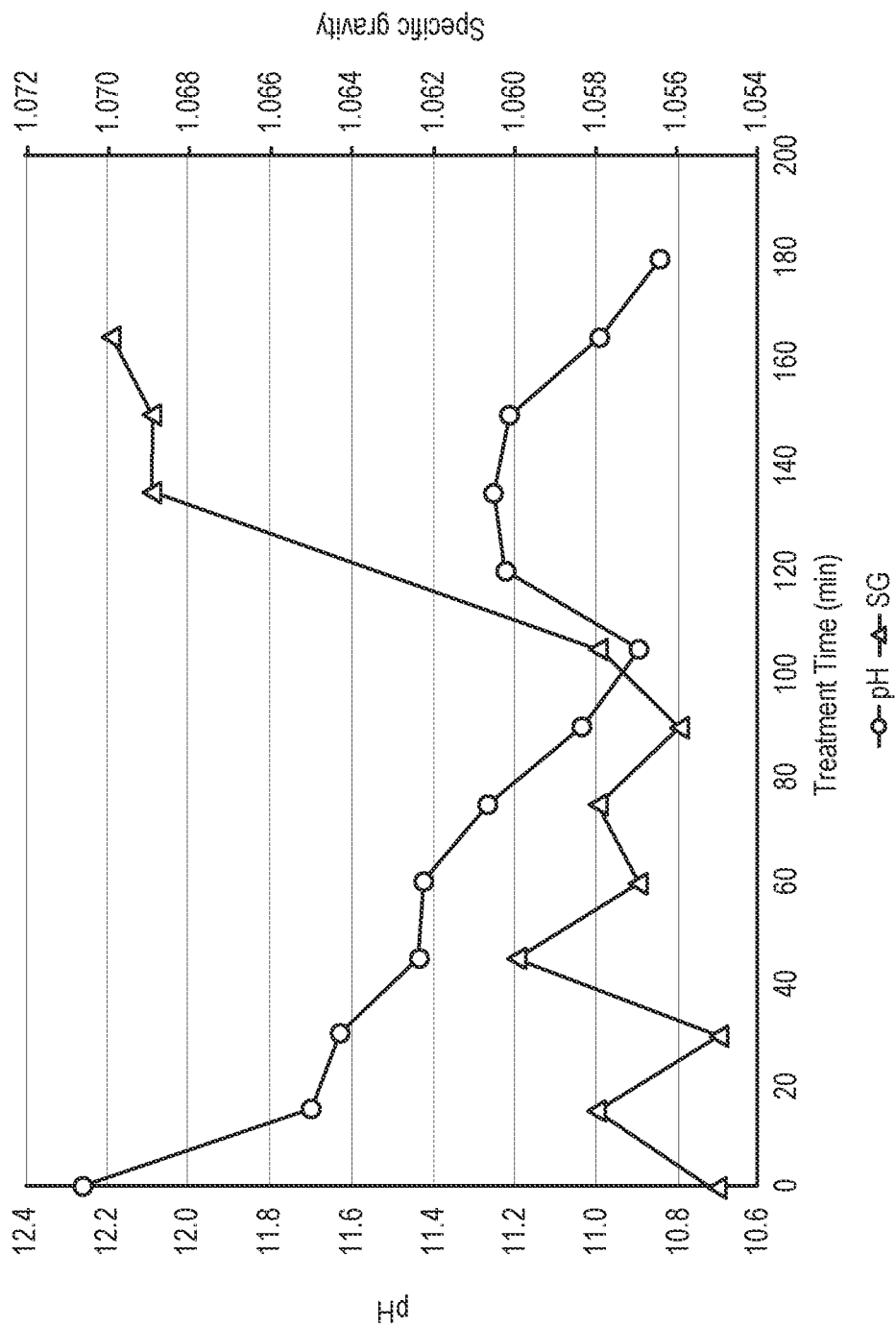
FIG. 85 shows pH and specific gravity over time of wash water from the drum of ready-mix truck treated with carbon dioxide.
Figure 86:
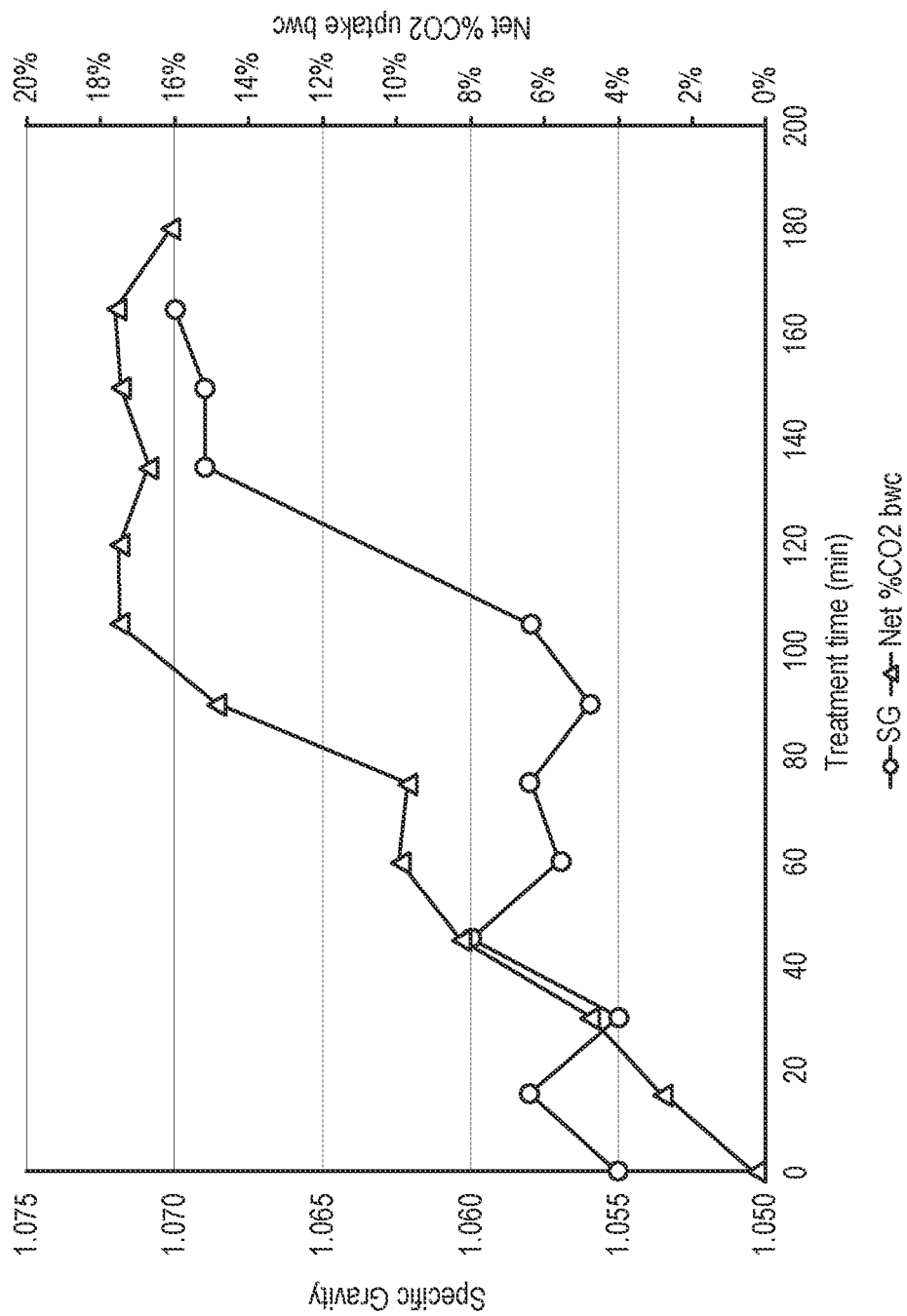
FIG. 86 shows specific gravity and carbon content of solids over time of wash water from the drum of ready-mix truck treated with carbon dioxide.
Figure 87:
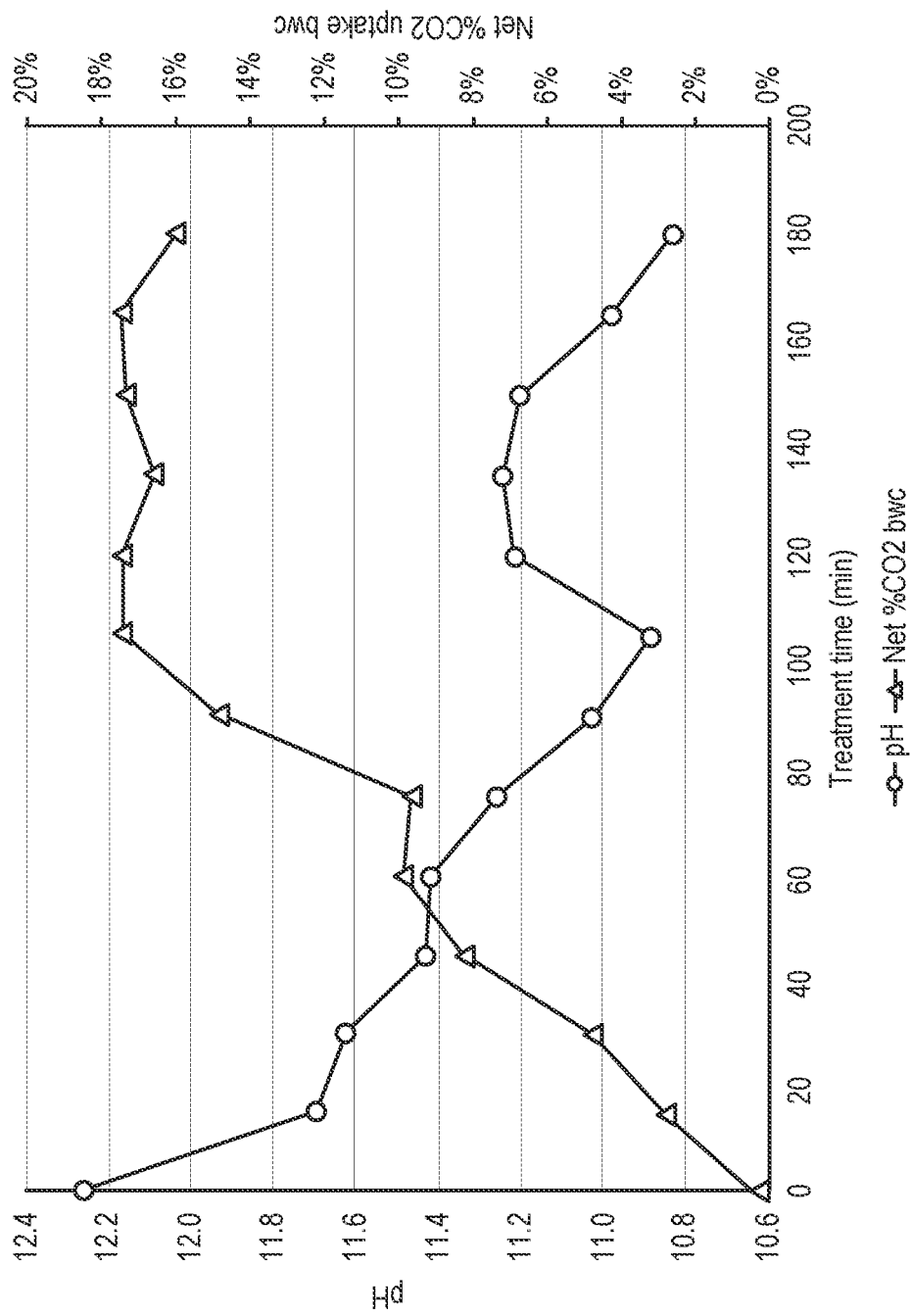
FIG. 87 shows pH and carbon content of solids over time of wash water from the drum of ready-mix truck treated with carbon dioxide.

FIG. 85 shows pH and specific gravity vs. treatment time. Specific gravity increased as pH decreased. FIG. 86 shows specific gravity and net % $CO_2$ in solids (by weight of cement) vs treatment time. The specific gravity and $CO_2$ content increases with treatment time. FIG. 87 shows pH and net % $CO_2$ in solids (by weight of cement) vs treatment time. $CO_2$ content increases and pH decreases with treatment time.

This Example demonstrates that a high carbon dioxide uptake can be achieved using wash water from ready-mix trucks, and feedback control of carbon dioxide delivery can achieve an efficiency of uptake of 89% or greater.

Example 15

This Example demonstrates the effect of a set-retarding admixture, in this case sodium gluconate, used at different concentrations, on properties of concrete made with $CO_2$-treated wash water.

Concrete Production Procedure
Add coarse aggregate and sand to mixer
Mix 15 seconds
Add 80% of the mix water
Mix 15 seconds
Add cement and fly ash
Mix 15 seconds
Add remaining mix water (tailwater) and admixtures
Mix 3 minutes
Mix Design

| Sand Mass (kg/m³) | 785 |
| Coarse Agg Mass (kg/m³) | 1085 |
| Cement Mass (kg/m³) | 310 |
| Mix water (kg/m³) | 194 |
| w/b | 0.63 |
| Cement Type | Lafarge Brookfield |

Aggregates in default mix design are saturated surface dry (SSD)

Mix water usage calculated per batch upon the moisture condition of the aggregates.

In some cases, the aggregates were under SSD and thus additional mix water was required to compensate.

$CO_2$ Treatment: In each case the $CO_2$ treatment of the wash water used a flow rate of 7.9 LPM for 75 minutes. The apparatus of Example 11 was used, except wash water volume was 30 L, not 50L.

Test 1: 0.225% Gluconate Immediately after Washing, $CO_2$ Before Use as Mix Water A washwater slurry was made with 2 kg cement and 20 kg of water. The slurry was mixed slowly for three hours. Sodium gluconate was then added at 0.225% bwc and mixed in. At 24 hrs, the slurry was diluted with an additional 10 kg of water and added to a 50 L carbon dioxide treatment loop. The specific gravity was measured to be 1.05. A control sample of wash water was taken, and a $CO_2$ dosage ramp was started. Samples were removed at various times. Concrete was made using the water samples as mix water shortly after the waters were sampled. The $CO_2$ treated water was used to produce concrete at 35, 60, 80 and 105 minutes after of the start of treatment.

It was observed that the slump was reduced when wash water was used as mix water, but the concrete was still workable. The $CO_2$ did not impact the set time acceleration, but it did counteract the slower hydration (as observed through calorimetry, examining the energy release in J/g) due to the retarder. The counteraction of the $CO_2$ towards the retarder increased with increasing $CO_2$ uptake.

TABLE 7

Trial details of wash water stabilized with 0.225% bwc sodium gluconate

| Batch ID | Control | WW | CO2-1 | CO2-2 | CO2-3 |
|---|---|---|---|---|---|
| Volume (m³) | 0.0258 | 0.0258 | 0.0258 | 0.0258 | 0.0258 |
| Sand (kg/m³) | 785 | 785 | 785 | 785 | 785 |
| Coarse Aggregate (kg/m³) | 1085 | 1085 | 1085 | 1085 | 1085 |
| Cement (kg/m³) | 310 | 310 | 310 | 310 | 310 |
| Target mix water (kg/m³) | 194 | 194 | 194 | 194 | 194 |
| Potable Water Mass (kg/m³) | 184 | 0 | 0 | 0 | 0 |
| Aggregate water (kg/m³) | 10 | −4 | −4 | −4 | −4 |
| Wash water mass (kg/m³) | 0 | 198 | 198 | 198 | 198 |
| Total potable mix water (kg/m³) | 194 | −4 | −4 | −4 | −4 |
| WW fraction of mix water | 0% | 102% | 102% | 102% | 102% |
| Cement in mix water (kg/m³) | 0 | 14 | 14 | 14 | 14 |
| Total cement (kg/m³) | 310 | 324 | 324 | 324 | 324 |
| w/c ratio (virgin cement) | 0.63 | 0.63 | 0.63 | 0.63 | 0.63 |
| w/c ratio (total cement) | 0.63 | 0.60 | 0.60 | 0.60 | 0.60 |
| Net wash water uptake (% bwc) | 0% | 0% | 7.5% | 21.7% | 25.9% |
| Slump (mm) | 140 | 90 | 70 | 80 | 80 |
| Relative slump | 100% | 64% | 50% | 57% | 57% |
| Temperature (° C.) | 17.8 | 18.5 | 20.6 | 22.5 | 23.1 |
| Set time via calorimetry | 3 h 4 min | 2 h 39 min | 2 h 44 min | 2 h 39 min | 2 h 44 min |
| Relative energy - 8 hours | 100% | 101% | 115% | 141% | 148% |
| Relative energy - 12 hours | 100% | 92% | 101% | 116% | 120% |
| Relative energy - 16 hours | 100% | 88% | 96% | 108% | 111% |
| Relative energy - 20 hours | 100% | 85% | 93% | 103% | 106% |

Test 2: 1% NaG—Gluconate after Washing, $CO_2$ at 24 Hours

A washwater slurry was made with 2 kg cement and 30 kg of water. Sodium gluconate was added at 1.0% bwc to the washwater slurry three hours after cement was added to water. At 24 hrs, the water was added to the 50 L carbon dioxide treatment loop. The specific gravity was measured to be 1.05. A control sample of wash water was taken, and a $CO_2$ dosage ramp was started. Samples were removed at various intervals. Concrete was made with the water samples as mix water shortly after the waters were sampled.

The increased dose of gluconate increased the slump of the untreated wash water concrete to be greater than the reference batch. The treatment of the water with the $CO_2$ caused the slump to decrease with increasing uptake. The concrete did maintain some workability, at about half the level of the reference. The sodium gluconate caused a slower set time in the untreated wash water batch, but in all but the lowest level of $CO_2$ the set times were similar to the reference and the highest level of $CO_2$ led to set acceleration.

batch and the set time was retarded by more than two hours. The heat of hydration was similarly lagging behind the reference. The treatment of the water with the $CO_2$ caused the slump to decrease slightly but it was comparable to the

TABLE 8

Trial details of wash water stabilized with 1.0% bwc sodium gluconate

| Batch ID | Control | WW | CO2-1 | CO2-2 | CO2-3 | CO2-4 | CO2-5 |
|---|---|---|---|---|---|---|---|
| Volume ($m^3$) | 0.0258 | 0.0258 | 0.0258 | 0.0258 | 0.0258 | 0.0258 | 0.0258 |
| Sand ($kg/m^3$) | 785 | 785 | 785 | 785 | 785 | 785 | 785 |
| Coarse Aggregate ($kg/m^3$) | 1085 | 1085 | 1085 | 1085 | 1085 | 1085 | 1085 |
| Cement ($kg/m^3$) | 310 | 310 | 310 | 310 | 310 | 310 | 310 |
| Target mix water ($kg/m^3$) | 194 | 194 | 194 | 194 | 194 | 194 | 194 |
| Potable Water Mass ($kg/m^3$) | 184 | 198 | 198 | 198 | 198 | 198 | 198 |
| Aggregate water ($kg/m^3$) | −15 | −28 | −28 | −28 | −28 | −28 | −28 |
| Wash water mass ($kg/m^3$) | 24 | 23 | 23 | 23 | 23 | 23 | 23 |
| Total potable mix water ($kg/m^3$) | 169 | 171 | 171 | 171 | 171 | 171 | 171 |
| WW fraction of mix water | 13% | 12% | 12% | 12% | 12% | 12% | 12% |
| Cement in mix water ($kg/m^3$) | 0 | 14 | 14 | 14 | 14 | 14 | 14 |
| Total cement ($kg/m^3$) | 310 | 324 | 324 | 324 | 324 | 324 | 324 |
| w/c ratio (virgin cement) | 0.63 | 0.63 | 0.63 | 0.63 | 0.63 | 0.63 | 0.63 |
| w/c ratio (total cement) | 0.63 | 0.60 | 0.60 | 0.60 | 0.60 | 0.60 | 0.60 |
| Treatment Time (min) | n/a | 0 | 31 | 47 | 59 | 78 | 87 |
| Net wash water uptake (% bwc) | 0.0% | 0.0% | 4.6% | 8.8% | 16.1% | 23.5% | 33.2% |
| Slump (mm) | 140 | 170 | 115 | 95 | 85 | 60 | 75 |
| Relative slump | 100% | 121% | 82% | 68% | 61% | 43% | 54% |
| Temperature (° C.) | 17.5 | 19.3 | 20 | 20.9 | 22 | 23.3 | 23.4 |
| Set time via calorimetry | 3 h 19 min | 3 h 59 min | 5 h 19 min | 3 h 44 min | 3 h 24 min | 3 h 34 min | 2 h 39 min |
| Relative energy - 8 hours | 100% | 103% | 85% | 126% | 133% | 137% | 180% |
| Relative energy - 12 hours | 100% | 104% | 103% | 113% | 112% | 111% | 134% |
| Relative energy - 16 hours | 100% | 104% | 110% | 110% | 108% | 107% | 123% |
| Relative energy - 20 hours | 100% | 103% | 113% | 108% | 105% | 106% | 118% |

Test 3: 2% Na—Gluconate after Washing, $CO_2$ at 24 Hours

A washwater slurry was made with 2 kg cement and 30 kg of water. Sodium gluconate was added at 2.0% bwc to the washwater slurry three hours after cement was added to water. At 24 hrs, the water was added to the 50 L carbon dioxide treatment loop. The specific gravity was measured to be 1.05. A control sample of wash water was taken, and a $CO_2$ dosage ramp was started. Samples were removed at various intervals. Concrete was made with the water samples as mix water shortly after the waters were sampled.

At this dose of sodium gluconate the slump of the untreated wash water concrete was greater than the reference control. The longest treatment time, providing 20.5% uptake by weight of cement, caused the slump to reduce slightly though it was 96% of the control. The set time increased at the first two $CO_2$ treatment durations but was only retarded by 35 minutes at the highest uptake. The heat of hydration showed a further reduction once the carbon dioxide was added but it trended back towards the control at the second sample and surpassed the control at the final sample. The one day compressive strength was lowest for the untreated wash water but increased with increasing $CO_2$ treatment time to exceed the reference by 14% at 45 minutes treatment/12.6% uptake and 18% at 56 minutes treatment/20.5% uptake

TABLE 9

Trial details of wash water stabilized with 2.0% bwc sodium gluconate

| Batch ID | Control | WW | CO2-1 | CO2-2 | CO2-3 |
|---|---|---|---|---|---|
| Volume ($m^3$) | 0.0258 | 0.0242 | 0.0242 | 0.0242 | 0.0242 |
| Sand ($kg/m^3$) | 785 | 785 | 785 | 785 | 837 |
| Coarse Aggregate ($kg/m^3$) | 1085 | 1084 | 1084 | 1084 | 1157 |
| Cement ($kg/m^3$) | 310 | 310 | 310 | 310 | 331 |
| Target mix water ($kg/m^3$) | 194 | 194 | 194 | 194 | 194 |
| Potable Water Mass ($kg/m^3$) | 184 | 0 | 0 | 0 | 0 |
| Aggregate water ($kg/m^3$) | 10 | −4 | −4 | −4 | −4 |
| Wash water mass ($kg/m^3$) | 0 | 198 | 198 | 198 | 198 |
| Total potable mix water ($kg/m^3$) | 194 | −4 | −4 | −4 | −4 |
| WW fraction of mix water | 0% | 102% | 102% | 102% | 102% |
| Cement in mix water ($kg/m^3$) | 0 | 14 | 14 | 14 | 14 |
| Total cement ($kg/m^3$) | 310 | 324 | 324 | 324 | 345 |
| w/c ratio (virgin cement) | 0.63 | 0.63 | 0.63 | 0.63 | 0.59 |
| w/c ratio (total cement) | 0.63 | 0.60 | 0.60 | 0.60 | 0.56 |

TABLE 9-continued

Trial details of wash water stabilized with 2.0% bwc sodium gluconate

| Batch ID | Control | WW | CO2-1 | CO2-2 | CO2-3 |
|---|---|---|---|---|---|
| Treatment Time (min) | n/a | 0 | 27 | 45 | 56 |
| Net wash water uptake (% bwc) | 0.0% | 0.0% | 4.1% | 12.6% | 20.5% |
| Slump (mm) | 140 | 180 | 150 | 150 | 135 |
| Relative slump | 100% | 129% | 107% | 107% | 96% |
| Temperature (° C.) | 17.5 | 18.5 | 19.6 | 20.6 | 22.5 |
| 24 h strength (MPa) | 13.0 | 11.0 | 12.4 | 14.8 | 15.4 |
| Relative 24 h strength | 100% | 84% | 95% | 114% | 118% |
| Set time via calorimetry | 3 h 19 min | 5 h 34 min | 8 h 54 min | 7 h 29 min | 3 h 54 min |
| Relative energy - 8 hours | 100% | 57% | 30% | 48% | 147% |
| Relative energy - 12 hours | 100% | 79% | 54% | 69% | 123% |
| Relative energy - 16 hours | 100% | 89% | 79% | 86% | 118% |
| Compressive strength, 24 hrs | 100% | 84% | 96% | 114% | 118% |

Summary of Slump and Uptake Data from the Three Doses of Sodium Gluconate in Tests 1-3

The reference batch with potable water had a slump of 140 mm in all tests. The lowest dose of sodium gluconate (0.225%) did not counteract the slump reduction due to use of wash water as mix water, and there was no impact of increasing $CO_2$ uptake, with all levels of $CO_2$ remaining at lower slump than control. The 1% dose restored the slump in the wash water not treated with $CO_2$ to a level higher than the reference. The slump declined as the $CO_2$ uptake increased to levels below control. The 2% dose restored the slump in the untreated wash water to a level greater than the reference. At 4% and 13% $CO_2$ uptake the slump was comparable to the control. At 20% $CO_2$ uptake the slump was slightly lower than control. Thus, at the highest sodium gluconate dose the reduction in slump was less sensitive to uptake.

Test 4: Stability of Treated Wash Water

Washwater was made with 2 kg Cement and 30 kg of water. Sodium gluconate was added to the washwater at 2% bwc three hours after the cement was added to water. After 24 hours, the washwater was added to the small prototype (50 L loop) and agitated. The specific gravity was measured to be 1.05. A control sample of wash water was taken and the wash water was treated with $CO_2$. A sample was taken after the treatment was complete as well as at 1, 3 and 24 hours afterwards. Concrete was made using the various water samples as mix water shortly after the waters were sampled.

The workability was not affected by the aging of the treated wash water. The 24 hour strength decreased slightly with increasing age of the treated wash water.

TABLE 10

Trial details of wash water stabilized with 2.0% bwc sodium gluconate with various post treatment hold times

| Batch ID | Control | WWT | 1 hr WWT | 3 hr WWT | 24 hr WWT |
|---|---|---|---|---|---|
| Volume (m³) | 0.0258 | 0.0242 | 0.0242 | 0.0242 | 0.0242 |
| Sand (kg/m³) | 785 | 785 | 785 | 785 | 785 |
| Coarse Aggregate (kg/m³) | 1085 | 1084 | 1084 | 1084 | 1084 |
| Cement (kg/m³) | 310 | 310 | 310 | 310 | 310 |
| Target mix water (kg/m³) | 194 | 194 | 194 | 194 | 194 |
| Potable Water Mass (kg/m³) | 184 | 0 | 0 | 0 | 0 |
| Aggregate water (kg/m³) | 10 | −4 | −4 | −4 | −4 |
| Wash water mass (kg/m³) | 0 | 198 | 198 | 198 | 198 |
| Total potable mix water (kg/m³) | 194 | −4 | −4 | −4 | −4 |
| WW fraction of mix water | 0% | 102% | 102% | 102% | 102% |
| Cement in mix water (kg/m³) | 0 | 14 | 14 | 14 | 14 |
| Total cement (kg/m³) | 310 | 324 | 324 | 324 | 324 |
| w/c ratio (virgin cement) | 0.63 | 0.63 | 0.63 | 0.63 | 0.63 |
| w/c ratio (total cement) | 0.63 | 0.60 | 0.60 | 0.60 | 0.60 |
| Post Treatment Hold Time (min) | n/a | 0 | 1 h | 3 h | 24 h |
| Net wash water uptake (% bwc) | 0.0% | 16.0% | | | |
| Slump (mm) | 140 | 150 | 150 | 165 | 155 |
| Relative slump | 100% | 107% | 107% | 118% | 111% |
| Temperature (° C.) | 17.5 | 22.2 | 22 | 20.9 | 19.2 |
| 24 h strength (MPa) | 13.0 | 13.2 | 14.0 | 12.4 | 11.0 |
| Relative 24 h strength | 100% | 101% | 107% | 95% | 84% |

Test 5: Carbonation Treatment Immediately after 2% NaG

Washwater was made with 2 kg Cement and 30 kg of water. Sodium gluconate was added to the washwater at 2% bwc three hours after the cement was added to water. The slurry was mixed for 15 minutes. The washwater was then added to the small prototype (SOL loop) and agitated. The specific gravity was measured to be 1.05. A control sample of wash water was taken, and the wash water was treated with $CO_2$ for 1 hour and 15 min. Concrete was made using potable water and with the treated water, immediately after $CO_2$ treatment and 24 hours after treatment.

The slump of the $CO_2$ treated wash water concrete was comparable to the control. The sodium gluconate caused the untreated wash water to have a set time increased by more than two hours. The $CO_2$ treatment reduced the set retardation to 50 minutes compared to control. The one day strength was less than the reference but by three days the strength was comparable to the reference. The effect is consistent with retarded concrete.

TABLE 11

Trial details of wash water stabilized with 2.0% bwc sodium gluconate immediately before treatment with $CO_2$

| Batch ID | Control | WW | WWT | 24 hr WWT |
|---|---|---|---|---|
| Volume (m³) | 0.0258 | 0.0242 | 0.0242 | 0.0242 |
| Sand (kg/m³) | 785 | 785 | 785 | 785 |
| Coarse Aggregate (kg/m³) | 1085 | 1084 | 1084 | 1084 |
| Cement (kg/m³) | 310 | 310 | 310 | 310 |
| Target mix water (kg/m³) | 194 | 194 | 194 | 194 |
| Potable Water Mass (kg/m³) | 184 | 0 | 0 | 0 |
| Aggregate water (kg/m³) | 10 | −4 | −4 | −4 |
| Wash water mass (kg/m³) | 0 | 198 | 198 | 198 |
| Total potable mix water (kg/m³) | 194 | −4 | −4 | −4 |
| WW fraction of mix water | 0% | 102% | 102% | 102% |
| Cement in mix water (kg/m³) | 0 | 14 | 14 | 14 |
| Total cement (kg/m³) | 310 | 324 | 324 | 324 |
| w/c ratio (virgin cement) | 0.63 | 0.63 | 0.63 | 0.63 |
| w/c ratio (total cement) | 0.63 | 0.60 | 0.60 | 0.60 |
| Post Treatment Hold Time (min) | n/a | n/a | 0 | 24 h |
| Net wash water uptake (% bwc) | 0.0% | 0.0% | 20.1% | 20.6% |
| Slump (mm) | 140 | 180 | 160 | 160 |
| Relative slump | 100% | 129% | 114% | 114% |
| Temperature (° C.) | 17.5 | 18.5 | 22.1 | 18.6 |
| 24 h strength (MPa) | 13.0 | 11.0 | 9.5 | |
| Relative 24 h strength | 100% | 84% | 73% | |
| 3 d strength (MPa) | 21.6 | | 20.7 | |
| Relative 3 d strength | 100% | | 96% | |
| Set time via calorimetry | 3 h 19 min | 5 h 34 min | 4 h 9 min | |
| Relative energy - 8 hours | 100% | 57% | 106% | |
| Relative energy - 12 hours | 100% | 79% | 89% | |
| Relative energy - 16 hours | 100% | 89% | 89% | |

Test 6: Carbonation Treatment Immediately after 1.5% NaG

Washwater was made with 2 kg Cement and 30 kg of water. Sodium gluconate was added to the washwater at 1.5% bwc three hours after the cement was added to water. The slurry was mixed for 15 minutes. The washwater was then added to the small prototype (SOL tank) and agitated. The specific gravity was measured to be 1.05. A control sample of wash water was taken, and the wash water was treated with $CO_2$ for 1 hour and 15 minutes. Concrete was made using potable water and with the treated water.

The slumps of the two batches of concrete were comparable with the stabilized and $CO_2$ treated batch being higher. The set times were within 10 minutes of each other and the heats of hydration were increased for the treated batch at the three intervals examined. The one day compressive strength was improved, while the 7-day compressive strength was slightly lower.

TABLE 12

Trial details of wash water stabilized with 1.5% bwc sodium gluconate immediately before treatment with $CO_2$

| Batch ID | Control | WWT |
|---|---|---|
| Volume (m³) | 0.0242 | 0.0242 |
| Sand (kg/m³) | 785 | 785 |
| Coarse Aggregate (kg/m³) | 1084 | 1084 |
| Cement (kg/m³) | 310 | 310 |
| Target mix water (kg/m³) | 194 | 194 |
| Potable Water Mass (kg/m³) | 184 | 0 |
| Aggregate water (kg/m³) | 10 | −4 |
| Wash water mass (kg/m³) | 0 | 198 |
| Total potable mix water (kg/m³) | 194 | −4 |
| WW fraction of mix water | 0% | 102% |
| Cement in mix water (kg/m³) | 0 | 14 |
| Total cement (kg/m³) | 310 | 324 |
| w/c ratio (virgin cement) | 0.63 | 0.63 |
| w/c ratio (total cement) | 0.63 | 0.60 |
| Slump (mm) | 80 | 95 |
| Relative slump | 100% | 119% |
| Temperature (° C.) | 17 | 21.2 |
| 24 h strength (MPa) | 11.0 | 12.3 |
| Relative 24 h strength | 100% | 112% |
| 7 d strength (MPa) | 30.6 | 28.2 |
| Relative 7 d strength | 100% | 92% |
| 28 d strength (Mpa) | 38.2 | 37.6 |
| Relative 28 d strength | 100% | 98% |
| Set time via calorimetry | 3 h 19 min | 3 h 29 min |
| Relative energy - 8 hours | 100% | 173% |
| Relative energy - 12 hours | 100% | 138% |
| Relative energy - 16 hours | 100% | 129% |

Example 16

Wash water with sodium gluconate, treated with CO2, and held before use as concrete mix water Washwater was made with 1 kg Cement and 15 kg of water. Sodium gluconate was added to the washwater at 1.5% bwc three hours after the cement was added to water. The slurry was mixed for 15 minutes. The washwater was then added to the small prototype and agitated. The specific gravity was measured to be 1.05. The wash water was treated with CO2 for 1 hour and 15 minutes. 24 hrs after the completion of the CO2 treatment, the treated water was used to make a batch of concrete. A parallel batch of wash water was produced using a dose of 2.0% gluconate and used to make another concrete batch after 7 days of storage.

The slumps of the two batches of concrete with treated wash water were comparable to (and slightly higher that) the potable water control. The one day compressive strength was improved by using the treated wash water. The aging of the wash water improved the properties of the concrete so produced.

| Batch ID | Control | WWT | WWT |
|---|---|---|---|
| Volume (m³) | 0.0242 | 0.0243 | 0.0243 |
| Sand (kg/m³) | 785 | 781 | 781 |
| Coarse Aggregate (kg/m³) | 1084 | 1080 | 1080 |
| Cement (kg/m³) | 310 | 309 | 309 |
| Target mix water (kg/m³) | 194 | 193 | 193 |
| Potable Water Mass (kg/m³) | 184 | 0 | 0 |
| Aggregate water (kg/m³) | 10 | −4 | −4 |
| Wash water mass (kg/m³) | 0 | 197 | 197 |
| Total potable mix water (kg/m³) | 194 | −4 | −4 |
| WW fraction of mix water | 0% | 102% | 102% |
| Cement in mix water (kg/m³) | 0 | 14 | 14 |

-continued

| Batch ID | Control | WWT | WWT |
|---|---|---|---|
| Total cement (kg/m$^3$) | 310 | 323 | 323 |
| w/c ratio (virgin cement) | 0.63 | 0.63 | 0.63 |
| w/c ratio (total cement) | 0.63 | 0.60 | 0.60 |
| Slump (mm) | 80 | 100 | 125 |
| Relative slump | 100% | 125% | 156% |
| Temperature (° C.) | 17 | 16.5 | 16.4 |
| 24 h strength (MPa) | 11.0 | 14.4 | 14.9 |
| Relative 24 h strength | 100% | 131% | 136% |
| 7 d strength (MPa) | 30.6 | 30.8 | 32.4 |
| Relative 7 d strength | 100% | 101% | 106% |
| 28 d strength (MPa) | 38.2 | 39.0 | 42.0 |
| Relative 28 d strength | 100% | 102% | 110% |

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An apparatus for carbonating wash water produced in the production of concrete wherein the wash water comprises cement and/or supplementary cementitious materials (SCM), comprising
   (i) a source of carbon dioxide;
   (ii) a first conduit operably connected to the source of carbon dioxide that runs to a wash water container, a carbonation loop, or both, for delivering a flow of carbon dioxide to the wash water container, the carbonation loop, or both, wherein
      (a) the wash water container contains wash water from a concrete production site;
      (b) the conduit is configured to deliver carbon dioxide to the wash water in the container, the wash water in the carbonation loop, or both, to produce carbonated wash water, and
      (c) the conduit comprises one or more actuators to adjust the flow of carbon dioxide to the wash water in the container, the wash water in the carbonation loop, or both;
   (iii) a system to transport the carbonated wash water to a concrete mix operation where the carbonated wash water is used as mix water in a concrete mix; and
   (iv) a control system comprising at least two sensors configured to send information connected to a controller, wherein the controller is configured to process the information from the sensors and to modulate carbon dioxide flow by sending a signal to the one or more actuators based on the information, wherein the sensors are configured to monitor at least two of
      (a) pH of the wash water,
      (b) rate of delivery of carbon dioxide to the wash water,
      (c) total amount of wash water in the wash water container,
      (d) temperature of the wash water,
      (e) specific gravity of the wash water,
      (f) concentration of one or more ions in the wash water,
      (g) age of the wash water,
      (h) circulation rate of the wash water,
      (i) timing of circulation of the wash water,
      (j) appearance of bubbles at surface of the wash water,
      (k) carbon dioxide concentration of the air above the wash water,
      (l) electrical conductivity of the wash water,
      (m) optical characteristics of the wash water.

2. The apparatus of claim 1 wherein the controller comprises at least three sensors, wherein the sensors are configured to monitor at least three of
   (a) pH of the wash water,
   (b) rate of delivery of carbon dioxide to the wash water,
   (c) total amount of wash water in the wash water container,
   (d) temperature of the wash water,
   (e) specific gravity of the wash water,
   (f) concentration of one or more ions in the wash water,
   (g) age of the wash water,
   (h) circulation rate of the wash water,
   (i) timing of circulation of the wash water,
   (j) appearance of bubbles at surface of the wash water,
   (k) carbon dioxide concentration of the air above the wash water,
   (l) electrical conductivity of the wash water,
   (m) optical characteristics of the wash water.

3. The apparatus of claim 1 wherein the controller comprises at least four sensors, wherein the sensors are configured to monitor at least four of
   (a) pH of the wash water,
   (b) rate of delivery of carbon dioxide to the wash water,
   (c) total amount of wash water in the wash water container,
   (d) temperature of the wash water,
   (e) specific gravity of the wash water,
   (f) concentration of one or more ions in the wash water,
   (g) age of the wash water,
   (h) circulation rate of the wash water,
   (i) timing of circulation of the wash water,
   (j) appearance of bubbles at surface of the wash water,
   (k) carbon dioxide concentration of the air above the wash water,
   (l) electrical conductivity of the wash water,
   (m) optical characteristics of the wash water.

4. The apparatus of claim 1 wherein the controller comprises at least five sensors, wherein the sensors are configured to monitor at least five of
   (a) pH of the wash water,
   (b) rate of delivery of carbon dioxide to the wash water,
   (c) total amount of wash water in the wash water container,
   (d) temperature of the wash water,
   (e) specific gravity of the wash water,
   (f) concentration of one or more ions in the wash water,
   (g) age of the wash water,
   (h) circulation rate of the wash water,
   (i) timing of circulation of the wash water,
   (j) appearance of bubbles at surface of the wash water,
   (k) carbon dioxide concentration of the air above the wash water,
   (l) electrical conductivity of the wash water,
   (m) optical characteristics of the wash water.

5. The apparatus of claim 1 wherein the controller comprises at least six sensors, wherein the sensors are configured to monitor at least six of
   (a) pH of the wash water,
   (b) rate of delivery of carbon dioxide to the wash water,
   (c) total amount of wash water in the wash water container, (d) temperature of the wash water,
(e) specific gravity of the wash water,
(f) concentration of one or more ions in the wash water,
(g) age of the wash water,
(h) circulation rate of the wash water,
(i) timing of circulation of the wash water,
(j) appearance of bubbles at surface of the wash water,
(k) carbon dioxide concentration of the air above the wash water,
(l) electrical conductivity of the wash water,
(m) optical characteristics of the wash water.

6. The apparatus of claim 1 wherein the controller comprises at least seven sensors, wherein the sensors are configured to monitor at least seven of
(a) pH of the wash water,
(b) rate of delivery of carbon dioxide to the wash water,
(c) total amount of wash water in the wash water container,
(d) temperature of the wash water,
(e) specific gravity of the wash water,
(f) concentration of one or more ions in the wash water,
(g) age of the wash water,
(h) circulation rate of the wash water,
(i) timing of circulation of the wash water,
(j) appearance of bubbles at surface of the wash water,
(k) carbon dioxide concentration of the air above the wash water,
(l) electrical conductivity of the wash water,
(m) optical characteristics of the wash water.

7. The apparatus of claim 1 wherein the controller comprises two sensors, wherein the sensors are configured to monitor specific gravity of the wash water and temperature of the wash water.

8. The apparatus of claim 7 wherein the controller further comprises a sensor configured to monitor total amount of wash water in the container.

9. The apparatus of claim 8 wherein the controller further comprises a sensor configured to monitor rate of delivery of carbon dioxide to the wash water.

10. The apparatus of claim 7 wherein the controller further comprises a sensor configured to monitor rate of delivery of carbon dioxide to the wash water.

11. The apparatus of claim 7 wherein the controller further comprises a sensor configured to monitor circulation rate of the wash water.

12. The apparatus of claim 1 wherein the first conduit runs to a carbonation loop and is configured to deliver carbon dioxide to the wash water in the carbonation loop to produce carbonated wash water.

13. The apparatus of claim 12 wherein the controller comprises two sensors, wherein the sensors are configured to monitor specific gravity of the wash water and temperature of the wash water.

14. The apparatus of claim 13 wherein the controller further comprises a sensor configured to monitor total amount of wash water in the container.

15. The apparatus of claim 13 wherein the controller further comprises a sensor configured to monitor rate of delivery of carbon dioxide to the wash water.

16. The apparatus of claim 12 wherein the controller further comprises a sensor configured to monitor rate of delivery of carbon dioxide to the wash water.

17. The apparatus of claim 12 wherein the controller further comprises a sensor configured to monitor circulation rate of the wash water.

* * * * *